US011000143B2

(12) United States Patent
Han et al.

(10) Patent No.: US 11,000,143 B2
(45) Date of Patent: May 11, 2021

(54) USER EQUIPMENT CONFIGURED TO TRANSMIT A FOOD MODEL TO A COOKING APPARATUS

(71) Applicant: Samsung Electronics Co., Ltd., Suwon-si (KR)

(72) Inventors: Jeong Su Han, Suwon-si (KR); Boo-Keun Yoon, Yongin-si (KR); Yong Jong Park, Seongnam-si (KR); Jong Sung Park, Seoul (KR); Eung Ryeol Seo, Suwon-si (KR); Han Jun Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 848 days.

(21) Appl. No.: 15/642,739

(22) Filed: Jul. 6, 2017

(65) Prior Publication Data

US 2018/0008079 A1    Jan. 11, 2018

Related U.S. Application Data

(60) Provisional application No. 62/360,654, filed on Jul. 11, 2016.

(30) Foreign Application Priority Data

Aug. 12, 2016  (KR) .................... 10-2016-0103141

(51) Int. Cl.
*A47J 27/00* (2006.01)
*A47J 36/24* (2006.01)

(52) U.S. Cl.
CPC ............. *A47J 27/002* (2013.01); *A47J 36/24* (2013.01)

(58) Field of Classification Search
CPC ...... G06Q 50/12; G06Q 30/06; G06Q 10/087; G06Q 20/18; G07F 17/0085;
(Continued)

(56) References Cited

U.S. PATENT DOCUMENTS 8,218,402 B2    7/2012 Lewis et al.
2012/0064204 A1    3/2012 Davila et al.
(Continued)

FOREIGN PATENT DOCUMENTS

CN    104921281 A    9/2015
EP    0321188 A2    6/1989
(Continued)

OTHER PUBLICATIONS

Extended European Search Report dated Jul. 5, 2019, issued in a counterpart European application No. 17827878.4-1006 / 3448178.
(Continued)

*Primary Examiner* — Phuong T Nguyen
(74) *Attorney, Agent, or Firm* — Jefferson IP Law, LLP

(57) ABSTRACT

A user equipment is provided. The user equipment includes a user interface, a transceiver and a processor. The user interface may receive an input of a food model including at least one of a shape, an ingredient, or a color of a food in accordance with a touch input of a user. The transceiver may transmit information of the food model to a cooking apparatus capable of shaping and heating the food. The processor may transmit the information of the food model to the cooking apparatus via the transceiver to allow the cooking apparatus to shape the food according to the food model. Further, the user interface may display an automatic cooking button, a draw button, a cooking method button, and an output button.

16 Claims, 115 Drawing Sheets

(58) Field of Classification Search
CPC ........ B60P 3/0257; A47J 27/002; A47J 36/00;
A47J 2027/043
USPC ......... 99/325, 331, 357, 427, 523, 468, 486,
99/334; 426/233, 393, 497, 95, 653, 446,
426/523
See application file for complete search history.

(56) References Cited

U.S. PATENT DOCUMENTS

2012/0328747 A1   12/2012  Levy
2014/0370167 A1*  12/2014  Garden ................... B60P 3/007
426/233

FOREIGN PATENT DOCUMENTS

| | | |
|---|---|---|
| EP | 1 741 989 A2 | 1/2007 |
| EP | 2 659 657 B1 | 10/2014 |
| KR | 10-2008-0027959 A | 3/2008 |
| KR | 10-2015-0116694 A | 10/2015 |
| KR | 10-2016-0009067 A | 1/2016 |
| KR | 10-2016-0089224 A | 7/2016 |
| WO | 2005/067639 A2 | 7/2005 |
| WO | 2014190217 A1 | 11/2014 |
| WO | 2016059023 A1 | 4/2016 |

OTHER PUBLICATIONS

Chinese Office Action dated Nov. 4, 2020 issued in Chinese Application No. 201780043184.1.

\* cited by examiner

FIG. 72

| TIME \ TEMPERATURE | 100°C | 120°C | 120°C | 160°C |
|---|---|---|---|---|
| 10 MINUTES | ▨ | ▨ | ▨ | ▨ |
| 20 MINUTES | ▨ | ... | ... | ... |
| 30 MINUTES | ▨ | ... | ... | ... |
| 40 MINUTES | ▨ | ... | ... | ... |

USER EQUIPMENT CONFIGURED TO TRANSMIT A FOOD MODEL TO A COOKING APPARATUS

CROSS-REFERENCE TO RELATED APPLICATION(S)

This application claims the benefit under 35 U.S.C. § 119(e) of a U.S. Provisional application filed on Jul. 11, 2016 in the U. S. Patent and Trademark Office and assigned Ser. No. 62/360,654, and under 35 U.S.C. § 119(a) of a Korean patent application filed on Aug. 12, 2016 in the Korean Intellectual Property Office and assigned Serial number 10-2016-0103141, the entire disclosure of each of which is hereby incorporated by reference.

TECHNICAL FIELD

The present disclosure relates to a cooking apparatus and a cooking system. More particularly, the present disclosure relates to a user equipment, a cooking apparatus, and a cooking system to which three-dimensional (3D) printing technology is applied.

BACKGROUND

In recent years, cooking apparatuses using three-dimensional (3D) printing technology have drawing considerable attention. A cooking apparatus is an appliance for cooking food and a 3D printer is a device capable of producing a 3D object.

A user may easily cook a desired food using a cooking apparatus having a 3D printing function. For example, when the user inputs a recipe of a food to be cooked to the cooking apparatus, printing and cooking of the food are processed, and then the user may obtain the desired food after a predetermined time. In this manner, the user may easily cook a desired food by using the cooking apparatus having the 3D printing function. Since the cooking apparatus having the 3D printing function may reduce the burden of cooking on the user, the demand for a cooling apparatus having a 3D printing function is expected to continue to increase.

The cooking apparatus may include a cartridge to contain food ingredients used to print a food and an extruding unit to extrude the food ingredients contained in the cartridge. If the food ingredients contained in the cartridge are not appropriately extruded, it is expected that a large amount of the food ingredients is thrown out in a state of being contained in the cartridge. Thus, there is a need to develop methods of preventing a waste of food ingredients.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a cooking apparatus having an improved structure suitable for cooking various foods by using three-dimensional (3D) printing technology.

Another aspect of the present disclosure is to provide a user equipment and a cooking apparatus capable of displaying a food shape in response to a touch input of a user and shaping the food according to the displayed food shape.

Another aspect of the present disclosure is to provide a user equipment and a cooking apparatus allowing a user to easily input a food shape.

Another aspect of the present disclosure is to provide a user equipment and a cooking apparatus capable of showing an appearance of a food shaped in accordance with the food shape input by the user after heating.

Additional aspects of the disclosure will be set forth in part in the description which follows and, in part, will be obvious from the description, or may be learned by practice of the disclosure.

In accordance with an aspect of the present disclosure, a user equipment is provided. The user equipment includes a user interface, a transceiver and a processor. The user interface may receive an input of a food model including at least one of a shape, an ingredient, or a color of a food in accordance with a touch input of a user. The transceiver may transmit information of the food model to a cooking apparatus capable of shaping and heating the food. The processor may transmit the information of the food model to the cooking apparatus via the transceiver to allow the cooking apparatus to shape the food according to the food model. Further, the user interface may display an automatic cooking button for selecting a predetermined food shape, a draw button for inputting a food shape drawn on the user interface by the user, a cooking method button for inputting a cooking method for the food, and an output button for outputting the food in accordance with the food shape and the cooking method.

The processor may display a list of food shapes on the user interface in response to a touch on the automatic cooking button.

The processor may identify food ingredients prepared in the cooking apparatus and display a list of foods shapeable from the food ingredients.

The processor may display a food shape selected by the user.

The processor may transmit the food model including the selected food shape to the cooking apparatus to allow the cooking apparatus to shape the food according to the food shape selected by the user.

The processor may identify food ingredients prepared in the cooking apparatus and display an insufficient food ingredient to shape the food according to the food shape selected by the user.

The processor may display a model drawing screen to draw the food shape selected by the user on the user interface in response to a touch on the draw button.

The processor may sense a touch point of the user and create a food shape based on a moving path of the sensed touch point.

The processor may display a reference image representing the food on the model drawing screen.

The processor may display at least one of a line, a circle, or polygon in accordance with a touch input of the user in a model drawing region and create the food shape from the at least one of the line, the circle, and the polygon.

When the user touches the inside of the food shape, the processor may display an additional information input menu for inputting the thickness, an ingredient, and a color of the food.

The processor may display a cooking method setting screen for inputting a cooking method including a heating temperature and a heating time on the user interface in response to a touch on the cooking method button.

The processor may transmit the cooking method to the cooking apparatus to allow the cooking apparatus to cook the food according to the heating temperature and the heating time input via the cooking method setting screen.

The processor may display a preview of the food and the preview of food may represent an appearance of the food after cooking by the cooking apparatus in response to a touch on the output button.

The preview of the food may represent the appearance of the food after the food is cooked according to the heating temperature and the heating time input by the user.

The processor may modify a size of the food shape in accordance with the touch input of the user.

The processor may automatically arrange the food shape in accordance with the touch input of the user.

In accordance with another aspect of the present disclosure, a user equipment is provided. The user equipment includes a user interface, a storage, a transceiver and a processor. The user interface may receive a touch input of a user and display an image in response to the touch input. The storage may store information on a plurality of food shapes representing appearances of foods. The transceiver may transmit information of a food shape to a cooking apparatus capable of shaping and heating a food. The processor may display a food shape selected by the user among the plurality of food shapes on the user interface and transmit the information of the food shape to the cooking apparatus via the transceiver to allow the cooking apparatus to shape the food in accordance with a food model.

The processor may detect a region closed by the selected food shape and inputs an ingredient and color of the food.

The processor may transmit a food model including the selected food shape, the ingredient, and the color to the cooking apparatus to allow the cooking apparatus to shape the food in accordance with the food shape, the ingredient, and the color.

The processor may receive an input of a cooking method including a heating temperature and a heating time via the user interface.

The processor may transmit the cooking method to the cooking apparatus to allow the cooking apparatus to heat the food according to the heating temperature and the heating time of the food.

The processor may display a preview of the food representing an appearance of the food after heating.

The processor may modify a size of the food shape in response to the touch input of the user.

The processor may repeat an arrangement of the food shape in response to the touch input of the user.

In accordance with another aspect of the present disclosure, a cooking apparatus is provided. The cooking apparatus includes a user interface, a food shaping device and a processor. The user interface may sense a touch input of a user and display an image in response to the touch input. The food shaping device may discharge food ingredients. The processor may sense a shape drawn on the user interface by the user and control the food shaping device to discharge the food ingredients in accordance with the drawn shape.

The processor may sense a touch point of the user on the user interface and display a moving path of the touch point in response to the touch input of the user.

The processor may display at least one of a line, circle, or a polygon on the user interface in response to the touch input of the user.

The processor may receive an input of an ingredient and color of the food for a closed region of the drawn shape.

The processor may display the input ingredient and color in the closed region.

The processor may control the food shaping unit to discharge the food ingredients according to the drawn shape, the ingredient, and the color.

In accordance with another aspect of the present disclosure, a cooking system includes a user equipment and a cooking apparatus. The user equipment may include a user interface configured to receive a touch input of a user and display an image in response to the touch input, a first transceiver configured to communicate with the cooking apparatus, and a first processor configured to sense a shape drawn on the user interface by the user and transmit information of the drawn shape to the cooking apparatus via the first transceiver. The cooking apparatus may include a second transceiver configured to communicate with the user equipment, a food shaping device configured to discharge food ingredients, a food heating device configured to heat a food shaped by using the food ingredients, and a second processor configured to receive information of the drawn shape via the second transceiver and control the food shaping device to discharge the food ingredients according to the drawn shape.

The first processor may sense a touch point of the user on the user interface and display a moving path of the touch point in response to the touch point of the user.

The first processor may receive an input of an ingredient and color of the food for a closed region of the drawn shape.

The user equipment may further include a camera configured to acquire a food image, and the first processor may transmit the food image acquired by the camera to the cooking apparatus via the first transceiver. The cooking apparatus may also include a camera configured to acquire a food image (e.g., inside or outside of the cooking apparatus) and transmit the food image acquired by the camera to the user equipment via the second transceiver, According to the present disclose, a food to be cooked by the user may be three-dimensionally shaped and cooked by applying the food shaping module to the cooking apparatus.

According to the present disclosure, provided are a user equipment and a cooking apparatus capable of displaying the food shape in accordance with the touch input of the user and shaping the food in accordance with the displayed food shape.

According to the present disclosure, provided are a user equipment and a cooking apparatus that allow the user to easily input the food shape.

According to the present disclosure, provided are a user equipment and a cooking apparatus capable of displaying an appearance of a food shaped in accordance with a food shape input by the user after heating.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 72 illustrates an example of data to generate a preview of food according to an embodiment of the present disclosure;

Throughout the drawings, like reference numerals will be understood to refer to like parts, components, and structures.

DETAILED DESCRIPTION

Figure 1:
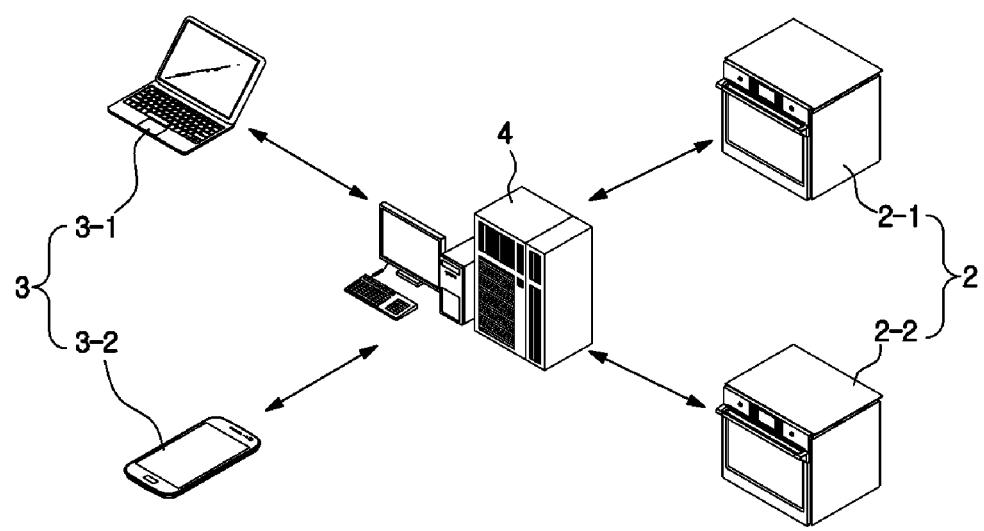
FIG. 1 illustrates a cooking system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the embodiments of the present disclosure, examples of which are illustrated in the accompanying drawings, wherein like reference numerals refer to like elements throughout.

FIG. 1 illustrates a cooking system according to an embodiment of the present disclosure.

Referring to FIG. 1, a cooking system 1 may include a cooking apparatus 2 configured to shape and heat a food, a user equipment 3 (e.g., a laptop computer 3-1 and a smartphone 3-2) configured to acquire information on the food from a user, and an information relay device 4 configured to relay communications between the cooking apparatus 2 and user equipment 3.

The cooking apparatus 2 may shape the food by three-dimensional (3D) printing. The food that is a mixture of food ingredients and/or seasonings is in an uncooked or unheated state. After cooking or heating the food by the cooking apparatus 2, the user may eat the food.

The cooking apparatus 2 may receive an input of a 3D food shape and three-dimensionally shape a food having by 3D printing. For example, the cooking apparatus 2 may shape the 3D shape of food by forming a food ingredient layer with an appropriate thickness by repeating a discharge of proper amounts of food ingredients and stacking the food ingredient layer.

The cooking apparatus 2 may receive the 3D food shape from the user in various ways. For example, the cooking apparatus 2 may receive information on the 3D food shape from the user equipment 3 via communication networks or may directly receive an input of the 3D shape of food from the user via a user interface.

The cooking apparatus 2 may heat the food having a 3D shape in various ways. For example, the cooking apparatus 2 may directly heat the food using a heater or may heat air surrounding the food by convection. Also, the cooking apparatus 2 may heat the food using microwaves.

The cooking apparatus 2 may include an electric oven that heats food using an electric heater, a convection oven that heats food using hot air, a microwave oven that heats food using microwaves, a gas oven that heats food by burning a gas fuel, and the like.

The user equipment 3 may receive an input of the 3D shape of food from the user and transmit information on the 3D shape of food to the cooking apparatus 2. For example, the user equipment 3 may receive an input of the 3D shape of food from the user via the user interface 3 and transmit information on the 3D shape of food to the cooking apparatus 2 via the information relay device 4.

In addition, the user equipment 3 may assign the cooking operation to a plurality of cooking apparatuses 2-1 and 2-2 in accordance with operating states of the cooking apparatuses 2-1 and 2-2. For example, while a first cooking apparatus 2-1 is in operation, the user equipment 3 may transmit the cooking operation to a second cooking apparatus 2-2.

The user equipment 3 may be implemented using a computer or portable terminal that may access a network. In this regard, examples of the computer may include a notebook computer, desktop, laptop, tablet PC, slate PC, and the like provided with a WEB Browser. In addition, examples of the portable terminal, as a wireless communication device with portability and mobility, may include a hand-held wireless communication device such as a personal communication system (PCS), global system for mobile communications (GSM), personal digital cellular (PDC), personal handy-phone system (PHS), personal digital assistant (PDA), international mobile telecommunication (IMT)-2000, code division multiple access (CDMA)-2000, w-code division multiple access (W-CDMA), wireless broadband Internet (WiBro) terminal, and smartphone and a wearable device such as a watch, ring, bracelet, anklet, necklace, glasses, contact lenses, and head-mounted-device (HMD).

The information relay device 4 may relay information between the cooking apparatus 2 and the user equipment 3. For example, the information relay device 4 may receive information on the 3D shape of food from the user equipment 3 and transmit the information on the 3D shape of food to the cooking apparatus 2. Also, the information relay device 4 may receive information on the operating state from the cooking apparatus 2 and transmit the information on the operating state of the cooking apparatus 2 to the user equipment 3.

The information relay device 4 may include a server device that simply relays signals between the cooking apparatus 2 and the user equipment 3 or a network relay device that relays communications between the cooking apparatus 2 and the user equipment 3. For example, the information relay device 4 may include a server device for providing a service to clients, a repeater for amplifying a weakened signal, a Hub for sending out data received via one of a plurality of ports via another port, a bridge for connecting different segments in a network, a switch for transmitting data received via one of a plurality of ports to a target port, a router for connecting independent networks, and a gateway for connecting networks having different protocols.

Hereinafter, the cooking apparatus 2, the user equipment 3, and the information relay device 4 will be described in more detail.

FIGS. 2 to 8 illustrate views of a case to which a cartridge assembly 200 according to a first embodiment of the present disclosure.

Figure 2:
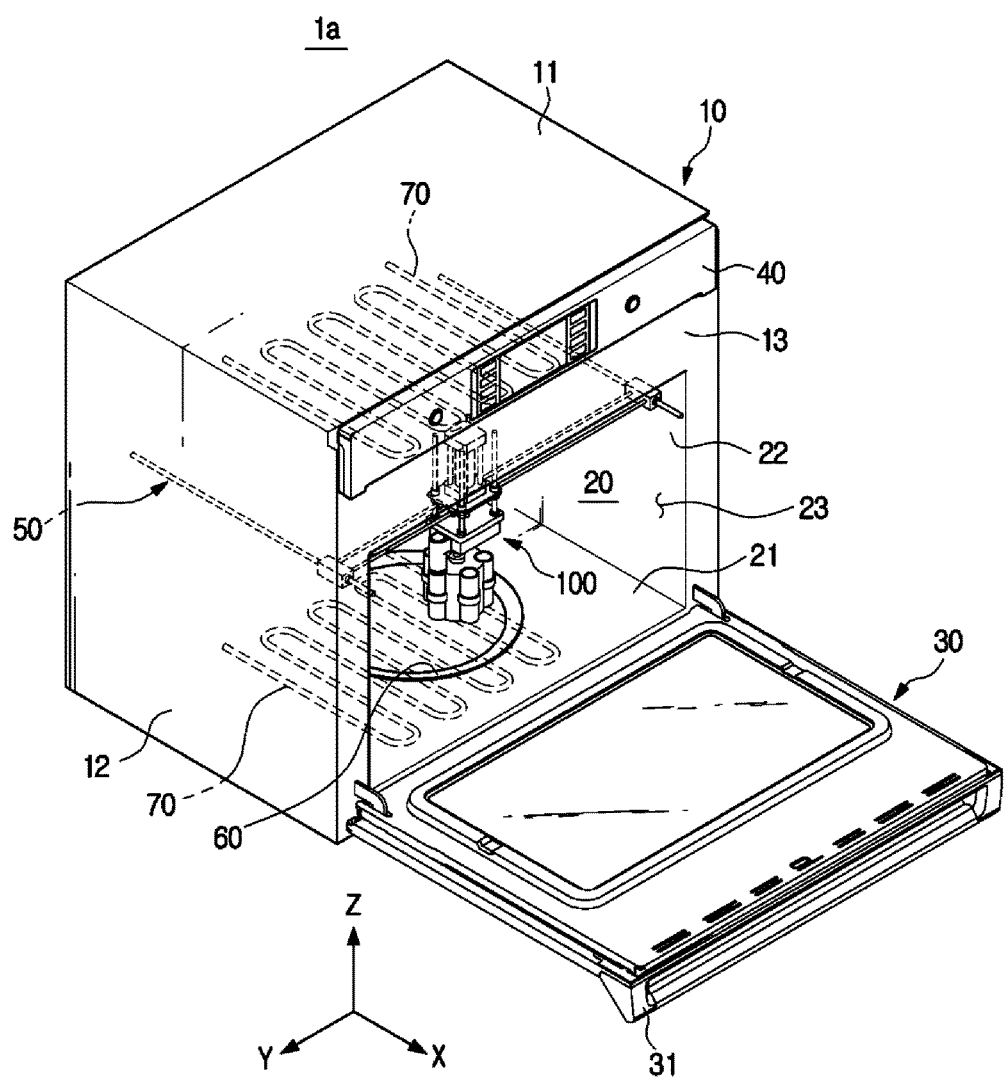
FIG. 2 is a perspective view illustrating a cooking apparatus according to an embodiment of the present disclosure.

FIG. 2 is a perspective view illustrating a cooking apparatus according to an embodiment of the present disclosure.

Referring to FIG. 2, a cooking apparatus 1a may include a main body 10. The main body 10 may define an appearance of the cooking apparatus 1a. The main body 10 may have a top surface 11, a bottom surface (not shown), a rear surface (not shown), both side surfaces 12, and a front surface 13.

The cooking apparatus 1a may further include a cooking chamber 20 disposed inside the main body 10. The cooking chamber 20 may be defined by a top surface (not shown), a bottom surface 21, a rear surface (not shown), both side surfaces 22, and an open font surface 23. An insulating member (not shown) may be disposed between the cooking chamber 20 and the main body 10 to insulate the cooking chamber 20.

The cooking apparatus 1a may further include a door 30. The door 30 may be rotatably installed on the main body 10 to open or close the front surface 23 of the cooking chamber 20. The door 30 may define an appearance of the main body 10 and the cooking apparatus 1a. The door 30 may be provided with a handle 31 for the convenience of the user.

The cooking apparatus 1a may further include a control panel 40 to control the operation of the cooking apparatus 1a. The control panel 40 may be installed at an upper portion of the font surface 23 of the main body 10, but the position of the control panel 40 may be modified in various ways.

The cooking apparatus 1a may further include a food shaping module 100. The food shaping module 100 may be movably disposed inside the cooking chamber 20. The food shaping module 100 may include a cartridge assembly 200 and a driving device 120 configured to drive the cartridge assembly 200. The food shaping module 100 will be described in more detail later.

The cooking apparatus 1a may further include a guide rod 50 configured to guide the food shaping module 100. The guide rod 50 may include fixed rods 51 fixedly installed at the both side surfaces 22 of the cooking chamber 20. The fixed rods 51 may be fixed to the both side surfaces 22 of the cooking chamber 20 to extend in a longitudinal direction X of the cooking apparatus 1a. The fixed rods 51 installed at the both side surfaces 22 of the cooking chamber 20 may be parallel to each other. The guide rod 50 may further include moving rods 52 moving along the fixed rods 51. The moving rods 52 may extend in a lateral direction Y of the cooking apparatus 1a. Both ends of the moving rods 52 may be coupled to the fixed rods 51 respectively. In particularly, the both ends of the moving rods 52 may be coupled to the fixed rods 51 respectively by binding members 53 such that the moving rods 52 move in the longitudinal direction X of the cooking apparatus 1a along the fixed rods 51. The food shaping module 100 may be movably coupled to the moving rods 52. Particularly, the food shaping module 100 may be coupled to the moving rods 52 to move in the lateral direction Y of the cooking apparatus 1a along the moving rods 52. The movement of the food shaping module 100 will be described in more detail later.

The cooking apparatus 1a may further include a tray 60 disposed on the bottom surface 21 of the cooking chamber 20. The tray 60 may be installed on the bottom surface 21 of the cooking chamber 20 to be rotated. The tray 60 may be installed on the bottom surface 21 of the cooking chamber 20 such that a height of the tray 60 is adjusted in the in a vertical direction Z of the cooking apparatus 1a.

The cooking apparatus 1a may further include at least one heater 70 to heat food. The at least one heater 70 may be installed in the cooking chamber 20. For example, the at least one heater 70 may be installed on the bottom surface 21 of the cooking chamber 20 or the top surface (not shown) of the cooking chamber 20. However, the installation position of the heater 70 may be modified in various ways.

The cooking apparatus 1a may further include a machine room (not shown) in which various electric components used to drive the cooking apparatus 1a are installed. For example, the machine room may be disposed in a space between the cooking chamber 20 and the main body 10. However, the position of the machine room is not limited and may be modified in various ways.

The cooking apparatus 1a may further include a fan (not shown) installed to circulate air heated by the at least one heater 70.

Figure 3:
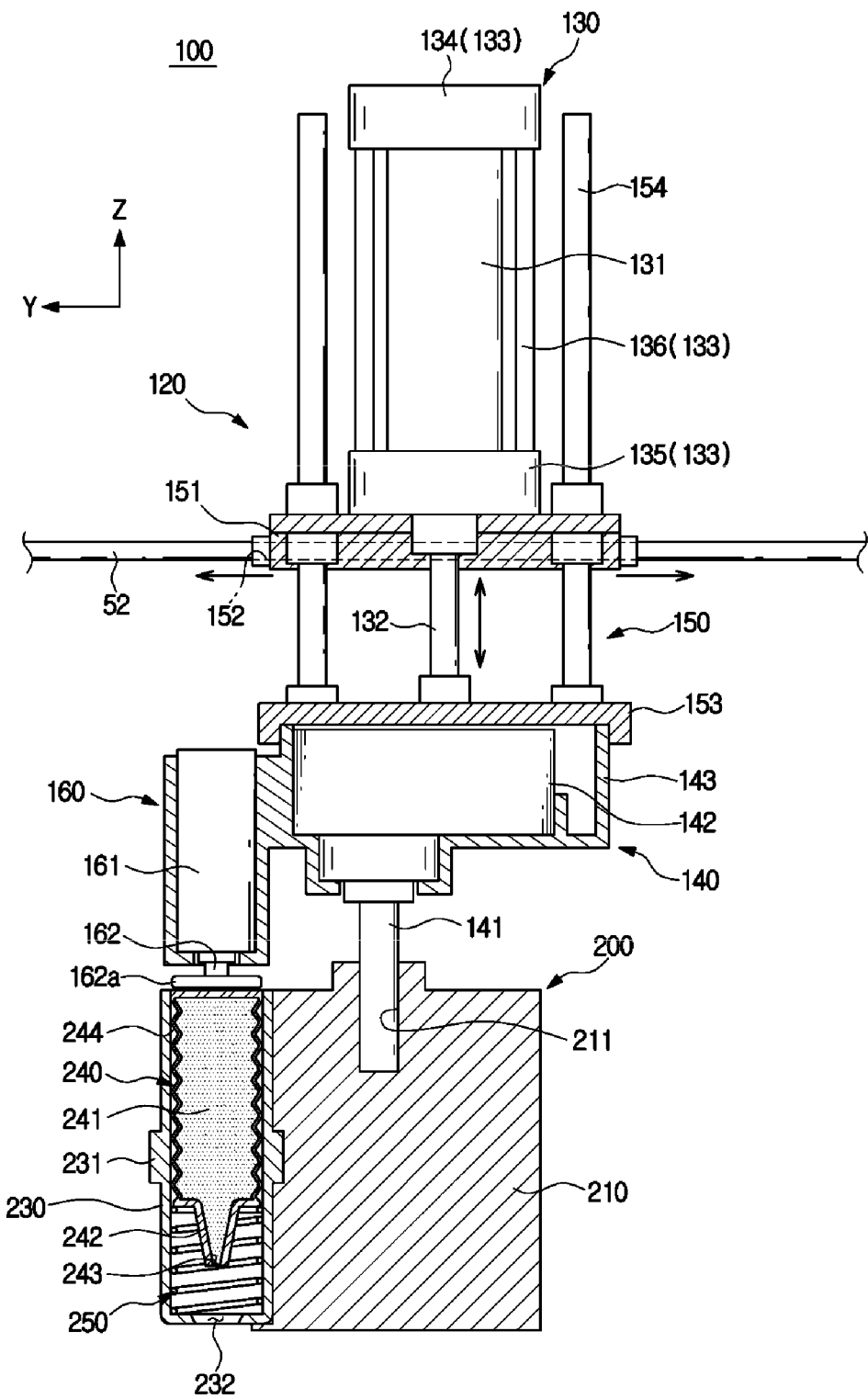
FIG. 3 is a cross-sectional view illustrating a food shaping module of the cooking apparatus according to an embodiment of the present disclosure.

FIG. 3 is a cross-sectional view illustrating a food shaping module of the cooking apparatus according to an embodiment of the present disclosure.

Referring to FIG. 3, the food shaping module 100 may include a cartridge assembly 200 and a driving device 120 configured to drive the cartridge assembly 200.

The driving device 120 may include a vertical movement adjusting unit 130 (e.g., a vertical movement adjusting device) that moves the cartridge assembly 200 in the vertical direction Z of the cooking apparatus 1a.

The vertical movement adjusting unit 130 may include an actuator. For example, the vertical movement adjusting unit 130 may include an electric actuator, pneumatic actuator, hydraulic actuator, or the like. Hereinafter, the pneumatic actuator will be described as an example of the vertical movement adjusting unit 130.

The vertical movement adjusting unit 130 may include a cylinder 131. Although the cylinder 131 may have a cylindrical shape, the shape of the cylinder 131 may be modified in various ways.

In addition, the vertical movement adjusting unit 130 may further include a piston rod 132 reciprocating by an air pressure. The piston rod 132 may be accommodated in the cylinder 131 such that one end of the piston rod 132 is fixed to a connection unit 150 (e.g., a connection device). Particularly, one end of the piston rod 132 may be fixed to a bottom plate 153 of the connection unit 150.

The vertical movement adjusting unit 130 may further include a housing 133. The housing 133 may be disposed on the connection unit 150. Particularly, the housing 133 may be disposed on a top plate 151 of the connection unit 150. The housing 133 may include a top cover 134 coupled to a top end of the cylinder 131 and a bottom cover 135 coupled to a bottom end of the cylinder 131. In addition, the housing 133 may further include a plurality of connection rods 136 connecting the top cover 134 with the bottom cover 135. The plurality of connection rods 136 may be disposed outside the cylinder 131. In another aspect, the cylinder 131 may be accommodated in a space defined by the top cover 134, the bottom cover 135, and the plurality of connection rods 136. One end of the piston rod 132 may penetrate the bottom cover 135 and the top plate 151 to be fixed to the bottom plate 153.

The type of the vertical movement adjusting unit 130 is not limited to the actuator so long as the vertical movement adjusting unit 130 may adjust the height of the cartridge assembly 200.

The driving device 120 may further include a rotation adjusting unit 140 (e.g., a rotation adjusting device) that rotates the cartridge assembly 200.

The rotation adjusting unit 140 may include a rotation shaft 141 coupled to the cartridge assembly 200. The rotation shaft 141 may be coupled to a cartridge body 210 to allow rotational movement of the cartridge assembly 200.

The rotation adjusting unit 140 may further include a driving motor 142. The driving motor 142 is connected to the rotation shaft 141 to provide a rotational force to the rotation shaft 141.

In addition, the rotation adjusting unit 140 may further include a casing 143 provided to accommodate the driving motor 142. The casing 143 may be fixed to the connection unit 150. Particularly, the casing 143 may be fixed to the bottom plate 153 of the connection unit 150.

The driving device 120 may further include the connection unit 150 connecting the vertical movement adjusting unit 130 with the rotation adjusting unit 140. The connection unit 150 may be disposed between the vertical movement adjusting unit 130 and the rotation adjusting unit 140.

The connection unit 150 may include a top plate 151 provided to support the vertical movement adjusting unit 130. The bottom cover 135 of the vertical movement adjusting unit 130 may be fixed to the top plate 151. The top plate 151 may have moving rod mounting holes 152 to which the moving rods 52 are coupled. The number and size of the moving rod mounting holes 152 may correspond to the number and size of the moving rods 52. Since the moving rods 52 are movably coupled to the moving rod mounting holes 152 of the connection unit 150, the food shaping module 100 may move in the lateral direction Y of the cooking apparatus 1*a* along the moving rods 52.

In addition, the connection unit 150 may further include the bottom plate 153 coupled to the rotation adjusting unit 140. Particularly, the bottom plate 153 of the connection unit 150 may be coupled to a casing 143 of the rotation adjusting unit 140. One end of the piston rod 132 of the vertical movement adjusting unit 130 may be fixed to the bottom plate 153 of the connection unit 150.

In addition, the connection unit 150 may further include a guide rod 154 connecting the top plate 151 with the bottom plate 153. The guide rod 154 may penetrate the top plate 151. In addition, one end of the guide rod 154 may be fixed to the bottom plate 153. The vertical movement adjusting unit 130 may be disposed inside the guide rod 154. The guide rod 154 may move integrally with the bottom plate 153. For example, when the piston rod 132 of the vertical movement adjusting unit 130 moves downward in the cooking apparatus 1*a*, a gap between the top plate 151 and the bottom plate 153 of the connection unit 150 increases simultaneously increasing a length of the guide rod 154 between the top plate 151 and the bottom plate 153 of the connection unit 150. A stopper (not shown) may be disposed at the guide rod 154. The stopper may limit the movement of the guide rod 154 downward in the cooking apparatus 1*a* to prevent detachment of the guide rod 154 from the top plate 151. The connection unit 150 may include a plurality of guide rods 154.

The driving device 120 may further include an extruding unit 160 (e.g., an extruding device). The extruding unit 160 may press at least one cartridge 240. The extruding unit 160 may be installed inside the cooking chamber 20 such that a food ingredient contained in at least one cartridge 240 is discharged onto the tray 60 (FIG. 2) by pressing the at least one cartridge 240.

The extruding unit 160 may include an actuator. For example, the extruding unit 160 may include an electric actuator, a pneumatic actuator, a hydraulic actuator, or the like. Hereinafter, the pneumatic actuator will be described as the extruding unit 160 by way of example.

The extruding unit 160 may include an extruding unit cylinder 161. Although the extruding unit cylinder 161 may have a cylindrical shape, the shape of the extruding unit cylinder 161 may be modified in various ways.

The extruding unit 160 may further include a piston 162 reciprocating by an air pressure. The piston 162 may include a pressing part 162*a* disposed at one end of the piston 162 to press the at least one cartridge 240.

The extruding unit 160 may be accommodated in the casing 143. Particularly, the extruding unit 160 may be accommodated in the casing 143 such that one end of the piston 162 is located outside the casing 143, In other words, the extruding unit 160 may be accommodated in the casing 143 such that the pressing part 162*a* of the piston 162 is located outside the casing 143. However, the extruding unit 160 may also be accommodated in a separate casing only for the extruding unit 160.

The driving device 120 may include a plurality of extruding units 160 respectively corresponding to a plurality of cartridges 240.

The cartridge assembly 200 may include a plurality of cartridges 240 in which food ingredients are contained. The extruding unit 160 may be provided to selectively press one of the plurality of cartridges 240. The cartridge assembly 200 will be described in more detail later. The type of the extruding unit 160 is not limited to the actuator so long as the extruding unit 160 may press the plurality of cartridges 240.

Figure 4:
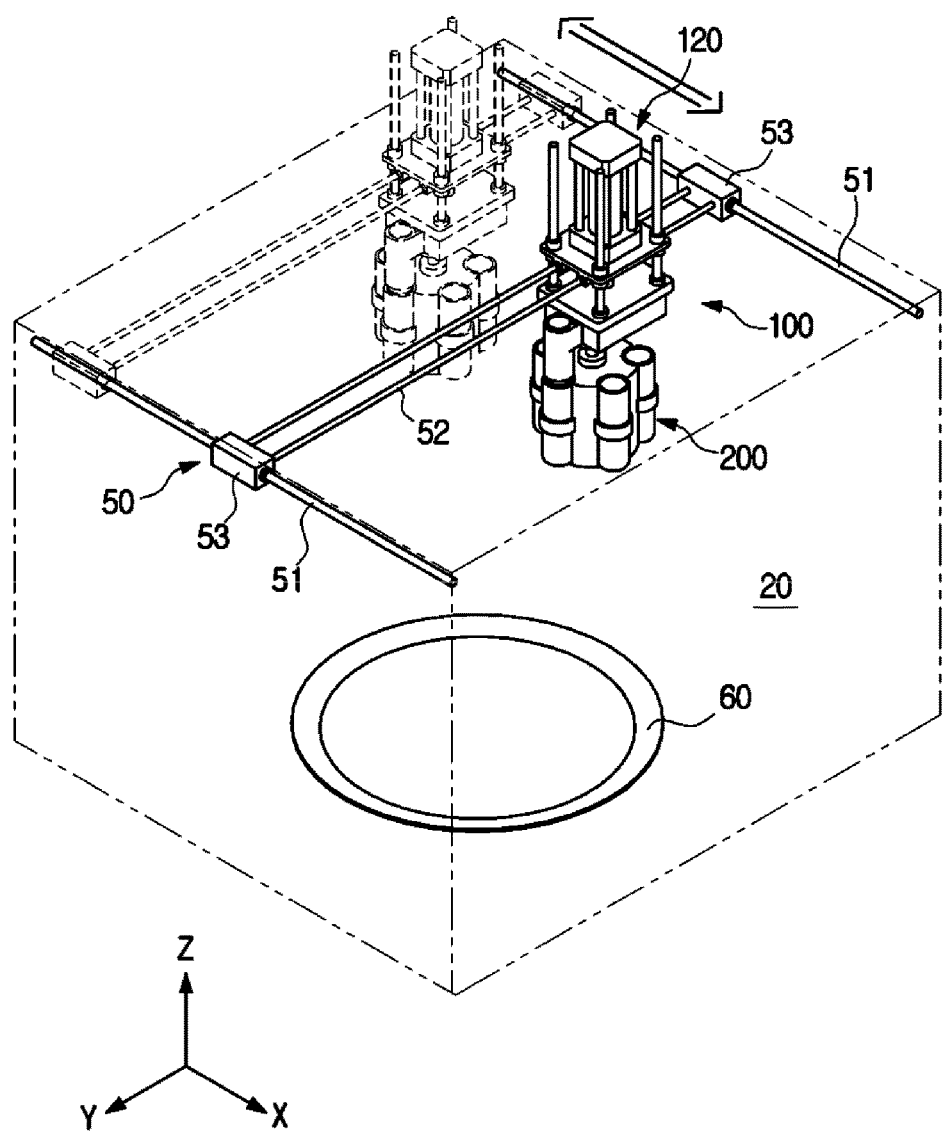
FIG. 4 is a view illustrating the cartridge assembly moving in the longitudinal direction X in the cooking apparatus according to an embodiment of the present disclosure.

FIG. 4 is a view illustrating the cartridge assembly moving in the longitudinal direction X in the cooking apparatus according to an embodiment of the present disclosure.

Referring to FIG. 4, the cartridge assembly 200 may move in the longitudinal direction X of the cooking apparatus 1*a*.

The movement of the cartridge assembly 200 in the longitudinal direction X of the cooking apparatus 1*a* may be implemented by movement of the moving rods 52 that move along the fixed rods 51. The moving rods 52 may move in the longitudinal direction X of the cooking apparatus 1*a* along the fixed rods 51. Thus, the food shaping module 100 coupled to the moving rods 52 may also move in the longitudinal direction X of the cooking apparatus 1*a* along the fixed rods 51 integrally with the moving rods 52.

Figure 5:
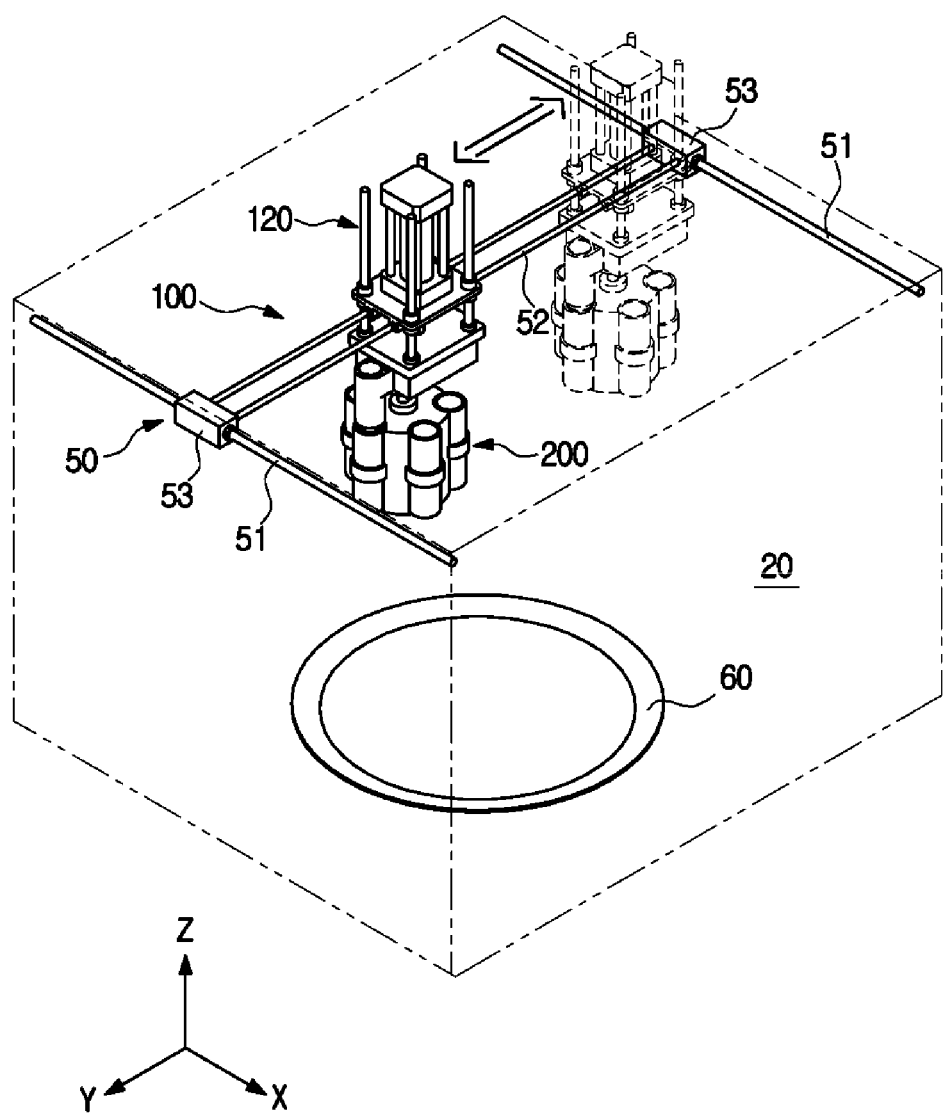
FIG. 5 is a view illustrating the cartridge assembly moving in the lateral direction Y in the cooking apparatus according to an embodiment of the present disclosure.

FIG. 5 is a view illustrating the cartridge assembly moving in the lateral direction Y in the cooking apparatus according to an embodiment of the present disclosure.

Referring to FIG. 5, the cartridge assembly 200 may move in the lateral direction Y of the cooking apparatus 1*a*.

The food shaping module 100 may be coupled to the moving rods 52 to move in the lateral direction Y of the cooking apparatus 1*a* along the moving rods 52. Thus, the cartridge assembly 200 as a component of the food shaping module 100 may also move in the lateral direction Y of the cooking apparatus 1*a*.

Figure 6:
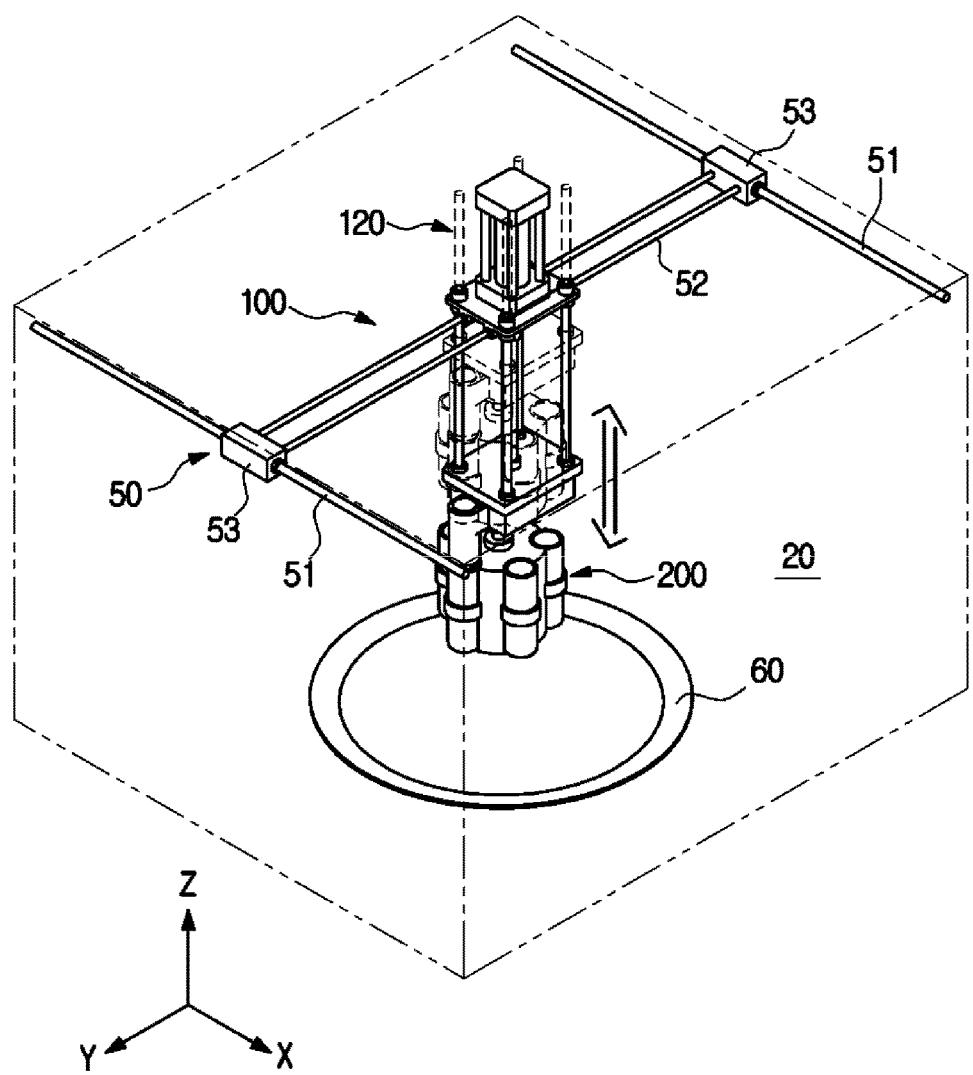
FIG. 6 is a view illustrating the cartridge assembly moving in the vertical direction Z in the cooking apparatus according to an embodiment of the present disclosure.

FIG. 6 is a view illustrating the cartridge assembly moving in the vertical direction Z in the cooking apparatus according to an embodiment of the present disclosure. Refer to FIG. 3 for the reference numerals not illustrated herein.

Referring to FIG. 6, the cartridge assembly 200 may move in the vertical direction Z of the cooking apparatus 1*a*.

The movement of the cartridge assembly 200 in the vertical direction Z of the cooking apparatus 1*a* may be implemented by the operation of the vertical movement adjusting unit 130. Particularly, the movement of the cartridge assembly 200 moving in the vertical direction Z of the cooking apparatus 1a is determined by the movement of the piston rod 132. When the piston rod 132 of the vertical movement adjusting unit 130 moves downward in the cooking apparatus 1a, the cartridge assembly 200 also moves downward in the cooking apparatus 1a. On the contrary, when the piston rod 132 of the vertical movement adjusting unit 130 moves upward in the cooking apparatus 1a, the cartridge assembly 200 also move upward in the cooking apparatus 1a.

Figure 7:
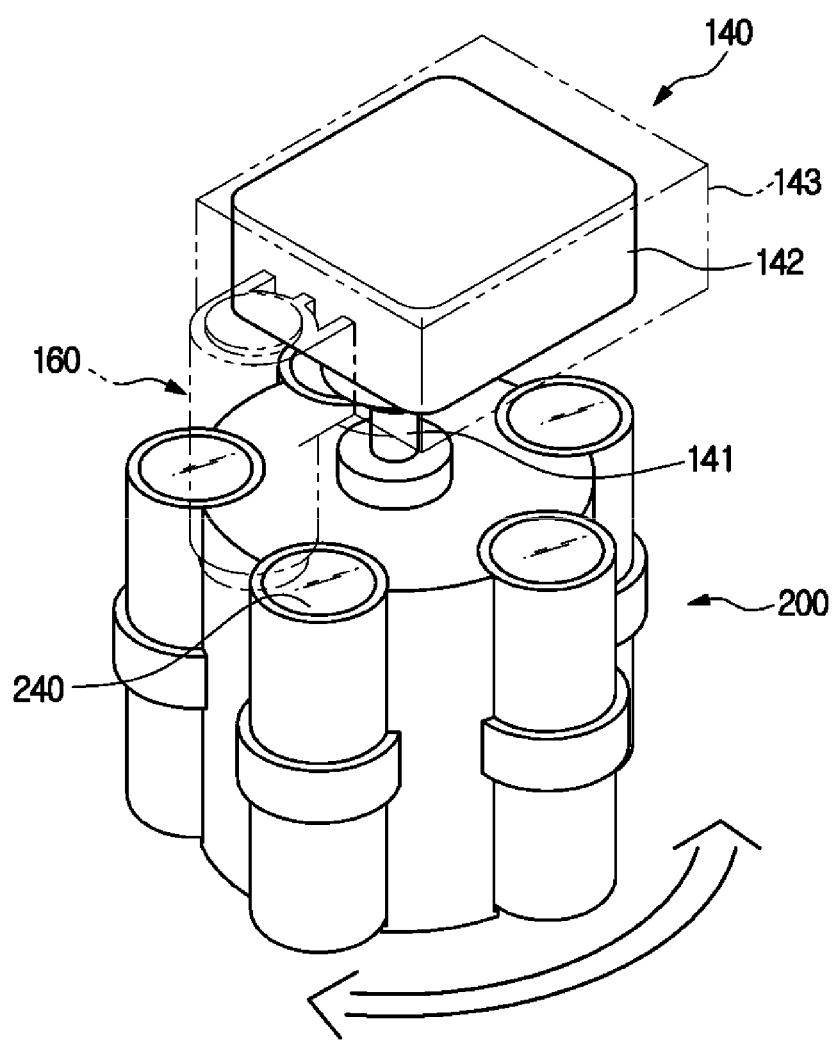
FIG. 7 is a view illustrating rotation of the cartridge assembly in the cooking apparatus according to an embodiment of the present disclosure.

FIG. 7 is a view illustrating rotation of the cartridge assembly in the cooking apparatus according to an embodiment of the present disclosure.

Referring to FIG. 7, the cartridge assembly 200 may rotate about the rotation shaft 141 of the rotation adjusting unit 140. The rotation shaft 141 may rotate upon receiving power from the driving motor 142 of the rotation adjusting unit 140. The cartridge assembly 200 may rotate in one direction or in both directions.

If the cartridge assembly 200 is designed as a rotatable device as described above, the plurality of cartridges 240 may be pressed by using one extruding unit 160. For example, under an assumption that the plurality of cartridges 240 contain different food ingredients, the extruding unit 160 may press one of the plurality of cartridges 240 by controlling the degree of rotation of the cartridge assembly 200.

However, the number of the extruding units 160 is not limited to one. For example, the driving device 120 may include a plurality of extruding units 160 corresponding to the number of the plurality of cartridges 240.

Figure 8:
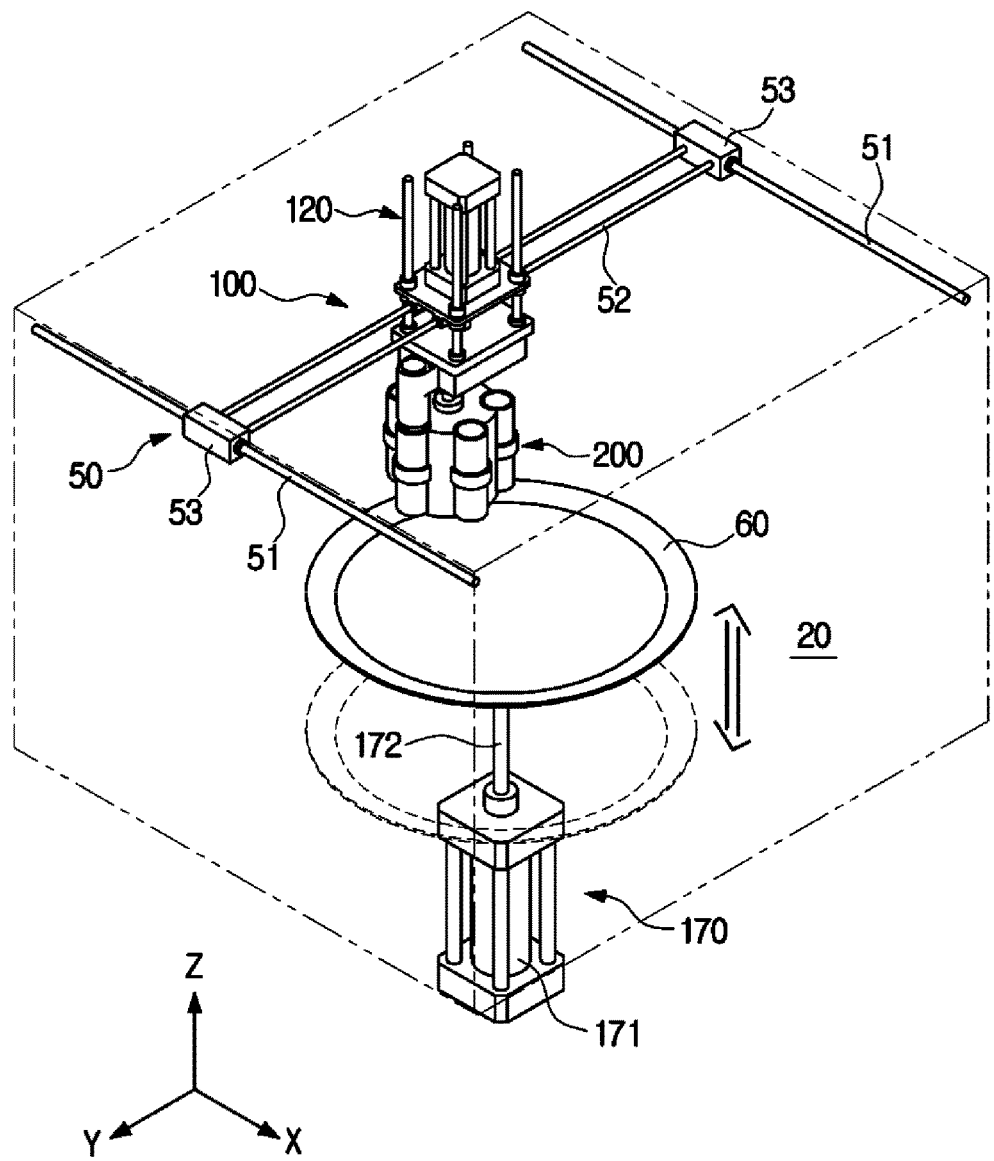
FIG. 8 is a view illustrating a tray moving in the vertical direction Z in the cooking apparatus according to an embodiment of the present disclosure.

FIG. 8 is a view illustrating a tray moving in the vertical direction Z in the cooking apparatus according to an embodiment of the present disclosure.

Referring to FIG. 8, the tray 60 may be installed on the bottom surface 21 of the cooking chamber 20 to be movable in the vertical direction Z of the cooking apparatus 1a. That is, the tray 60 may be installed on the bottom surface 21 of the cooking chamber 20 such that the height of the tray 60 is adjustable.

The cooking apparatus 1a may further include a tray height adjusting unit 170 (e.g., a tray height adjusting device).

The tray height adjusting unit 170 may include an actuator. Examples of the tray height adjusting unit 170 may include an electric actuator, a pneumatic actuator, and a hydraulic actuator. Hereinafter, the pneumatic actuator will be described as the tray height adjusting unit 170 by way of example.

The tray height adjusting unit 170 may include a tray cylinder 171 and a tray piston rod 172. The tray piston rod 172 may reciprocate in the vertical direction Z of the cooking apparatus 1a by an air pressure.

The movement of the tray 60 in the vertical direction Z of the cooking apparatus 1a may be implemented by the operation of the tray height adjusting unit 170. Particularly, the movement of the tray 60 in the vertical direction Z of the cooking apparatus 1a is determined by the movement of the tray piston rod 172. When the tray piston rod 172 moves upward in the cooking apparatus 1a, the tray 60 also moves upward in the cooking apparatus 1a. On the contrary, when the tray piston rod 172 moves downward in the cooking apparatus 1a, the tray 60 also moves downward in the cooking apparatus 1a.

The tray height adjusting unit 170 may be disposed between the cooking chamber 20 and the main body 10. Particularly, the tray height adjusting unit 170 may be disposed between the bottom surface 21 of the cooking chamber 20 and the main body 10. However, the position of the tray height adjusting unit 170 is not limited thereto and may be modified in various ways.

The type of the tray height adjusting unit 170 is not limited to the actuator so long as it may adjust the height of the tray 60.

The tray 60 may be installed on the bottom surface 21 of the cooking chamber 20 so as to be rotatable.

As described above with reference to FIGS. 4 to 6, the cartridge assembly 200 may be installed in the cooking chamber 20 so as to be linearly movable. In addition, the cartridge assembly 200 may be installed in the cooking chamber 20 so as to be rotatable as illustrated in FIG. 7.

Figure 9:
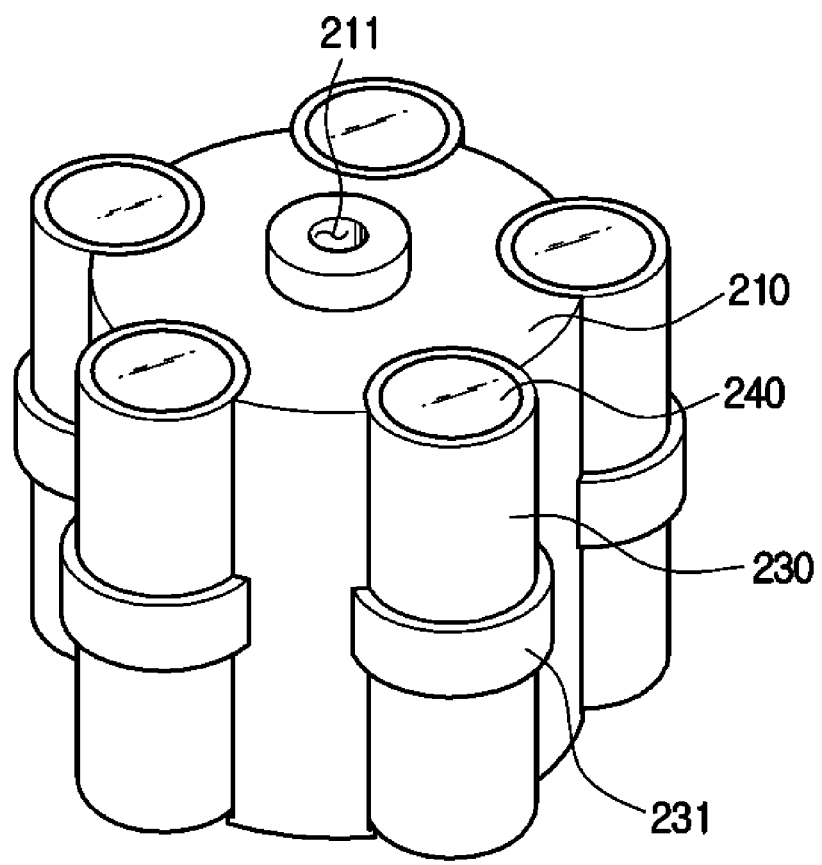
FIG. 9 is a perspective view of a cartridge assembly according to the first embodiment of the cooking apparatus of the present disclosure.
Figure 10:
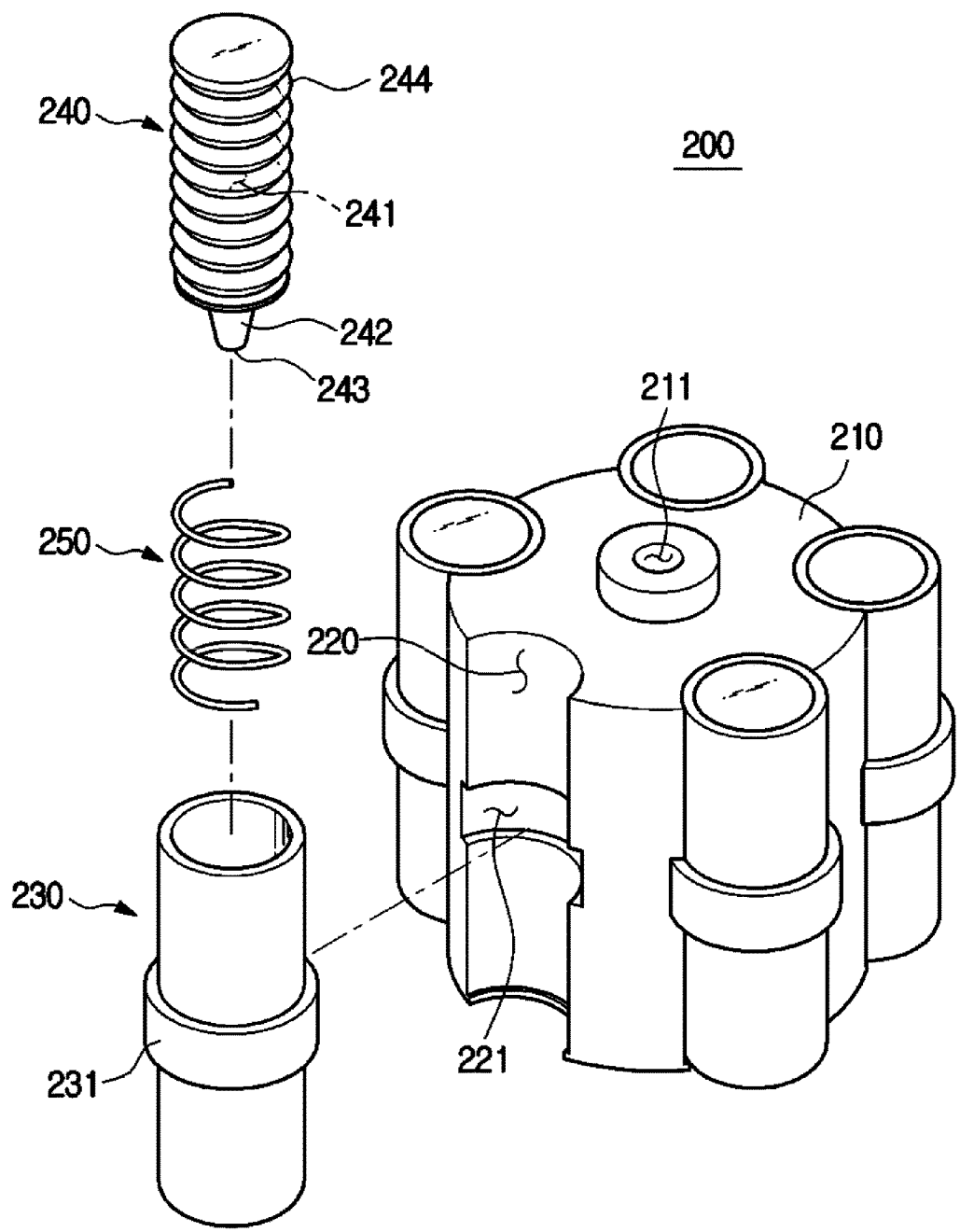
FIG. 10 is an exploded perspective view of the cartridge assembly according to the first embodiment of the cooking apparatus of the present disclosure.

FIG. 9 is a perspective view of a cartridge assembly according to the first embodiment of the cooking apparatus of the present disclosure. FIG. 10 is an exploded perspective view of the cartridge assembly according to the first embodiment of the cooking apparatus of the present disclosure.

Referring to FIGS. 9 and 10, the cartridge assembly 200 may include a cartridge body 210. The cartridge body 210 may have a cylindrical shape. However, the shape of the cartridge body 210 is not limited thereto and may be modified in various ways. A plurality of cartridge mounts 220 may be formed on the cartridge body 210. When the cartridge body 210 has a cylindrical shape, the plurality of cartridge mounts 220 may be formed on the side surface of the cartridge body 210 along a circumferential direction of the cartridge body 210. Grooves 221 may be formed on the side surface of the cartridge body 210 to define the plurality of cartridge mounts 220. The cartridge body 210 may include a rotation shaft coupling part 211 to be coupled to the rotation shaft 141 of the rotation adjusting unit 140.

The cartridge assembly 200 may further include a plurality of cartridge cases 230 mounted on the plurality of cartridge mounts 220. The plurality of cartridge cases 230 may have a cylindrical shape with one open surface. For example, the plurality of cartridge cases 230 may have a cylindrical shape with an open top surface. The plurality of cartridge cases 230 may include protrusions 231 respectively corresponding to the grooves 221 of the plurality of cartridge mounts 220. The protrusions 231 may protrude from the side surfaces of the plurality of cartridge cases 230 to be coupled to the grooves 221 of the plurality of cartridge mounts 220. The plurality of cartridge cases 230 may further have openings 232. The openings 232 may be formed in the plurality of cartridge cases 230 to face the bottom surface 21 of the cooking chamber 20. For example, the openings 232 may be formed at the bottom surfaces of the plurality of cartridge cases 230. Nozzle parts 242 of the plurality of cartridges 240 may selectively protrude out of the plurality of cartridge cases 230 through the openings 232.

The plurality of cartridge cases 230 are not limited to the cylindrical shape and may have a shape corresponding to the plurality of cartridge mounts 220.

The cartridge assembly 200 may further include a plurality of cartridges 240 disposed in the plurality of cartridge cases 230. Food ingredients may be contained in the plurality of cartridges 240. The food ingredients may be in a liquid phase or a solid phase. Also, the food ingredients may be in a powder form.

The plurality of cartridges 240 may include a transparent or opaque material.

The plurality of cartridges 240 may include at least one material selected from plastic, paper, and coated fiber. For example, the plurality of cartridges 240 may be formed of a polyethylene (PE) material. As another example, the plurality of cartridges 240 may be formed of paper having a plastic-coated inner surface. As another example, the plurality of cartridges 240 may be formed of a waterproof coated fiber.

Each of the plurality of cartridges 240 may include a containing part 241.

In addition, each of the plurality of cartridges 240 may further include a nozzle part 242 connected to the containing part 241 and having a discharge port 243 through which a food ingredient is discharged.

The containing part 241 may have wrinkles 244 found in at least one portion thereof. Preferably, the wrinkles 244 may be formed in the entire containing part 241. Since the wrinkles 244 are formed in at least one portion of the containing part 241 as described above, the food ingredient may be easily discharged when the extruding unit 160 presses each of the plurality of cartridges 240. That is, if the wrinkles 244 are formed in at least one portion of the containing part 241, smooth discharge of the food ingredient may be expected. Thus, throwing out or replacement of the plurality of cartridges 240 even when the food ingredients remain in the plurality of cartridges 240 may be prevented.

The cartridge assembly 200 may further include elastic members 250. The elastic member 250 may be accommodated inside each of the plurality of cartridge cases 230. Particularly, the elastic member 250 may be accommodated in each of the plurality of cartridge cases 230 so as to be disposed between the cartridge 240 and the opening 232 in the vertical direction Z of the cooking apparatus 1a. The nozzle part 242 of each of the plurality of cartridges 240 may selectively protrude out of each of the plurality of cartridge cases 230 through the opening 232 by an elastic force of the elastic member 250. For example, the elastic member 250 may include a spring.

The plurality of cartridges 240 may include different food ingredients.

Figure 11A:
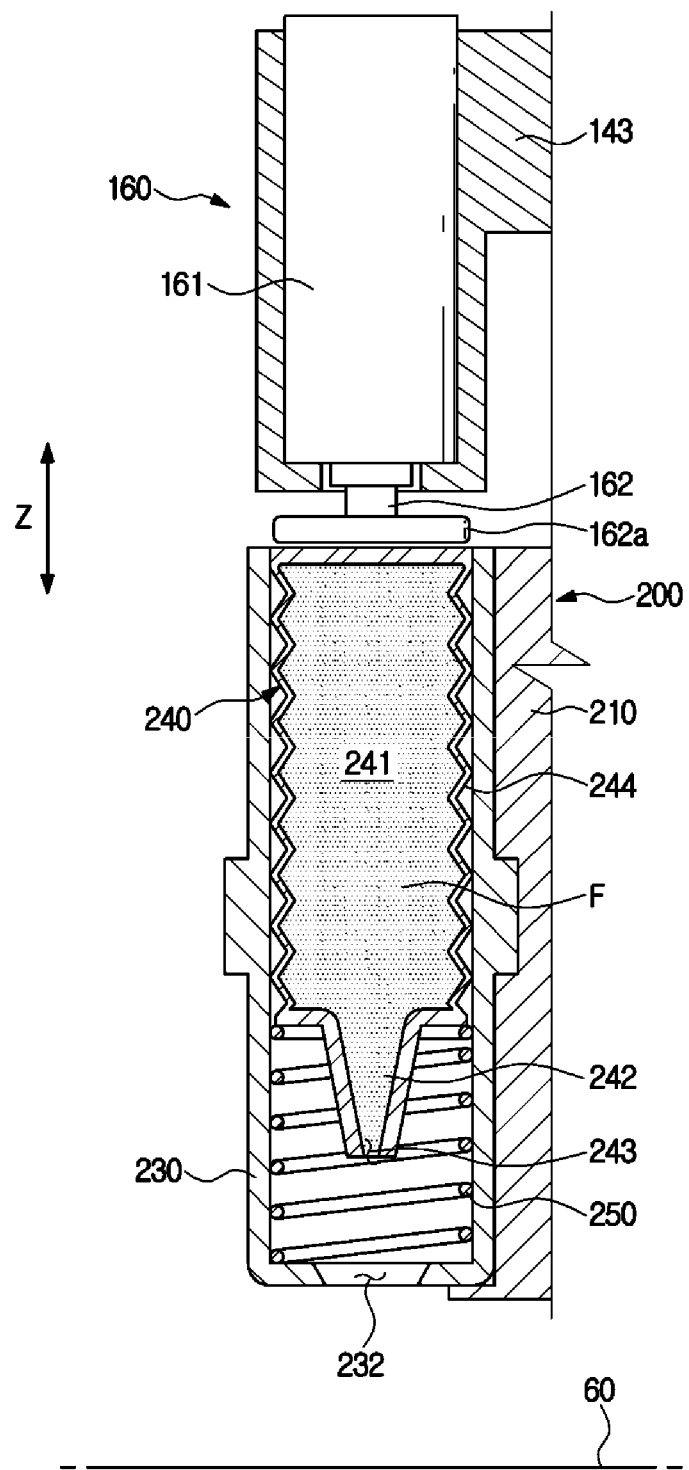
FIGS. 11A and 11B are views illustrating a process of pressing the cartridge assembly according to the first embodiment of the cooking apparatus of the present disclosure.
Figure 11B:
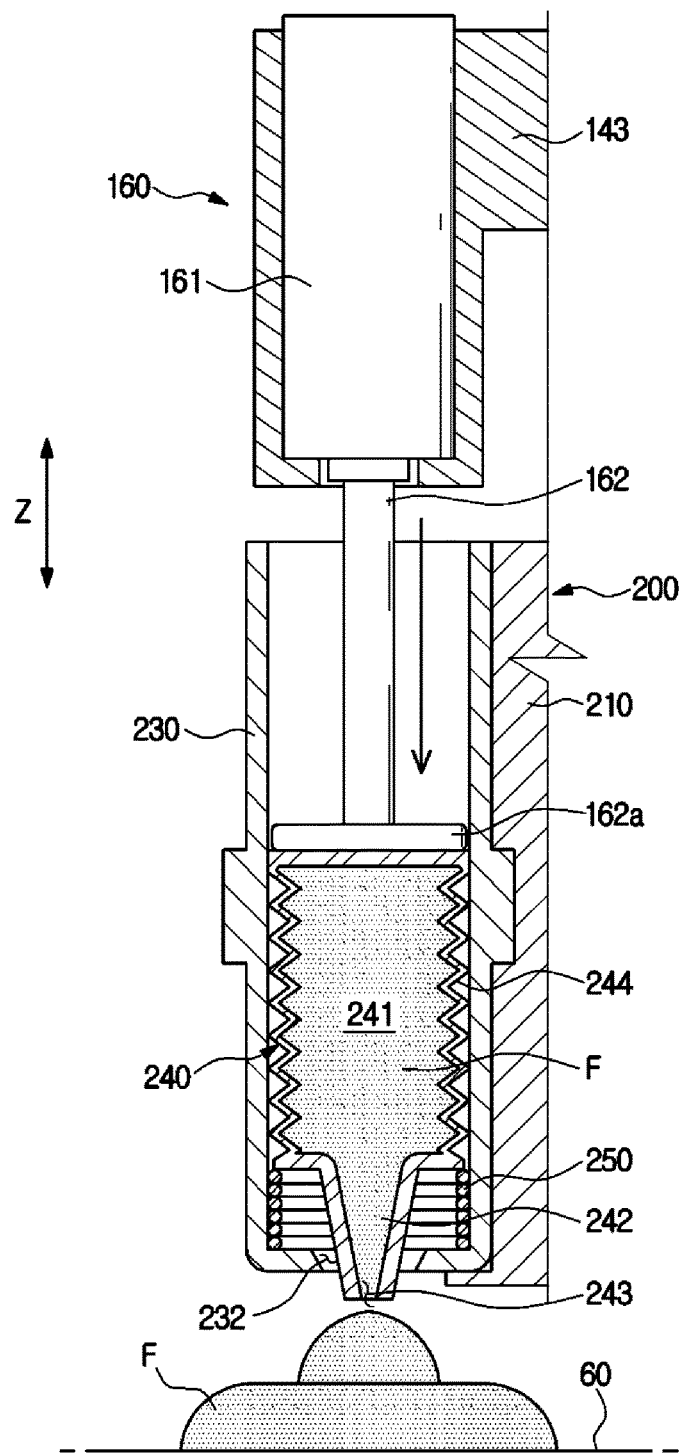

FIGS. 11A and 11B are views illustrating a process of pressing the cartridge assembly according to the first embodiment of the cooking apparatus of the present disclosure. In FIGS. 11A and 11B, "F" indicates food ingredient.

Referring to FIGS. 11A and 11B, the plurality of cartridges 240 may be pressed by the extruding unit 160 in the vertical direction Z of the cooking apparatus 1a.

When the piston 162 of the extruding unit 160 presses each of the plurality of cartridges 240, the elastic member 250 is compressed so that the nozzle part 242 of the cartridge 240 protrudes out of each of the plurality of cartridge cases 230 through the opening 232. In this case, since the plurality of cartridges 240 is compressed by the extruding unit 160, the food ingredients contained in the plurality of cartridges 240 are discharged onto the tray 60 through the discharge ports 243.

A discharge amount of the food ingredient may be adjusted by changing a pressure applied to the cartridge 240 by the piston 162 of the extruding unit 160 and a movement distance of the piston 162 of the extruding unit 160. In addition, the discharge amount of the food ingredient may also be adjusted by a solenoid valve, a rotary valve, or the like.

Figure 12A:
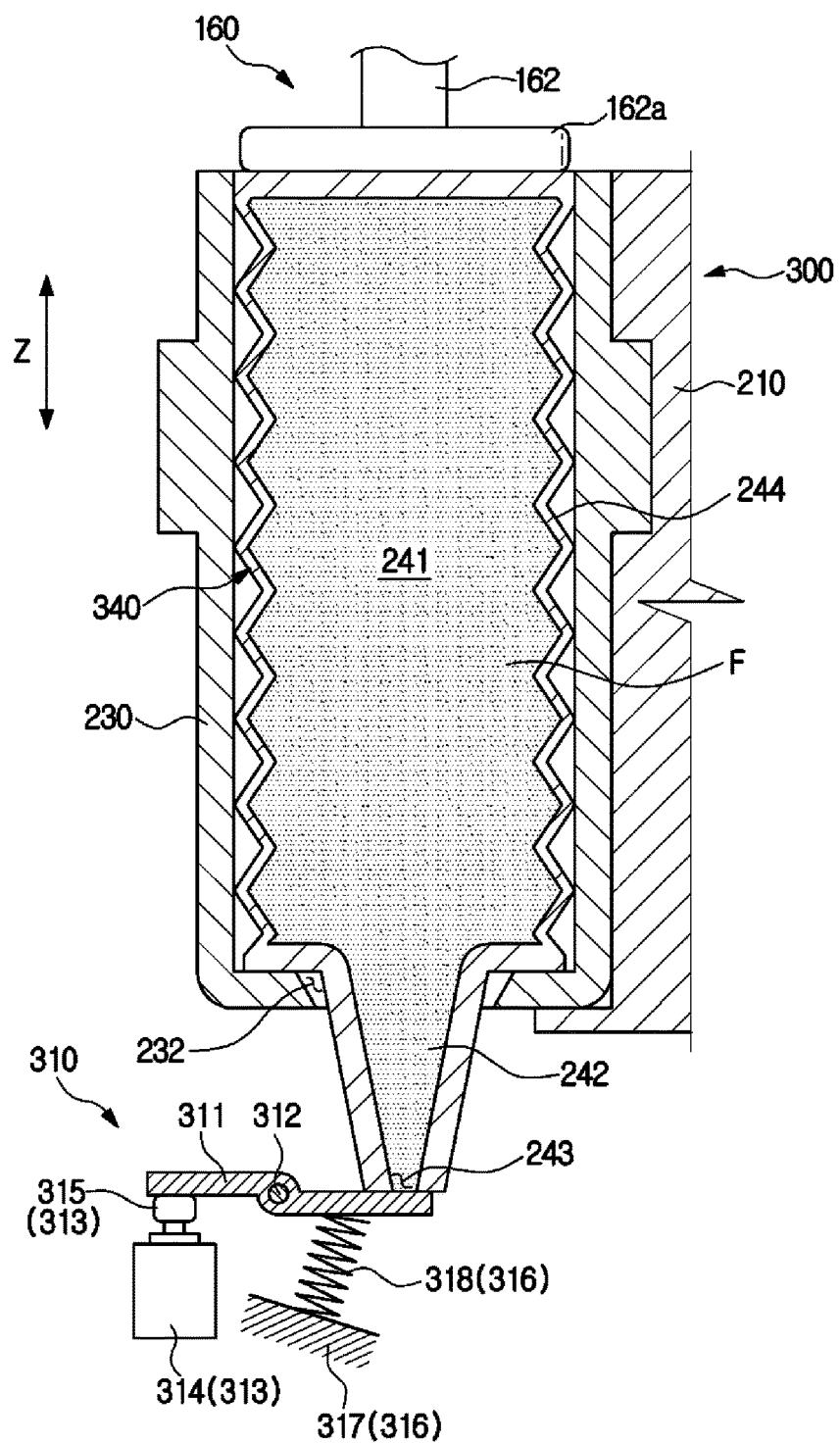
FIGS. 12A and 12B are views schematically illustrating a first method of adjusting the amount of the food ingredient extruded from a cartridge of the cartridge assembly according to the second embodiment of the cooking apparatus of the present disclosure.
Figure 12B:
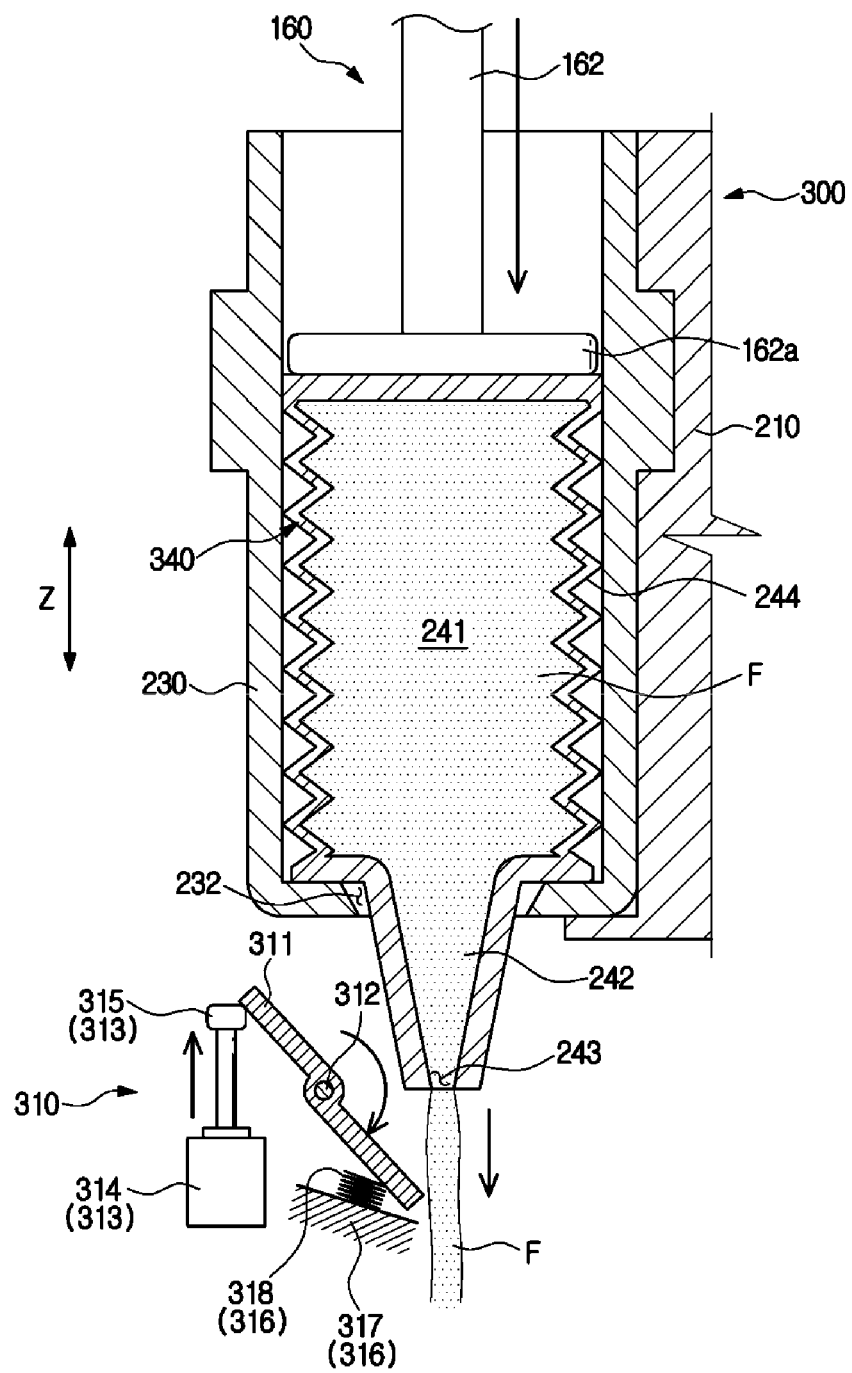

FIGS. 12A and 12B are views schematically illustrating a first method of adjusting the amount of the food ingredient extruded from a cartridge of the cartridge assembly according to the second embodiment of the cooking apparatus of the present disclosure. A cartridge assembly 300 according to a second embodiment has the same structure as that of the cartridge assembly 200 according to the first embodiment except that the elastic member 250 is not used herein. In the cartridge assembly 300 according to the second embodiment, the nozzle part 242 of each of a plurality of cartridges 340 is maintained in a state of protruding out of the cartridge case 230 through the opening 232. In FIGS. 12A and 12B, "F" indicates food ingredients. Descriptions given above with reference to FIGS. 2 to 11B will not be repeated herein.

Referring to FIGS. 12A and 12B, the cooking apparatus 1a may further include a discharge port opening/closing member 310 configured to selectively open or close the discharge ports 243 of the plurality of cartridges 340.

The discharge port opening/closing member 310 may include a rotating bar 311. The rotating bar 311 may be provided to be rotatable about a shaft 312 to open or close the discharge port 243.

The discharge port opening/closing member 310 may further include an actuator 313. For example, the actuator 313 may include an electric actuator, a pneumatic actuator, and a hydraulic actuator or the like. The actuator 313 may include a cylinder 314 and a piston rod reciprocating in a state of being coupled to the cylinder 314 by an air pressure. The piston rod 315 of the actuator 313 interacts with one end of the rotating bar 311 farther from the discharge port 243 of the cartridge 340.

The discharge port opening/closing member 310 may further include a spring unit 316 (e.g., a spring device). The spring unit 316 may further include a support 317 and a spring 318 fixed to the support 317. The spring 318 of the spring unit 316 interacts with the other end of the rotating bar 311 closer to the discharge port 243 of the cartridge 340.

As illustrated in FIG. 12A, before the plurality of cartridges 340 is pressed by the extruding unit 160, the discharge port 243 of the cartridge 340 is maintained in a closed state by the rotating bar 311 of the discharge port opening/closing member 310.

As illustrated in FIG. 12B, when the plurality of cartridges 340 is pressed by the extruding unit 160, the discharge port 243 of the cartridge 340 is opened as the rotating bar 311 of the discharge port opening/closing member 310 rotates about the center of the shaft 312. In this case, the piston rod 315 of the actuator 313 protrudes from the cylinder 314 to push the one end of the rotating bar 311 in a direction opposite to the direction of pressing the cartridge 340, and the spring 318 supports the other end of the rotating bar 311 in a compressed state.

By using the discharge port opening/closing member 310 illustrated in FIGS. 12A and 12B, the amounts of the food ingredients discharged from the plurality of cartridges 340 may be easily adjusted.

Figure 13A:
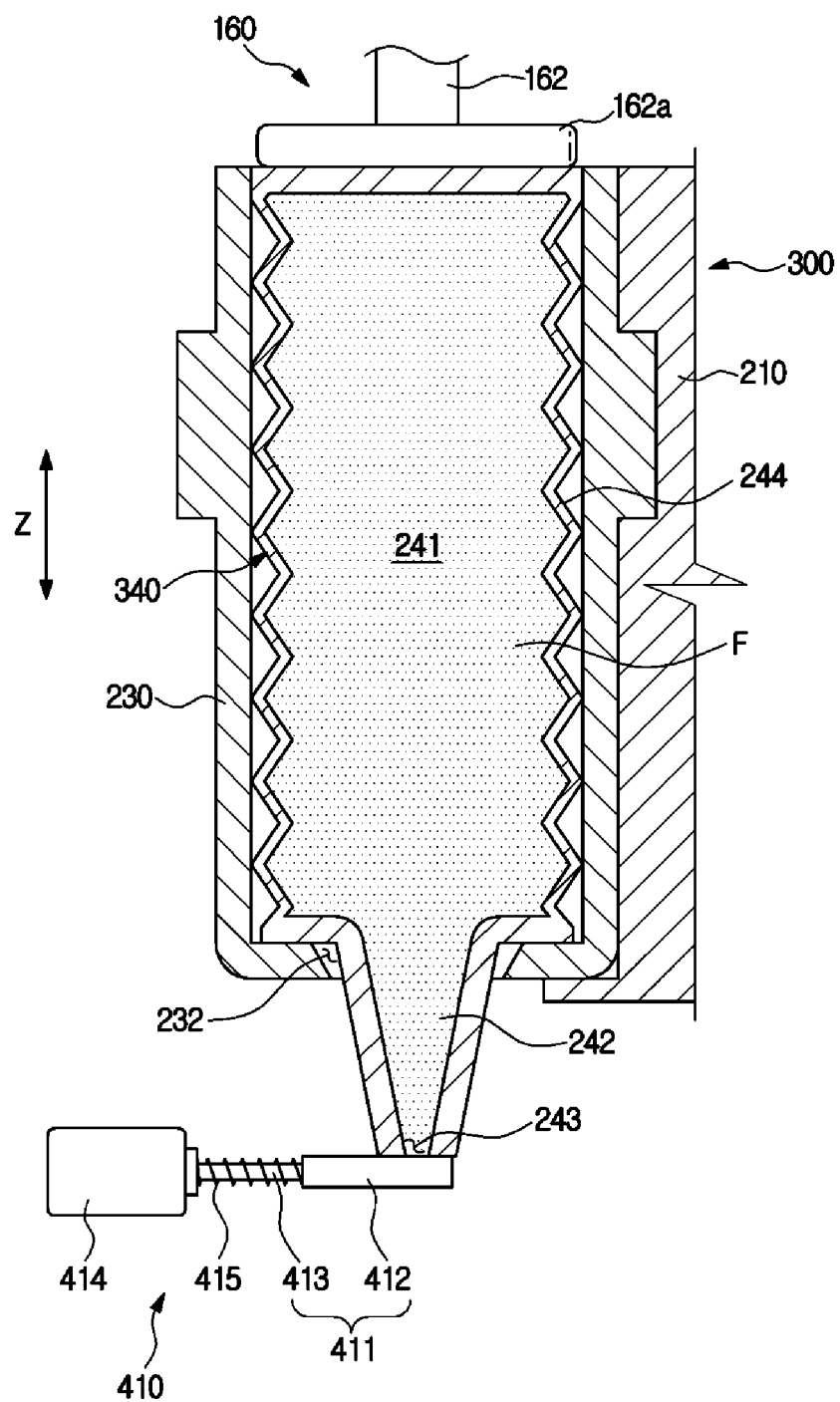
FIGS. 13A and 13B are views schematically illustrating a second method of adjusting the amount of the food ingredient extruded from the cartridge of the cartridge assembly according to the second embodiment of the cooking apparatus of the present disclosure.
Figure 13B:
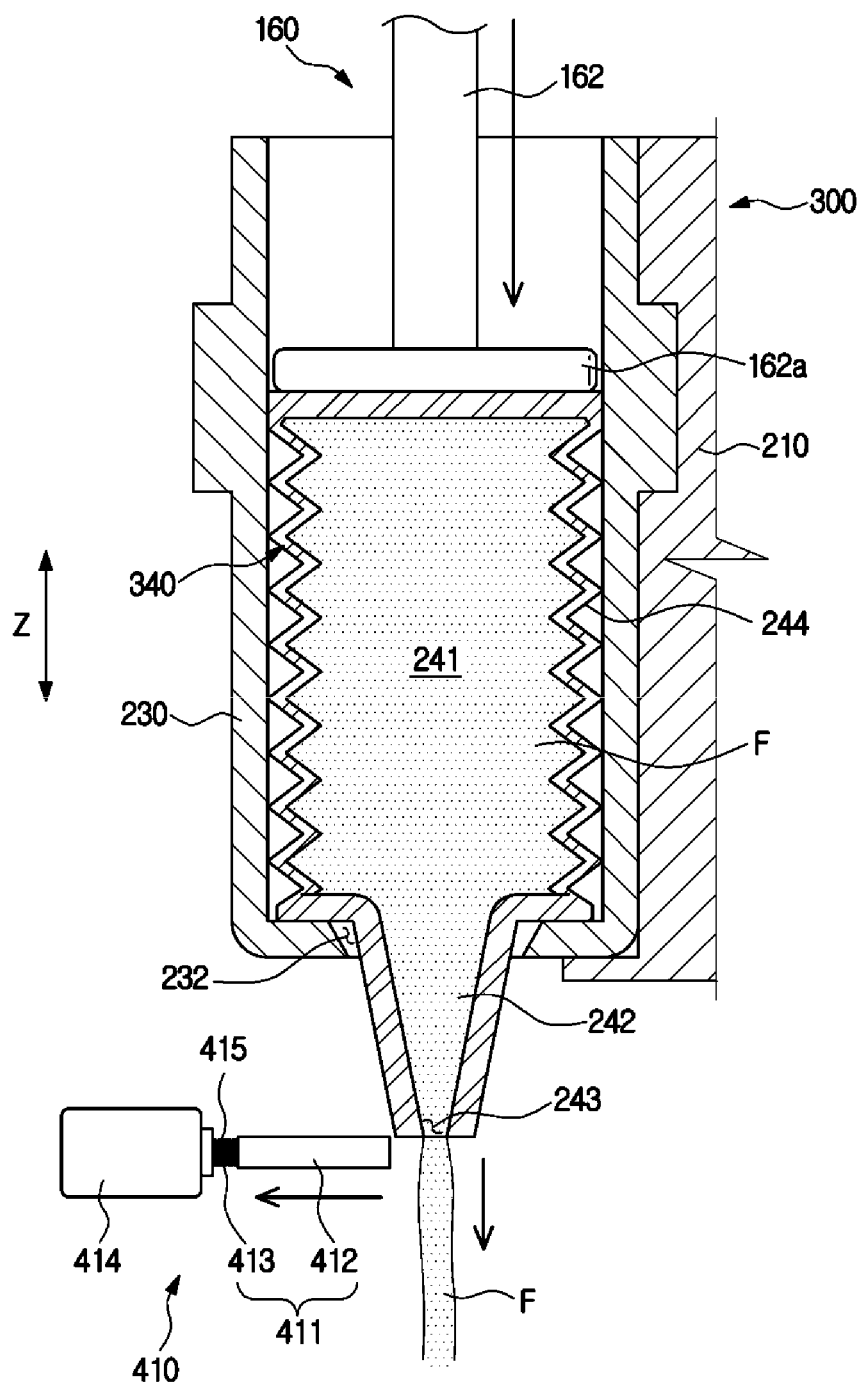

FIGS. 13A and 13B are views schematically illustrating a second method of adjusting the amount of the food ingredient extruded from the cartridge of the cartridge assembly according to the second embodiment of the cooking apparatus of the present disclosure. Since the cartridge assembly 300 according to the second embodiment is described above with reference to FIGS. 12A and 12B, detailed descriptions thereof will not be repeated herein. Also, descriptions given above with reference to FIGS. 2 to 11B will not be repeated.

Referring to FIGS. 13A and 13B, the cooking apparatus 1a may further include a discharge port opening/closing member 410 configured to selectively open or close the discharge ports 243 of the plurality of cartridges 340.

The discharge port opening/closing member 410 may include a moving bar 411. The moving bar 411 may linearly move to open or close the discharge port 243. In other words, the moving bar 411 may move in the horizontal direction to open or close the discharge port 243. The moving bar 411 may include a head 412 brought into direct contact with the discharge port 243 and a body 413 connected to the head 412.

The discharge port opening/closing member 410 may further include a driving unit 414 (e.g., a driving device). The moving bar 411 may be coupled to the driving unit 414 to move in the horizontal direction.

The discharge port opening/closing member 410 may further include a spring 415. The spring 415 may be coupled to the moving bar 411. Particularly, the spring 415 may be coupled to the body 413 of the moving bar 411.

As illustrated in FIG. 13A, before the plurality of cartridges 340 is pressed by the extruding unit 160, the discharge port 243 of the cartridge 340 is maintained in a closed state by the moving bar 411 of the discharge port opening/closing member 410. Particularly, the discharge port 243 of the cartridge 340 is maintained in a closed state by the head 412 of the moving bar 411.

As illustrated in FIG. 13B, when the plurality of cartridges 340 is pressed by the extruding unit 160, the discharge port 243 of the cartridge 340 is opened as the moving bar 411 of the discharge port opening/closing member 410 moves toward the driving unit 414. In this case, the spring 415 is compressed.

That is, a force of moving the moving bar 411 toward the driving unit 414 to be spaced apart from the discharge port 243 is applied to opening of the discharge port 243 of the cartridge 340. A force of moving the moving bar 411 toward the discharge port 243 is applied to closing of the discharge port 243 of the cartridge 340 such that the moving bar 411 is brought into contact with the discharge port 243. Resilience of the spring 415 may act as a force applied to the closing of the discharge port 243 of the cartridge 340.

Figure 14A:
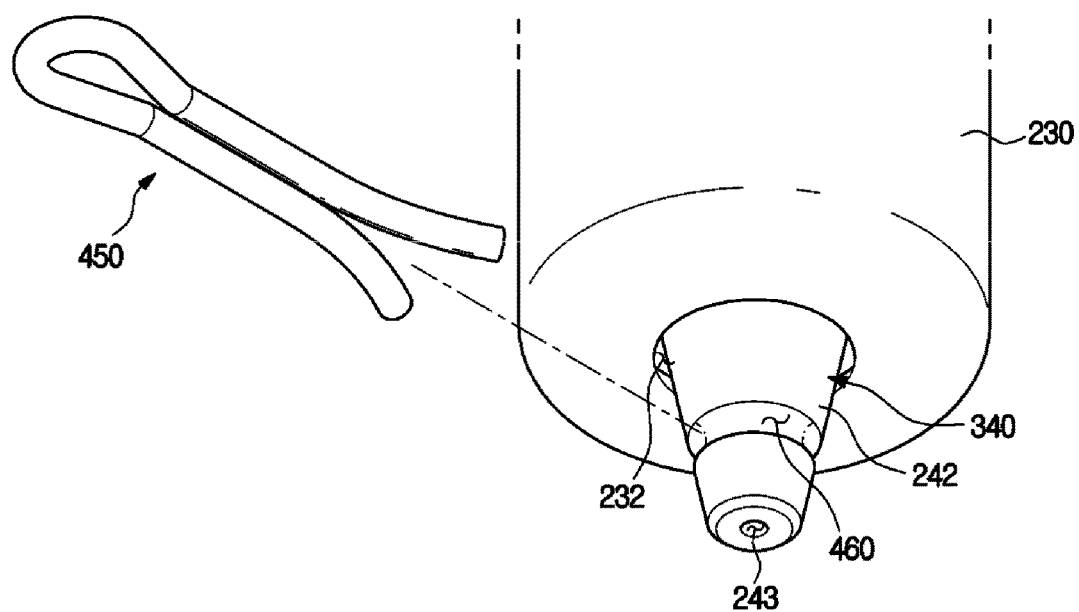
FIGS. 14A and 14B are views schematically illustrating a third method of adjusting the amount of the food ingredient extruded from the cartridge of the cartridge assembly according to the second embodiment of the cooking apparatus of the present disclosure.
Figure 14B:
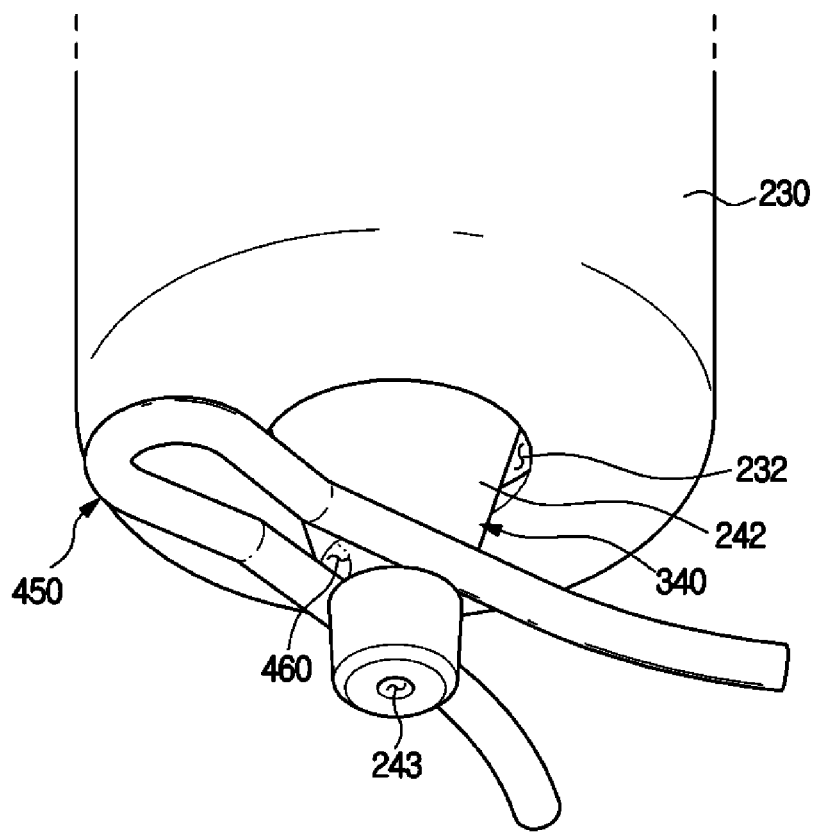

FIGS. 14A and 14B are views schematically illustrating a third method of adjusting the amount of the food ingredient extruded from the cartridge of the cartridge assembly according to the second embodiment of the cooking apparatus of the present disclosure. Since the cartridge assembly 300 according to the second embodiment is described above with reference to FIGS. 12A and 12B, detailed descriptions thereof will not be repeated.

Referring to FIGS. 14A and 14B, the cooking apparatus 1a may further include a discharge port opening/closing member configured to selectively open or close the discharge ports 243 of the plurality of cartridges 340.

The discharge port opening/closing member may include a clamp 450. The clamp 450 may be detachably coupled to the nozzle part 242 of the cartridge 340. The cartridge 340 may have a groove 460. Particularly, the groove 460 may be formed to be recessed along a circumference of the nozzle part 242 to having a smaller diameter than the discharge port 243. The clamp 450 may be detachably coupled to the groove 460.

FIG. 14A illustrates that the discharge port 243 of the cartridge 340 is in an open state. In this case, since the clamp 450 is separated from the groove 460, a passage of the food ingredient is formed in each of the plurality of cartridges 340. Thus, the food ingredient may be discharged out of each of the plurality of cartridges 340 through the discharge port 243 of the cartridge 340.

FIG. 14B illustrates that the discharge port 243 of the cartridge 340 is in a closed state. In this case, since the clamp 450 is coupled to the groove 460 and presses the nozzle part 242, the passage of the food ingredient in the cartridge 340 is blocked. Thus, the food ingredient cannot be discharged out of the cartridge 340 through the discharge port 243 of the cartridge 340.

This will be described in another aspect.

The clamp 450 may have elasticity. The clamp 450 may be maintained in a state of being coupled to the nozzle part 242 of the cartridge 340 regardless of the discharge of the food ingredient. That is, the clamp 450 may be maintained in a state of being coupled to the groove 460 regardless of the discharge of the food ingredient. Before the plurality of cartridges 340 is pressed by the extruding unit 160, the discharge port 243 of the cartridge 340 is maintained in a closed state by a pressure of the clamp 450. However, when the cartridge 340 is pressed by the extruding unit 160, the clamp 450 is loosened by movement of the food ingredient contained in the cartridge 340. As a result, the passage of the food ingredient expands in the cartridge 340 to open the discharge port 243.

Figure 15A:
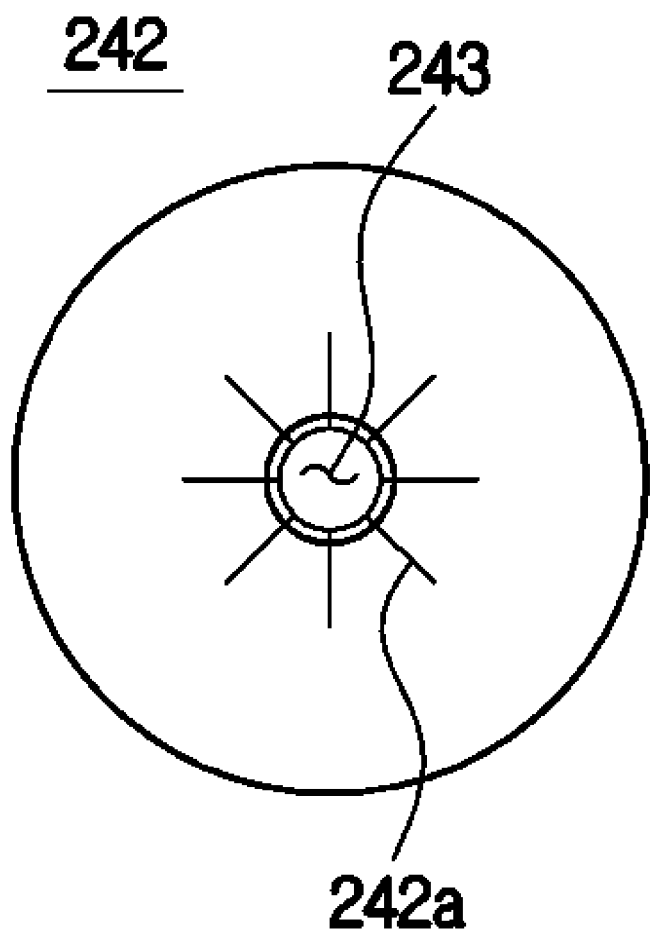
FIGS. 15A, 15B, and 15C are views schematically illustrating a fourth method of adjusting the amount of the food ingredient extruded from the cartridge of the cartridge assembly according to the second embodiment of the cooking apparatus of the present disclosure.
Figure 15B:
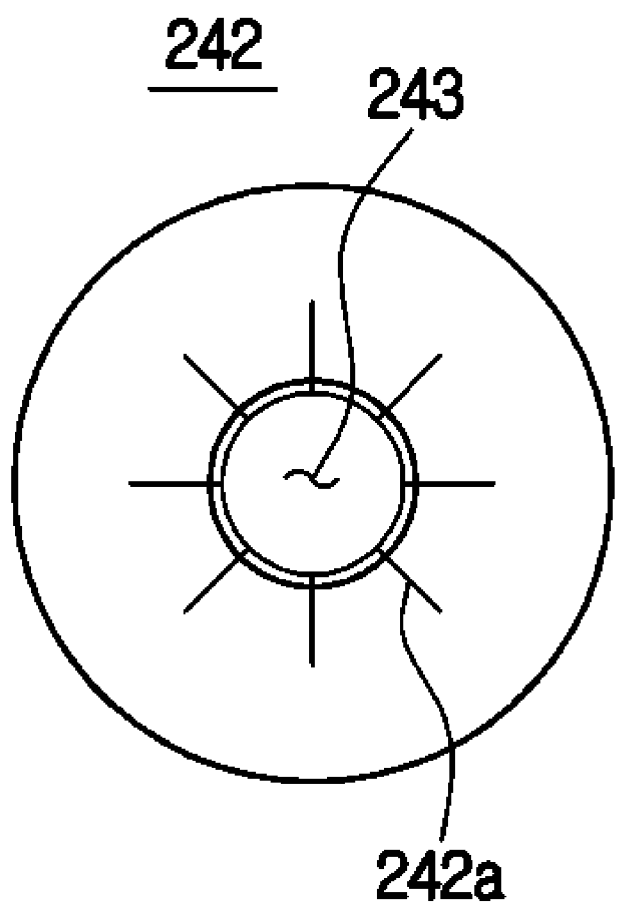
Figure 15C:
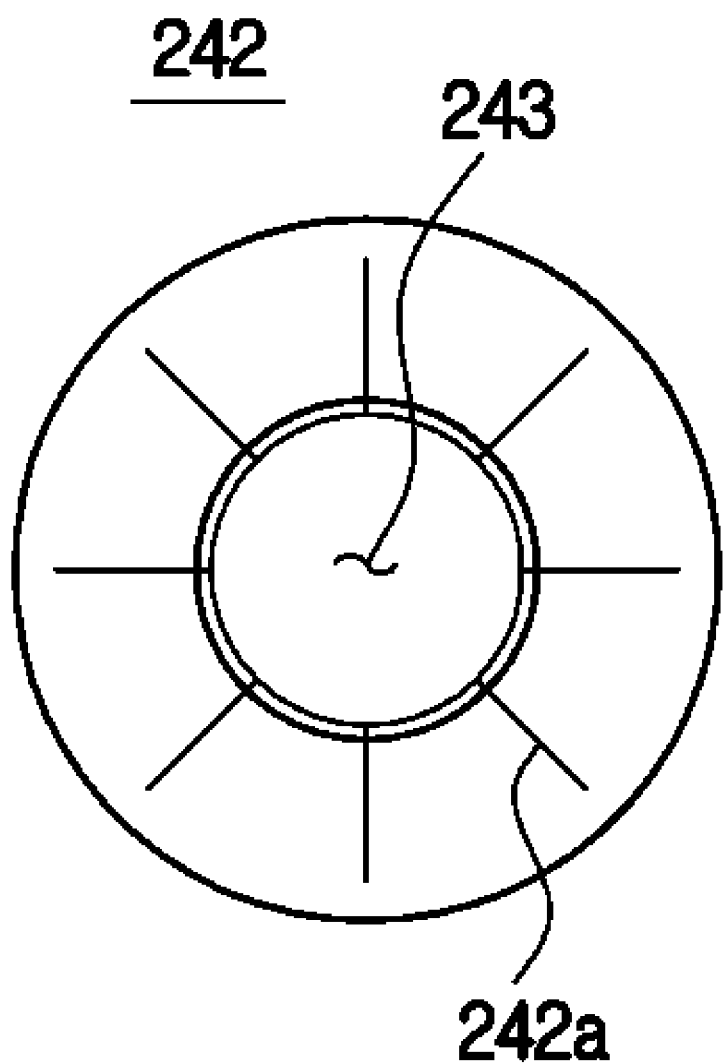

FIGS. 15A to 15C are views schematically illustrating a fourth method of adjusting the amount of the food ingredient extruded from the cartridge of the cartridge assembly according to the second embodiment of the cooking apparatus of the present disclosure. Since the cartridge assembly 300 according to the second embodiment is described above with reference to FIGS. 12A and 12B, descriptions thereof will not be repeated. Refer to FIGS. 12A and 12B for the reference numerals not illustrated herein.

Referring to FIGS. 15A to 15C, the plurality of cartridges 340 may include nozzle parts 242 having discharge ports 243 with various sizes. A larger discharge port 243 may discharge a larger amount of the food ingredient, while a smaller discharge port 243 may discharge a smaller amount of the food ingredient.

Each of the plurality of cartridges 340 may include the containing part 241 and the nozzle part 242 detachably coupled to the containing part 241. The nozzle part 242 coupled to the containing part 241 may be determined in accordance with the amount of the food ingredient to be extruded from the cartridge 340. For example, if a larger amount of the food ingredient is required to be extruded from the cartridge 340, a nozzle part 242 having a larger discharge port 243 may be selected and coupled to the containing part 241 as illustrated in FIG. 15C. If a smaller amount of the food ingredient is required to be extruded from the cartridge 340, a nozzle part 242 having a smaller discharge port 243 may be selected and coupled to the containing part 241 as illustrated in FIG. 15A. If a medium amount of the food ingredient is required to be extruded from the cartridge 340, a nozzle part 242 having a medium discharge port 243 may be selected and coupled to the containing part 241 as illustrated in FIG. 15B.

The nozzle part 242 may further have cutout lines 242a radially extending from the discharge port 243. In this case, the nozzle part 242 may be formed of an elastic material. The cutout lines 242a may facilitate shape modification of the nozzle part 242 according to pressure of the extruding unit 160 applied to the cartridge 340. For example, when the plurality of cartridges 340 is pressed by the extruding unit 160, the nozzle part 242 is easily elastically deformed by the cutout lines 242a and the amount of the food ingredient discharged through the discharge port 243 may increase. On the contrary, when the plurality of cartridge 340 is not pressed by the extruding unit 160, the nozzle part 242 returns to the original shape thereof by resilience and the amount of the food ingredients discharged through the discharge port 243 may decrease. Or, the discharge of the food ingredient through the discharge port 243 may be prevented.

Preferably, the nozzle part 242 illustrated in FIG. 15 may be applied to a case in which the food ingredients are in a powder form. If the food ingredients are in a liquid phase, the nozzle part 242 may have a needle-like shape.

FIGS. 16A to 16D are views schematically illustrating a fifth method of adjusting the amount of the food ingredient extruded from the cartridge of the cartridge assembly according to the second embodiment of the cooking apparatus of the present disclosure. Since the cartridge assembly 300 according to the second embodiment is described above with reference to FIGS. 12A and 12B, descriptions thereof will not be repeated. Refer to FIGS. 12A and 12B for the reference numerals not illustrated herein.

Referring to FIGS. 16A to 16D, the plurality of cartridges 340 may include nozzle parts 242 having discharge ports 243 with various sizes. A larger discharge port 243 may discharge a larger amount of the food ingredient, while a smaller discharge port 243 may discharge a smaller amount of the food ingredient.

The plurality of cartridges 340 may include the containing part 241 and the nozzle part 242 detachably coupled to the containing part 241. The nozzle part 242 coupled to the containing part 241 may be determined in accordance with the amount of the food ingredient to be extruded from the cartridge 340. Since the relationship between the amount of the food ingredient to be extruded from the cartridge 340 and the nozzle part 242 is the same as that described above with reference to FIG. 15, detailed descriptions thereof will not be repeated herein.

Figure 16A:
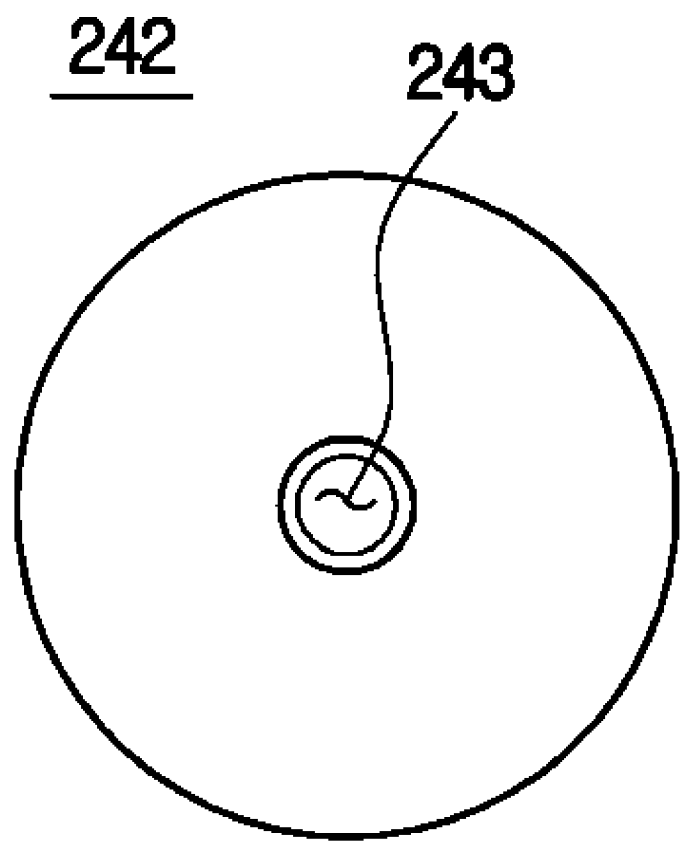
FIGS. 16A, 16B, 16C, and 16D are views schematically illustrating a fifth method of adjusting the amount of the food ingredient extruded from the cartridge of the cartridge assembly according to the second embodiment of the cooking apparatus of the present disclosure.
Figure 16B:
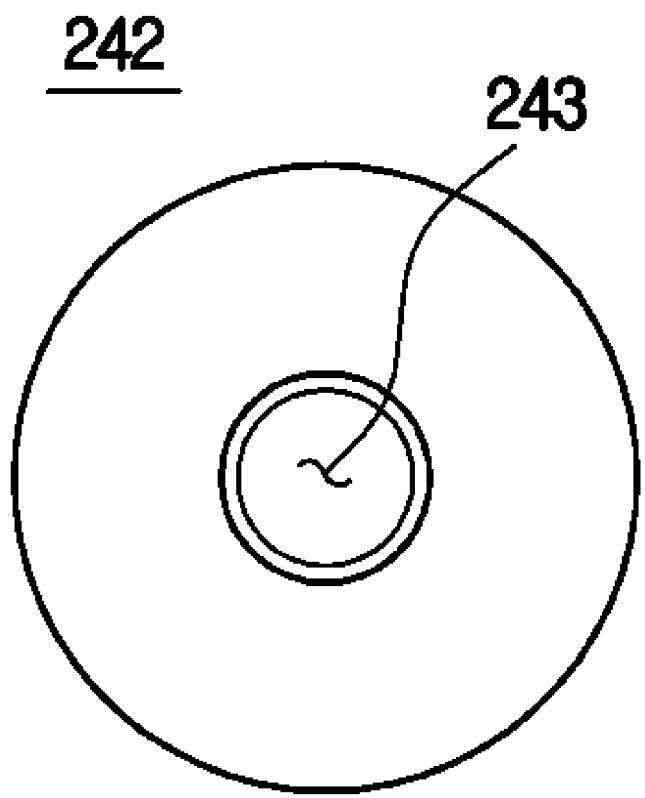
Figure 16C:
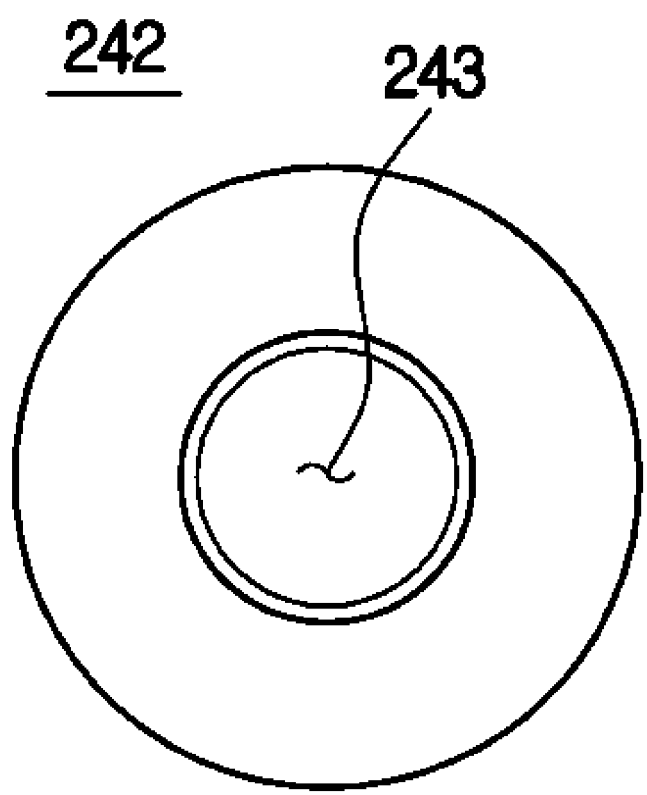

Not only the amount of the food ingredient to be extruded from the cartridge 340 but also the property of food ingredient to be extruded from the cartridge 340 may affect the size of the discharge port 243. Under an assumption that the amounts of the food ingredients to be extruded from the plurality of cartridges 340 are the same, since it is more difficult for a food ingredient with a higher viscosity to pass the discharge port 243, a larger discharge port 243 as illustrated in FIG. 16C is suitable therefor. On the contrary, since a food ingredient having a lower viscosity easily passes through the discharge port 243, a smaller discharge port 243 as illustrated in FIG. 16A is suitable therefor. A discharge port 243 with a medium size as illustrated in FIG. 16B is suitable for a food ingredient having a medium viscosity.

Figure 16D:
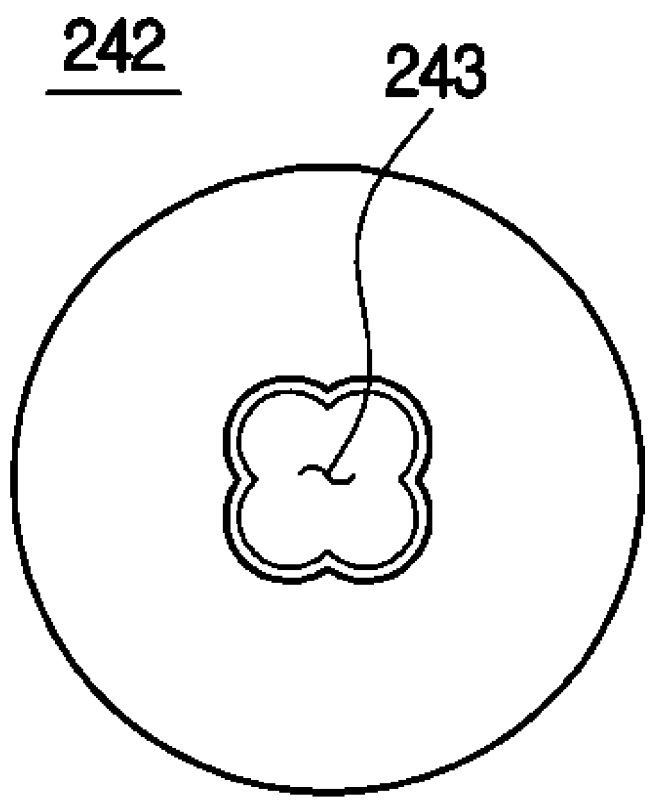

In addition, the plurality of cartridges 340 may have nozzle parts 242 with various shapes of the discharge ports 243. The nozzle parts 242 may have circular discharge ports 243 as illustrated in FIGS. 16A to 16C. The nozzle part 242 may have a discharge port 243 with a clover shape as illustrated in FIG. 16D. The clover shape illustrated in FIG. 16D may realize straightness of the food ingredient discharged through the discharge port 243 by using surface tension. However, the shape of the discharge port 243 is not limited thereto and may be modified in various ways.

Figure 17:
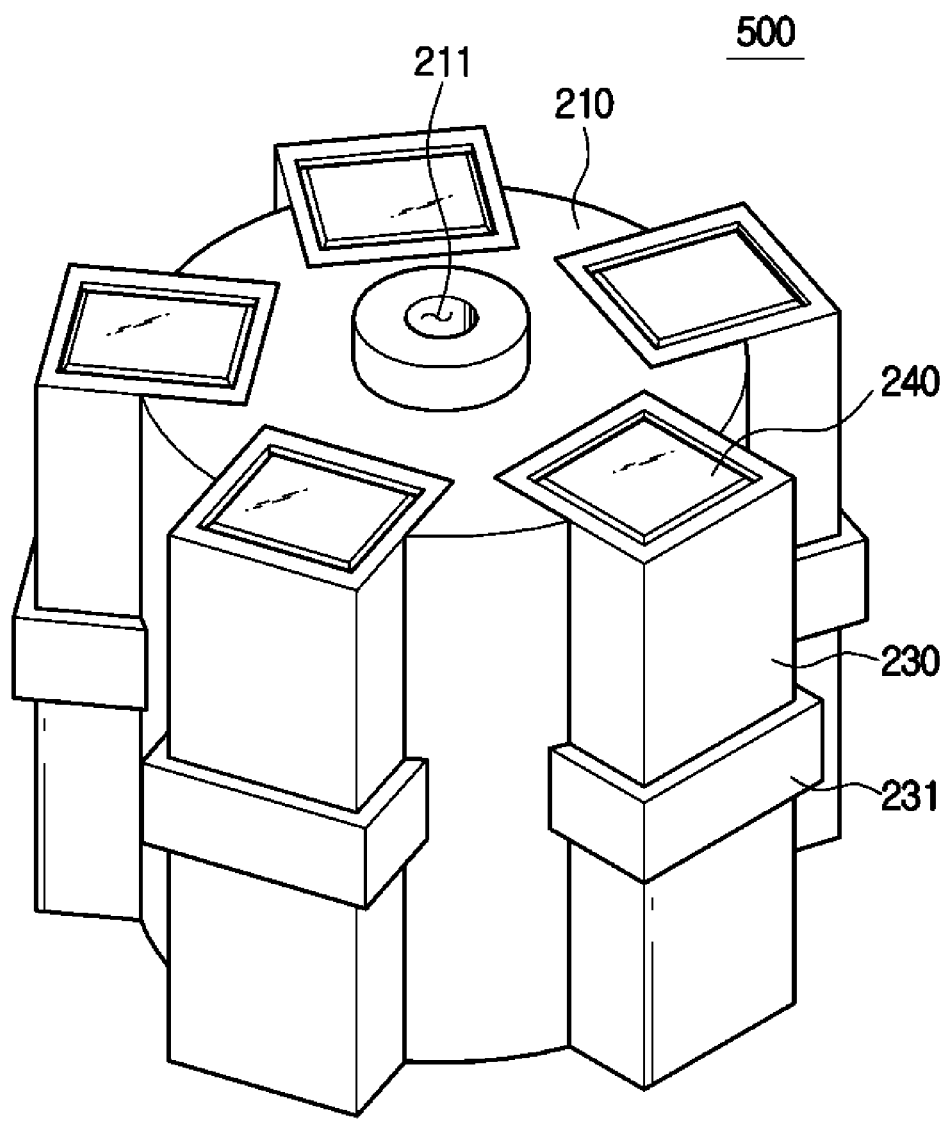
FIG. 17 is a perspective view illustrating a cartridge assembly according to a third embodiment of the cooking apparatus of the present disclosure.

FIG. 17 is a perspective view illustrating a cartridge assembly according to a third embodiment of the cooking apparatus of the present disclosure. Hereinafter, descriptions given above with reference to the cartridge assembly 200 according to the first embodiment illustrated in FIG. 9 will not be repeated. Refer to FIGS. 9 and 10 for the reference numerals not illustrated herein.

Referring to FIG. 17, a cartridge assembly 500 may include a cartridge body 210. The cartridge body 210 may have a cylindrical shape. However, the shape of the cartridge body 210 is not limited thereto. Since the plurality of cartridge mounts 220 are described above with reference to FIG. 9, detailed descriptions thereof will not be repeated.

The cartridge assembly 500 may further include the plurality of cartridge cases 230 mounted on the plurality of cartridge mounts 220. The plurality of cartridge cases 230 may have a rectangular pillar shape with one open surface. For example, the plurality of cartridge cases 230 may have a rectangular pillar shape with an open top surface. The plurality of cartridge cases 230 may include protrusions 231 respectively corresponding to the grooves 221 of the plurality of cartridge mounts 220. The protrusions 231 may protrude from the side surfaces of the plurality of cartridge cases 230 to be coupled to the grooves 221 of the plurality of cartridge mounts 220. The plurality of cartridge cases 230 may further have openings 232. The descriptions of the openings 232 are as described above with reference to FIG. 8 and will not be repeated herein.

The cartridge assembly 500 may further include a plurality of cartridges 240 disposed in the plurality of cartridge cases 230. The plurality of cartridges 240 may have a shape corresponding to the plurality of cartridge cases 230.

The cartridge assembly 500 may further include elastic members 250. The descriptions of the elastic members 250 are as described above with reference to FIG. 9 and will not be repeated herein.

Figure 18:
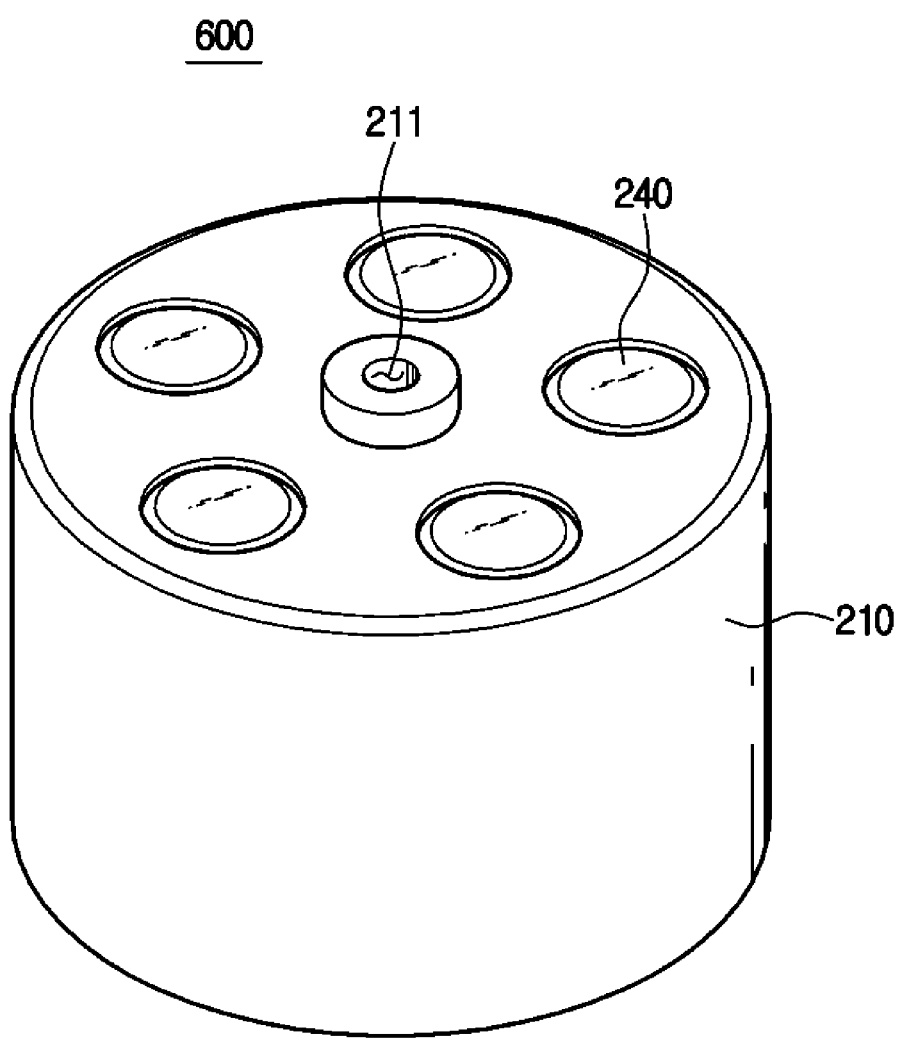
FIG. 18 is a perspective view illustrating a cartridge assembly according to a fourth embodiment of the cooking apparatus of the present disclosure.

FIG. 18 is a perspective view illustrating a cartridge assembly according to a fourth embodiment of the cooking apparatus of the present disclosure. Hereinafter, descriptions given above with reference to the cartridge assembly 200 according to the first embodiment illustrated in FIG. 9 will not be repeated. Refer to FIGS. 9 and 10 for the reference numerals not illustrated herein.

Referring to FIG. 18, a cartridge assembly 600 may include a cartridge body 210. The cartridge body 210 may have a cylindrical shape. However, the shape of the cartridge body 210 is not limited thereto. A plurality of cartridge mounts 220 may be formed on the cartridge body 210. The plurality of cartridge mounts 220 may be formed to penetrate the cartridge body 210. The cartridge body 210 may include a rotation shaft coupling part 211 to be coupled to the rotation shaft 141 of the rotation adjusting unit 140. For example, the plurality of cartridge mounts 220 may be disposed at outer portions than the rotation shaft coupling part 211 to be spaced apart from each other along the circumferential direction of the cartridge body 210.

The cartridge assembly 600 may further include a plurality of cartridge cases 230 mounted on the plurality of cartridge mounts 220. Since the plurality of cartridge cases 230 is described above with reference to FIG. 8, detailed descriptions thereof will not be repeated herein.

The cartridge assembly 600 may further include a plurality of cartridges 240 located inside the plurality of cartridge cases 230. Since the plurality of cartridges 240 is described above with reference to FIG. 9, detailed descriptions thereof will not be repeated.

The cartridge assembly 600 may further include elastic members 250. Since the elastic members 250 are described above with reference to FIG. 8, descriptions thereof will not be repeated herein.

Figure 19:
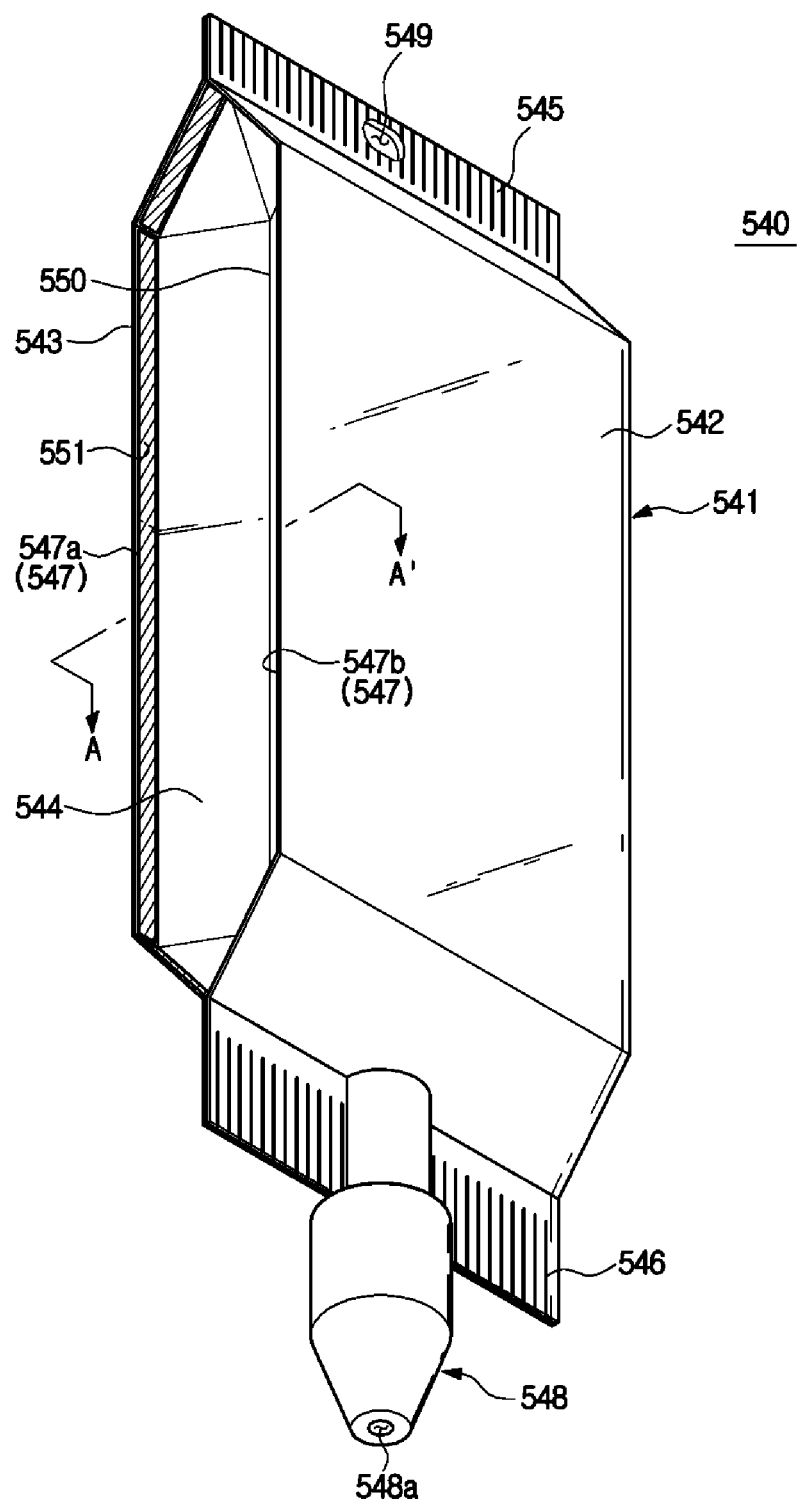
FIG. 19 is a perspective view illustrating a cartridge assembly according to a fifth embodiment of the cooking apparatus of the present disclosure.
Figure 20:
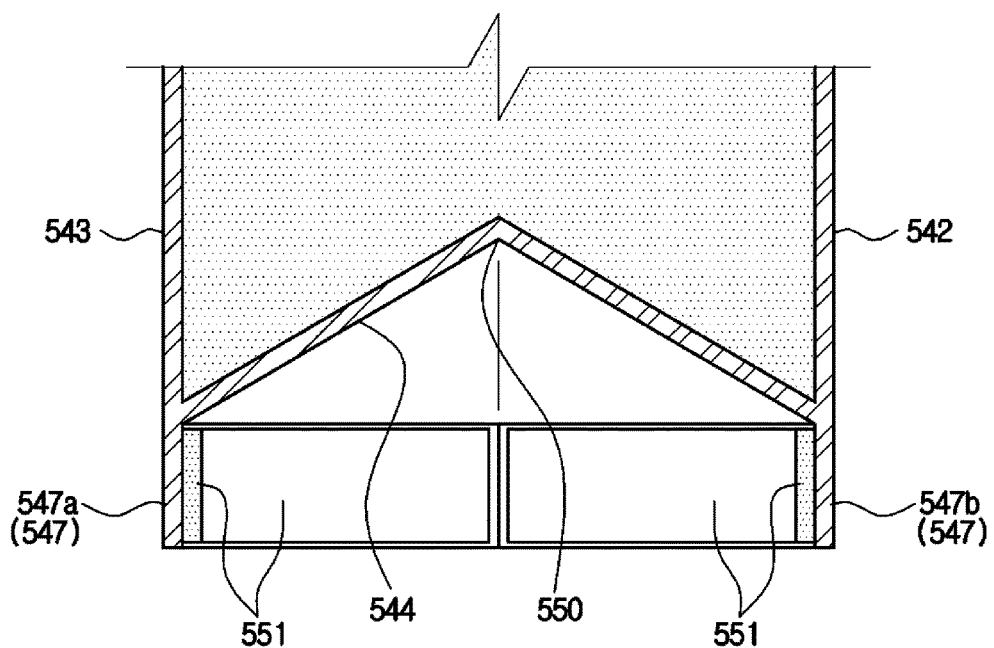
FIG. 20 is a cross-sectional view of the cartridge of FIG. 19 taken along line A-A' according to an embodiment of the present disclosure.

FIG. 19 is a perspective view illustrating a cartridge assembly according to a fifth embodiment of the cooking apparatus of the present disclosure. FIG. 20 is a cross-sectional view of the cartridge of FIG. 19 taken along line A-A' according to an embodiment of the present disclosure.

Referring to FIGS. 19 and 20, the cartridge assembly according to the fifth embodiment may include a plurality of cartridges 540 in which food ingredients are contained.

Each of the plurality of cartridges 540 may have a main body portion 541. The main body portion 541 may include a main body front surface 542 constituting a front surface of the cartridge 540 and a main body rear surface 543 constituting a rear surface of the cartridge 540. In addition, the main body portion 541 may further include main body side surfaces 544 constituting side surfaces of the cartridge 540. The main body side surfaces 544 may connect the main body front surface 542 with the main body rear surface 543.

The main body portion 541 may further include press parts 545, 546, and 547. The press parts 545, 546, and 547 may include an upper end press part 545 formed by pressing an upper end of the main body front surface 542, an upper end of the main body rear surface 543, and upper ends of the main body side surfaces 544. Also, the press parts 545, 546, and 547 may further include a lower end press part 546 formed by pressing a lower end of the main body front surface 542, a lower end of the main body rear surface 543, and lower ends of the main body side surfaces 544. The press parts 545, 546, and 547 may further include a side end press part 547 formed by pressing one side edge of one of the main body front surface 542 and the main body rear surface 543 and one side edge of the main body side surfaces 544. The side end press part 547 may include a first side end press part 547a formed by pressing one side edge of the main body front surface 542 and one side edge of the main body side surfaces 544 are pressed and a second side end press part 547b formed as one side edge of the main body rear surface 543 and one side edge of the main body side surfaces 544.

Each of the plurality of cartridges 540 may further include a nozzle part 548 having a discharge port 548a. The nozzle part 548 may be coupled to the main body portion 541 such that a food ingredient contained in the main body portion 541 is discharged through the discharge port 548a. For example, the nozzle part 548 may be partially inserted into the lower end press part 546 to be coupled to the main body portion 541.

Each of the plurality of cartridges 540 may further have an installation hole 549. The installation hole 549 may be formed at the upper end press part 545 such that the cartridge 540 is mounted in the cartridge body of the cartridge assembly according to the fifth embodiment.

Each of the plurality of cartridges 540 may have fold lines 550. The fold lines may be formed in the main body side surfaces 544 of the main body portion 541. Particularly, the fold line 550 may be formed long in the main body side surfaces 544 of the main body portion 541 in the longitudinal direction of the cartridge 540. The main body side surfaces 544 may have a recessed shape. In this case, the fold line 550 is the deepest portion.

Each of the plurality of cartridges 540 may further include an adhesive member 551. The adhesive member 551 may be disposed in the main body portion 541 to efficiently remove an empty space in the main body portion 541 formed as the food ingredient is discharged during a process of pressing the cartridge 540 by using the extruding unit 160. Particularly, the adhesive member 551 may be disposed on the main body side surfaces 544. More particularly, the adhesive member 551 may be disposed on at least one of the first side end press part 547a and the second side end press part 547b.

An aluminum foil may also be used to efficiently remove the empty space in the main body portion 541 formed as the food ingredient is discharged during a process of pressing the cartridge 540 by using the extruding unit 160. This is because the aluminum foil has rigidity. The aluminum foil may be disposed on at least one of the first side end press part 547a and the second side end press part 547b. A thickness of the aluminum foil may be in the range of 0.05 mm to 0.2 mm but is not limited thereto.

Both of the adhesive member 551 and the aluminum foil may also be disposed on at least one of the first side end press part 547a and the second side end press part 547b.

Figure 21A:
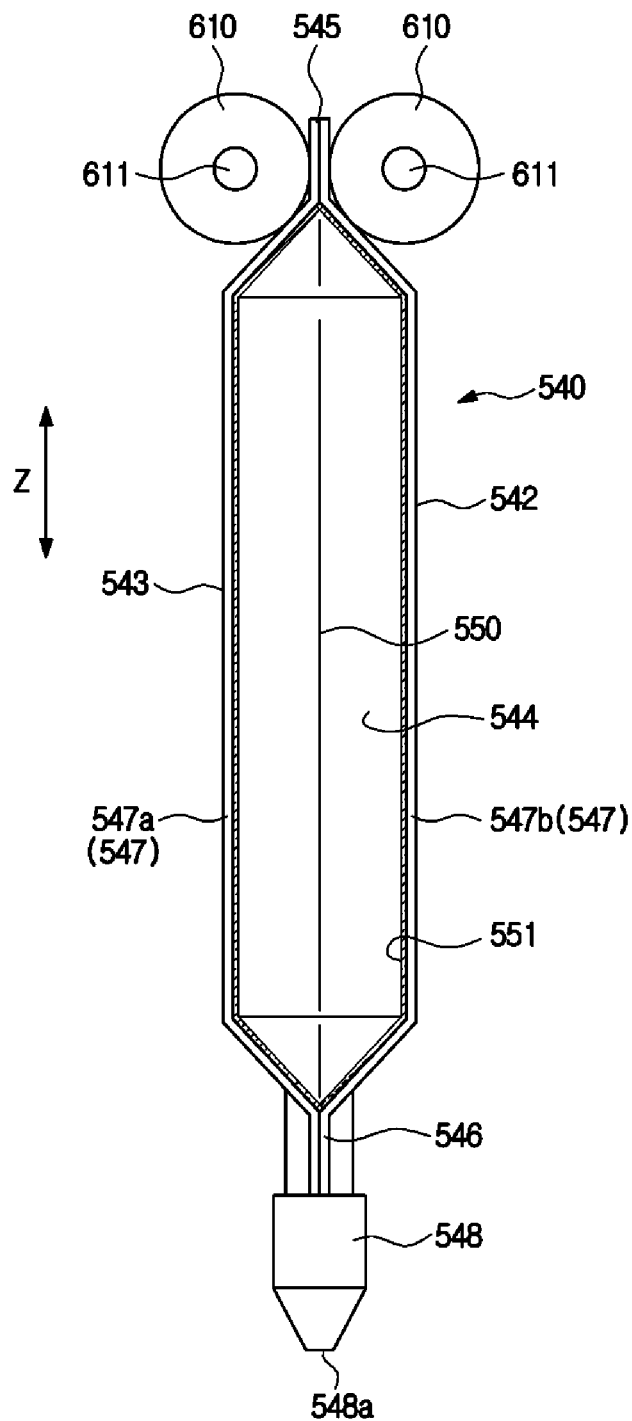
FIGS. 21A and 21B are views illustrating one process of pressing the cartridge of FIG. 19 according to an embodiment of the present disclosure.
Figure 21B:
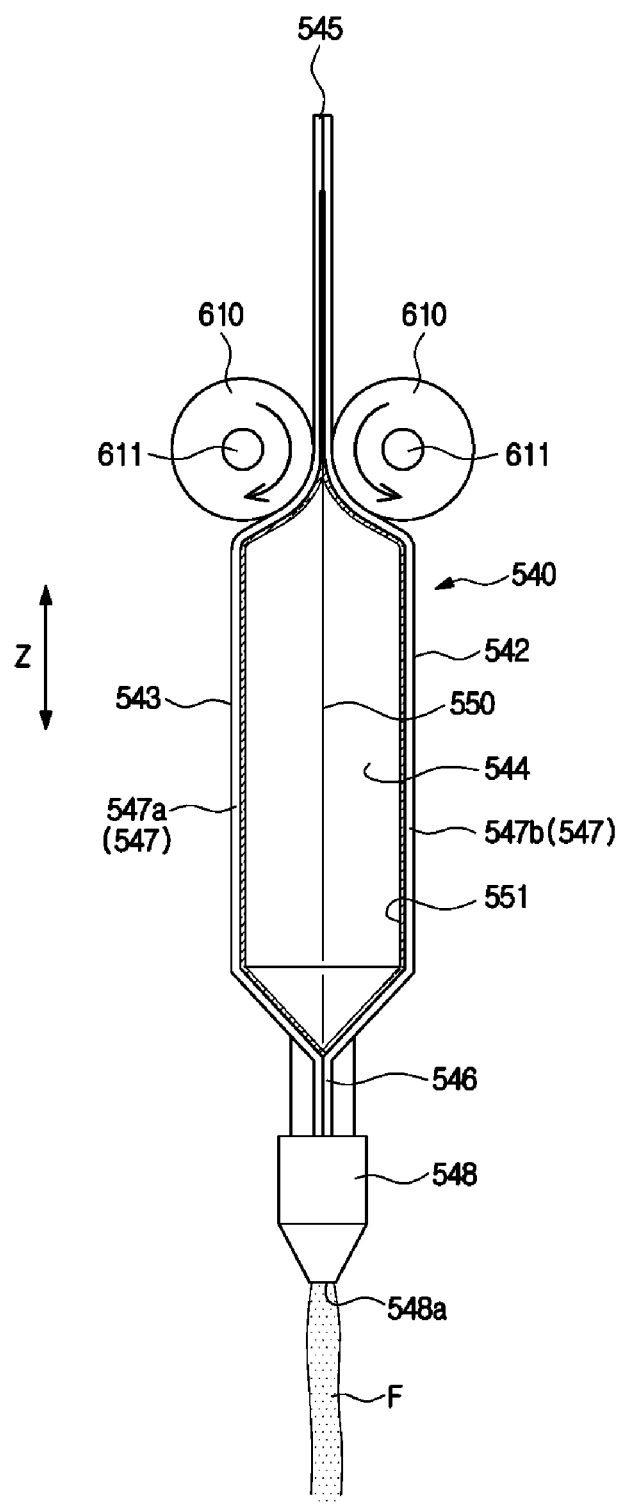

FIGS. 21A and 21B are views illustrating one process of pressing the cartridge of FIG. 19 according to an embodiment of the present disclosure. FIGS. 21A and 21B are side vies of the cartridge 540 of FIG. 19. In FIGS. 21A and 21B, "F" indicates food ingredient.

Referring to FIGS. 21A and 21B, the cartridge 540 of the cartridge assembly according to the fifth embodiment may be pressed by the extruding unit. The extruding unit may include a plurality of rollers 610. The cartridge 540 may be pressed by the plurality of rollers 610 in a state of being interposed between the rollers 610. The rollers 610 may rotate about respective roller rotation shafts 611 thereof.

FIG. 21A illustrates a state before the cartridge 540 is pressed by the extruding unit. As illustrated in FIG. 21A, the cartridge 540 may be disposed between the plurality of rollers 610. Particularly, the cartridge 540 may be disposed such that the upper end press part 545 of the main body portion 541 is interposed between the rollers 610.

FIG. 21B illustrates a state in which the cartridge 540 is pressed by the extruding unit. As illustrated in FIG. 21B, the cartridge 540 may be pressed as the rollers 610 rotate about the respective roller rotation shafts 611. In this case, the plurality of rollers 610 may rotate in opposite directions. As the cartridge 540 is pressed by the rollers 610, the food ingredient contained in the cartridge 540 may be discharged through the discharge port 548a of the nozzle part 548. Portions of the cartridge 540 pressed by the rollers 610 may adhere to each other by the adhesive member 551 disposed on at least one of the first side end press part 547a and the second side end press part 547b. As the portions of the cartridge 540 pressed by the rollers 610 adhere to each other, the food ingredient is collected in a non-pressed portion of the cartridge 540 that is not pressed by the rollers 610. Accordingly, a pressure of the rollers 610 may be concentrated on the food ingredient collected in the non-pressed portion of the cartridge 540. Thus, a waste of the food ingredient contained in the cartridge 540 may be prevented.

The discharge amount of the food ingredient may be adjusted by changing revolution per minute (RPM) of the plurality of rollers 610.

Figure 22A:
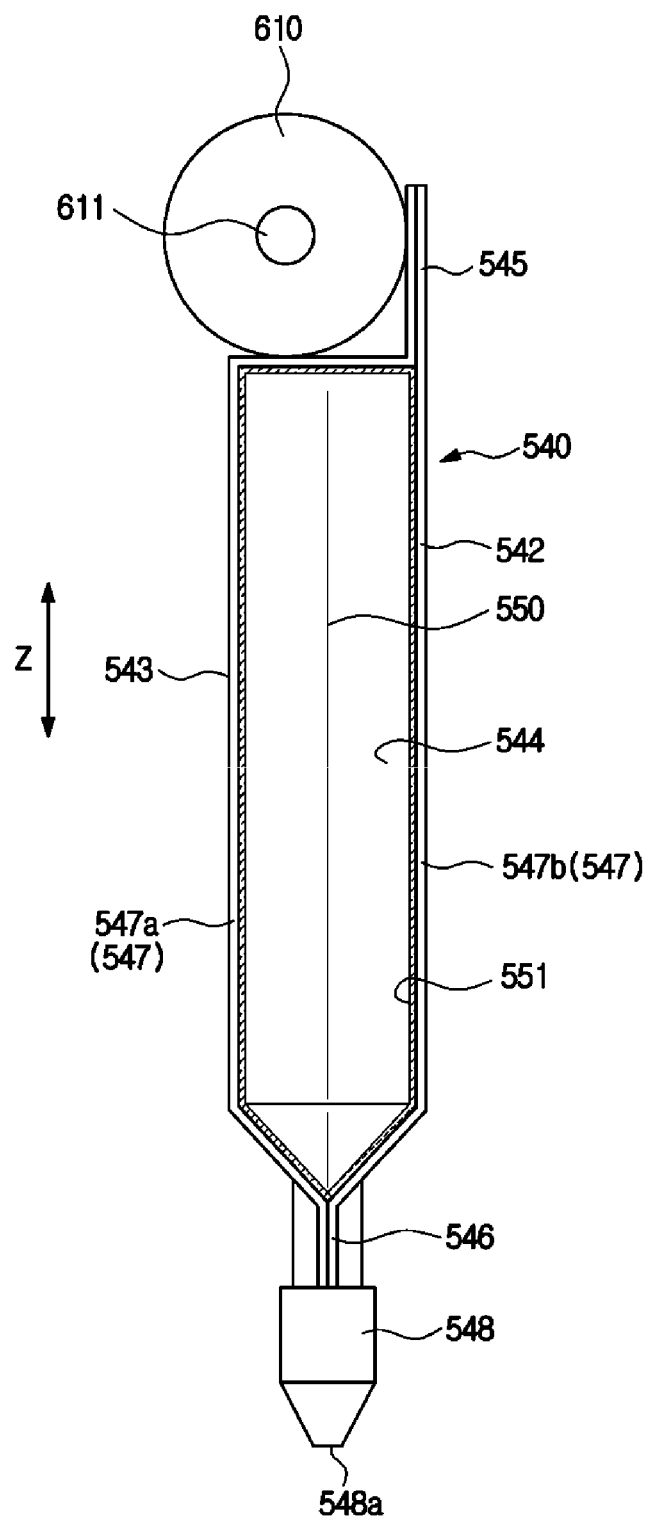
FIGS. 22A and 22B are views illustrating another process of pressing the cartridge of the cartridge assembly according to the fifth embodiment of the cooking apparatus of the present disclosure.
Figure 22B:
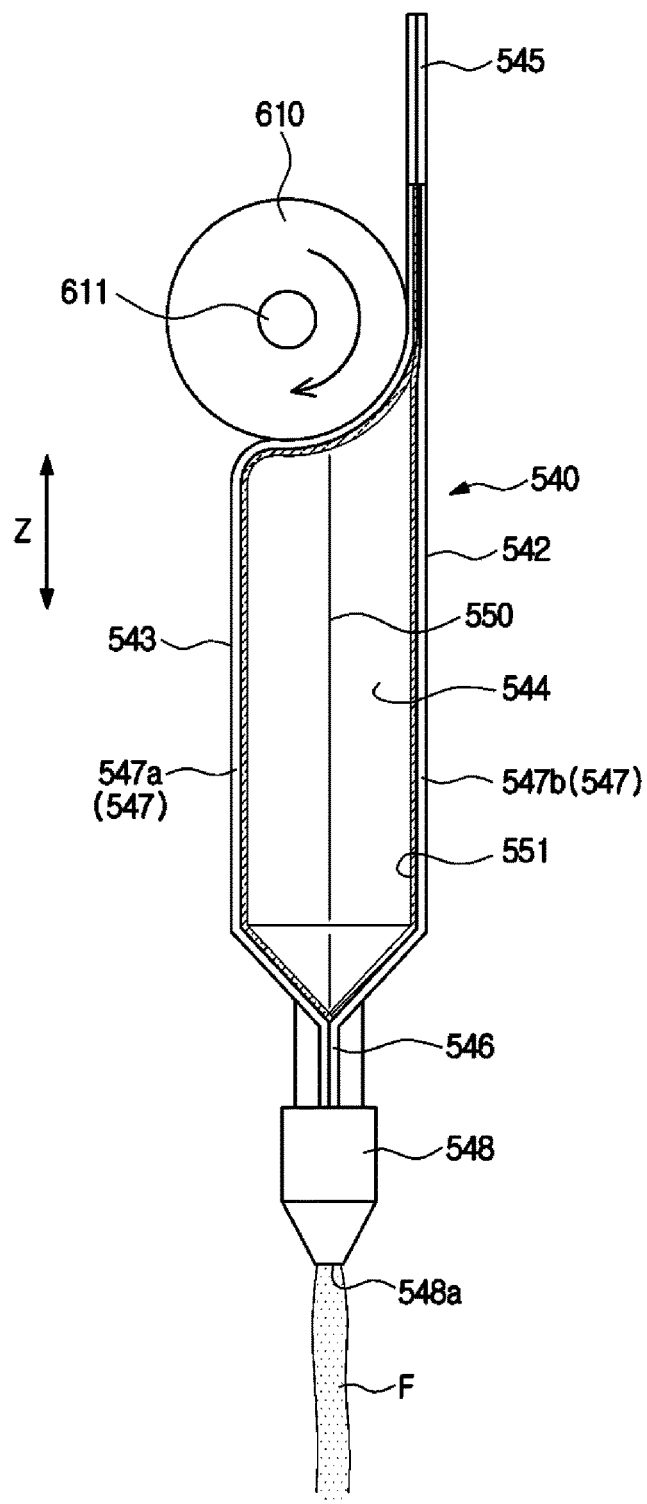

FIGS. 22A and 22B are views illustrating another process of pressing the cartridge of the cartridge assembly according to the fifth embodiment of the cooking apparatus of the present disclosure. In FIGS. 22A and 22B, "F" indicates food ingredient.

Referring to FIGS. 22A and 22B, the plurality of cartridges 540 of the cartridge assembly according to the fifth embodiment may be pressed by the extruding unit 160. The extruding unit 160 may include one roller 610. The roller 610 may rotate about a roller rotation shaft 611.

FIG. 22A illustrates a state before the cartridge 540 is pressed by the extruding unit 160. FIG. 22B illustrates a state in which the cartridge 540 is pressed by the extruding unit 160. As illustrated in FIG. 22B, the cartridge 540 may be pressed as the single roller 610 rotates about the roller rotation shaft 611. As the cartridge 540 is pressed by the roller 610, the food ingredient contained in the cartridge 540 may be discharged through the discharge port 548a of the nozzle part 548. Portions of the cartridge 540 pressed by the roller 610 may adhere to each other by the adhesive member 551 disposed on at least one of the first side end press part 547a and the second side end press part 547b. Effects of adhesion of the portions of the cartridge 540 pressed by the roller 610 are the same as those described above with reference to FIGS. 21A and 21B, and thus detailed descriptions thereof will not be repeated.

Figure 23:
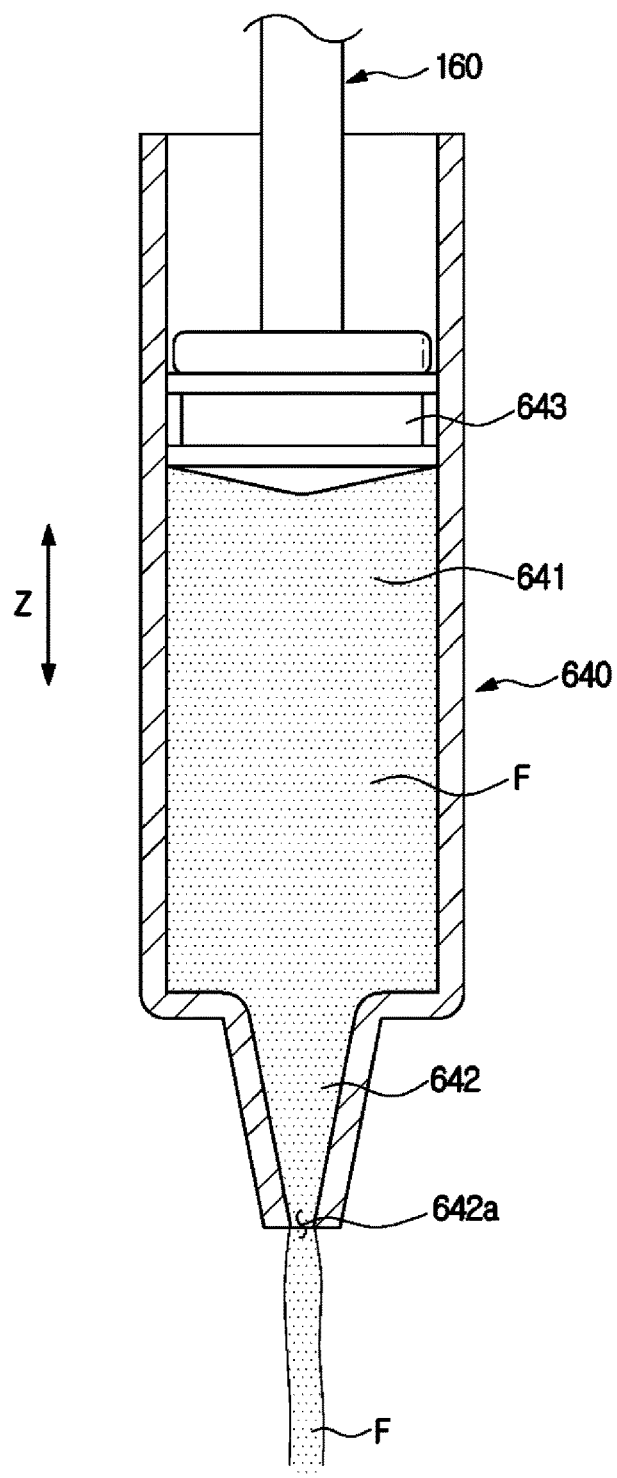
FIG. 23 is a view illustrating a cartridge of a cartridge assembly according to a sixth embodiment of the cooking apparatus of the present disclosure.

FIG. 23 is a view illustrating a cartridge of a cartridge assembly according to a sixth embodiment of the cooking apparatus of the present disclosure. In FIG. 23, "F" indicates food ingredient.

As illustrated in FIG. 23, the cartridge assembly according to the sixth embodiment may include a plurality of cartridges 640. The plurality of cartridges 640 may be formed of a hard material. For example, while the plurality of cartridges 240 of the cartridge assembly 200 according to the first embodiment is formed of a soft material, the plurality of cartridges 640 of the cartridge assembly according to the sixth embodiment is formed of a hard material that is not deformed by the extruding unit 160.

Each of the plurality of cartridges 640 may include a containing part 641 and a nozzle part 642 connected to the containing part 641 and having a discharge port 642a through which a food ingredient is discharged. The containing part 641 is formed of a hard material that is not deformed by the extruding unit 160.

Each of the plurality of cartridges 640 may further include a cap 643 disposed inside the containing part 641 to be movable in the pressing direction of the extruding unit 160.

As the extruding unit 160 presses the cap 643, the cap 643 moves toward the discharge port 642a in the pressing direction of the extruding unit 160. During this process, the food ingredient contained in the cartridge 640 is extruded through the discharge port 642a.

Figure 24:
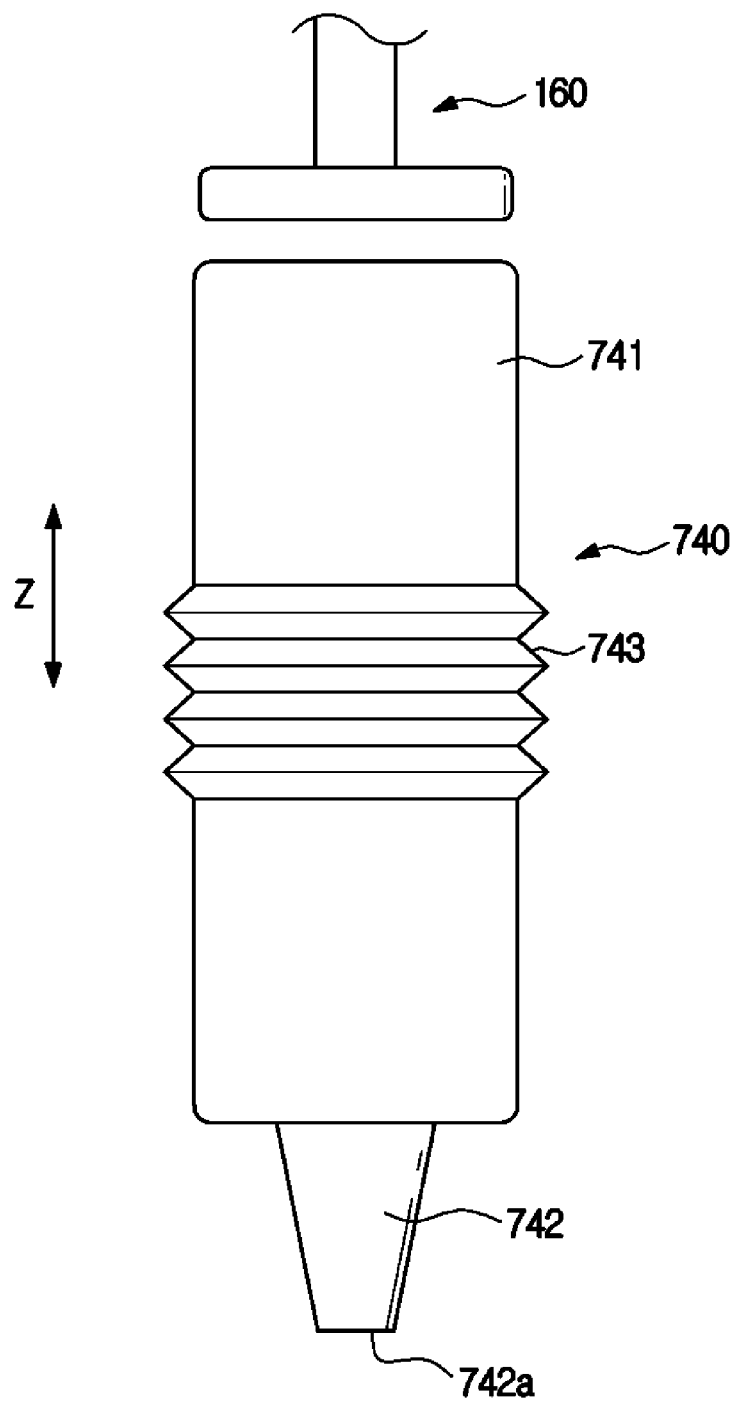
FIG. 24 is a view illustrating a cartridge of a cartridge assembly according to a seventh embodiment of the cooking apparatus of the present disclosure.

FIG. 24 is a view illustrating a cartridge of a cartridge assembly according to a seventh embodiment of the cooking apparatus of the present disclosure.

Referring to FIG. 24, the cartridge assembly according to the seventh embodiment may include a plurality of cartridges 740. The plurality of cartridges 740 may be formed of a soft material. That is, the plurality of cartridges 740 may include a soft material deformable by the extruding unit 160.

Each of the plurality of cartridges 740 may include a containing part 741 and a nozzle part 742 connected to the containing part 741 and having a discharge port 742a through which a food ingredient is discharged. The containing part 741 is formed of a soft material deformable by the extruding unit 160.

The containing part 741 may have wrinkles 743 in at least one portion thereof. Since the wrinkles 743 are formed in at least one portion of the containing part 741, the food ingredient may be easily discharged when the extruding unit 160 presses the cartridge 740. That is, if the wrinkles 743 are formed in at least one portion of the containing part 741, smooth discharge of the food ingredient may be expected. Thus, throwing out or replacement of the plurality of cartridges 740 even when the food ingredients remain in the plurality of cartridges 240 may be prevented.

Figure 25:
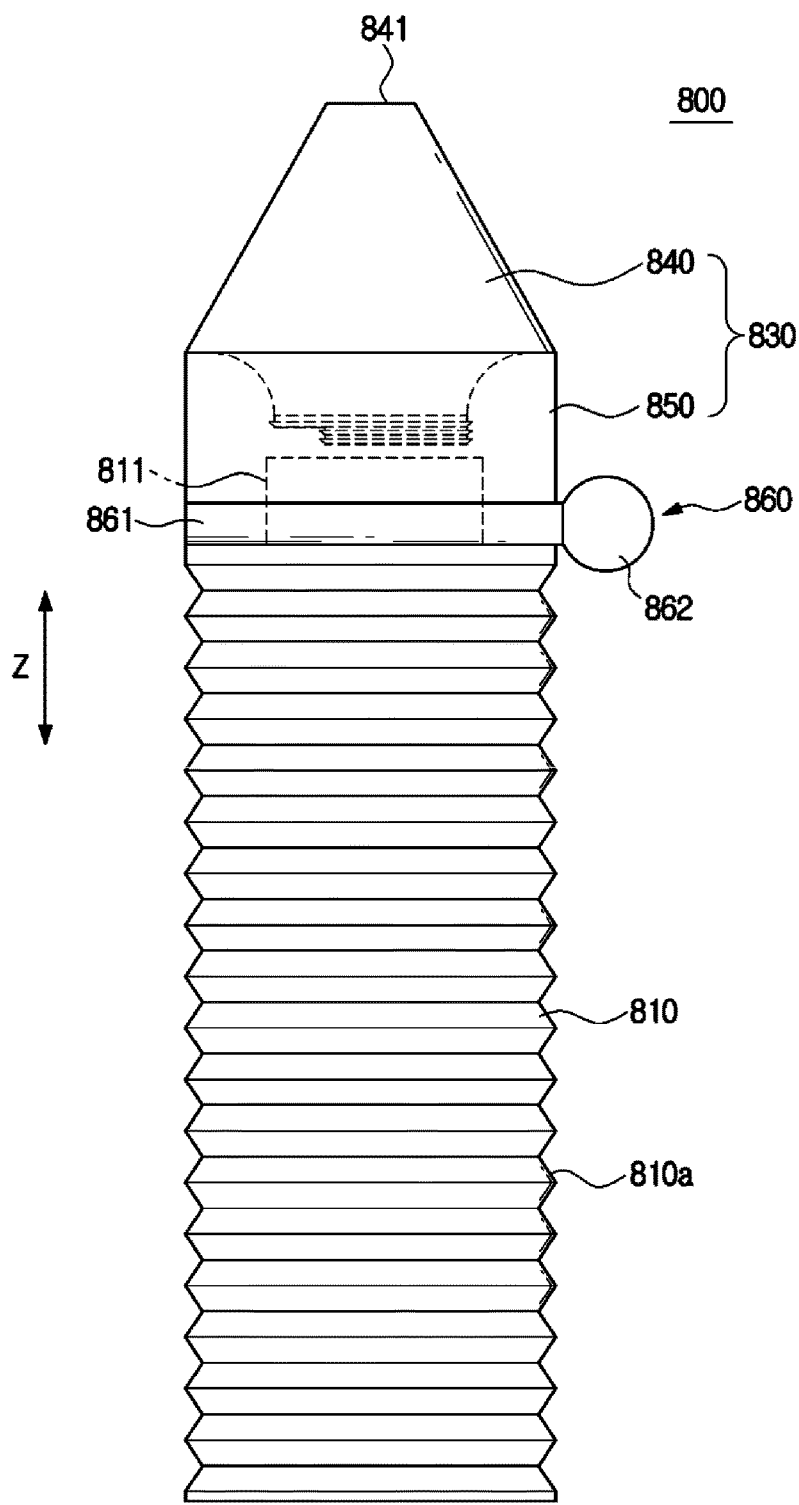
FIG. 25 is a view illustrating a cartridge unit of a cartridge assembly according to an eighth embodiment of the cooking apparatus of the present disclosure.
Figure 26:
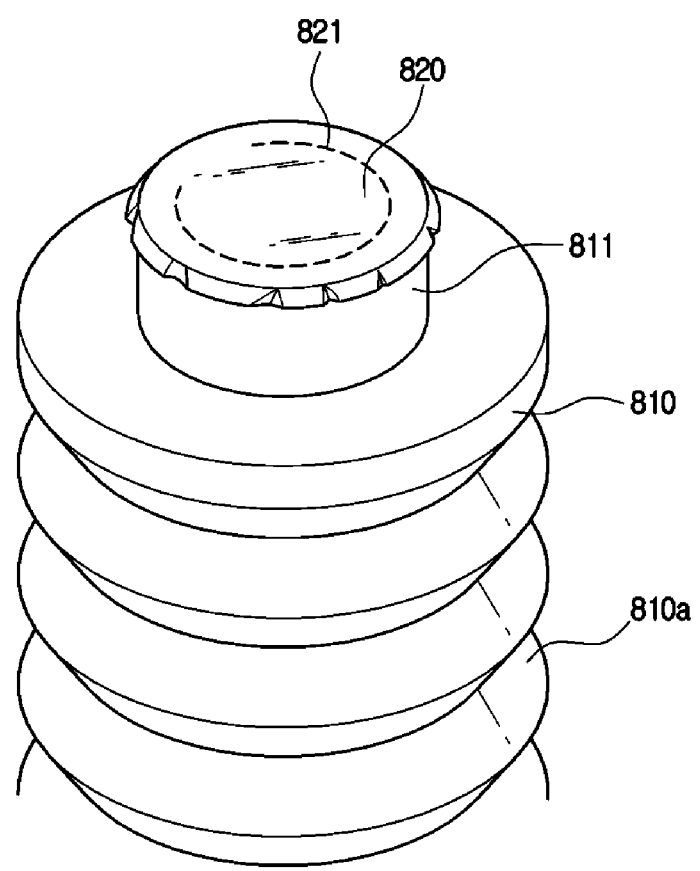
FIG. 26 is a perspective view illustrating a container of the cartridge unit of FIG. 25 according to an embodiment of the present disclosure.
Figure 27:
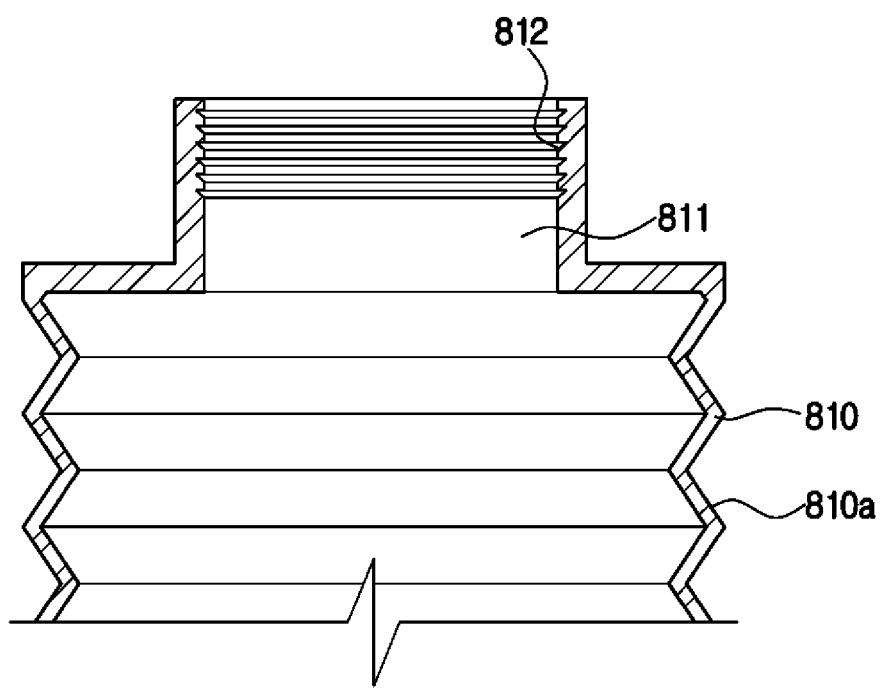
FIG. 27 is a cross-sectional view of an enlarged portion of the container of FIG. 25 according to an embodiment of the present disclosure.
Figure 28:
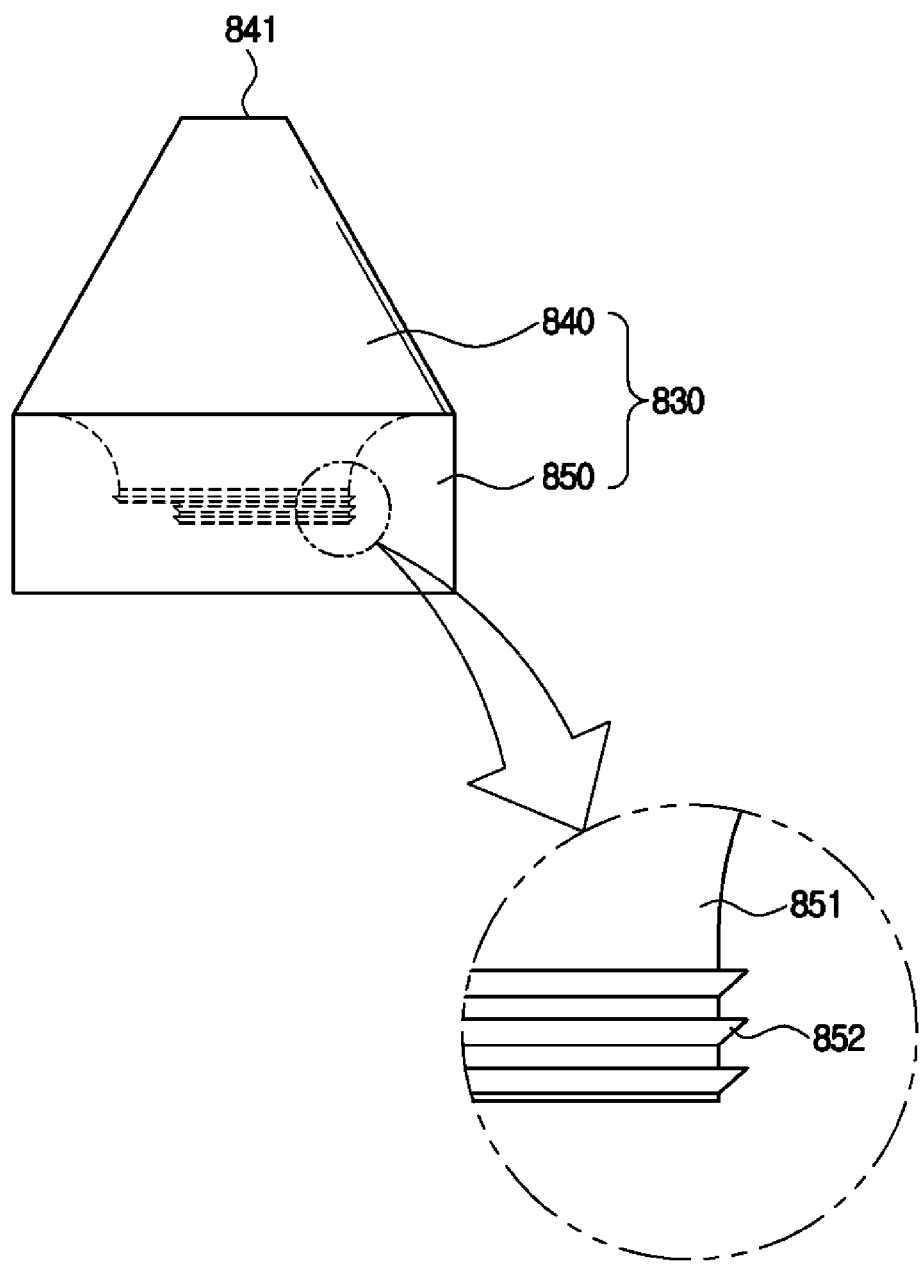
FIG. 28 is a view illustrating a container cap of the cartridge unit of FIG. 25 according to an embodiment of the present disclosure.

FIG. 25 is a view illustrating a cartridge unit of a cartridge assembly according to an eighth embodiment of the cooking apparatus of the present disclosure. FIG. 26 is a perspective view illustrating a container of the cartridge unit of FIG. 25 according to an embodiment of the present disclosure. FIG. 27 is a cross-sectional view of an enlarged portion of the container of FIG. 25 according to an embodiment of the present disclosure. FIG. 28 is a view illustrating a container cap of the cartridge unit of FIG. 25 according to an embodiment of the present disclosure.

Referring to FIGS. 25 to 28, the cartridge assembly according to the eighth embodiment may include a cartridge unit 800 (e.g., a cartridge device) of the present disclosure.

The cartridge unit 800 may include a container 810 in which a food ingredient is contained. The container 810 may have an inlet 811. The food ingredient contained in the container 810 is discharged out of the container 810 through the inlet 811. First threads 812 may be formed on the internal surface of the inlet 811.

The container 810 may include a plastic material. Preferably, the container 810 may have a thickness of 500 μm or less.

Wrinkles 810a may be formed in at least one portion of the container 810. Preferably, the wrinkles 810a may be formed in the entire surface of the container 810. Effects of the wrinkles 810a formed in at least one portion of the container 810 are the same as those described above with reference to the wrinkles 244, and thus detailed descriptions thereof will not be repeated.

The cartridge unit 800 may further include a cartridge cover 820 adhered to the inlet 811 to seal the container 810. The cartridge cover 820 may be removably attached to the inlet 811.

The cartridge cover 820 may have a thin film form.

The cartridge cover 820 may include at least one material of polymer and metal. For example, the cartridge cover 820 may include aluminum foil.

The cartridge cover 820 may have a structure that tears when a predetermined level of force is applied thereto. This structure may be realized by a reference tear line 821 as illustrated in FIG. 25. The reference tear line 821 may be formed on the cartridge cover 820. The reference tear line 821 may be formed along a circumferential direction of the inlet 811.

The cartridge unit 800 may further include a container cap 830. The container cap 830 may be coupled to the container 810. Particularly, the container cap 830 may be separably (or detachably) coupled to the inlet 811 of the container 810.

The container cap 830 may include at least one material of plastic and metal.

The container cap 830 may include a nozzle part 840 having a discharge port 841.

The container cap 830 may further include a connection part 850 connected to the nozzle part 840. The connection part 850 may include a nozzle introduction part 851 corresponding to the inlet 811 of the container 810. After passing through the inlet 811 of the container 810, the food ingredient contained in the container 810 may be discharged out of the cartridge unit 800 through the nozzle introduction part 851 and the discharge port 841. Second threads 852 that are engaged with the first threads 812 of the inlet 811 may be formed on the external surface of the nozzle introduction part 851. When the container cap 830 is pressed after removing a strap 860, the inlet 811 of the container 810 may be coupled to the nozzle introduction part 851 of the container cap 830. In this case, the first threads 812 and the second threads 852 may be engaged with each other. Tight coupling of the first threads 812 and the second threads 852 may prevent leakage of the food ingredient contained in the container 810 during a process in which the food ingredient is transferred to the container cap 830 and discharged out of the cartridge unit 800 through the discharge port 841.

The cartridge unit 800 may further include the strap 860. The strap 860 may be provided to connect the container 810 with the container cap 830. The strap 860 may be removably disposed between the container 810 and the container cap 830.

The strap 860 may include a bending part 861 configured to connect the container 810 with the container cap 830 and a grip part 862 extending from the bending part 861. The user may easily remove the strap 860 by using the grip part 862.

Figure 29A:
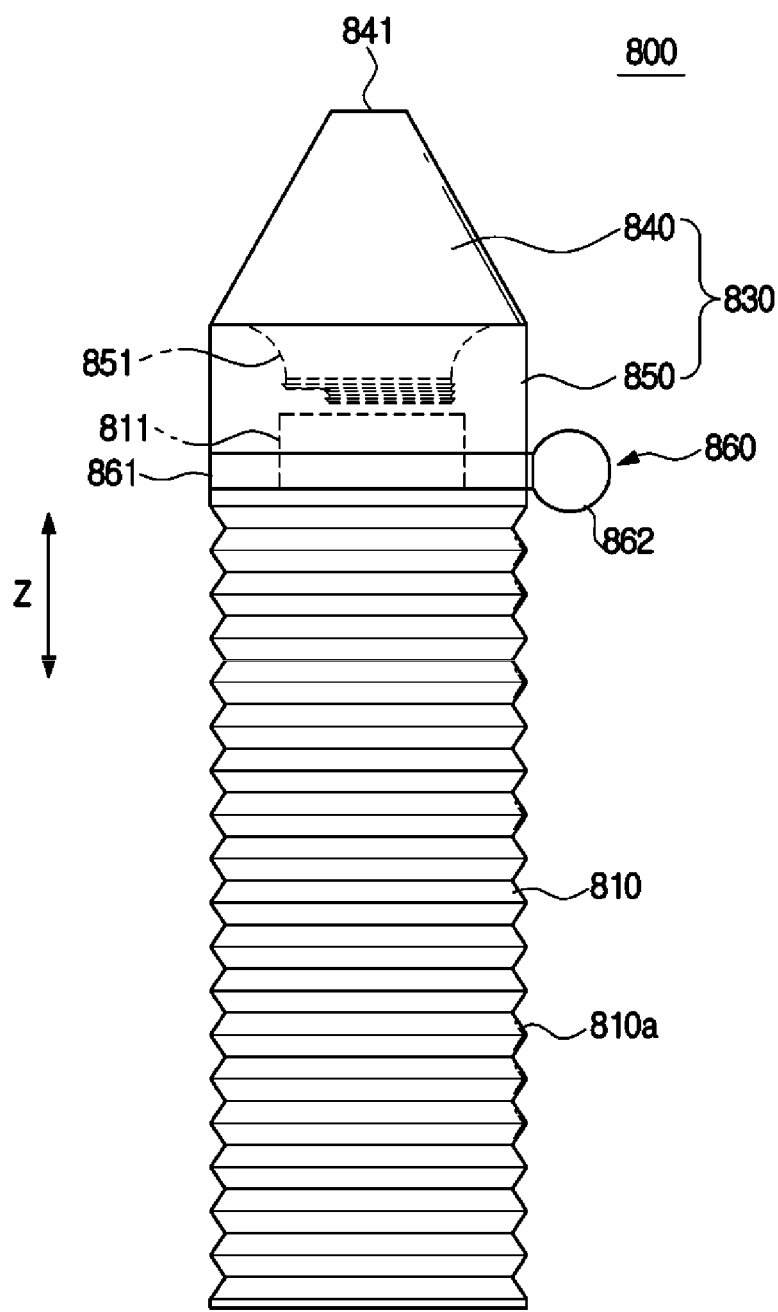
FIGS. 29A, 29B, and 29C are views illustrating a process of using the cartridge unit of the cartridge assembly according to the eighth embodiment of the cooking apparatus of the present disclosure.
Figure 29B:
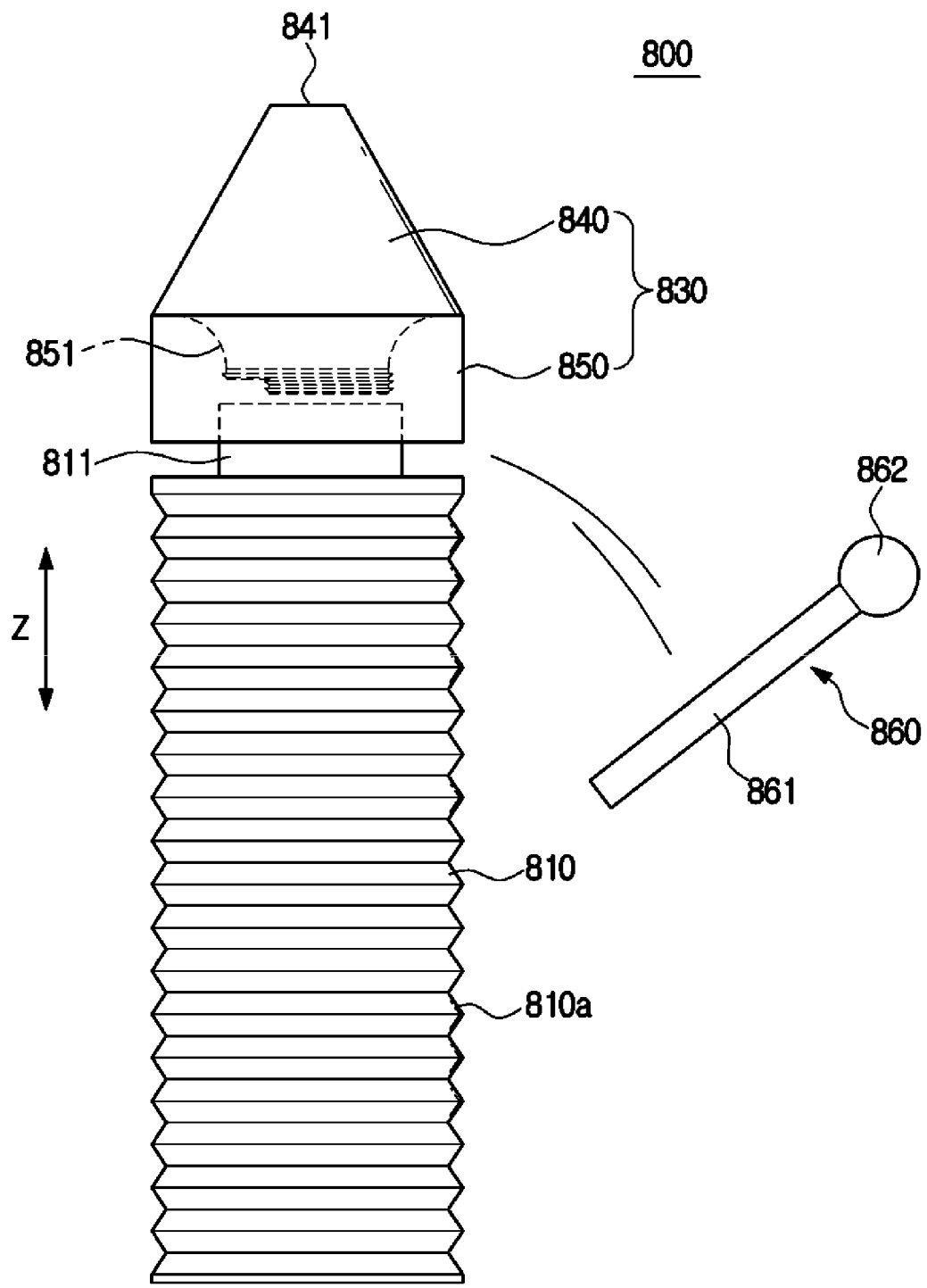
Figure 29C:
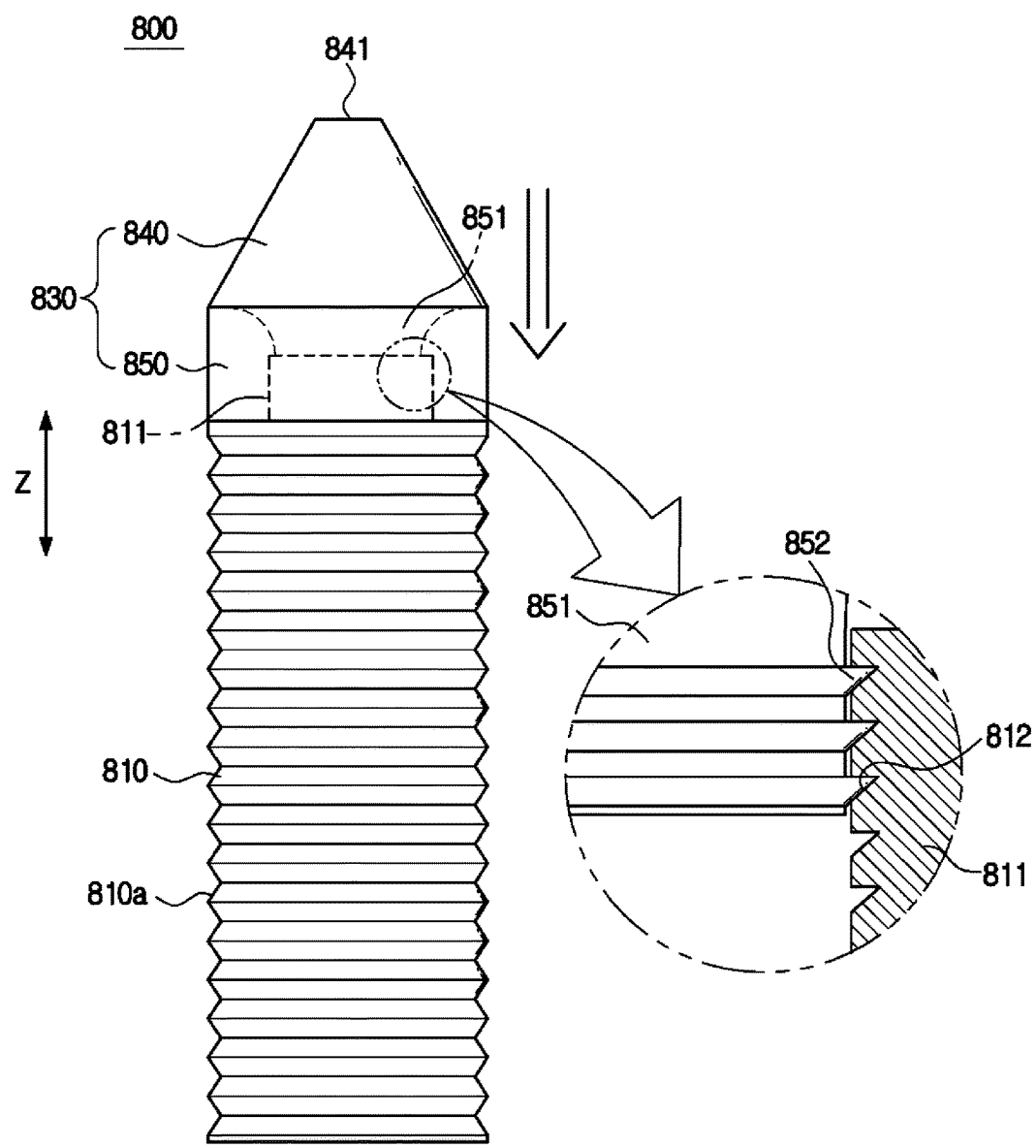

FIGS. 29A to 29C are views illustrating a process of using the cartridge unit of the cartridge assembly according to the eighth embodiment of the cooking apparatus of the present disclosure.

Referring to FIG. 29A, the cartridge unit 800 is in a state where the container 810 is connected with the container cap 830 by the strap 860. In this case, the inlet 811 of the container 810 and the nozzle introduction part 851 of the container cap 830 are spaced apart from each other.

Referring to FIGS. 29B and 29C, by pressing the container cap 830 after removing the strap 860, the container cap 830 is coupled to the container 810. Particularly, the nozzle introduction part 851 of the container cap 830 is coupled to the inlet 811 of the container 810. In this case, the cartridge cover 820 attached to the inlet 811 of the container 810 may be torn when the nozzle introduction part 851 of the container cap 830 presses the inlet 811 of the container 810. As the cartridge cover 820 tears, the container 810 and the container cap 830 communicate with each other. Thus, the food ingredient contained in the container 810 is transferred to the container cap 830 and discharged out of the cartridge unit 800 through the discharge port 841 of the nozzle part 840.

Figure 30:
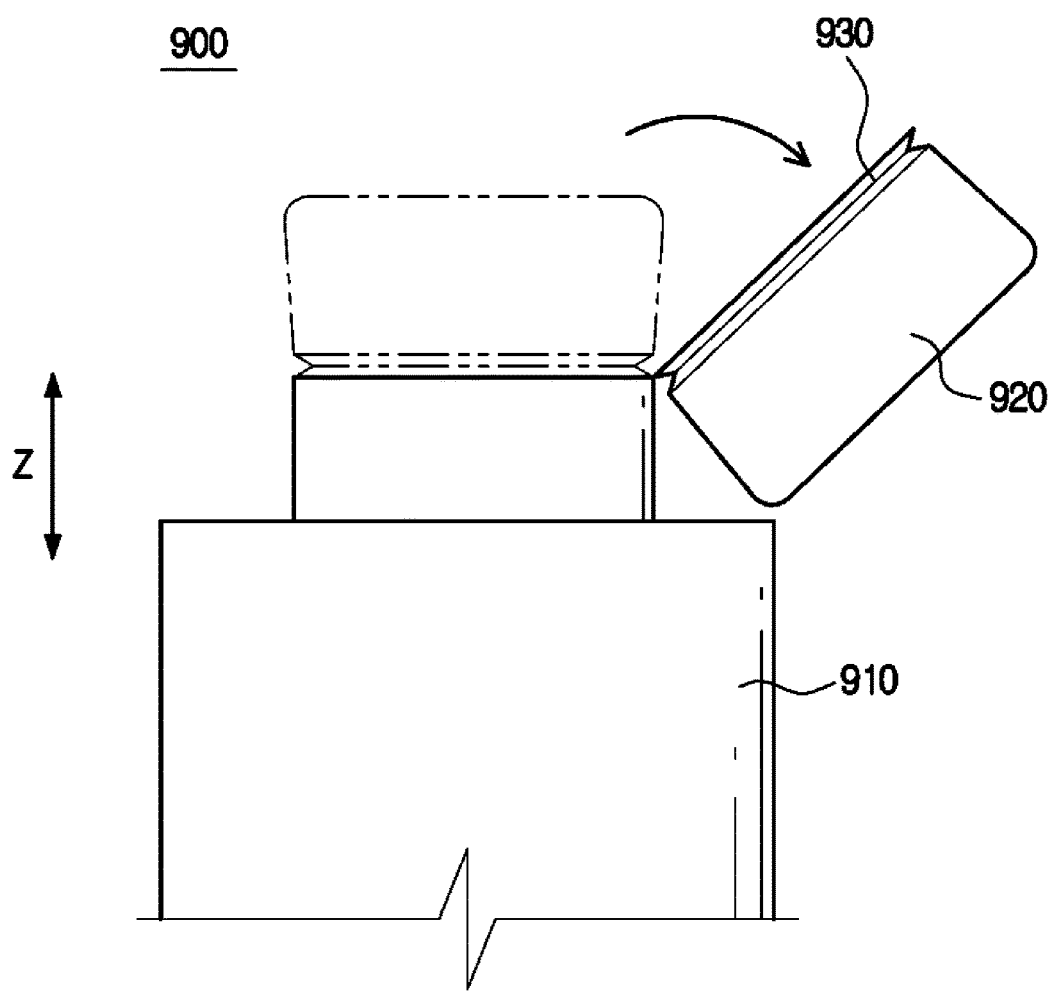
FIG. 30 is a view illustrating a method of removing a container cap of the cartridge unit of a cartridge assembly according to a ninth embodiment of the cooking apparatus of the present disclosure.

FIG. 30 is a view illustrating a method of removing a container cap of the cartridge unit of a cartridge assembly according to a ninth embodiment of the cooking apparatus of the present disclosure.

Referring to FIG. 30, a cartridge assembly according to the ninth embodiment may include a cartridge unit 900 (e.g., a cartridge device) of the present disclosure.

The cartridge unit 900 may include a container 910 to contain a food ingredient.

The cartridge unit 900 may further include a container cap 920 integrally formed with the container 910. The container cap 920 may be integrally formed with the container 910 to be removable from the container 910.

The cartridge unit 900 may have a cutting groove 930. The cutting groove 930 may be formed at a boundary between the container 910 and the container cap 920. In other words, the container 910 and the container cap 920 may be defined based on the cutting groove 930. The container cap 920 may be separated from the container 910 along the cutting groove 930. Particularly, when the user bends the container cap 920, the container cap 920 is separated from the container 910 along the cutting groove 930 and thus the container 910 is opened.

A nozzle (not shown) having a discharge port may be coupled to the container 910 from which the container cap 920 is removed.

Figure 31:
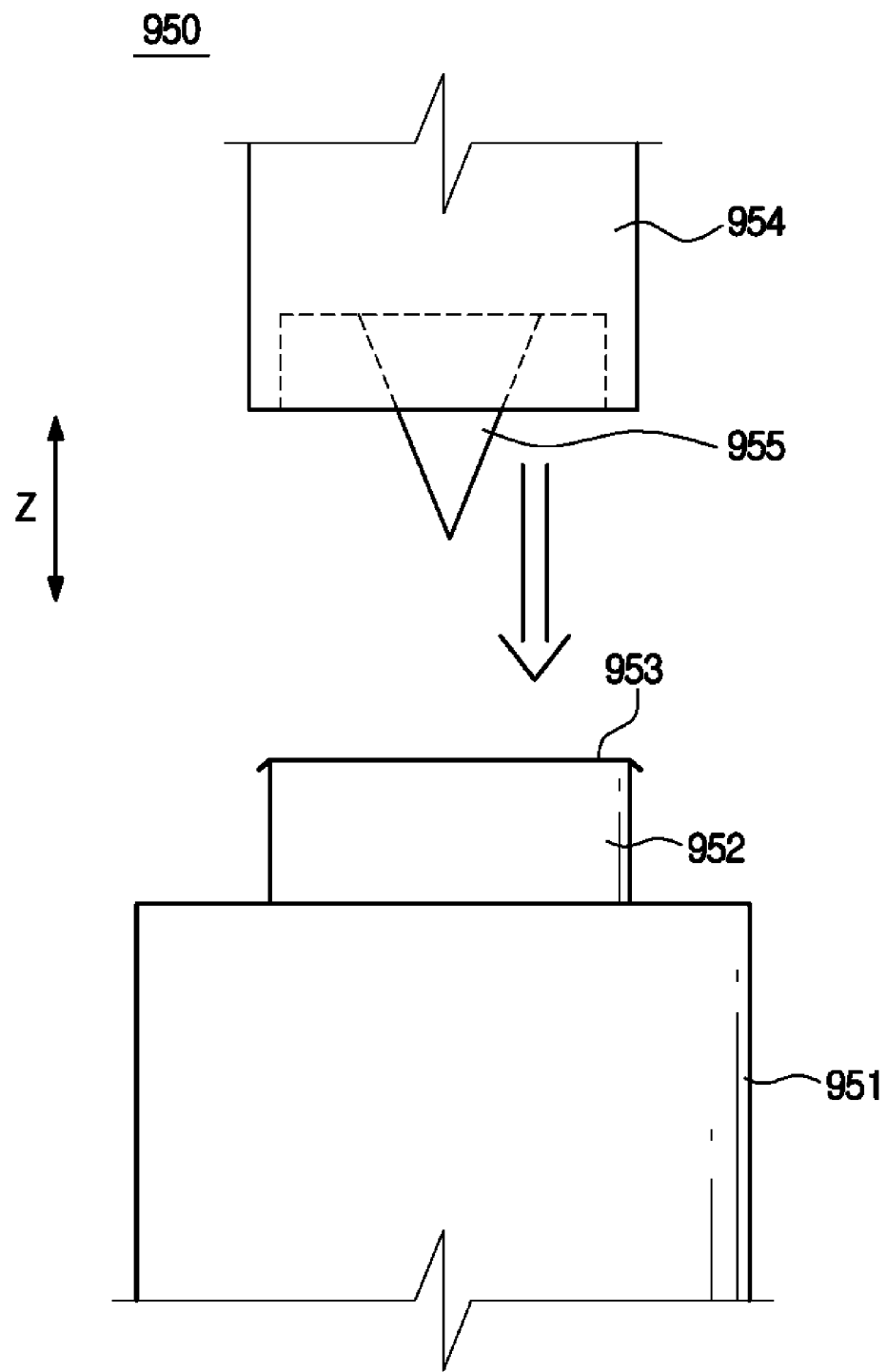
FIG. 31 is a view illustrating a method of removing a cartridge cover of a cartridge unit of a cartridge assembly according to a tenth embodiment of the cooking apparatus of the present disclosure.

FIG. 31 is a view illustrating a method of removing a cartridge cover of a cartridge unit of a cartridge assembly according to a tenth embodiment of the cooking apparatus of the present disclosure.

Referring to FIG. 31, a cartridge assembly according to the tenth embodiment of the present disclosure may include a cartridge unit 950 (e.g., a cartridge device).

The cartridge unit 950 may include a container 951 to contain a food ingredient. The container 951 may have an inlet 952. The food ingredient contained in the container 951 is discharged out of the container 951 through the inlet 952.

The cartridge unit 950 may further include a cartridge cover 953 attached to the inlet 952 to seal the container 951. The cartridge cover 953 may be removably attached to the inlet 952.

The cartridge cover 953 may have a thin film form.

The cartridge cover 953 may include at least one material of polymer and metal. For example, the cartridge cover 953 may include aluminum foil.

The cartridge unit 950 may further include a container cap 954. The container cap 954 may be coupled to the container 954. Particularly, the container cap 954 may be separably coupled to the inlet 952 of the container 951.

The cartridge unit 950 may further include a cartridge cover opener 955 configured to remove the cartridge cover 953. The cartridge cover opener 955 may have a sharp shape. The cartridge cover opener 955 may be provided at the container cap 954. Particularly, the cartridge cover opener 955 may be integrally formed with the container cap 954 outside the container cap 954.

After separating the container cap 954 from the container 951, the user may remove the cartridge cover 953 by using the cartridge cover opener 955 provided at the container cap 954. Particularly, the user may open the container 951 by scratching the cartridge cover 953 by using the cartridge cover opener 955.

A nozzle (not shown) having a discharge port may be coupled to the container 951 from which the cartridge cover 953 is removed.

Figure 32:
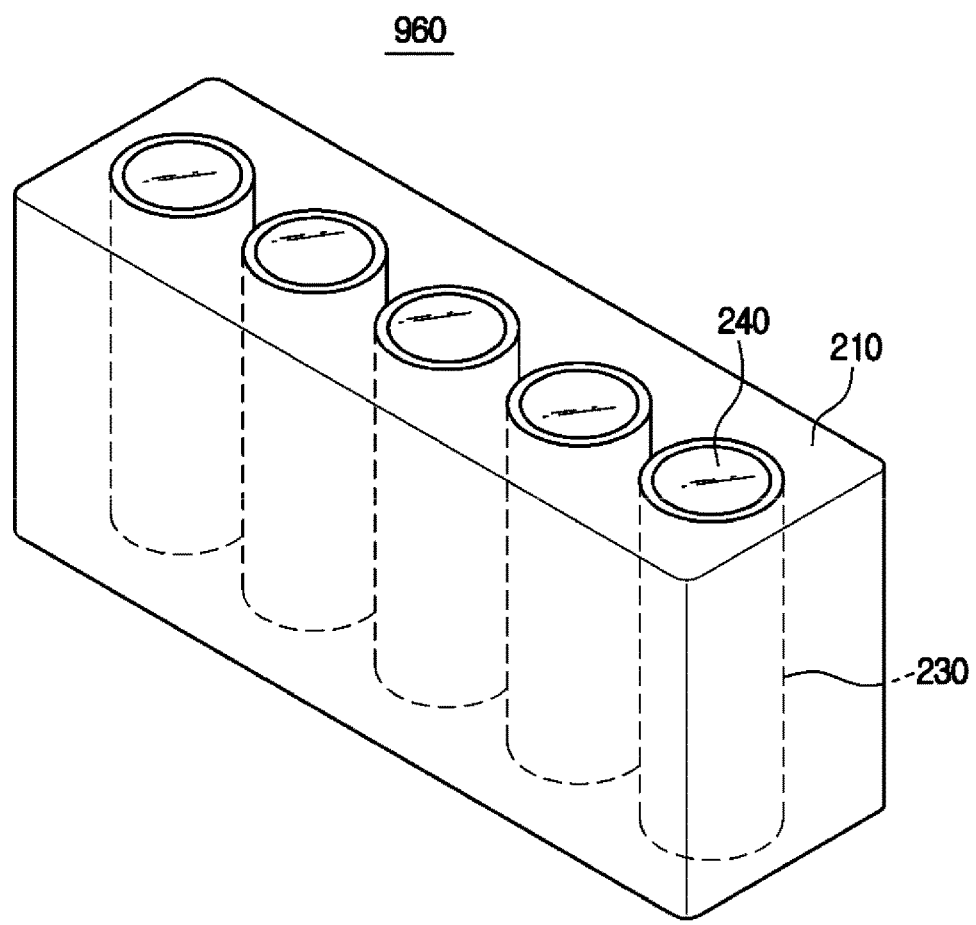
FIG. 32 is a view illustrating a cartridge assembly according to an eleventh embodiment of the cooking apparatus of the present disclosure.

FIG. 32 is a view illustrating a cartridge assembly according to an eleventh embodiment of the cooking apparatus of the present disclosure. Refer to FIGS. 2, 9, and 10 for the reference numerals not illustrated herein.

Referring to FIG. 32, a cartridge assembly 960 according to the eleventh embodiment may include a cartridge body 210. The cartridge body 210 may have a box shape. However, the shape of the cartridge body 210 is not limited thereto and may be modified in various ways. A plurality of cartridge mounts 220 may be formed on the cartridge body 210. The plurality of cartridge mounts 220 may be formed to penetrate the cartridge body 210.

The cartridge assembly 960 according to the eleventh embodiment may be disposed inside the cooking chamber 20 so as to perform linear movement and rotational movement. Methods for the linear movement and rotational movement of the cartridge assembly 960 according to the eleventh embodiment are the same as those of the cartridge assembly 200 according to the first embodiment, and thus detailed descriptions thereof will not be repeated.

The cartridge assembly 960 may further include a plurality of cartridge cases 230 mounted in the plurality of cartridge mounts 220. The plurality of cartridge cases 230 may have a cylindrical shape with one open surface. The plurality of cartridge cases 230 may further include an opening 232. The opening 232 may be formed in the cartridge case 230 to face the bottom surface 21 of the cooking chamber 20. The nozzle parts 242 of the plurality of cartridges 240 may selectively protrude out of the plurality of cartridge cases 230 via the openings 232.

The shape of the cartridge case 230 is not limited to the cylindrical shape and the plurality of cartridge cases 230 may have a shape corresponding to that of the plurality of cartridge mounts 220.

The cartridge assembly 960 may further include a plurality of cartridges 240 repeatedly disposed inside the plurality of cartridge cases 230. The plurality of cartridges 240 may contain food ingredients. Since the plurality of cartridges 240 and the food ingredients are described above with reference to FIGS. 8 and 9, detailed descriptions thereof will not be repeated.

The cartridge assembly 960 may further include elastic members 250. Since the elastic members 250 are described above with reference to FIGS. 9 and 10, detailed descriptions thereof will not be repeated.

Figure 33A:
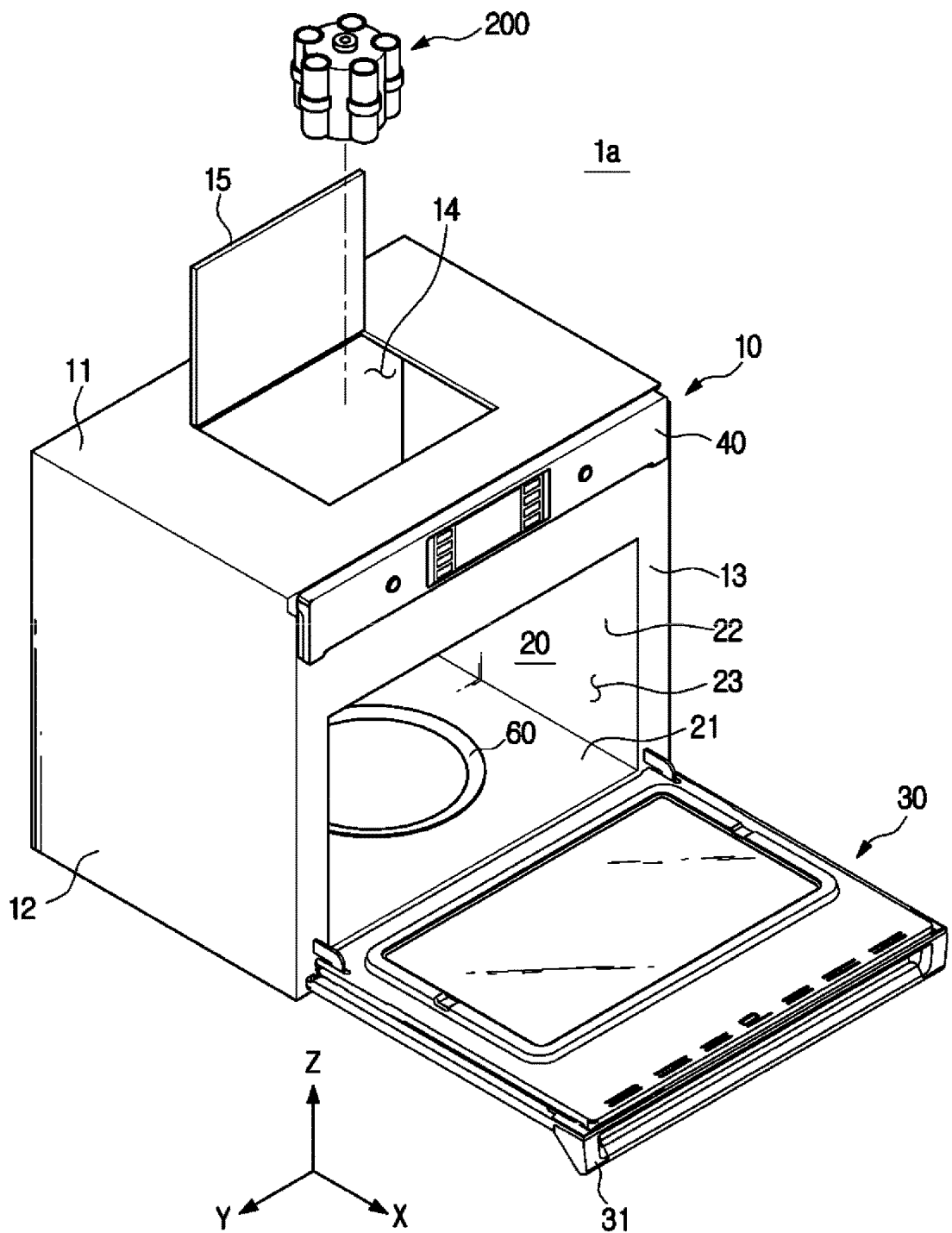
FIGS. 33A and 33B are views for describing a method of replacing a cartridge assembly of a cooking apparatus according to various embodiments of the present disclosure.
Figure 33B:
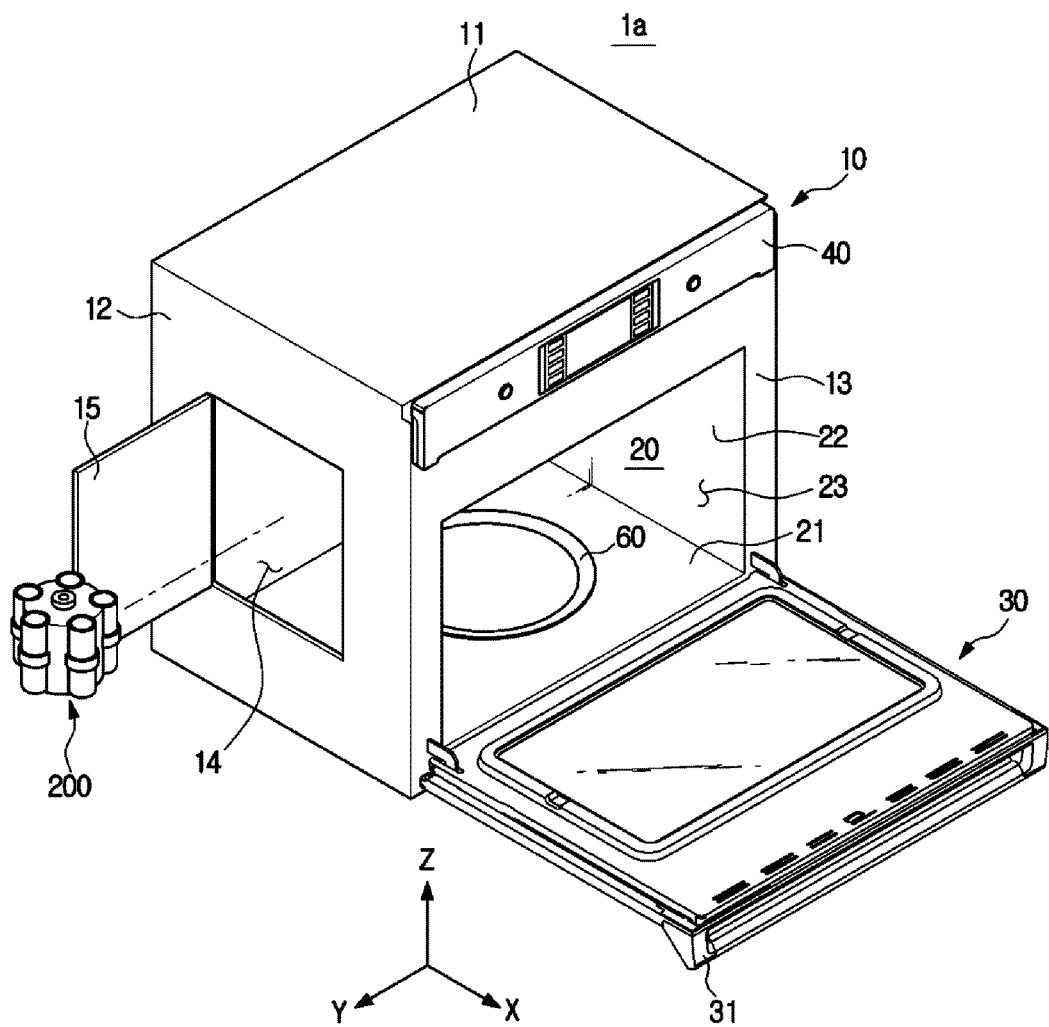

FIGS. 33A and 33B are views for describing a method of replacing a cartridge assembly of a cooking apparatus according to various embodiments of the present disclosure. For descriptive convenience, a method of replacing the cartridge assembly 200 according to the first embodiment will be described with reference to FIGS. 33A and 33B by way of example. Refer to FIG. 2 for the reference numerals not illustrated herein. In addition, descriptions given above with reference to FIG. 2 will not be repeated.

Referring to FIGS. 33A and 33B, the cartridge assembly 200 may be disposed inside the cooking chamber 20 to be replaceable.

The main body 10 may have an opening part 14 formed on one surface of the main body 10 for replacement of the cartridge assembly 200. Particularly, the opening part 14 may be formed on the top surface 11 or one of side surfaces 12 of the main body 10. FIG. 32A illustrates a case in which the opening part 14 is formed on the top surface 11 of the main body 10. FIG. 32B illustrates a case in which the opening part 14 is formed on one side surface 12 of the main body 10.

The cooking apparatus 1a may further include a simple door 15 configured to open or close the opening part 14. The simple door 15 may be installed on the main body 10. For example, the simple door 15 may be rotatably installed on the main body 10 to open or close the opening part 14. As another example, the simple door 15 may be slidably installed on the main body 10 to open or close the opening part 14. As another example, the simple door 15 may be separably installed on the main body 10 to open or close the opening part 14. FIG. 33A illustrates that the simple door 15 is installed on the top surface 11 of the main body 10 to open or close the opening part 14. FIG. 33B illustrates that the simple door 15 is installed on one side surface 12 of the main body 10 to open or close the opening part 14.

Figure 34A:
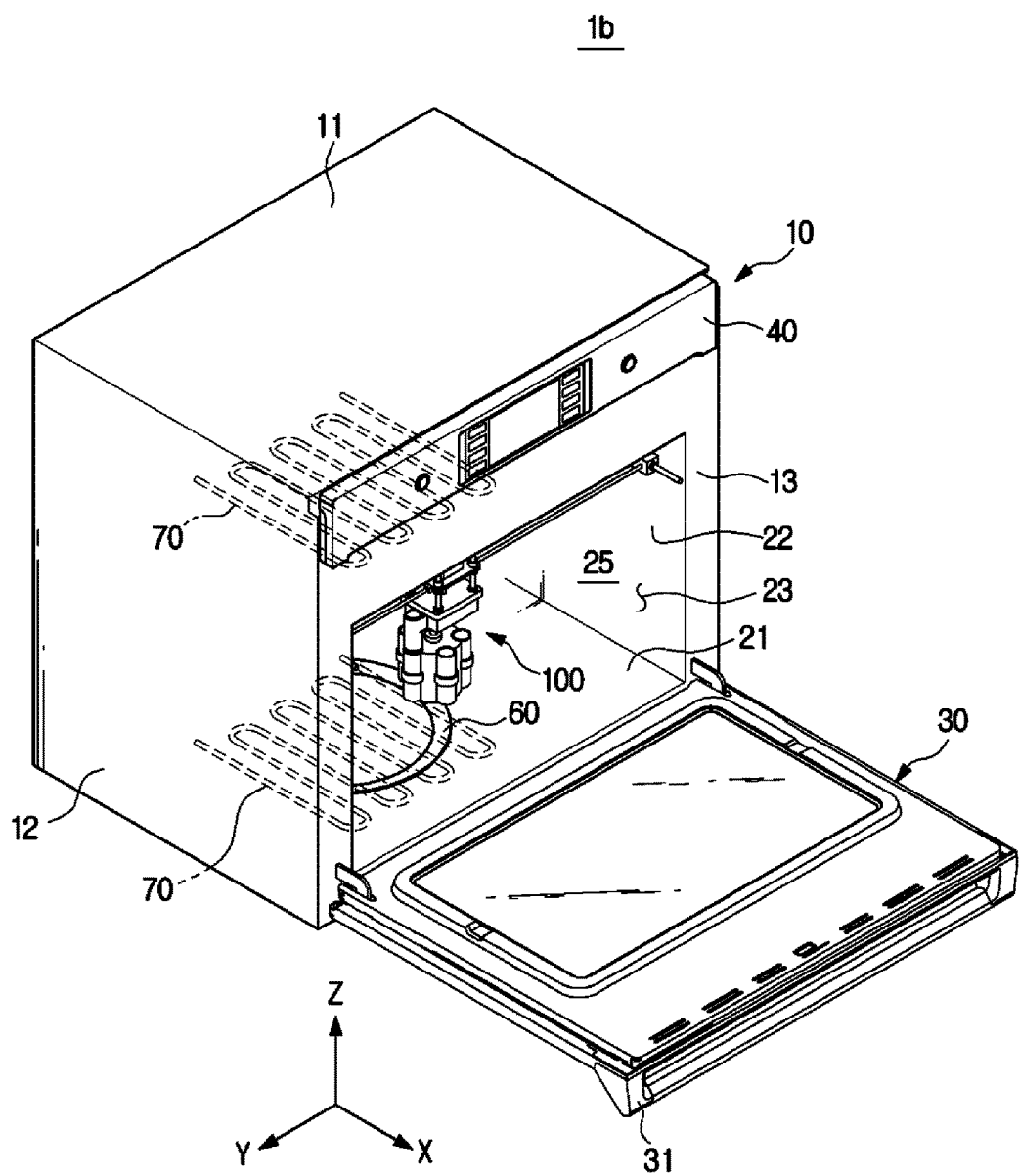
FIGS. 34A, 34B, and 34C are views illustrating one process of partitioning an internal space of a main body into a plurality of spaces in a cooking apparatus according to various embodiments of the present disclosure.
Figure 34B:
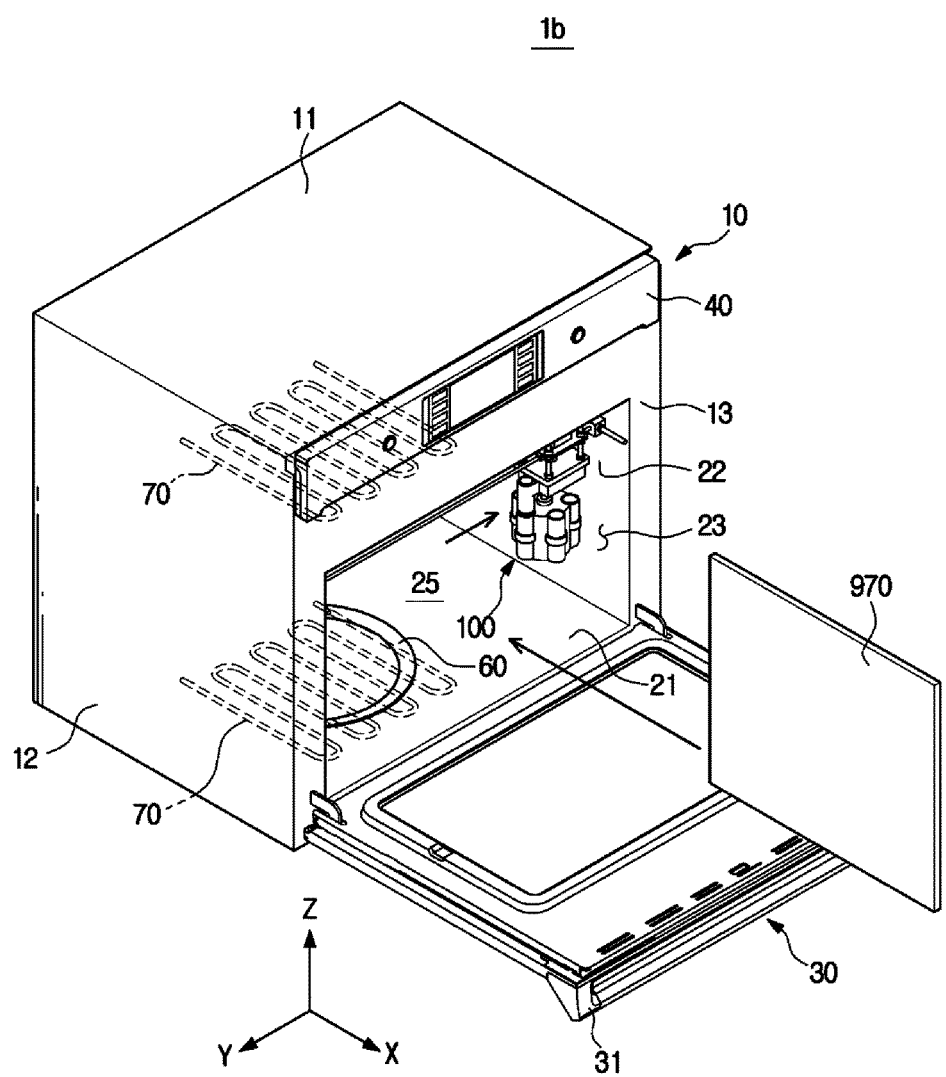
Figure 34C:
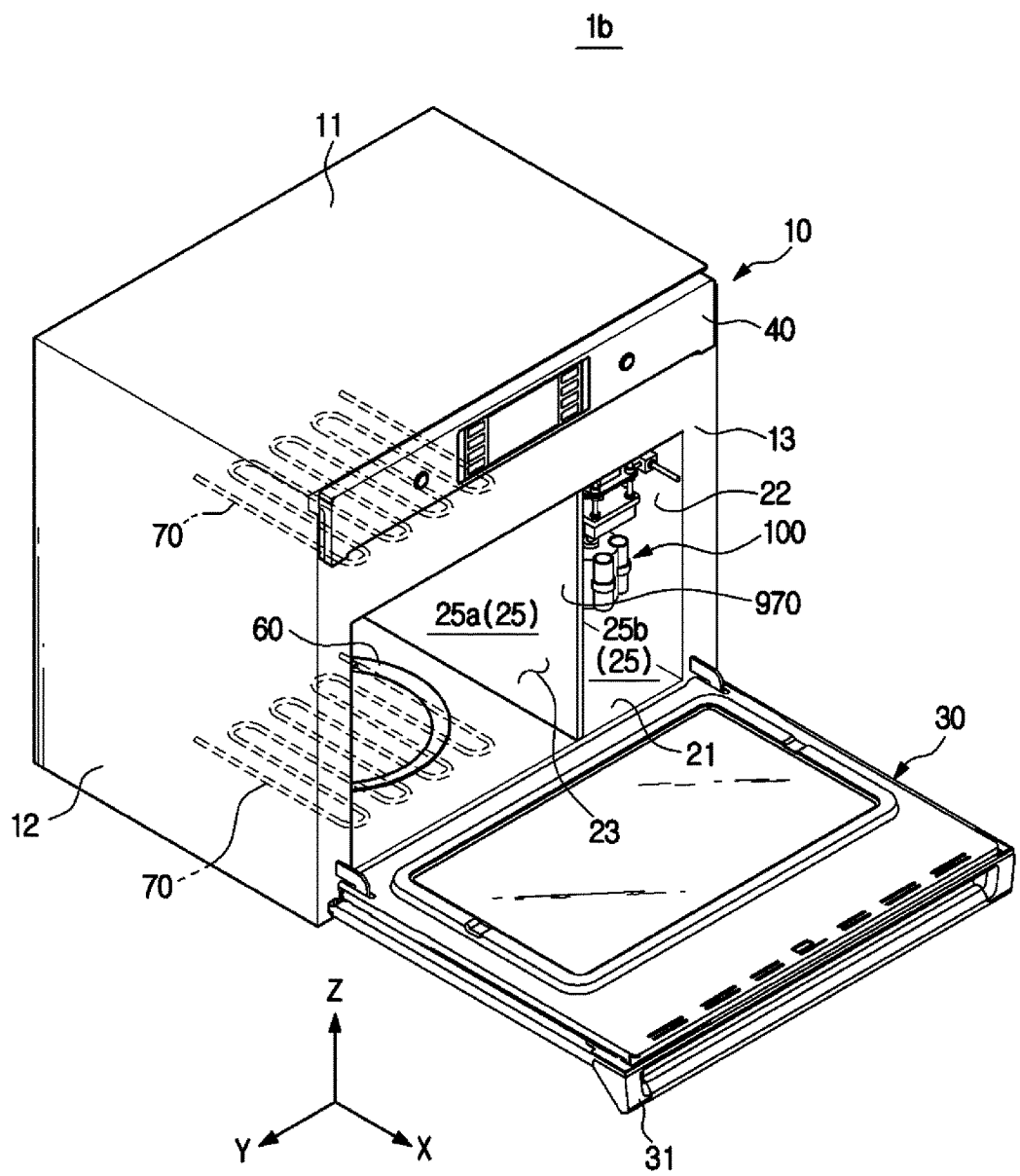

FIGS. 34A to 34C are views illustrating one process of partitioning an internal space of a main body into a plurality of spaces in a cooking apparatus according to various embodiments of the present disclosure. Hereinafter, descriptions given above with reference to FIGS. 2 to 10 will be omitted. Refer to FIGS. 2 to 10 for the reference numerals not illustrated herein.

Referring to FIGS. 34A to 34C, a cooking apparatus 1b may include a main body 10. The main body 10 may define an appearance of the cooking apparatus 1b. The main body 10 may have a top surface 11, a bottom surface (not shown), a rear surface (not shown), both side surfaces 12, and a front surface 13.

The cooking apparatus 1b may further have an internal space 25 formed inside the main body 10. The internal space 25 may be defined by a top surface (not shown), a bottom surface 21, a rear surface (not shown), both side surfaces 22, and an open font surface 23. An insulating member (not shown) may be disposed between the internal space 25 and the main body 10 to insulate the internal space 25.

The internal space 25 may have a first space 25a and a second space 25b.

The cooking apparatus 1b may further include a partitioning frame 970 disposed in the internal space 25 to separate the first space 25a from the second space 25b. The partitioning frame 970 may be separably disposed in the internal space 25.

The partitioning frame 970 may block heat transfer between the first space 25a and the second space 25b simultaneously partitioning the internal space 25 into the first space 25a and the second space 25b.

The inside of the partitioning frame 970 may be maintained in a vacuum state.

An insulating material may be accommodated in the partitioning frame 970.

The cooking apparatus 1b may further include a door 30. The door 30 may be rotatably installed on the main body 10 to open or close the font surface 23 of the internal space 25. The door 30 is the same as that described above with reference to FIG. 2, and thus detailed descriptions thereof will not be repeated.

The cooking apparatus 1b may further include a control panel 40 to control the operation of the cooking apparatus 1b. Since the control panel 40 is described above with reference to FIG. 2, descriptions thereof will not be repeated.

The cooking apparatus 1b may further include a food shaping module 100. The food shaping module 100 may be movably disposed in the internal space 25. The food shaping module 100 may include a cartridge assembly 200 and a driving device 120 configured to drive the cartridge assembly 200. Since the food shaping module 100 is described above with reference to FIGS. 2 to 10, descriptions thereof will not be repeated.

The cooking apparatus 1b may further include a guide rod 50 configured to guide the food shaping module 100. The guide rod 50 may include fixed rods 51 fixedly installed at the both side surfaces 22 of the internal space 25. The guide rod 50 may further include moving rods 52 moving along the fixed rods 51. Since the guide rod 50 is described above with reference to FIG. 2, detailed descriptions thereof will not be repeated.

The cooking apparatus 1b may further include a tray 60 disposed on the bottom surface 21 of the internal space 25. A food may be located on the tray 60. The tray 60 may be installed in the first space 25a. Particularly, the tray 60 may be installed on the bottom surface 21 of the first space 25a. Since the tray 60 is described above with reference to FIGS. 2 to 10, detailed descriptions thereof will not be repeated.

The cooking apparatus 1b may further include at least one heater 70 configured to heat the food. The at least one heater 70 may be installed in the first space 25a. For example, the at least one heater 70 may be installed on the bottom surface 21 of the first space 25a or on the top surface (not shown) of the internal space 25. However, the installation position of the at least one heater 70 may be modified in various ways.

In case of shaping a food, the food shaping module 100 may be located in the first space 25a of the internal space 25. In other words, in case of three-dimensionally printing a food to be cooked by using the food ingredients contained in the plurality of cartridges 240, the food shaping module 100 may be located in the first space 25a of the internal space 25.

In case of cooking the shaped food, the food shaping module 100 may be located in the second space 25b of the internal space 25. In other words, in case of cooking the three-dimensionally printed food, the food shaping module 100 may be located in the second space 25b of the internal space 25. This is to prevent the food shaping module 100 from being damaged by heat applied to the shaped food during a process of cooking the food.

In another aspect, the first space 25a may be defined as a space in which the food is shaped and the shaped food is cooked. The second space 25b may be defined as a space in which the food shaping module 100, which has finished the shaping of the food in the first space 25a, waits for completion of cooking in the first space 25a.

Referring to FIGS. 34A and 34B, the internal space 25 may be partitioned into the first space 25a and the second space 25b horizontally adjacent to each other by the partitioning frame 970. Particularly, the internal space 25 may be partitioned into the first space 25a and the second space 25b adjacent to each other in the lateral direction Y of the cooking apparatus 1b by the partitioning frame 970. The internal space 25 may also be partitioned into a plurality of spaces adjacent to each other in the longitudinal direction X of the cooking apparatus 1b by the partitioning frame 970.

Figure 35A:
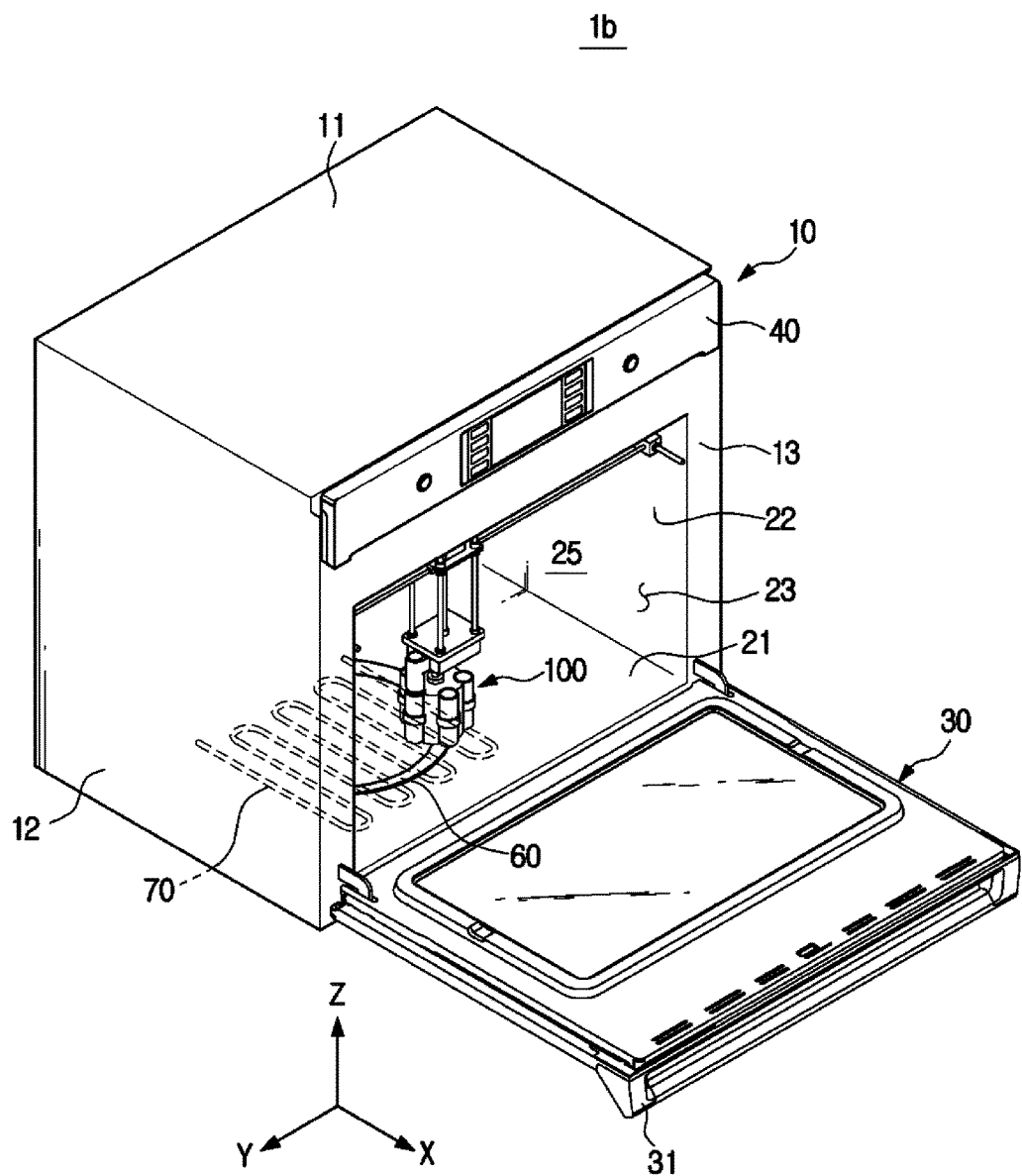
FIGS. 35A, 35B, and 35C are views illustrating another process of partitioning an internal space of a main body into a plurality of spaces in the cooking apparatus different from that illustrated in FIGS. 34A, 34B, and 34C according to various embodiments of the present disclosure.
Figure 35B:
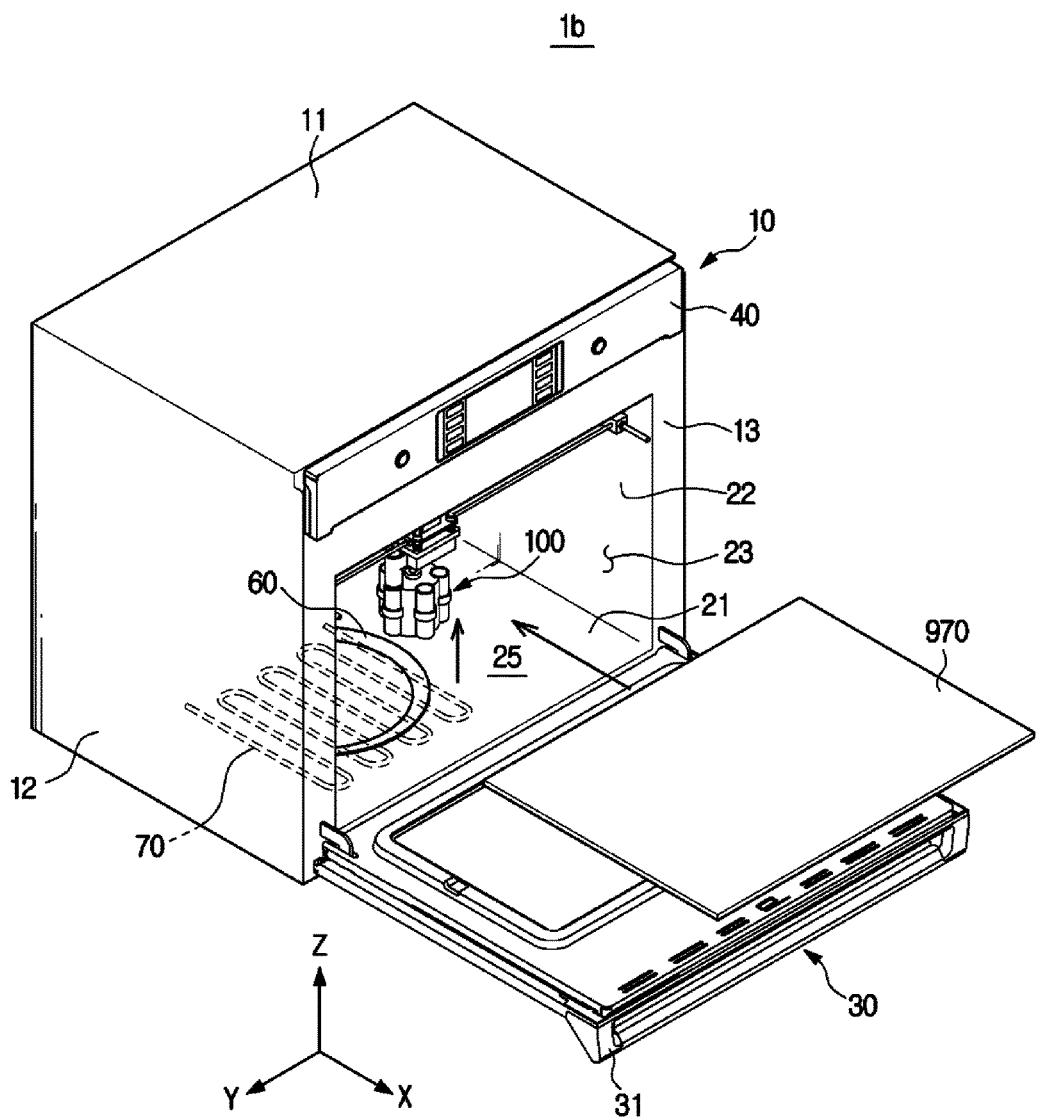
Figure 35C:
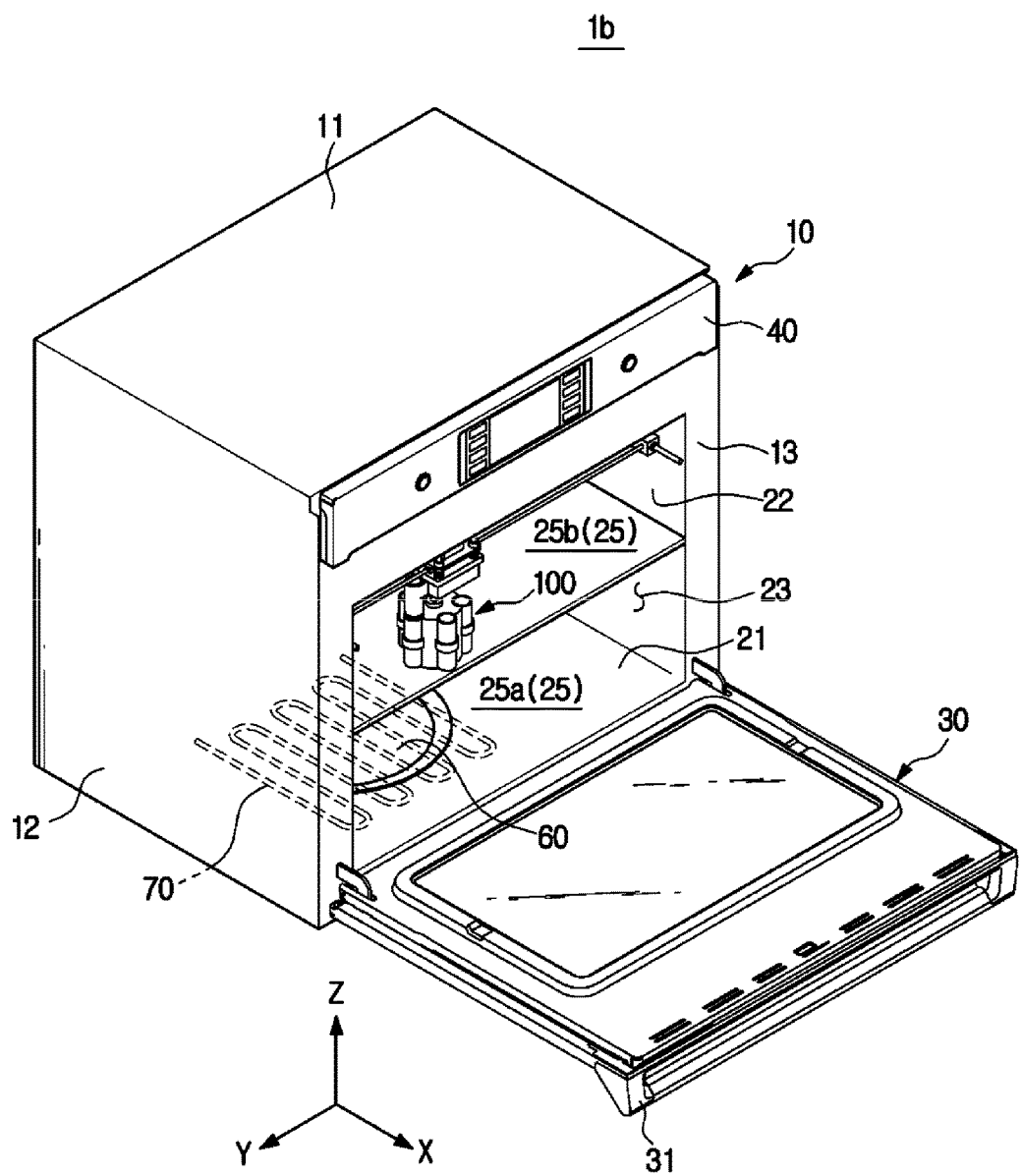

FIGS. 35A to 35C are views illustrating another process of partitioning an internal space of a main body into a plurality of spaces in the cooking apparatus different from that illustrated in FIGS. 34A to 34C according to various embodiments of the present disclosure. Hereinafter, descriptions given above with reference to FIGS. 34A to 34C will not be repeated. In addition, the same reference numerals may be assigned to the same elements described above with reference to FIGS. 34A to 34C.

Referring to FIG. 35A to 35C, the internal space 25 may be partitioned into the first space 25a and the second space 25b vertically adjacent to each other by the partitioning frame 970. Particularly, the internal space 25 may be partitioned into the first space 25a and the second space 25b adjacent to each other in the vertical direction Z of the cooking apparatus 1b by the partitioning frame 970.

Figure 36A:
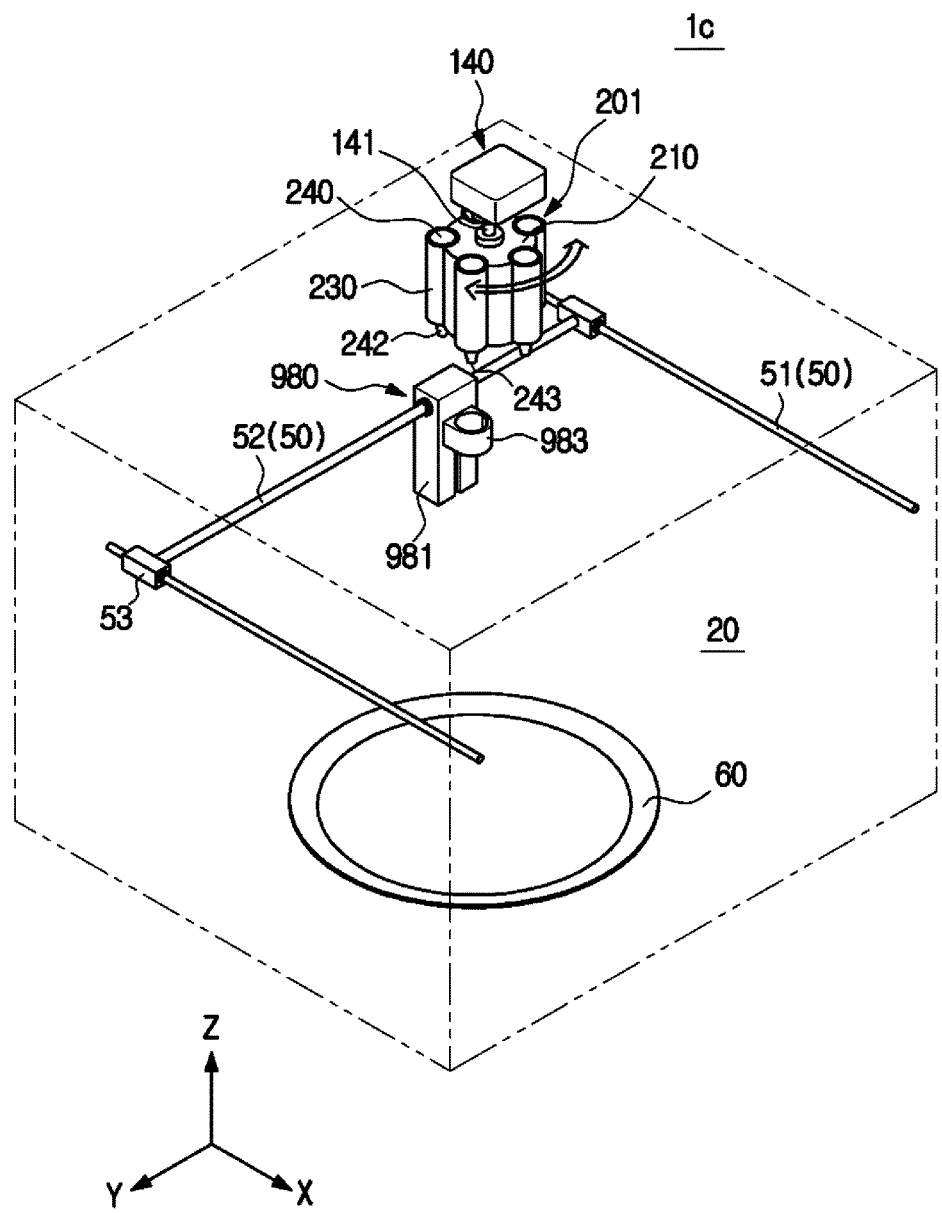
FIGS. 36A, 36B, and 36C are views illustrating a process of individually moving a cartridge separated from a cartridge body in a cooking apparatus according to various embodiments of the present disclosure.
Figure 36B:
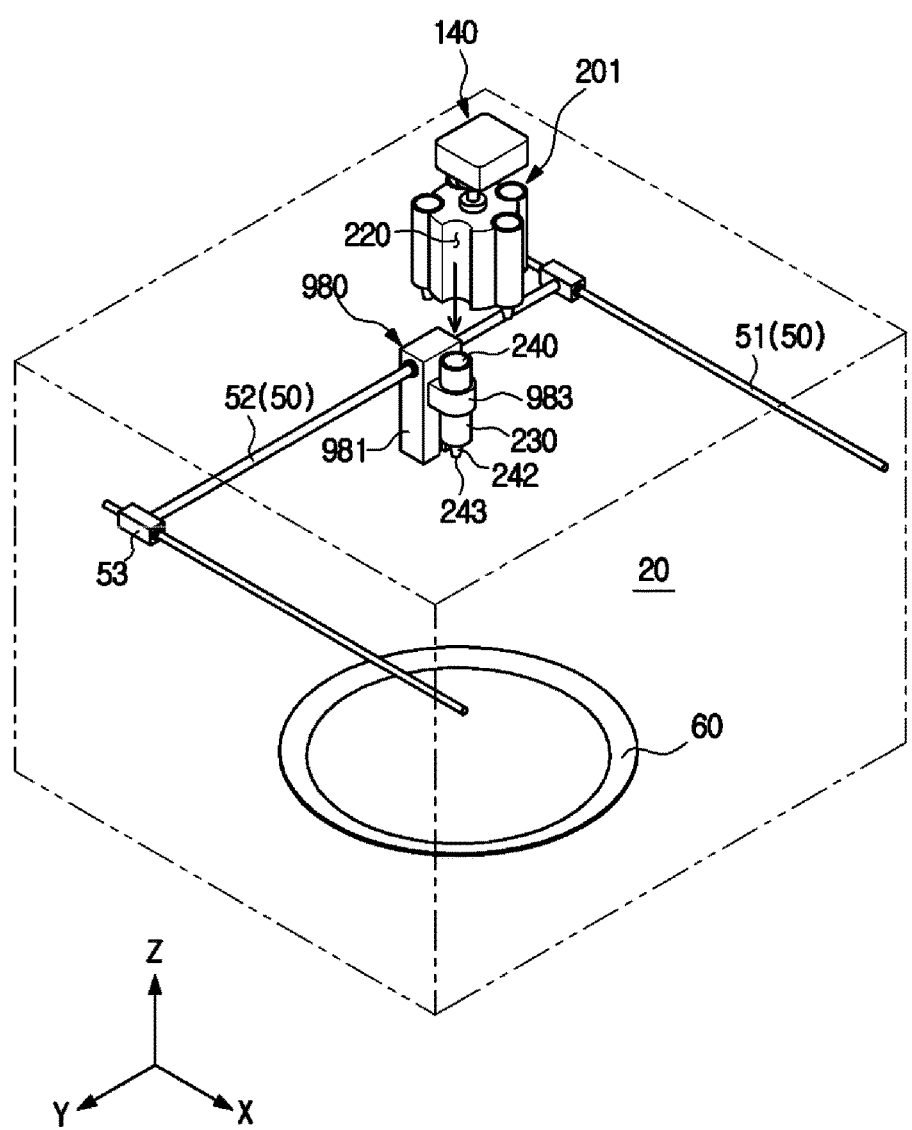
Figure 36C:
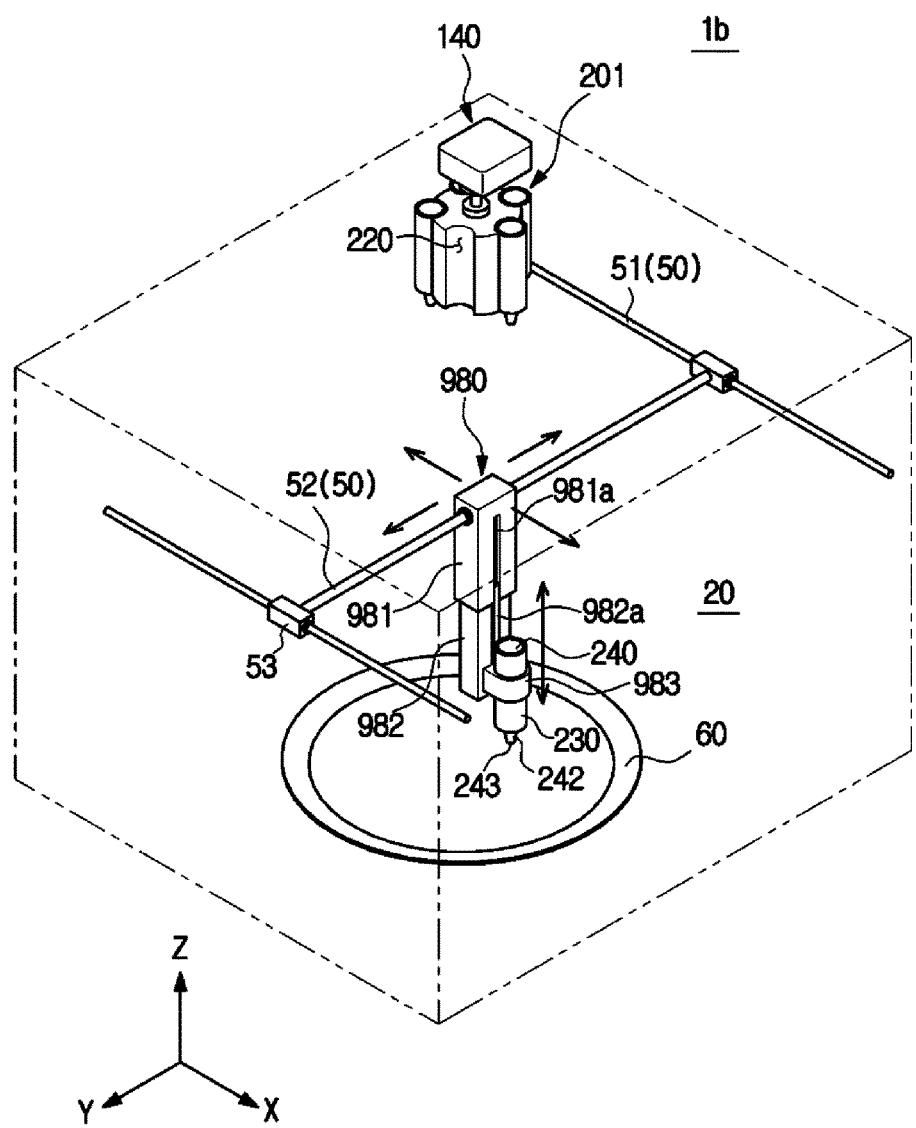

FIGS. 36A to 36C are views illustrating a process of individually moving a cartridge separated from a cartridge body in a cooking apparatus according to various embodiments of the present disclosure. Refer to FIG. 2 for the reference numerals not illustrated herein.

Referring FIGS. 36A to 36C, the cooking apparatus 1c may include a main body 10. The main body 10 may define an appearance of the cooking apparatus 1c.

The cooking apparatus 1c may further include a cooking chamber 20 disposed inside the main body 10. The cooking chamber 20 may be defined by a top surface (not shown), a bottom surface 21, a rear surface (not shown), both side surfaces 22, and an open font surface 23. An insulating member (not shown) may be disposed between the cooking chamber 20 and the main body 10 to insulate the cooking chamber 20.

The cooking apparatus 1c may further include a door 30. Since the door 30 is described above with reference to FIG. 2, detailed descriptions thereof will not be repeated herein.

The cooking apparatus 1c may further include a control panel 40 to control the operation of the cooking apparatus 1c. Since the control panel 40 is described above with reference to FIG. 2, detailed descriptions thereof will not be repeated.

The cooking apparatus 1c may further include a cartridge assembly 201. The cartridge assembly 201 may be disposed in the cooking chamber 20 to be rotatable. Particularly, the cartridge assembly 201 may be rotatably installed on the top surface of the cooking chamber 20.

The cartridge assembly 201 may include a cartridge body 210. The cartridge body 210 may have a cylindrical shape. However, the shape of the cartridge body 210 is not limited thereto and may be modified in various ways. A plurality of cartridge mounts 220 may be formed on the cartridge body 210. When the cartridge body 210 has a cylindrical shape, the plurality of cartridge mounts 220 may be formed to be recessed on a side surface of the cartridge body 210 along a circumferential direction of the cartridge body 210. The cartridge body 210 may include a rotation shaft coupling part 211 to be coupled to the rotation shaft 141 of the rotation adjusting unit 140.

The cartridge assembly 201 may further include a plurality of cartridges 240 mounted on the plurality of cartridge mounts 220. Food ingredients may be contained in the plurality of cartridges 240. The food ingredients may be in a liquid phase or a solid phase. Also, the food ingredients may be in a powder form. Each of the plurality of cartridges 240 may include a containing part 241 and a nozzle part 242 connected to the containing part 241 and having a discharge port 243.

Different food ingredients may be contained in the plurality of cartridges 240.

The cooking apparatus 1c may further include a rotation adjusting unit 140 to rotate the cartridge assembly 201. The rotation adjusting unit 140 may include a rotation shaft 141 coupled to the cartridge assembly 201. The rotation shaft 141 may be coupled to the cartridge body 210 to enable rotational movement of the cartridge assembly 201. In addition, the rotation adjusting unit 140 may further include a driving motor 142. The driving motor 142 is connected to the rotation shaft 141 to provide a rotational force to the rotation shaft 141. In addition, the driving motor 142 may be fixedly installed to the top surface of the cooking chamber 20.

The cooking apparatus 1c may further include a cartridge carrier 980. The cartridge carrier 980 may be installed in the cooking chamber 20 to individually moving one of the plurality of cartridges 240 coupled to the cartridge body 210. The cartridge carrier 980 may be installed in the cooking chamber 20 so as to be linearly movable. Particularly, the cartridge carrier 980 may move in the longitudinal direction X of the cooking apparatus 1c, in the lateral direction Y of the cooking apparatus 1c, and in the vertical direction Z of the cooking apparatus 1a. The movement of the cartridge carrier 980 will be described in more detail later.

The cartridge carrier 980 may include a casing 981 having a guide part 981a. The casing 981 may be coupled to the moving rods 52 so as to be movable along the moving rods 52.

The cartridge carrier 980 may further include a moving member 982 slidably coupled to the casing 981. The moving member 982 may be coupled to the casing 981 so as to be movable in the vertical direction Z of the cooking apparatus 1c. The moving member 982 may include a rib 982a coupled to the guide part 981a. The moving member 982 may move in the vertical direction Z of the cooking apparatus 1a in a state where the rib 982a is coupled to the guide part 981a.

The cartridge carrier 980 may further include a cartridge holder 983 holding the cartridge 240. For example, the cartridge carrier 980 may include one cartridge holder 983 to individually move the plurality of cartridges 240. However, the number of the cartridge holder 983 is not limited thereto and may be modified in various ways. The cartridge holder 983 may be formed at the moving member 982.

The cooking apparatus 1c may further include a guide rod 50 to guide the cartridge carrier 980. The guide rod 50 may include fixed rods 51 fixedly installed at the both side surfaces 22 of the cooking chamber 20. The fixed rods 51 may be fixed to the both side surfaces 22 of the cooking chamber 20 to extend in a longitudinal direction X of the cooking apparatus 1a. The fixed rods 51 installed at the both side surfaces 22 of the cooking chamber 20 may be parallel to each other. The guide rod 50 may further include moving rods 52 moving along the fixed rods 51. The moving rods 52 may extend in the lateral direction Y of the cooking apparatus 1c. Both ends of the moving rods 52 may be coupled to the fixed rods 51 respectively. Particularly, the both ends of the moving rods 52 may be coupled to the fixed rods 51 respectively by binding members 53 such that the moving rods 52 move in the longitudinal direction X of the cooking apparatus 1c along the fixed rods 51. Particularly, the cartridge carrier 980 may be coupled to the moving rods 52 to be movable in the lateral direction Y of the cooking apparatus 1a along the moving rods 52.

The cartridge carrier 980 may move in the longitudinal direction X of the cooking apparatus 1c. The movement of the cartridge carrier 980 in the longitudinal direction X of the cooking apparatus 1c may be realized by movement of the moving rods 52 along the fixed rods 51.

The cartridge carrier 980 may move in the lateral direction Y of the cooking apparatus 1c. The cartridge carrier 980 may be coupled to the moving rods 52 so as to move in the lateral direction Y of the cooking apparatus 1a along the moving rods 52.

The cartridge carrier 980 may move in the vertical direction Z of the cooking apparatus 1c. The movement of the cartridge carrier 980 in the vertical direction Z of the cooking apparatus 1c may be realized by the operation of the moving member 982 movably coupled to the casing 981. Particularly, when the moving member 982 moves downward in the cooking apparatus 1c, the cartridge 240 mounted on the cartridge holder 983 also moves downward in the cooking apparatus 1c. On the contrary, when the moving member 982 moves upward in the cooking apparatus 1c, the cartridge 240 mounted on the cartridge holder 983 also moves upward in the cooking apparatus 1a. The movement of the moving member 982 may be guided in the vertical direction Z of the cooking apparatus 1a via coupling between the rib 982a and the guide part 981a.

The cooking apparatus 1c may further include a tray 60 disposed on the bottom surface 21 of the cooking chamber 20. Since the tray 60 is described above with reference to FIG. 2, detailed descriptions thereof will not be repeated.

The cooking apparatus 1c may further include at least one heater 70 to heat the food. Since the at least one heater 70 is described above with reference to FIG. 2, detailed descriptions thereof will not be repeated.

As illustrated in FIGS. 36A to 36C, the cartridge 240 may be separated from the cartridge body 210 and individually move. For descriptive convenience, it is assumed that the plurality of cartridges 240 contain different food ingredients.

When a command to select a given cartridge containing a predetermined food ingredient among the plurality of cartridges 240 is input to the cooking apparatus 1a, an operation of searching for the given cartridge is performed. In this case, the cartridge assembly 201 may rotate about the rotation shaft 141. When the given cartridge is found, the cartridge is separated from the cartridge body 210 and mounted on the cartridge holder 983 of the cartridge carrier 980. In this case, the given cartridge may be separated from the cartridge body 210 and mounted on the cartridge holder 983 in the vertical direction Z of the cooking apparatus 1a. The given cartridge may freely move in the cooking chamber 20 integrally with the cartridge carrier 980 in a state of being mounted on the cartridge holder 983.

Figure 37:
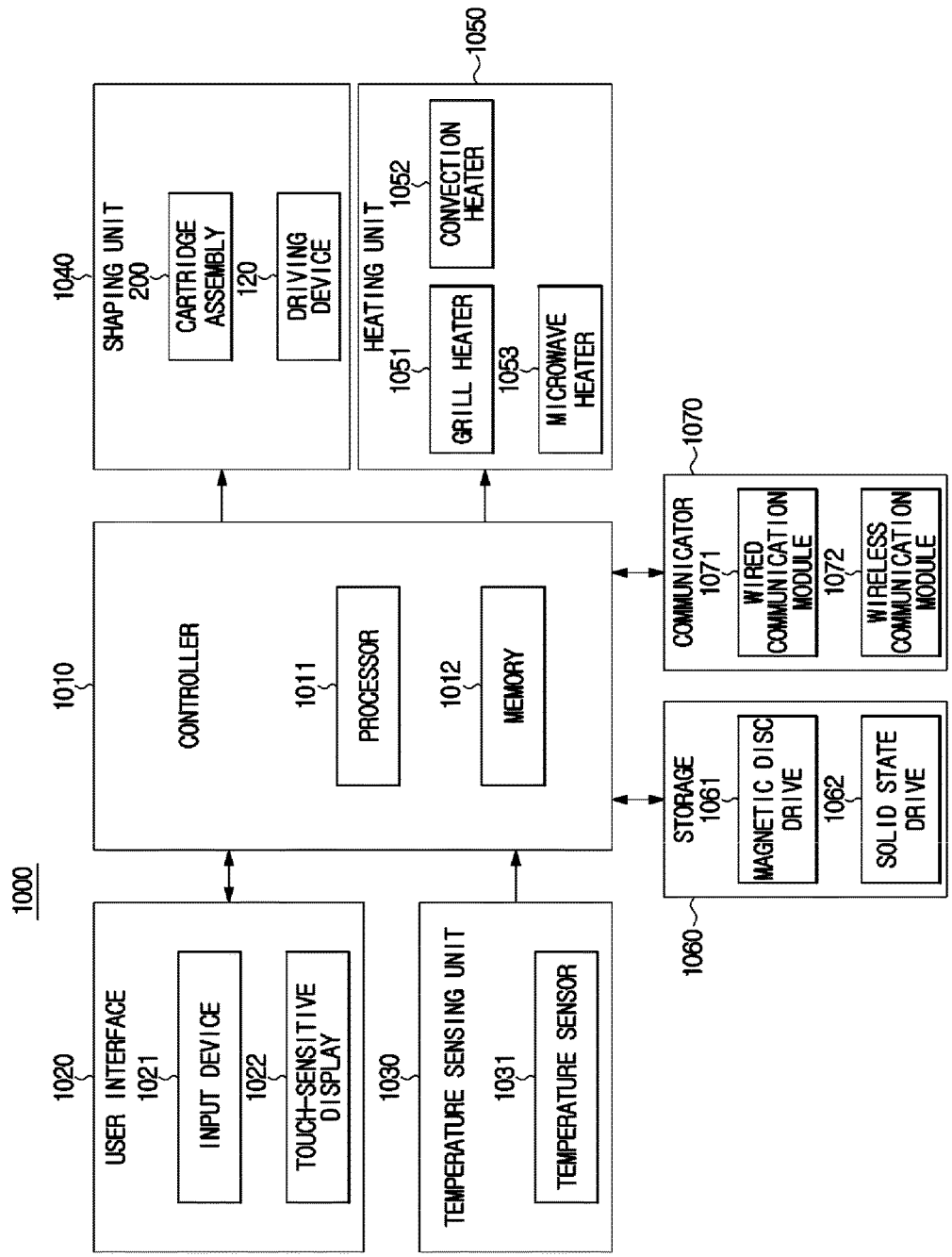
FIG. 37 is a block diagram illustrating a cooking apparatus according to an embodiment of the present disclosure.

FIG. 37 is a block diagram illustrating a cooking apparatus according to an embodiment of the present disclosure.

Referring to FIG. 37, a cooking apparatus 1000 may include a user interface 1020 configured to interact with a user, a temperature sensing unit 1030 (e.g., a temperature sensing device) configured to sense temperature of a cooking chamber, a shaping unit 1040 (e.g., a shaping device) configured to shape a food, a heating unit 1050 (e.g., a heating device) configured to heat the food, a storage 1060 (e.g., a memory) configured to store programs and data, a communicator 1070 (e.g., a transceiver) configured to communicate with an external device, and a controller 1010 (e.g., at least one processor) configured to control the operation of the cooking apparatus 1000.

The user interface 1020 may include an input device 1021 configured to receive a command from the user and a touch-sensitive display 1022 configured to receive a touch input of the user and display information in response to the received touch input.

The input device 1021 may include various types of input devices such as a push button, a keyboard, a touch button, a lever, a slide switch, a joystick, a jog dial, and a shuttle dial capable of receiving the user command.

The input device 1021 may receive a pre-allocated user command. For example, the input device 1021 may include a power button to receive a command to turn on or off the cooking apparatus 1000, an operation button to receive a command to start or stop the operation of cooking apparatus 1000, a time setting dial to set an operation time of the cooking apparatus 1000, and the like.

The touch-sensitive display 1022 may receive a touch input of the user and display information in response to the touch input of the user.

The touch-sensitive display 1022 may include a touch panel configured to receive the touch input of the user, a display panel configured to visually display information, and a controller configured to control the operation of the touch-sensitive display 1022. The touch panel may be stacked on the display panel.

The touch-sensitive display 1022 may display various graphic user interfaces and receive a touch input of the user applied to the graphic user interface. For example, the touch-sensitive display 1022 may display a screen through which a food model, i.e., a 3D shape, ingredient, color, and the like of food is input and may input the food model in accordance with the touch input of the user.

The touch panel of the touch-sensitive display 1022 may include a capacitive touch panel, a resistive touch panel, an ultrasonic touch panel, an infrared touch panel, and the like. In addition, the display panel of the touch-sensitive display 1022 may include a liquid crystal display (LCD) panel, a light emitting diode (LED) panel, an organic LED (OLED) panel, and the like.

The temperature sensing unit 1030 may include a temperature sensor 1031 configured to sense a temperature of the cooking chamber in which the food is heated and output an electrical signal corresponding to the sensed temperature. The temperature sensor 1031 may be disposed inside the cooking chamber and may include a thermistor whose electrical resistance value changes in accordance with temperature.

The shaping unit 1040 corresponds to the above-described food shaping module and may shape a food in accordance with the shape, ingredient, and color of the food input by the user (hereinafter, referred to as "food model").

The shaping unit 1040 may include a cartridge assembly 200 and a driving device 120 configured to drive the cartridge assembly 200.

The cartridge assembly 200 may store food ingredients and discharge food ingredients in accordance with food shaping data of the controller 1010.

The driving device 120 may move the cartridge assembly 200 and locate the cartridge assembly 200 at a position preset according to the food shaping data of the controller 1010.

Particularly, the cartridge assembly 200 may discharge the food ingredients by repeating of movement and stopping by the driving device 120. The food ingredients discharged from the cartridge assembly 200 may form the food.

The heating unit 1050 may heat the food inside the cooking chamber in various ways. For example, the heating unit 1050 may include a grill heater 1051 (e.g., a grill heating device) configured to radiate radiant heat into the cooking chamber, a convection heater 1052 configured to supply hot air into the cooking chamber, a microwave heater 1053 configured to radiate microwaves into the cooking chamber, or the like.

The grill heater 1051 may include a hot wire capable of converting electric energy into thermal energy. The hot wire of the grill heater 1051 may be disposed at an upper portion in the cooking chamber and may radiate radiant heat toward the food located in the cooking chamber from the upper portion of the cooking chamber.

The convection heater 1052 may include a hot wire to convert electric energy into thermal energy, a fan to circulate air, and a motor to drive the fan. The convection heater 1052 may heat surrounding air and the fan may supply the air heated by the hot wire into the cooking chamber.

The microwave heater 1053 may include a magnetron capable of generating microwaves and an antenna to radiate the generated microwaves into the cooking chamber. The microwave heater 1053 may generate microwaves having a frequency of about 2.4 giga-hertz (GHz) to 2.5 GHz. The microwave heater 1053 may heat the food by strongly rotating water inside the food by the microwaves.

The user may select one of various cooking methods depending on food and cooked food and at least one of the grill heater 1051, the convection heater 1052, and the microwave heater 1053 may be operated in accordance with the selected cooking method. For example, when the user cooks a cookie or pizza, the convection heater 1052 may be operated. When the user cooks meats such as sausage, the grill heater 1051 may be operated.

The storage 1060 may include a control program to control the operation of the cooking apparatus 1000. For example, the storage 1060 may store an operation system (OS) configured to manage resources (software and hardware) included in the cooking apparatus 1000, a modeling program configured to receive information on the shape, ingredient, and color of food via the user interface 1020, a food shaping program configured to control the shaping unit 1040 to shape the food in accordance with the food model, a food heating program configured to control the heating unit 1050 to heat the food in accordance with the cooking method, and the like.

Also, the storage 1060 may store a database including a plurality of food models and cooking methods for the respective food models. The food model may include the shape, ingredient, and color of food and the cooking method may include an operated heating unit 1050, cooking temperature inside the cooking chamber, and cooking time for operating the heating unit 1050, and the like.

The storage 1060 may include a magnetic disc drive 1061 and a solid-state drive 1062 capable of storing programs and data for a long time.

The communicator 1070 may receive information from the user equipment and transmit information to the user equipment. For example, the communicator 1070 may receive information on the food model from the user equipment and transmit information on the operation of the cooking apparatus 1000 to the user equipment.

The communicator 1070 may include a wired communication module 1071 configured to transmit/receive information to/from the user equipment in a wired manner and a wireless communication module 1072 (e.g., a wireless communication device or transceiver) configured to transmit/receive information to/from the user equipment in a wireless manner.

The wired communication module 1071 (e.g., a wired communication device or transceiver) may transmit/receive information using various wired communication protocols such as ethernet or universal serial bus (USB) communication. Particularly, the wired communication module 1071 may transmit information to the user equipment or the information relay device via a communication cable and receive information from the user equipment or the information relay device via the communication cable. The wired communication module 1071 may include a transceiver, a communication port, and the like.

The wireless communication module 1072 may transmit/receive information using various wireless communication protocols such as wireless fidelity (Wi-Fi™) or Bluetooth (BT®). Particularly, the wireless communication module 1072 may transmit information to the user equipment or the information relay device through radio waves and receive information from the user equipment or the information relay device through radio waves. The wireless communication module 1072 may include a transceiver, an antenna, and the like.

The controller 1010 may include a processor 1011 configured to generate a control signal to control the operation of the cooking apparatus 1000 and a memory 1012 (e.g., a storage) configured to store programs and data to control the operation of the cooking apparatus 1000.

The processor 1011 may process a touch input of the user input via the user interface 1020 and generate a food model based on the touch input.

Also, the processor 1011 may process data on the food model input via the user interface 1020, received via the communicator 1070, or stored in the storage 1060 and generate food shaping data to shape the food based on the food model. For example, the food shaping data may include information on food ingredients constituting the food, information on coordinates of a position to which the food ingredients are discharged, and information on discharge amounts of the food ingredients. The shaping unit 1040 may form the food in accordance with the food shaping data output from the processor 1011.

Also, the processor 1011 may process data on a cooking method input via the user interface 1020, received through the communicator 1070, or stored in the storage 1060 and generate food heating data to heat the food based on the cooking method. For example, the food heating data may include information on the operated heating devices 1051, 1052, 1053, and 1054, information on temperature of the cooking chamber, and cooking time of the heating devices 1051, 1052, 1053, and 1054. The heating unit 1050 may heat the food in accordance with the food heating data output from the processor 1011.

The memory 1012 may store a program to receive an input of the food model and the cooking method via the user interface 1020 and a program to process data on the food model and/or data on the cooking method and generate food shaping data and/or food heating data. In addition, the memory 1012 may temporarily store data on the food model and/or data on the cooking method to be processed by the processor 1011 and food shaping data and/or food heating data output from the processor 1011.

The memory 1012 may include volatile memory such as static random access memory (S-RAM) and dynamic RAM (D-RAM) and non-volatile memory such as read only memory (ROM), erasable programmable ROM (EPROM), and electrically erasable PROM (EEPROM).

As described above, the controller 1010 may generate data on the food model and/or data on the cooking method in accordance with the touch input received via the user interface 1020 and output food shaping data to control the operation of the shaping unit 1040 according to the food model and food heating data to control the operation of the heating unit 1050 in accordance with the cooking method.

Figure 38:
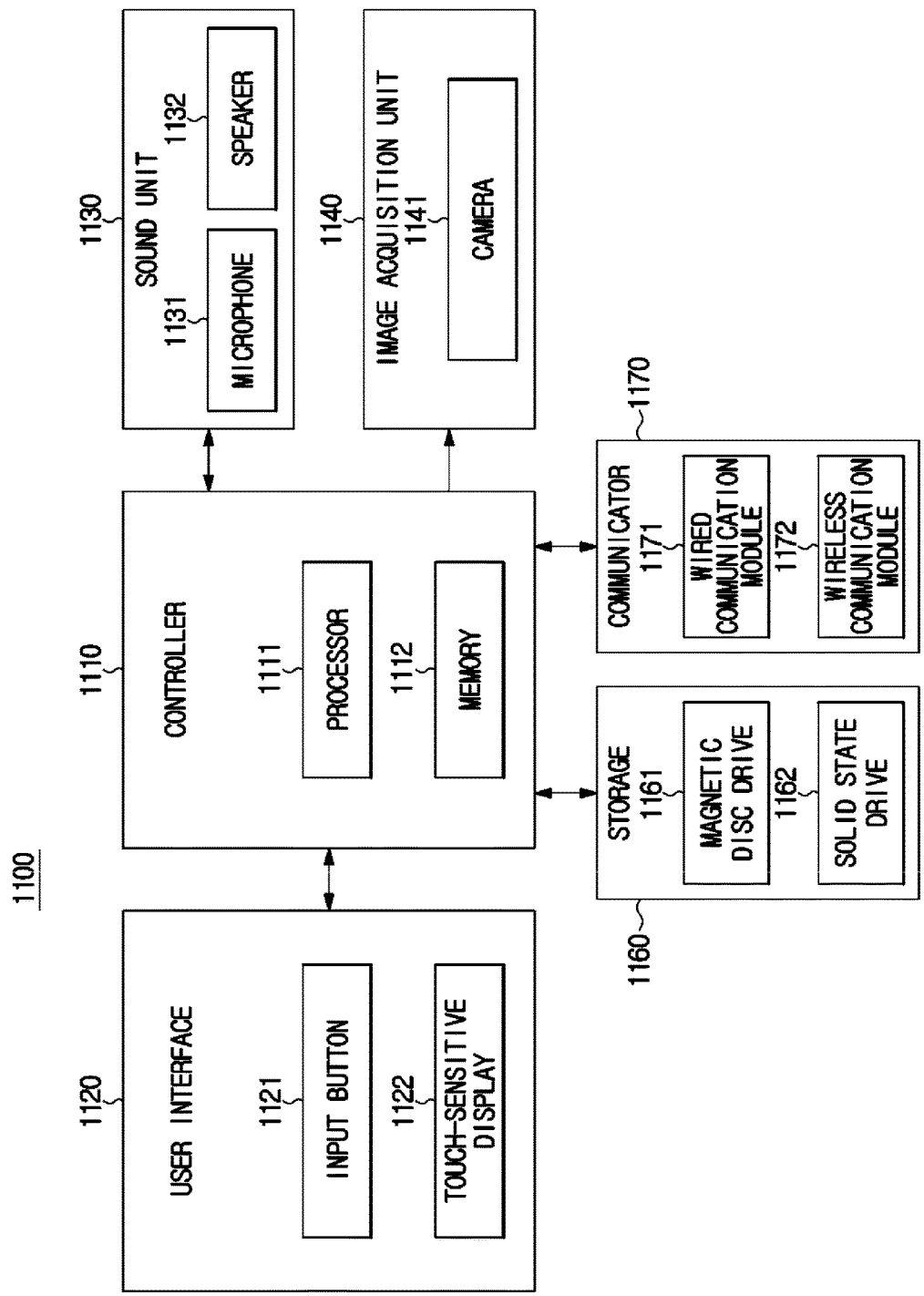
FIG. 38 is a block diagram of a user equipment according to an embodiment of the present disclosure.

FIG. 38 is a block diagram of a user equipment according to an embodiment of the present disclosure.

Referring to FIG. 38, the user equipment 1100 may include a user interface 1120 configured to interact with a user, a sound unit 1130 (e.g., a sound device) configured to receive and output sounds, an image acquisition unit 1140 (e.g., an image acquisition device) configured to acquire an image, a storage 1160 (e.g., a memory) configured to store programs and data, a communicator 1170 (e.g., a transceiver) configured to communicate with external devices, and a controller 1110 (e.g., at least one processor) configured to control the operation of the user equipment 1100.

The user interface 1120 may include an input device 1121 (e.g., an input button) configured to receive a user command and a touch-sensitive display 1122 configured to receive a touch input of the user and display information in response to the received touch input.

The input device 1121 may include various types of input devices such as a push button, a keyboard, a touch button, a lever, a slide switch, a joystick, a jog dial, a shuttle dial, a mouse, and a trackball capable of receiving the user command.

The input device 1121 may receive a pre-allocated user command. For example, the input device 1121 may include a power button to receive a command to turn on or off the user equipment 1100, a volume button to adjust sounds output from the sound unit 1130 of the user equipment 1100, and the like.

The touch-sensitive display 1122 may receive a touch input of the user and display information in response to the touch input of the user.

The touch-sensitive display 1122 may include a touch panel configured to receive the touch input of the user, a display panel configured to visually display information, and a controller configured to control the operation of the touch-sensitive display 1122. The touch panel may be stacked on the display panel.

The touch-sensitive display 1122 may display various graphic user interfaces and receive a touch input of the user applied to the graphic user interface. For example, the touch-sensitive display 1122 may display a screen through which a food model, i.e., a 3D shape, ingredient, color, and the like of food, is input and may receive the food model in accordance with the touch input of the user.

The sound unit 1130 may include a microphone 1131 configured to receive sounds from the user and a speaker 1132 configured to output sounds. The microphone 1131 may acquire a sound signal and output an electrical signal corresponding to the acquired sound signal. In addition, the speaker 1132 may receive an electrical signal and output a sound signal corresponding to the received electrical signal.

The image acquisition unit 1140 may include a camera 1141 configured to acquire an image. The camera 1141 may include a plurality of optical sensors configured to output an electrical signal corresponding to color and intensity of light reflected by an object or radiated from the object. By two-dimensionally aligning the plurality of optical sensors, the camera 1141 may convert an image into image data that is electrical signals. The image data may include information on the shape and color of an object.

The storage 1160 may include a control program to control the operation of the user equipment 1100. For example, the storage 1160 may store an operation system (OS) configured to manage resources (software and hardware) included in the user equipment 1100, a modeling program configured to receive information on the shape, ingredient, and color of food via the user interface 1120, an imaging program configured to process and store the image acquired by the image acquisition unit 1140, and the like.

Also, the storage 1160 may store a database including a plurality of food models and cooking methods for the respective food models. The food model may include the shape, ingredient, and color of food and the cooking method may include an operated heating unit 1050 of the cooking apparatus 1000, cooking temperature inside the coming chamber of the cooking apparatus 1000, and cooking time for operating the heating unit 1050 of the cooking apparatus 1000, and the like.

The storage 1160 may include a magnetic disc drive 1161 and a solid-state drive 1162 capable of storing programs and data for a long time.

The communicator 1170 may receive information from the cooking apparatus and transmit information to the cooking apparatus. For example, the communicator 1170 may receive information on the food model from the cooking apparatus and transmit information on the operation of the cooking apparatus to the cooking apparatus.

The communicator 1170 may include a wired communication module 1171 (e.g., a wired communication device) configured to transmit/receive information to/from the cooking apparatus in a wired manner and a wireless communication module 1172 (e.g., a wireless communication device) configured to transmit/receive information to/from the cooking apparatus in a wireless manner.

The wired communication module 1171 may transmit/receive information using various wired communication protocols such as ethernet or universal serial bus (USB) communication. Particularly, the wired communication module 1171 may transmit information to the user equipment or the information relay device via a communication cable and receive information from the user equipment or the information relay device via the communication cable. The wired communication module 1171 may include a transceiver, a communication port, and the like.

The wireless communication module 1172 may transmit/receive information via short-range wireless networks such as Wi-Fi™ and Bluetooth® and/or mobile communication methods such as global system for mobile communication (GSM), code division multiple access (CDMA), wideband code division multiple access (WCDMA), universal mobile telecommunications system (UMTS), time division multiple access (TDMA), and long term evolution (LTE). Particularly, the wireless communication module 1172 may transmit information to the user equipment or the information relay device through radio waves and receive information from the user equipment or the information relay device through radio waves. The wireless communication module 1172 may include a transceiver, an antenna, and the like.

The controller 1110 may include a processor 1111 configured to generate a control signal to control the operation of the user equipment 1100 and a memory 1112 configured to store programs and data to control the operation of the user equipment 1100.

The processor 1111 may process a touch input of the user received via the user interface 1120 and generate data on the food model and the cooking method based on the touch input. In addition, the processor 1111 may generate a communication control single to transmit the data on the food model and the cooking method to the cooking apparatus 1000. The communicator 1170 may transmit the data on the food model and the cooking method to the cooking apparatus 1000 in accordance with the communication control signal.

The memory 1112 may store a program to receive an input of the food model and the cooking method via the user interface 1120. In addition, the memory 1012 may temporarily store data on the food model and the cooking method generated by the processor 1011.

The memory 1112 may include volatile memory such as S-RAM and D-RAM and non-volatile memory such as ROM, EPROM, and EEPROM.

As described above, the controller 1110 may generate data on the food model and/or data on the cooking method in accordance with the touch input received via the user interface 1120 and transmit the data on the food model and/or data on the cooking method to the cooking apparatus 1000 via the communicator 1170.

Hereinafter, a cooking operation of the cooking apparatus 1000 will be described.

Figure 39:
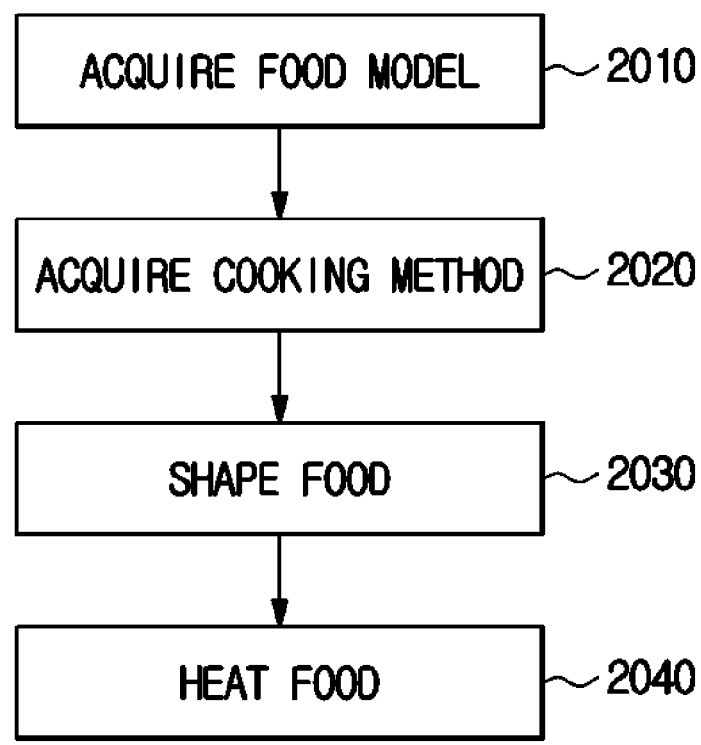
FIG. 39 illustrates a cooking operation of a cooking apparatus according to an embodiment of the present disclosure.

FIG. 39 illustrates a cooking operation of a cooking apparatus according to an embodiment of the present disclosure.

Referring to FIG. 39, a cooking operation 2000 of the cooking apparatus 1000 may include acquiring a food model in operation 2010, acquiring a cooking method in operation 2020, shaping a food in operation 2030, and heating the food (2040).

The acquiring of the food model in operation 2010 may include a series of processes including receiving an input of a shape, ingredient, and color of food and generating a food model including the shape, ingredient, and color of food.

For example, the cooking apparatus 1000 may generate the food model in accordance with a touch input of the user received via the user interface 1020, retrieve data on the food model from the storage 1060, or receive the data on the food model via the communicator 1070.

The generating of the food model is not limitedly performed by the cooking apparatus 1000. For example, the user equipment 1100 may generate the food model based on the touch input of the user received via the user interface 1120 and transmit the data on the food model to the cooking apparatus 1000 via the communicator 1170.

The acquiring of the cooking method in operation 2020 may include a series of processes including selecting a heating device to heat the food (e.g., the grill heater, the convection heater, and the microwave heater), setting a cooking temperature of the cooking chamber, and setting a cooking time.

For example, the cooking apparatus 1000 may select the heating unit 1050, set the cooking temperature, and set the cooking time in accordance with the touch input of the user input via the user interface 1020.

The acquiring of the cooking method is not limitedly performed by the cooking apparatus 1000. For example, the user equipment 1100 may select the heating unit 1050 of the cooking apparatus 1000, set the cooking temperature, and set the cooking time in accordance with the touch input of the user input via the user interface 1020. Also, the user equipment 1100 may transmit the data on the cooking method to the cooking apparatus 1000 via the communicator 1170.

The shaping of the food in operation 2030 may include a series of processes including shaping the food by the shaping unit 1040 of the cooking apparatus 1000 in accordance with the food model.

For example, the cooking apparatus 1000 may determine food ingredients constituting the food in accordance with the food model, calculate coordinates of the position to which the food ingredients are discharged, and calculate discharge amounts of the food ingredients. The food ingredients, discharge coordinates, and discharge amounts may constitute food shaping data. In addition, the cooking apparatus 1000 may select cartridges containing the food ingredients, moving the cartridges to the discharge coordinates, and drive the cartridges in accordance with the discharge amounts.

The heating of the food in operation 2040 may include a series of processes of heating the food by the heating unit 1050 of the food shaping module 100 in accordance with the cooking method.

For example, the cooking apparatus 1000 may select one of the heating devices 1051, 1052, 1053, and 1054 to operate in accordance with the cooking method and operate the selected heating device 1051, 1052, 1053, or 1054 until the temperature of the cooking chamber reaches a desired cooking temperature. In addition, when the temperature of the cooking chamber reaches the cooking temperature, the cooking apparatus 1000 may repeat starting and stopping of the operation of the heating device 1051, 1052, 1053, or 1054 to maintain the temperature of the cooking chamber at the cooking temperature. In addition, when a cooking time has lapsed after the operation of the heating device 1051, 1052, 1053, or 1054 are initiated, the cooking apparatus 1000 may stop the operation of the heating device 1051, 1052, 1053, or 1054.

As described above, the cooking apparatus 1000 may cook the food having a desired shape by acquiring the food model and the cooking method and shaping and heating the food.

Figure 40:
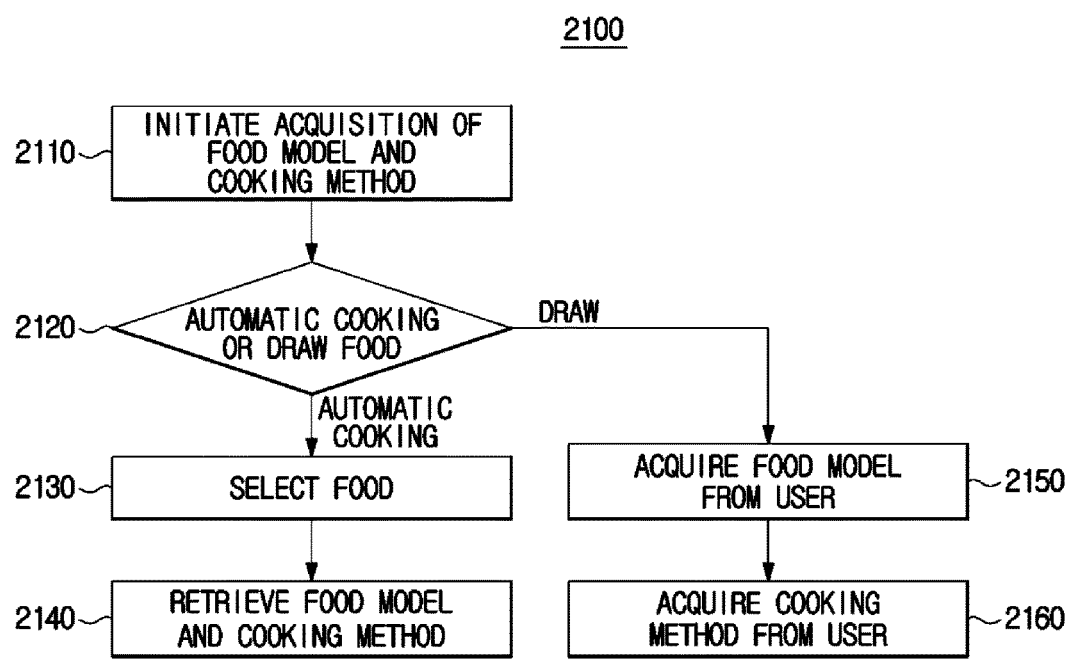
FIG. 40 illustrates a method of acquiring a food model and a cooking method according to an embodiment of the present disclosure.
Figure 41:
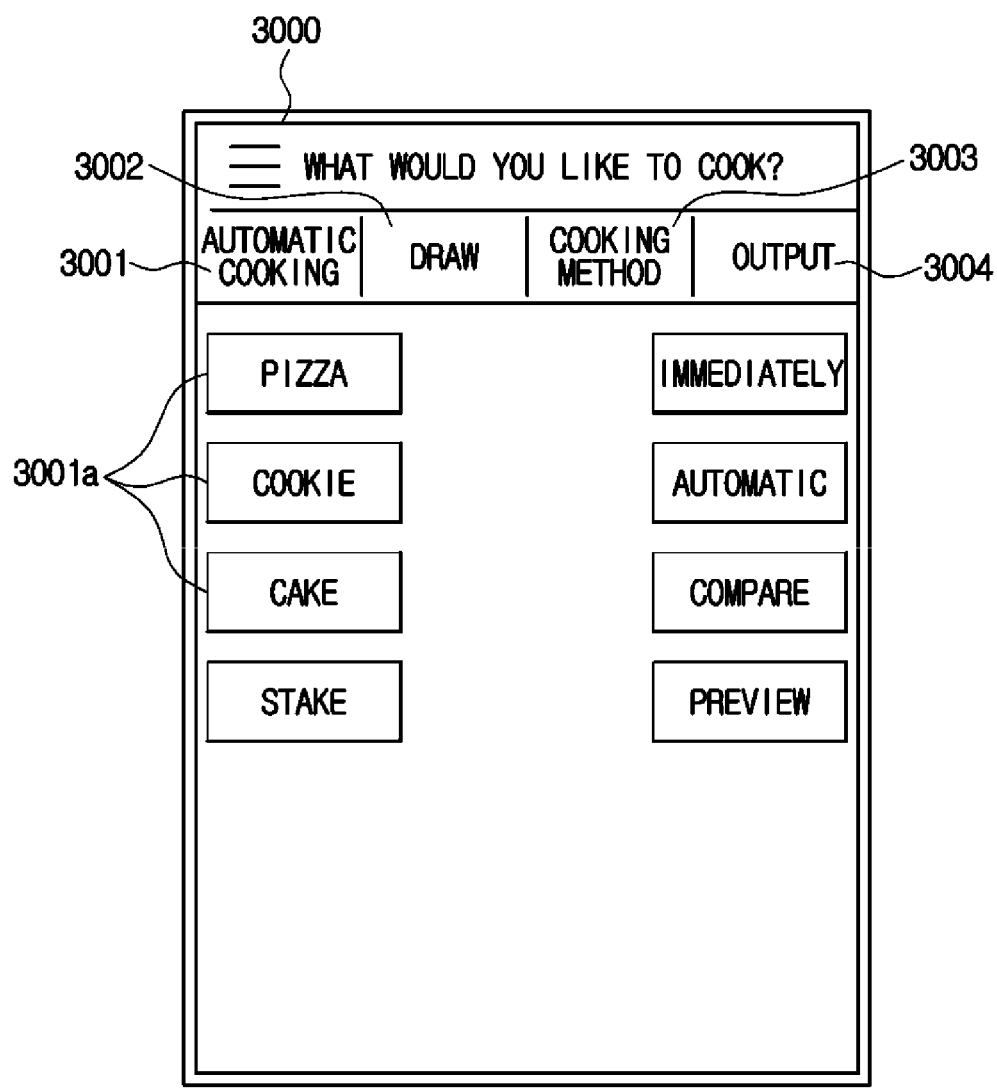
FIG. 41 illustrates a main screen according to an embodiment of the present disclosure.
Figure 42:
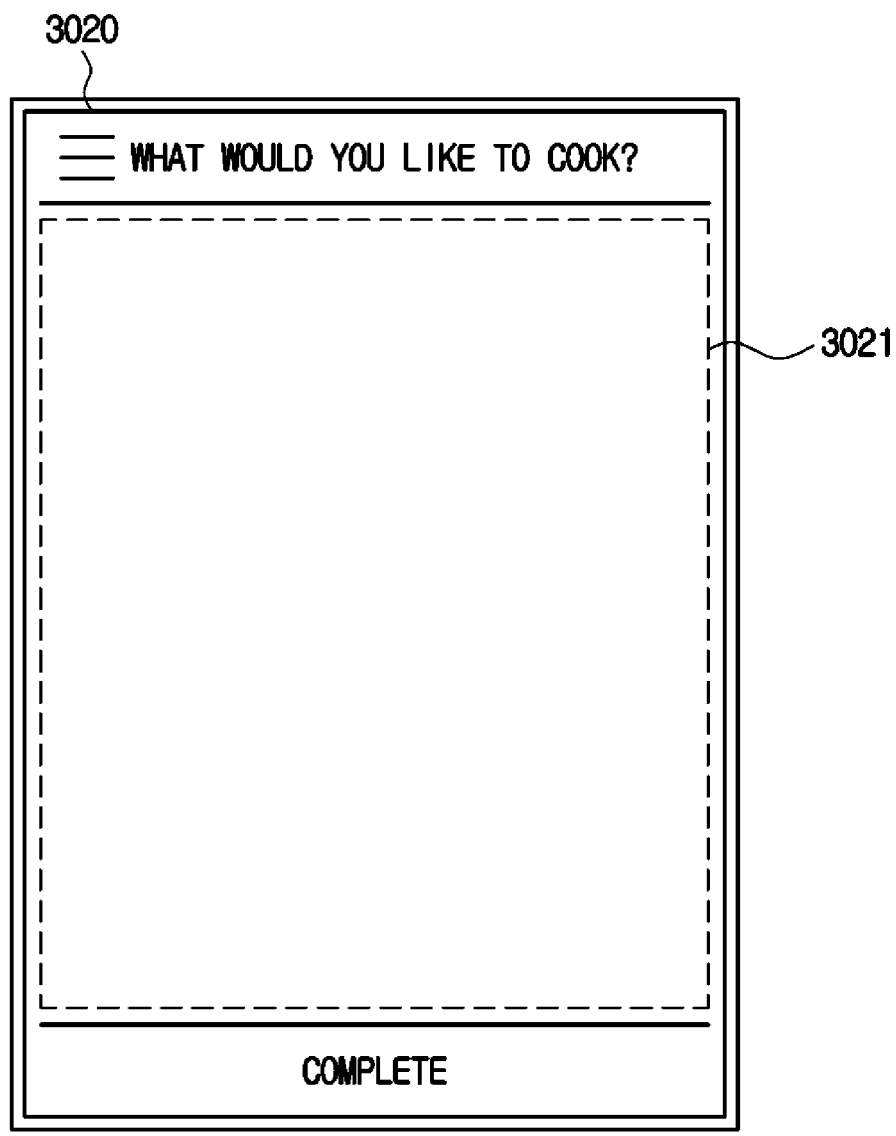
FIG. 42 illustrates a model creation screen to create a food model according to an embodiment of the present disclosure.
Figure 43:
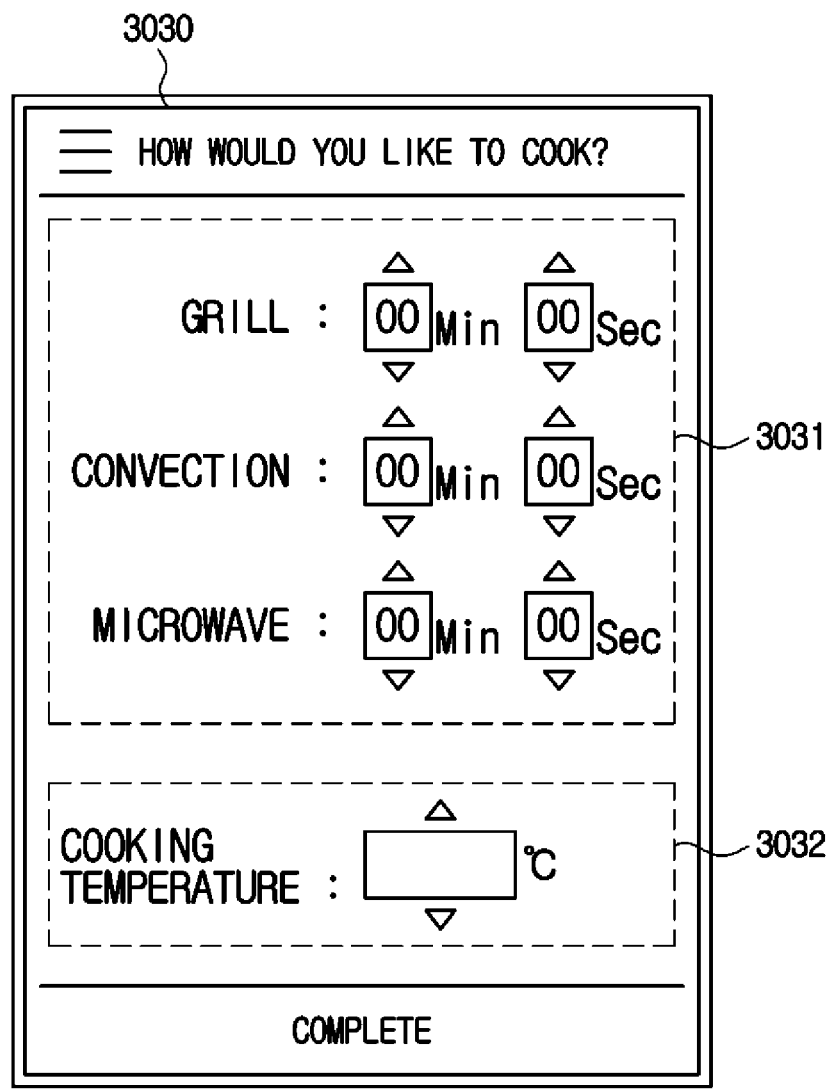
FIG. 43 illustrates a cooking method setting screen to set a cooking method for a food according to an embodiment of the present disclosure.

FIG. 40 illustrates a method of acquiring a food model and a cooking method according to an embodiment of the present disclosure. FIG. 41 illustrates a main screen according to an embodiment of the present disclosure. FIG. 42 illustrates a model creation screen to create a food model according to an embodiment. FIG. 43 illustrates a cooking method setting screen to set a cooking method for a food according to an embodiment of the present disclosure.

A method of acquiring a food model and a cooking method in operation 2100 will be described with reference to FIGS. 40, 41, 42, and 43.

A process of acquiring a food model and a cooking method is initiated in operation 2110.

The cooking apparatus 1000 may initiate the process of acquiring the food model and the cooking method in response to a food shaping/cooking command input from the user via the user interface 1020.

As described above, the acquiring of the food model and the cooking method is not limitedly performed by the cooking apparatus 1000. The user equipment 1100 may also initiate the acquisition of the food model and the cooking method in response to the food shaping/cooking command input from the user via the user interface 1120.

The user may select automatic cooking or food drawing in operation 2120.

The cooking apparatus 1000 may acquire the food model and the cooking method in various ways.

The cooking apparatus 1000 may use a previously created food model and a preset cooking method (automatic cooking) or receive a food model and a cooking method from the user (food drawing). In the automatic cooking mode, the cooking apparatus 1000 may automatically shape a first by using the previously created food model and the preset cooking method and heat the shaped food. In the food drawing mode, the cooking apparatus 1000 may receive inputs of a food model and a cooking method from the user, shape a food in accordance with the input food model, and heat the food in accordance with the input cooking method.

The user may select a method of acquiring the food model and the cooking method via the cooking apparatus 1000. For example, the controller 1010 of the cooking apparatus 1000 may display a main screen 3000 to select the method of acquiring the food model and the cooking method on the user interface 1020.

The main screen 3000 may include an automatic cooking button 3001 to use the previously created food model and the preset cooking method, a model creating button 3002 to directly receive the food model from the user, a cooking method setting button 3003 to receive an input of the cooking method from the user, an output button 3004 to shape and heat the food, and the like. When the user touches the automatic cooking button 3001 of the main selection screen 3000, the automatic cooking is selected. When the user touches the model creating button 3002 of the main screen 3000, the food drawing may be selected.

In addition, the user may also select the method of acquiring the food model and the cooking method via the user equipment 1100. For example, the controller 1110 of the user equipment 1100 may display the main screen 3000 including the automatic cooking button 3001, the model creating button 3002, and the cooking method setting button 3003 on the user interface 1120 as illustrated in FIG. 41. In accordance with a touch input of the user on the main screen 3000, the operation of automatic cooking or food drawing may be selected.

When the automatic cooking is selected ("automatic cooking" in operation 2120), a food is selected by the user in operation 2130.

The user who has selected the automatic cooking may select a food to be cooked. For example, the controller 1010 of the cooking apparatus 1000 may display the main screen 3000 on the user interface 1020 as illustrated in FIG. 41. The main screen 3000 may include food buttons 3001a indicating various names of food such as cookie, pizza, cake, and stake. The user may confirm the names of food displayed on the plurality of food buttons 3001a and touch one of the plurality of food buttons 3001a.

Also, the user may select a food via the user equipment 1100. For example, the controller 1010 of the user equipment 1100 may display the main screen 3000 including the food buttons 3001a indicating names of various foods on the user interface 1120 as illustrated in FIG. 41. A food may be selected in accordance with a touch input of the user on the food buttons 3001a.

A food model and a cooking method for the food selected by the user are acquired in operation 2140.

The cooking apparatus 1000 may acquire the previously created food model and the cooking method of the food selected via the food button 3001a of the main screen 3000 in various ways. For example, the controller 1010 of the cooking apparatus 1000 may retrieve data on the food model and the cooking method from the storage 1060. The data on the food model and the cooking method may be pre-stored in storage 1060 of the cooking apparatus 1000. The food model and the cooking method of the storage 1060 may be previously created by a designer of the cooking apparatus 1000 and stored therein or created by the user and stored therein.

As another example, the controller 1010 of the cooking apparatus 1000 may acquire the food model and the cooking method from an external device via the communicator 1070. The controller 1010 may request for the food model and the cooking method from the user equipment 1100 and other servers through the communicator 1070 and may receive data on the food model and the cooking method from the user equipment 1100 or other servers.

The user equipment 1100 may also acquire the previously created food model and the preset cooking method for the food in various ways. For example, the controller 1110 of the user equipment 1100 may retrieve data on the food model and the cooking method from the storage 1160 or receive data on the food model and the cooking method from other server devices via the communicator 1170. Next, the user equipment 1100 may transmit the data on the food model and the cooking method to the cooking apparatus 1000 in accordance with a command of the user.

As described above, the cooking apparatus 1000 or the user equipment 1100 may acquire the previously created food model and the preset cooking method in the automatic cooking mode. In addition, the cooking apparatus 1000 may shape the food in accordance with the previously created food model and heat the food in accordance with the preset cooking method.

When the food drawing is selected ("food drawing" in operation 2120), the food model is input from the user in operation 2150.

The user who has selected the food drawing may create a food model via the cooking apparatus 1000. For example, the controller 1010 of the cooking apparatus 1000 may display a model creation screen 3020 to create a food model on the user interface 1020 as illustrated in FIG. 42. The model creation screen 3020 may include a model drawing region 3021 to allow the user to directly draw a food model. The user may draw the food model on the model drawing region 3021 by touching the model drawing region 3021 and dragging the touch.

In addition, the user may create a food model via the user equipment 1100. For example, the controller 1110 of the user equipment 1100 may display the model creation screen 3020 including the model drawing region 3021 to create the food model on the user interface 1020 as illustrated in FIG. 42. The user may draw a food model on the model drawing region 3021 displayed on the user equipment 1100, and the controller 1110 of the user equipment 1100 may transmit data on the food model to the cooking apparatus 1000.

The cooking method for the food is input by the user in operation 2160.

The user who has selected the food drawing may set a cooking method for the food via the cooking apparatus 1000. For example, the controller 1010 of the cooking apparatus 1000 may display a cooking method setting screen 3030 to set the cooking method for the food on the user interface 1020 as illustrated in FIG. 43. The cooking method setting screen 3030 may include a first setting region 3031 to set a heating device (e.g., grill heater, convection heater, and microwave heater) and a cooking time for each heating device and a second setting region 3032 to set a cooking time by the heating device. The user may select the heating device and set the cooking time and cooking temperature by using the first setting region 3031 and the second setting region 3032 of the cooking method setting screen 3030.

Also, the user may set the cooking method for the food through the user equipment 1100. For example, the controller 1110 of the user equipment 1100 may display the cooking method setting screen 3030 to set the cooking method for the food on the user interface 1020 as illustrated in FIG. 43. After the cooking method is set by the user, the controller 1110 of the user equipment 1100 may transmit data on the cooking method to the cooking apparatus 1000 via the communicator 1170.

As described above, by the food drawing, the cooking apparatus 1000 or the user equipment 1100 may receive the food model and the cooking method from the user. Also, the cooking apparatus 1000 may shape the food in accordance with the food model created by the user and heat the food in accordance with the cooking method set by the user.

Figure 44:
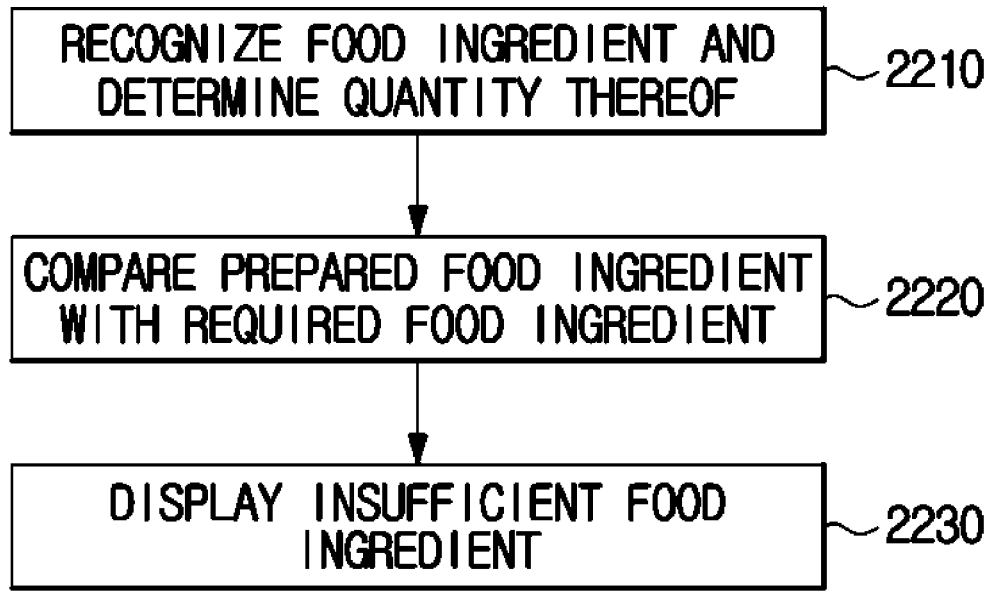
FIG. 44 illustrates a method of notifying an insufficient food ingredient by automatic cooking according to an embodiment of the present disclosure.
Figure 45:
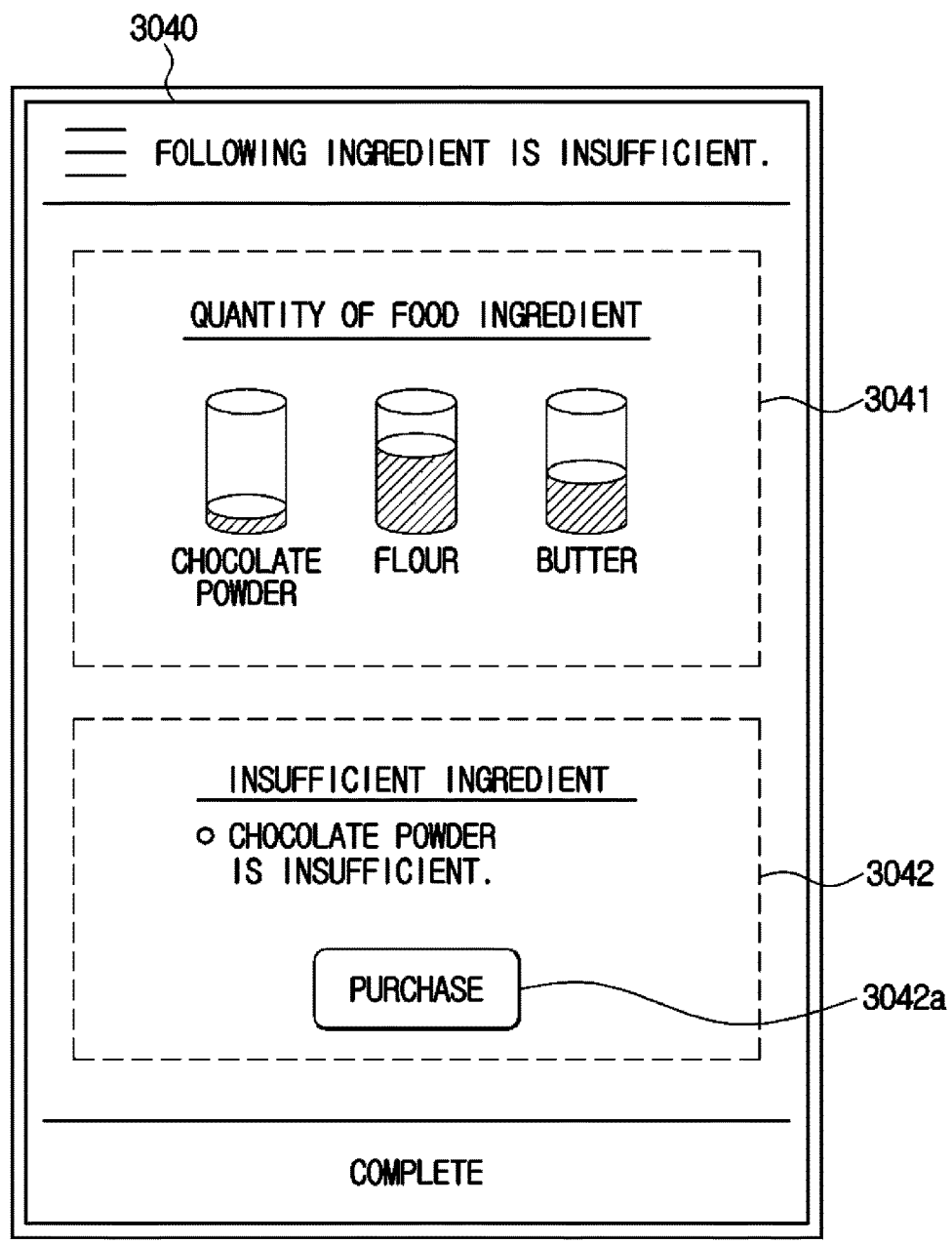
FIG. 45 illustrates an insufficient ingredient notification screen to notify a user of an insufficient food ingredient according to an embodiment of the present disclosure.

FIG. 44 illustrates a method of notifying an insufficient food ingredient by automatic cooking according to an embodiment of the present disclosure. FIG. 45 illustrates an insufficient ingredient notification screen to notify a user of an insufficient food ingredient according to an embodiment of the present disclosure.

In case of shaping the food by the above-described automatic cooking, food ingredients may not be sufficient to shape the food. In this case, the cooking apparatus 1000 or the user equipment 1100 may notify the insufficient food ingredient to the user.

A method of notifying an insufficient food ingredient (2200) will be described with reference to FIGS. 44 and 45.

After prepared food ingredients are recognized, the quantities of the prepared food ingredients are determined in operation 2210.

The cooking apparatus 1000 or the user equipment 1100 may recognize the food ingredients prepared in the cooking apparatus 1000 and determine the quantities of the food ingredients.

The cooking apparatus 1000 may identify a cartridge assembly installed in the cooking apparatus 1000 to recognize prepared food ingredients. For example, the cooking apparatus 1000 may identify the cartridge assembly by using a bar code, quick response (QR) code, or radio frequency identification (RF-ID). Particularly, the bar code, QR code, or RF tag including identification information of a cartridge assembly is attached to the cartridge assembly, and the cooking apparatus 1000 may sense identification information of the cartridge assembly by using a bar code reader, a QR code reader, or an RF reader.

In addition, the controller 1010 of the cooking apparatus 1000 may record information on lifespan of the cartridge assembly in the storage 1060 to determine the quantities of the prepared food ingredients. For example, when the cartridge assembly is used, the controller 1010 may record discharge amounts, discharge numbers, or discharge time of the food ingredients contained in the cartridge assembly in the storage 1060. The controller 1010 may determine the quantities of the food ingredients based on the information on the lifespan of the cartridge assembly.

The controller 1110 of the user equipment 1100 may request the cooking apparatus 1000 for the quantities of the food ingredients via the communicator 1170 to recognize the prepared food ingredients. In response to the required of the user equipment 1100, the controller 1010 of the cooking apparatus 1000 may identify the cartridge assembly and determine the quantities of the food ingredients based on the information on the lifespan of the cartridge assembly. Then, the controller 1010 of the cooking apparatus 1000 may transmit the quantities of the food ingredients to the user equipment 1100 via the communicator 1070.

The prepared food ingredients are compared with ingredients of the food selected by the user in operation 2220.

The cooking apparatus 1000 or the user equipment 1100 may compare the prepared food ingredients with the ingredients of the food selected by the user.

The controller 1010 of the cooking apparatus 1000 may extract information on food ingredients from the food model of the food selected by the user and compare the extracted food ingredients with food ingredients contained in the cartridge assembly. Furthermore, the controller 1010 of the cooking apparatus 1000 may compare the quantities of the food ingredient extracted from the food model with the quantities of the food ingredient contained in the cartridge assembly.

In addition, the controller 1110 of the user equipment 1100 may also extract information on food ingredient from the food model of the food selected by the user and compare the extracted food ingredients with food ingredients contained in the cartridge assembly.

Insufficient food ingredients are displayed in operation 2230.

The cooking apparatus 1000 or the user equipment 1100 may display food ingredients determined as being insufficient as a result of comparison between the prepared food ingredients and the ingredients of the food selected by the user.

For example, the controller 1010 of the cooking apparatus 1000 may display an insufficient ingredient notification screen 3040 to notify the user of insufficient food ingredients on the user interface 1020 as illustrated in FIG. 45. The insufficient ingredient notification screen 3040 may include a quantity display region 3041 to display the quantities of the food ingredients prepared in the cooking apparatus 1000 and an insufficient ingredient display region 3042 to display an insufficient food ingredient and the quantity of the insufficient food ingredient. In addition, the insufficient ingredient display region 3042 may include a purchase button 3042a connected to an online market where the insufficient food ingredients may be purchased.

The controller 1110 of the user equipment 1100 may also display the insufficient ingredient notification screen 3040 on the user interface 1120 as illustrated in FIG. 45. Via the insufficient ingredient notification screen 3040, the insufficient food ingredients may be notified to the user.

As described above, the cooking apparatus 1000 or the user equipment 1100 may notify the insufficient food ingredients to the user.

Figure 46:
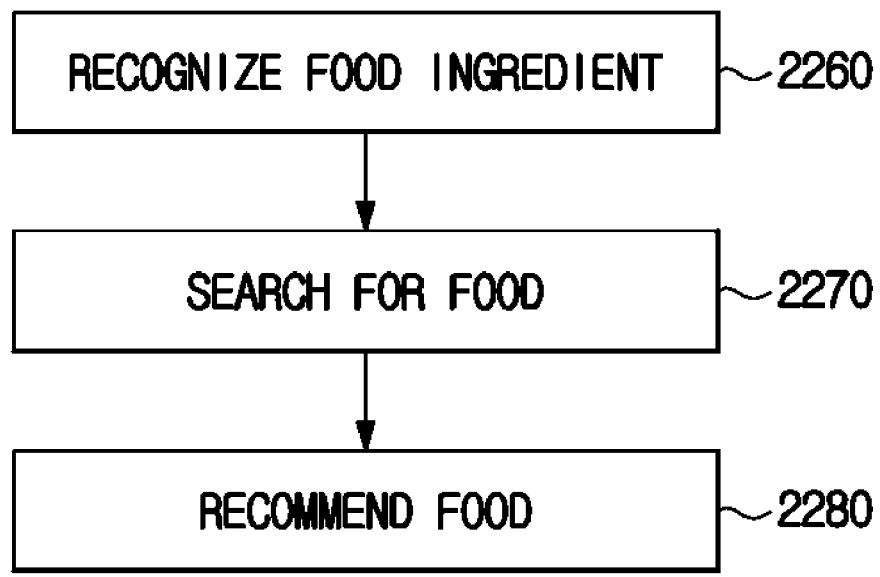
FIG. 46 illustrates a method of recommending a food by automatic cooking according to an embodiment of the present disclosure.
Figure 47:
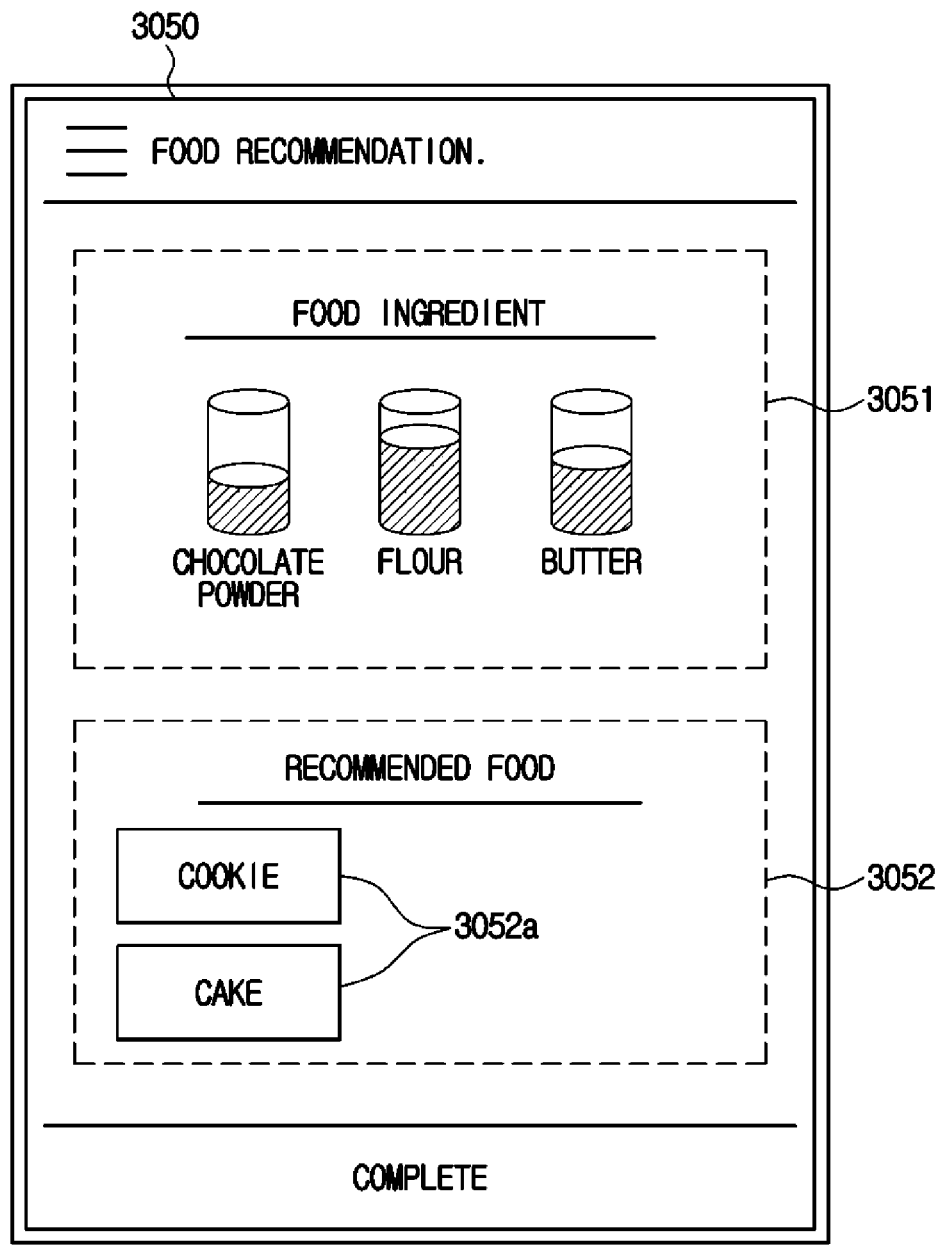
FIG. 47 illustrates a food recommendation screen to recommend a food according to an embodiment of the present disclosure.

FIG. 46 illustrates a method of recommending a food by automatic cooking according to an embodiment of the present disclosure. FIG. 47 illustrates a food recommendation screen to recommend a food according to an embodiment of the present disclosure.

When the food is shaped by automatic cooking as described above, the cooking apparatus 1000 or the user equipment 1100 may recommend a food to the user in accordance with prepared food ingredients.

A method of recommending a food (2250) will be described with reference to FIGS. 46 and 47.

Prepared food ingredients are recognized in operation 2260.

The cooking apparatus 1000 or the user equipment 1100 may recognize food ingredients prepared in the cooking apparatus 1000.

The cooking apparatus 1000 may identify the cartridge assembly installed in the cooking apparatus 1000 to recognize the prepared food ingredients. For example, the cooking apparatus 1000 may identify the cartridge assembly by using a bar code, QR code, or RF-ID.

In addition, the user equipment 1100 may request the cooking apparatus 1000 for data on food ingredients to recognize the prepared food ingredients. In response to the request from the user equipment 1100, the cooking apparatus 1000 may identify the cartridge assembly installed in the cooking apparatus 1000 and transmit data on the food ingredients contained in the cartridge assembly to the user equipment 1100.

Foods are searched for based on the prepared food ingredients in operation 2270.

The cooking apparatus 1000 or the user equipment 1100 may search for foods based on the prepared food ingredients.

For example, the cooking apparatus 1000 may search for a food model stored in the storage 1060 based on the prepared food ingredients or request an external server device for a food model including the prepared food ingredients. The user equipment 1100 may also search for a food model stored in the storage 1060 based on the prepared food ingredients or request an external server device for a food model including the prepared food ingredients.

Foods are recommended based on the prepared food ingredients in operation 2280.

After the food model is searched, the cooking apparatus 1000 or the user equipment 1100 may recommend the food to the user.

For example, the controller 1010 of the cooking apparatus 1000 may display a food recommendation screen 3050 on the user interface 1020 as illustrated in FIG. 47. The food recommendation screen 3050 may include a food ingredient display region 3051 to display food ingredients prepared in the cooking apparatus 1000 and a food recommend region 3052 to recommend a food. In addition, the food recommend region 3052 may display a select button 3052a to select the recommended food.

The controller 1110 of the user equipment 1100 may also display the food recommendation screen 3050 on the user interface 1120 as illustrated in FIG. 47. The food may be recommended to the user via the food recommendation screen 3050 and may be selected by the user.

As described above, the cooking apparatus 1000 or the user equipment 1100 may recommend a food to be cooked to the user in accordance with prepared food ingredients.

Figure 48:
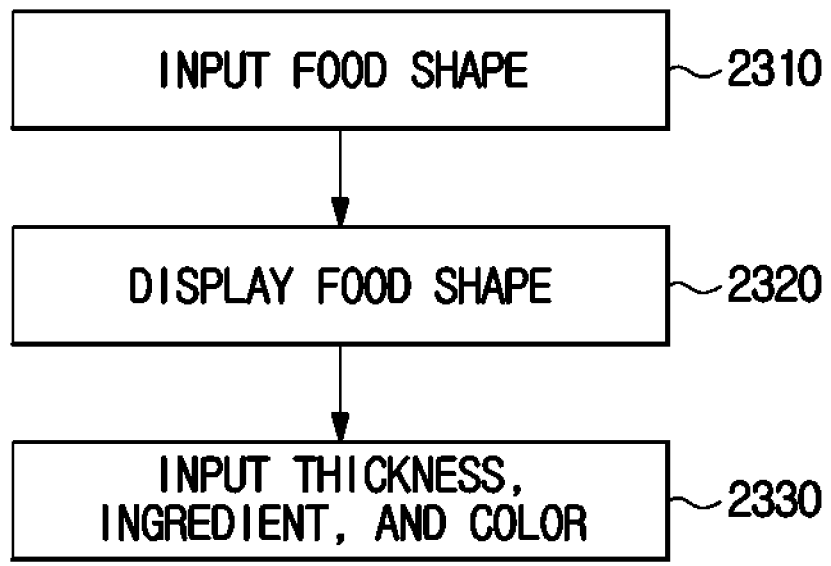
FIG. 48 illustrates an example of a method of creating a food model according to an embodiment of the present disclosure.

FIG. 48 illustrates an example of a method of creating a food model according to an embodiment of the present disclosure. In addition, FIGS. 49, 50, 51, 52, and 53 illustrate examples of receiving a food model according to an embodiment of the present disclosure.

The user may directly input information on a shape, thickness, ingredient, and color of a food constituting the food model.

A method of creating a food model (2300) will be described with reference to FIGS. 49, 50, 51, 52, and 53.

A food shape is input in operation 2310 and the food shape is displayed in operation 2320.

The cooking apparatus 1000 or the user equipment 1100 may receive an input of the food shape from the user and display the input food shape in real time.

Figure 49:
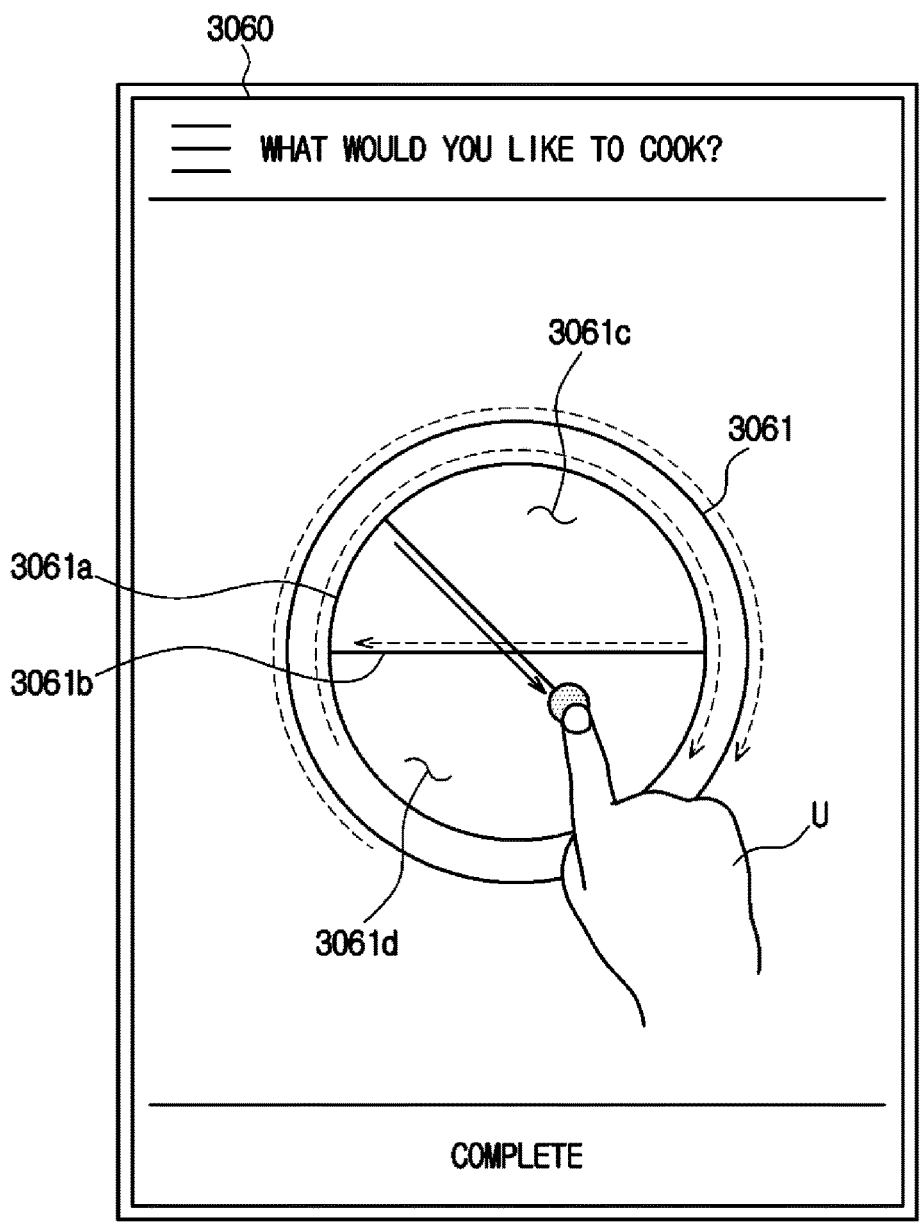
FIGS. 49, 50, 51, 52, and 53 illustrate examples of receiving a food model according to various embodiments of the present disclosure.

For example, the controller 1010 of the cooking apparatus 1000 may display a model creation screen 3060 to create a food model on the user interface 1020 as illustrated in FIG. 49. The user may touch a point of the model creation screen 3060 and drag the touch point. The controller 1010 may store coordinates of a moving path of the touch point of the user and display a line representing the moving path of the touch point of the user. A food shape 3061 may be formed by such lines.

In other words, the user (U) may draw the food shape 3061 on the user interface 1020. The controller 1010 may store the food shape 3061 drawn on the user interface 1020 by the user and display the food shape 3061 on the user interface 1020.

The food shape 3061 may be divided into a plurality of sections by lines input by the user and the divided sections may be separately managed. For example, when the user draws a line 3061b crossing a circle 3061a, a pair of semicircles 3061c and 3061d divided by the line 3061b may be separately managed. In other words, a first semicircle 3061c and a second semicircle 3061d may have different thicknesses, include different ingredients, or have different colors.

In addition, the controller 1110 of the user equipment 1100 may also display the model creation screen 3060 on the user interface 1120 as illustrated in FIG. 49, and the user may draw the food shape 3061 on the user interface 1120.

Figure 50:
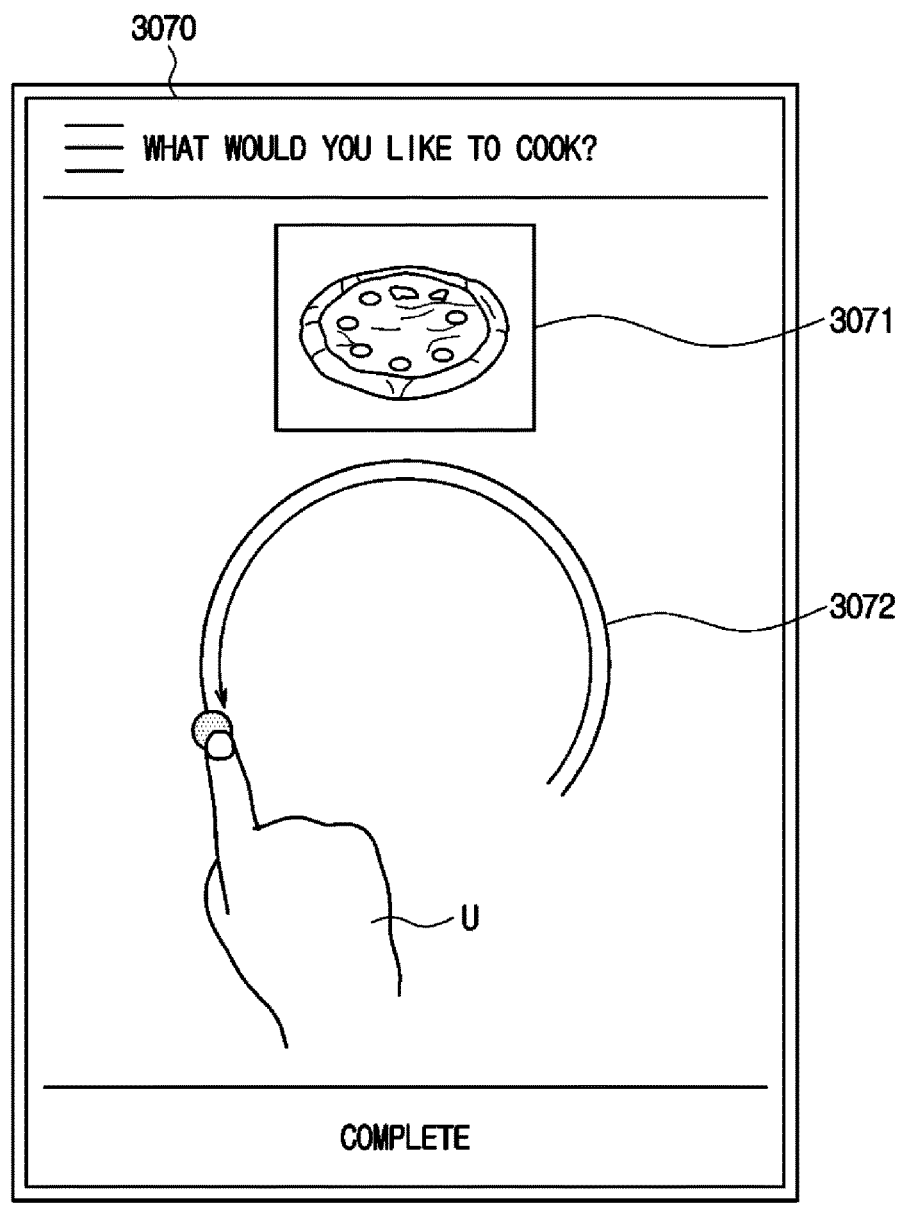

As another example, the controller 1010 of the cooking apparatus 1000 may display a model creation screen 3070 on the user interface 1020 as illustrated in FIG. 50. The model creation screen 3070 may include a reference image 3071. The reference image 3071 may be an image representing the food selected by the user.

The user may draw the food shape on the user interface 1020 with reference to the reference image 3071. The controller 1010 may store a food shape 3072 drawn on the user interface 1020 by the user and display the food shape 3072 on the user interface 1020.

In addition, the controller 1110 of the user equipment 1100 may also display the model creation screen 3070 on the user interface 1120 as illustrated in FIG. 50, and the user may draw the food shape 3072 on the user interface 1120 with reference to the reference image 3071.

Figure 51:
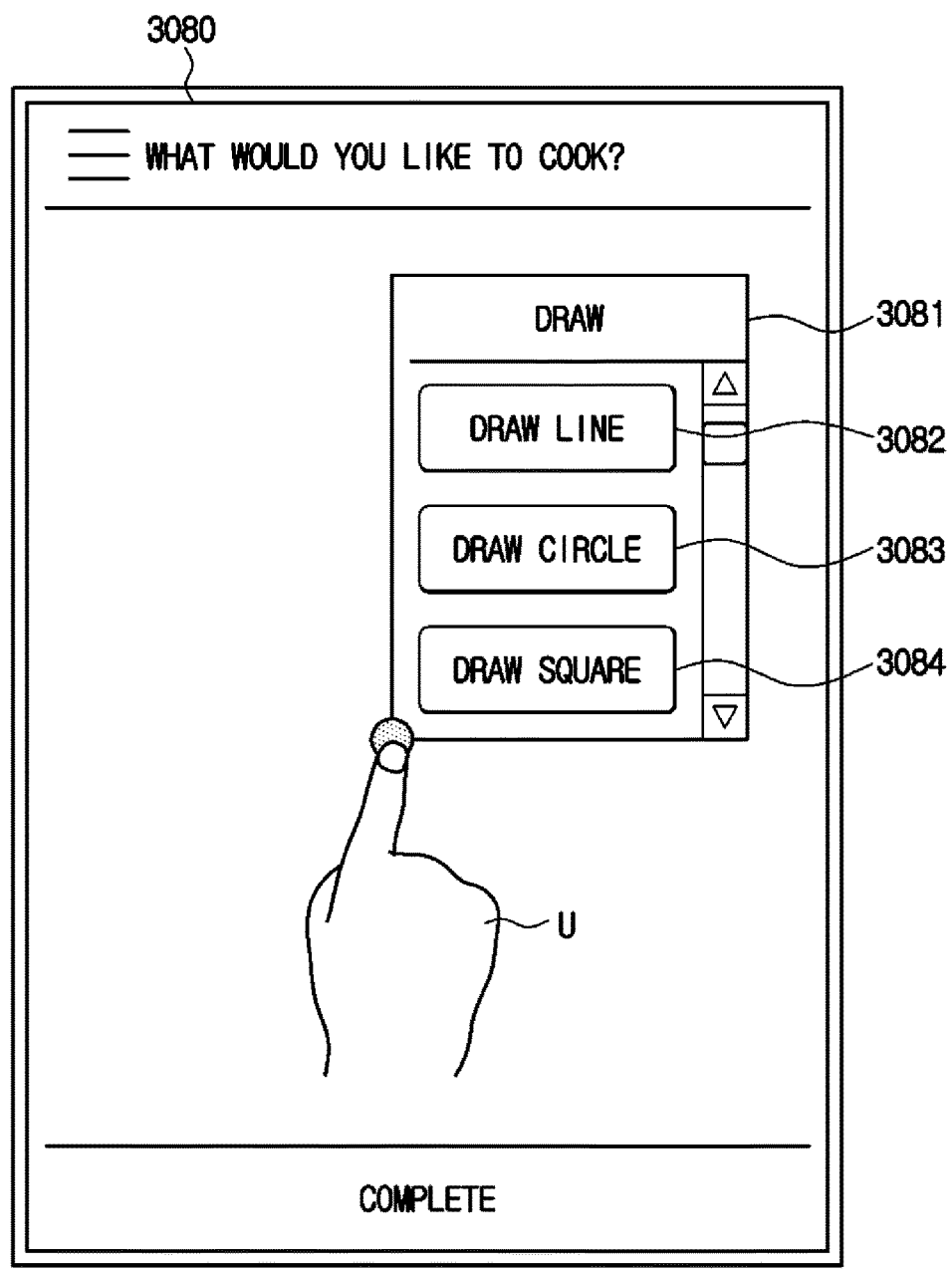

As another example, the controller 1010 of the cooking apparatus 1000 may display a model creation screen 3080 on the user interface 1020 as illustrated in FIG. 51. The controller 1010 may display a figure drawing menu 3081 on the model creation screen 3080 in accordance with a touch input of the user. When the user maintains a touch on the user interface 1020 for a predetermined time or longer or touches the user interface 1020 twice or more within a given time, the controller 1010 may display the figure drawing menu 3081 on the model creation screen 3080.

The figure drawing menu 3081 may include a line draw button 3082, a circle draw button 3083, a square draw button 3084, and the like to allow the user to easily draw the shape of food. The user may easily draw the shape of food including lines, circles, squares, triangles, or the like by using the figure drawing menu 3081. The controller 1010 may store the shape of food drawn using the lines, circles, squares, triangles, and the like by the user and display the food shape on the user interface 1020.

The controller 1110 of the user equipment 1100 may also display the model creation screen 3080 on the user interface 1120 as illustrated in FIG. 51, and the user may draw the shape of food on the user interface 1120 by using the figure drawing menu 3081 of the model creation screen 3080.

After the creation of the food shape is completed, the thickness, ingredient, and color of food are input in operation 2330.

The cooking apparatus 1000 or the user equipment 1100 may receive an input of the thickness, ingredient, and color of food from the user.

Figure 52:
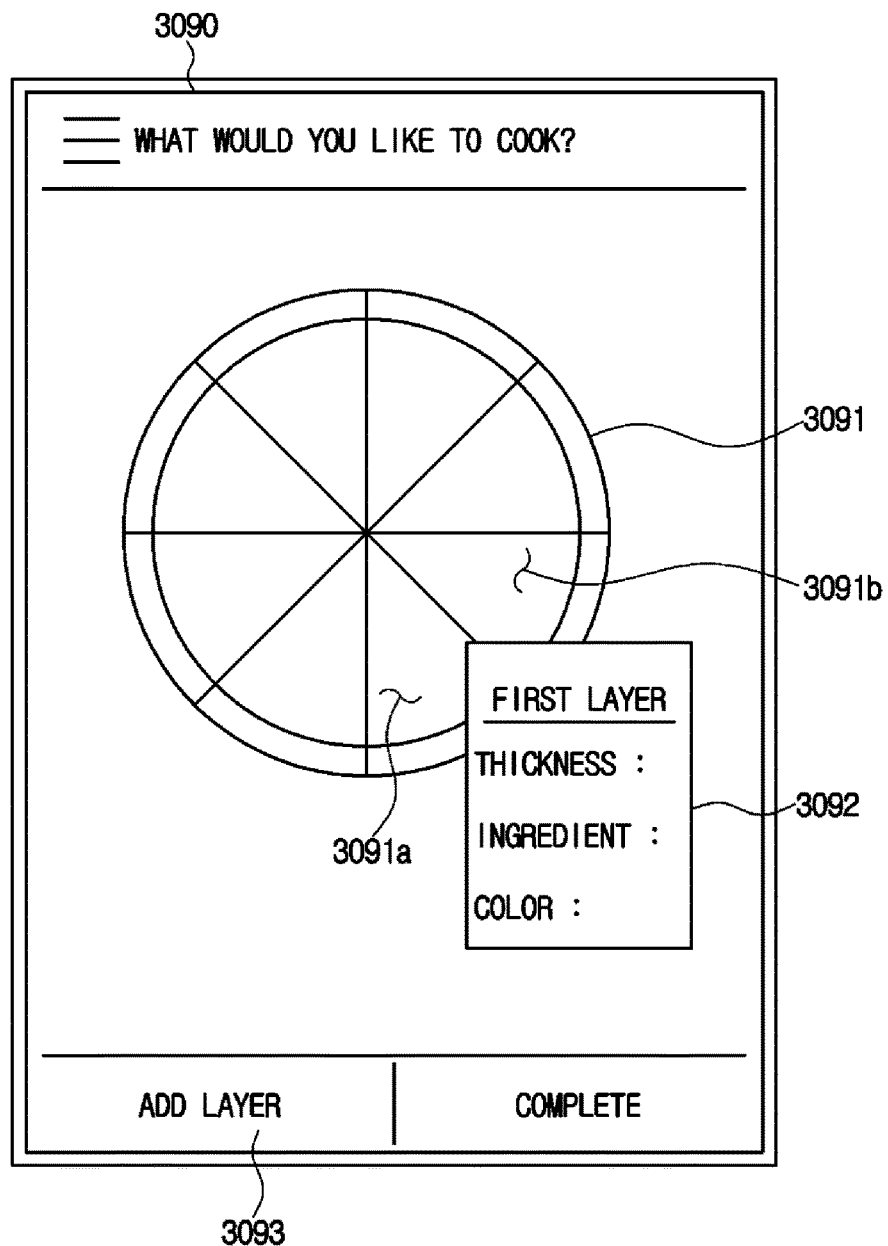

For example, the controller 1010 of the cooking apparatus 1000 may display a model creation screen 3090 to prepare a food model on the user interface 1020 as illustrated in FIG. 52.

When the user touches the food shape 3091 after creation of the food shape 3091 is completed, the controller 1010 may display a first additional information input menu 3092 through which the thickness, ingredient, and color of food are input. The user may input the thickness, ingredient, and color of food via the first additional information input menu 3092.

Particularly, a section of the food model defined by the thickness, ingredient, and color of food input by the user is limited to an area inside of a closed curve including a touch point of the user. For example, the thickness, ingredient, and color of food input with regard to a first section 3091*a* of the food shape 3091 by the user only define the thickness, ingredient, and color of the first section 3091*a*. In other words, a second section 3091*b*, which is not selected, may have a thickness, ingredient, and color different from those of the first section 3091*a*.

The controller 1010 may create a food model by using the thickness, ingredient, and color of food input via the first additional information input menu 3092 and the previously drawn shape of the food.

In addition, in case of a food having a plurality of layers (for example, a pizza may include a dough layer, a cheese layer, and a source layer), the model creation screen 3090 may further include a layer add button 3093 to input thickness, ingredient, and color of each of the plurality of layers.

Figure 53:
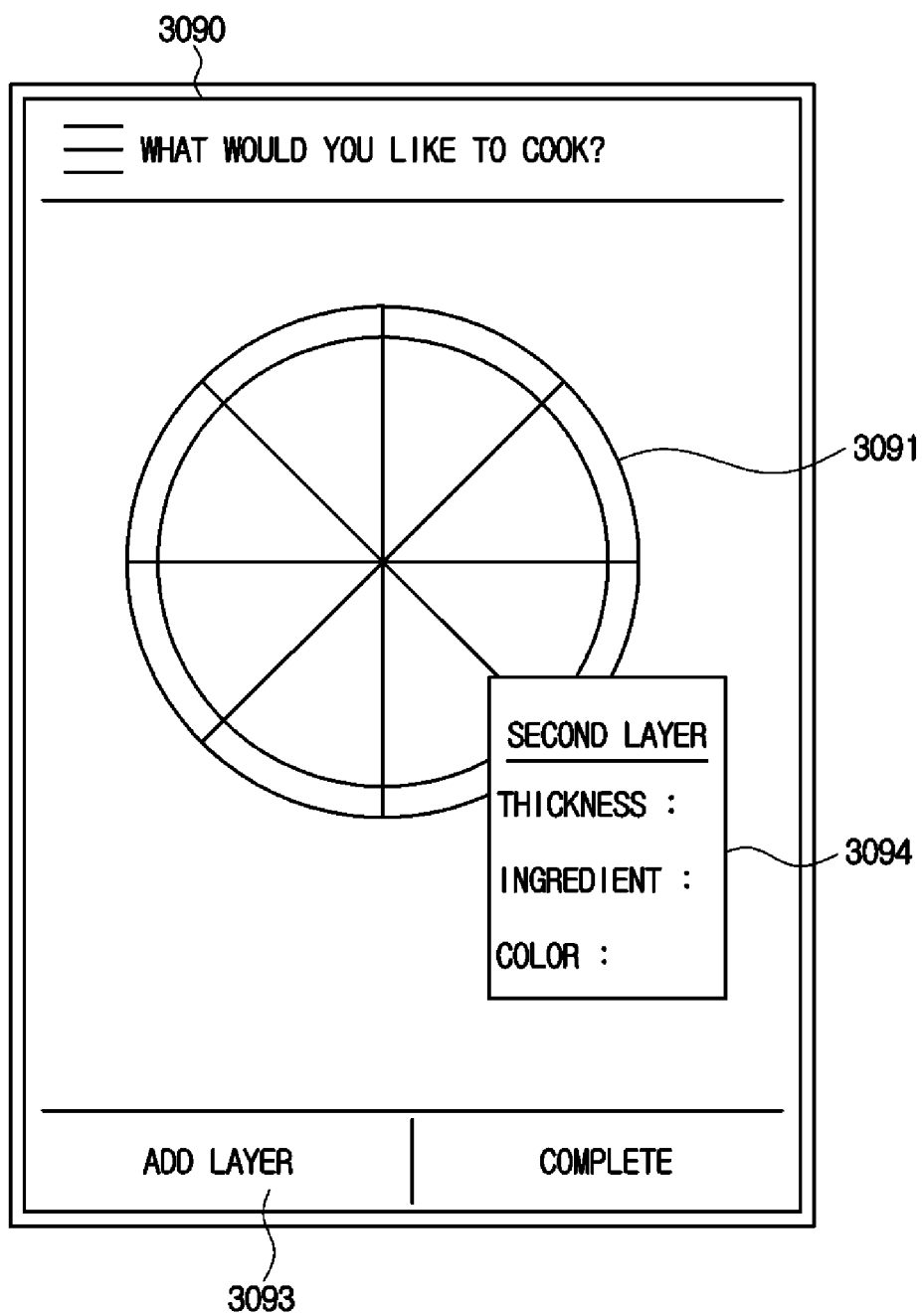

When the user touches the layer add button 3093, the controller 1010 may display a second additional information input menu 3094 to input a thickness, ingredient, and color of a second layer of the food as illustrated in FIG. 53. The user may input the thickness, ingredient, and color of food via the second additional information input menu 3094.

In addition, the controller 1010 may create a food model by using the thickness, ingredient, and color of the first layer of the food input via the first additional information input menu 3092, the thickness, ingredient, and color of the second layer of the food input via the second additional information input menu 3094, and the previously drawn food shape.

The controller 1110 of the user equipment 1100 may also display the model creation screen 3090 on the user interface 1120 as illustrated in FIGS. 52 and 53. The user may input the thickness, ingredient, and color of food via the first additional information input menu 3092 and the second additional information input menu 3094.

As described above, the user may draw the shape of food on the user interface 1020 or 1120, and the cooking apparatus 1000 or the user equipment 1100 may store the shape of food drawn on the user interface 1020 or 1120. In addition, the cooking apparatus 1000 or the user equipment 1100 may receive an input of the thickness, ingredient, and color of food via the user interface 1020 or 1120 and create the food model based on the input thickness, ingredient, and color of food.

Figure 54:
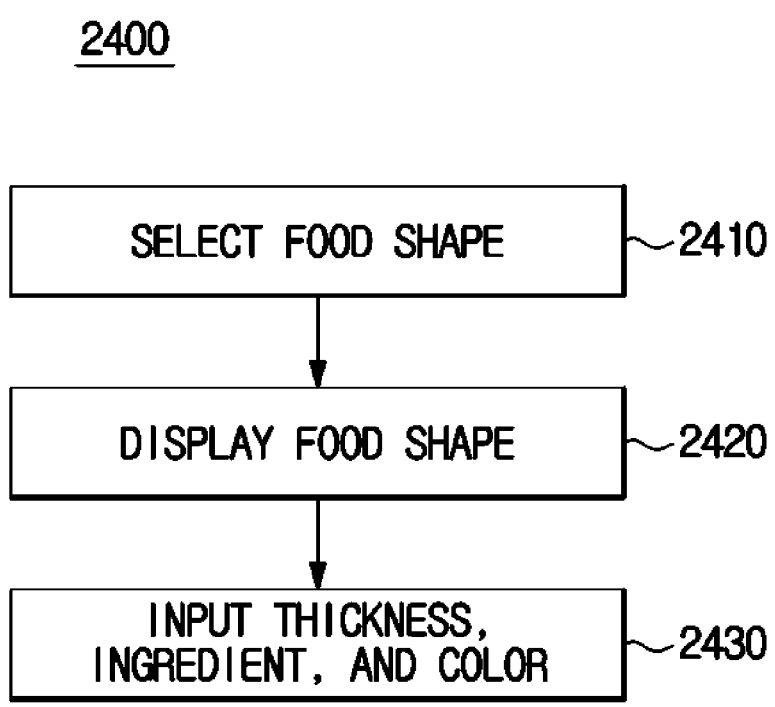
FIG. 54 illustrates another example of a method of creating a food model according to an embodiment of the present disclosure.
Figure 55:
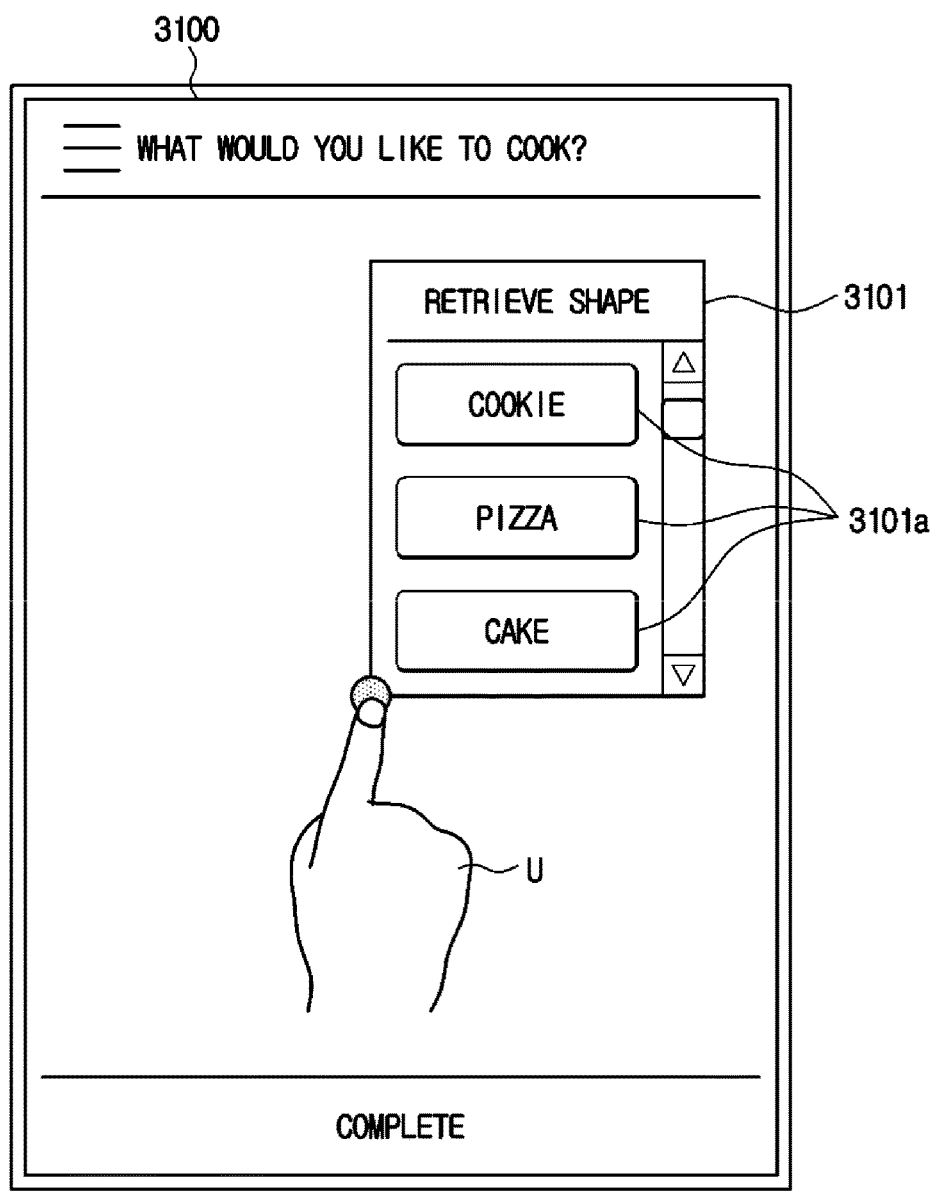
FIGS. 55 and 56 illustrate examples of receiving a food model according to various embodiments of the present disclosure.
Figure 56:
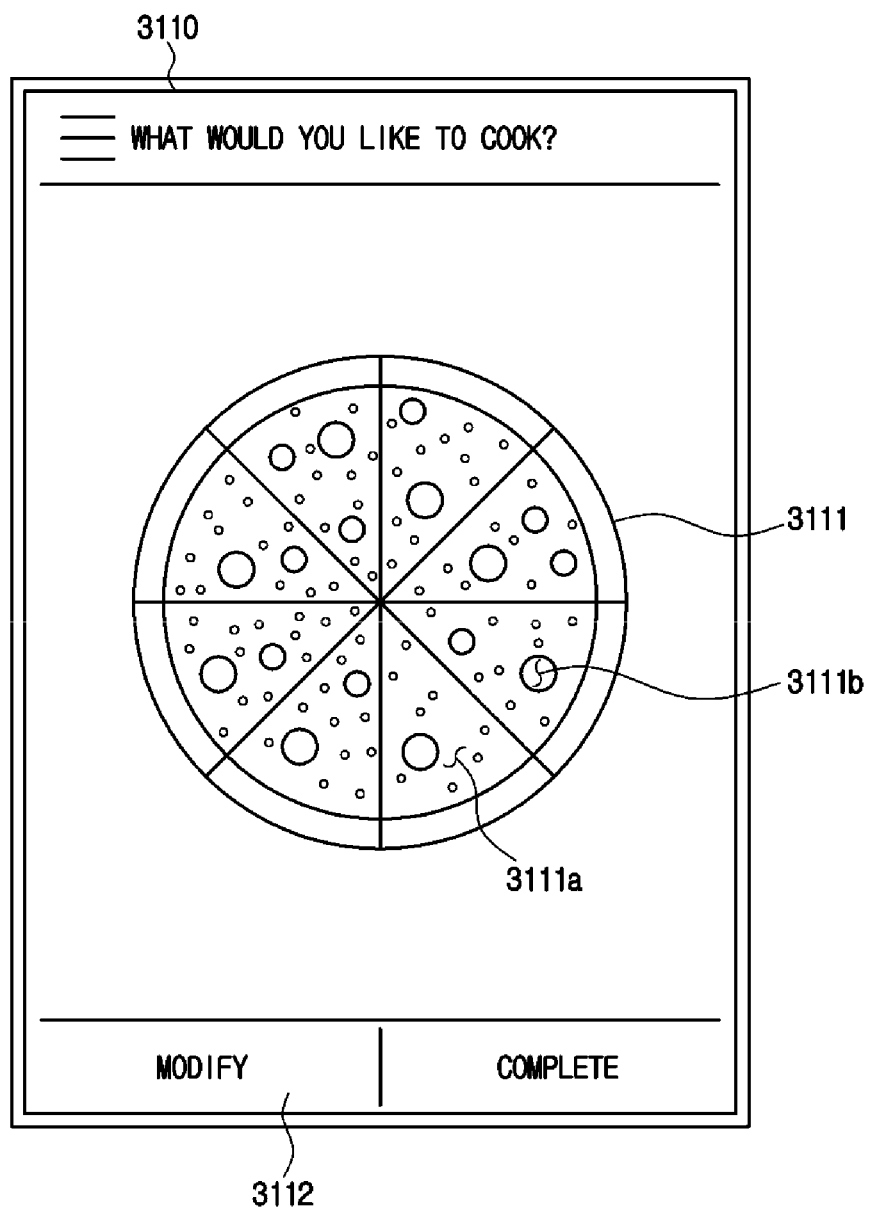

FIG. 54 illustrates another example of a method of creating a food model according to an embodiment of the present disclosure. In addition, FIGS. 55 and 56 illustrate examples of receiving a food model according to an embodiment of the present disclosure.

The user may use a pre-stored food shape or directly input information on a thickness, ingredient, and color of food to create a food model.

A method of creating a food model (2400) will be described with reference to FIGS. 54, 55, and 56.

A pre-stored food shape is selected in operation 2410.

The cooking apparatus 1000 or the user equipment 1100 may allow the user to select a food shape. The food shape does not include information on the thickness, ingredient, and color of food but may only include information on the appearance of the food.

For example, the controller 1010 of the cooking apparatus 1000 may display a model creation screen 3100 to create a food model on the user interface 1020 as illustrated in FIG. 55. The controller 1010 may display a food shape selection menu 3101 on the model creation screen 3100 in accordance with a touch input of the user. When the user maintains a touch on the user interface 1020 for a predetermined time or longer or touches the user interface 1020 twice or more within a given time, the controller 1010 may display the food shape selection menu 3101 on the model creation screen 3100.

The food shape selection menu 3101 may include food buttons 3101*a* indicating various names of food such as cookie, pizza, cake, and stake. The user may confirm the names of food displayed on the plurality of food buttons 3101*a* and touch one of the plurality of food buttons 3101*a*.

In response to the user's selection, the controller 1010 may retrieve data on the selected food shape from the storage 1060 or receive data on the food shape from an external device via the communicator 1070.

The controller 1110 of the user equipment 1100 may also display the model creation screen 3100 on the user interface 1120 as illustrated in FIG. 55 and may display the food shape selection menu 3101 in accordance with a touch input of the user.

The food shape selected by the user is displayed in operation 2420.

The cooking apparatus 1000 or the user equipment 1100 may display the food shape selected by the user.

The controller 1010 of the cooking apparatus 1000 may display the food shape selected by the user on the user interface 1020. For example, the controller 1010 of the cooking apparatus 1000 may display a model creation screen 3110 including the food shape 3111 on the user interface 1020 as illustrated in FIG. 56. The model creation screen 3110 may also include a shape modification button 3112 to modify the food shape 3111.

When the user touches the shape modification button 3112, the user may edit the food shape 3111 displayed on the model creation screen 3110.

In addition, the controller 1110 of the user equipment 1100 may also display the food shape 3111 on the user interface 1020 as illustrated in FIG. 56 in accordance with the user's selection.

After the food shape is selected, the thickness, ingredient, and color of food is input in operation 2430.

The cooking apparatus 1000 or the user equipment 1100 may receive the thickness, ingredient, and color of food from the user. For example, when the user touches the inside of the food shape display on the user interface 1020 after completion of selection of the food shape, the user may input the thickness, ingredient, and color of food.

Particularly, a section of the food model defined by the thickness, ingredient, and color of food input by the user is limited to an area inside of a closed curve including a touch point of the user. For example, the thickness, ingredient, and color of food input with regard to a first section 3111*a* of the food shape 3111 illustrated in FIG. 56 by the user only define the thickness, ingredient, and color of the first section 3111*a*.

In other words, a second section 3111*b*, which is not selected, may have a thickness, ingredient, and color different from those of the first section 3111*a*.

The controller 1010 may create a food model by using the input thickness, ingredient, and color of food and the food shape.

As described above, the cooking apparatus 1000 or the user equipment 1100 may display a plurality of food shapes, and the user may select one of the plurality of food shapes. In addition, the cooking apparatus 1000 or the user equipment 1100 may receive the thickness, ingredient, and color of food from the user and create the food model based on the shape, the thickness, ingredient, and color of food.

Figure 57:
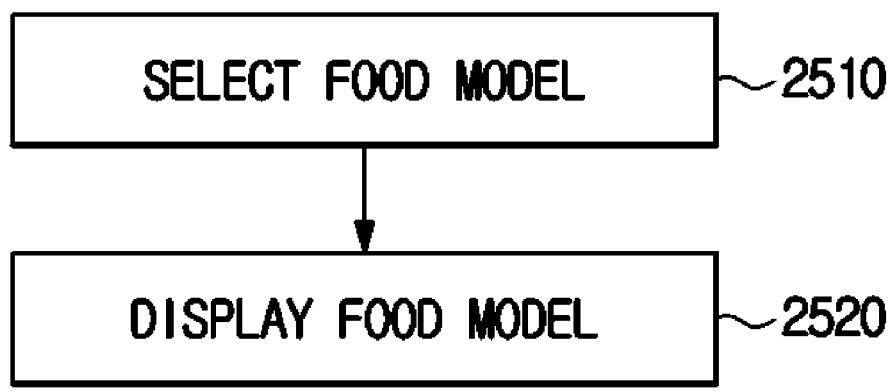
FIG. 57 illustrates another example of a method of creating a food model according to an embodiment of the present disclosure.
Figure 58:
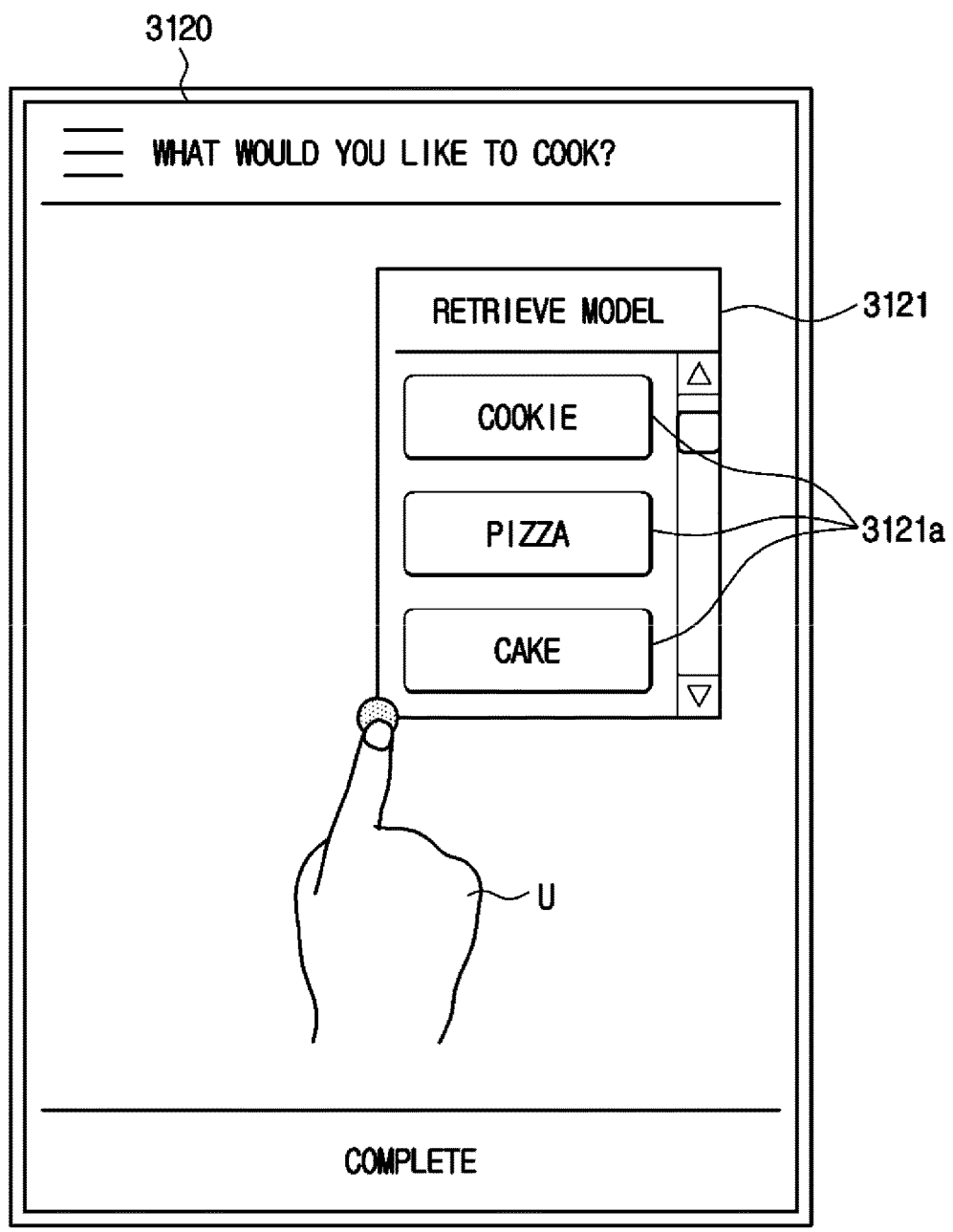
FIGS. 58 and 59 illustrate examples of receiving an input of a food model according to various embodiments of the present disclosure.
Figure 59:
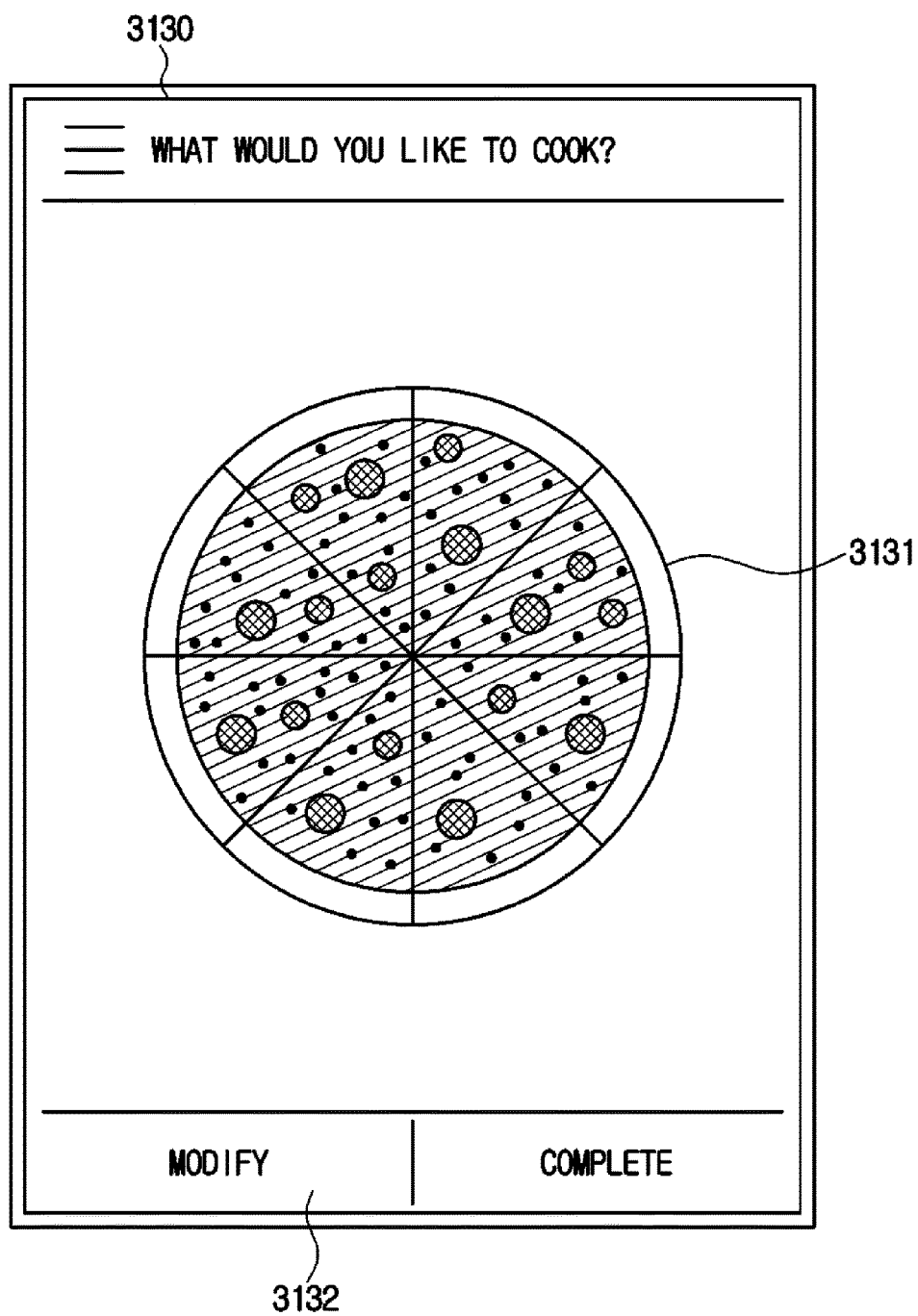

FIG. 57 illustrates another example of a method of creating a food model according to an embodiment of the present disclosure. In addition, FIGS. 58 and 59 illustrate examples of receiving an input of a food model according to an embodiment of the present disclosure.

The user may use a pre-stored food model to create a food model.

A method of creating a food model (2500) will be described with reference to FIGS. 57, 58, and 59.

A pre-stored food shape is selected in operation 2510.

The cooking apparatus 1000 or the user equipment 1100 may allow the user to select a food shape. The food model may include all information related to the food shape such as the shape, thickness, ingredient, and color of food.

For example, the controller 1010 of the cooking apparatus 1000 may display a model creation screen 3120 to create a food model on the user interface 1020 as illustrated in FIG. 58. The controller 1010 may display a food model selection menu 3121 on the model creation screen 3120 in accordance with a touch input of the user. When the user maintains a touch on the user interface 1020 for a predetermined time or longer or touches the user interface 1020 twice or more within a given time, the controller 1010 may display the food model selection menu 3121 on the model creation screen 3120.

The food model selection menu 3121 may include food buttons 3121*a* indicating various names of food such as cookie, pizza, cake, and stake. The user may confirm the names of food displayed as the plurality of food buttons 3101*a* and touch one of the plurality of food buttons 3121*a*.

In response to the user's selection, the controller 1010 may retrieve data on the selected food shape from the storage 1060 or receive data on the food shape from an external device via the communicator 1070.

The controller 1110 of the user equipment 1100 may also display the food model creation screen 3120 on the user interface 1120 as illustrated in FIG. 58 and may display the food model selection menu 3121 in accordance with a touch input of the user.

The food model selected by the user is displayed in operation 2520.

The cooking apparatus 1000 or the user equipment 1100 may display a shape of a food selected by the user.

The controller 1010 of the cooking apparatus 1000 may display the shape of the food selected by the user on the user interface 1020. For example, the controller 1010 of the cooking apparatus 1000 may display a model creation screen 3130 including a food shape 3131 on the user interface 1020 as illustrated in FIG. 59. The model creation screen 3130 may also include a shape modification button 3132 to modify the displayed food shape 3111.

When the user touches the shape modification button 3132, the user may edit the food model 3131 displayed on the model creation screen 3130. In other words, the user may edit all of the shape, thickness, ingredient, and color of the food.

The controller 1110 of the user equipment 1100 may also display a food model 3131 on the user interface 1020 as illustrated in FIG. 59 in accordance with a user's selection.

As described above, the cooking apparatus 1000 or the user equipment 1100 may display a plurality of food models, and the user may select one of the plurality of food models.

Figure 60:
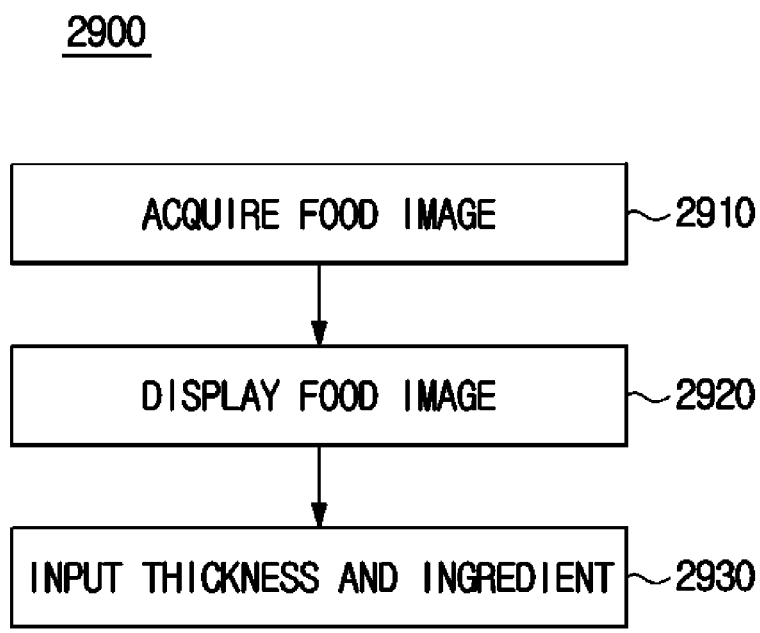
FIG. 60 illustrates a method of creating a food model according to an embodiment of the present disclosure.
Figure 61:
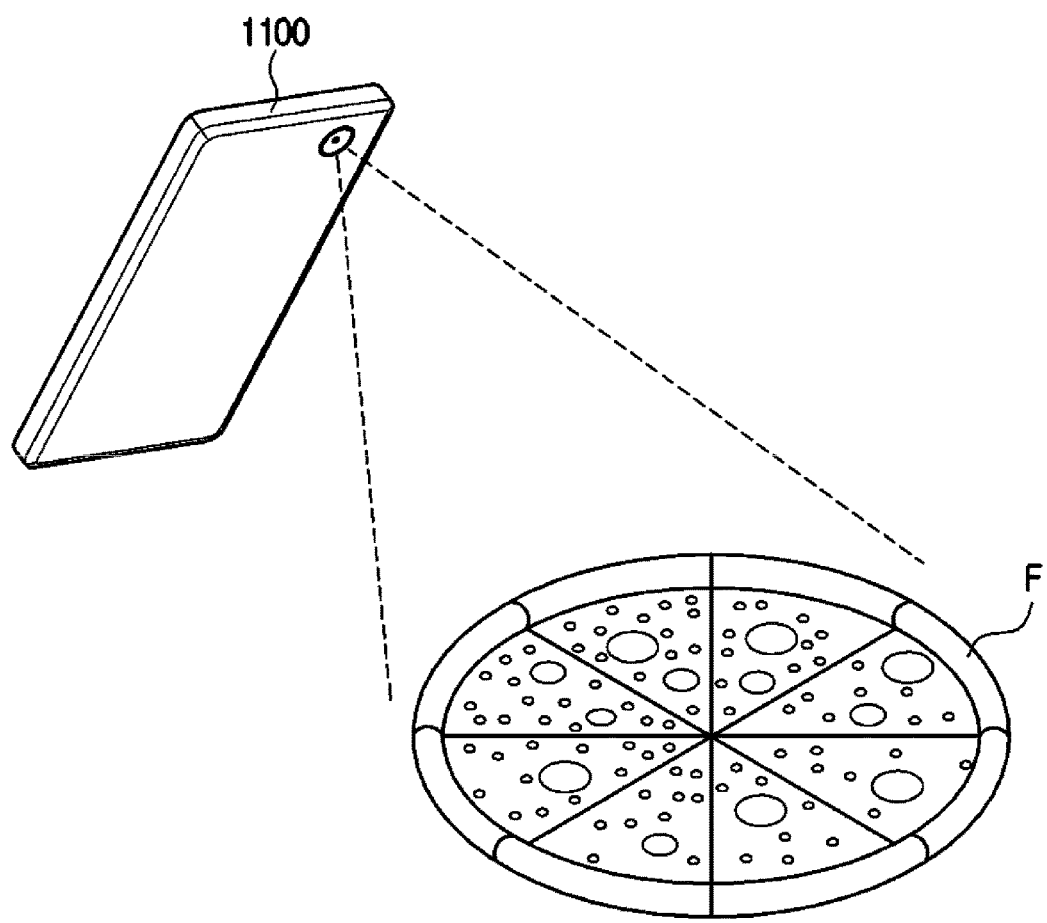
FIG. 61 illustrates an example of acquiring a food image according to an embodiment of the present disclosure.
Figure 62:
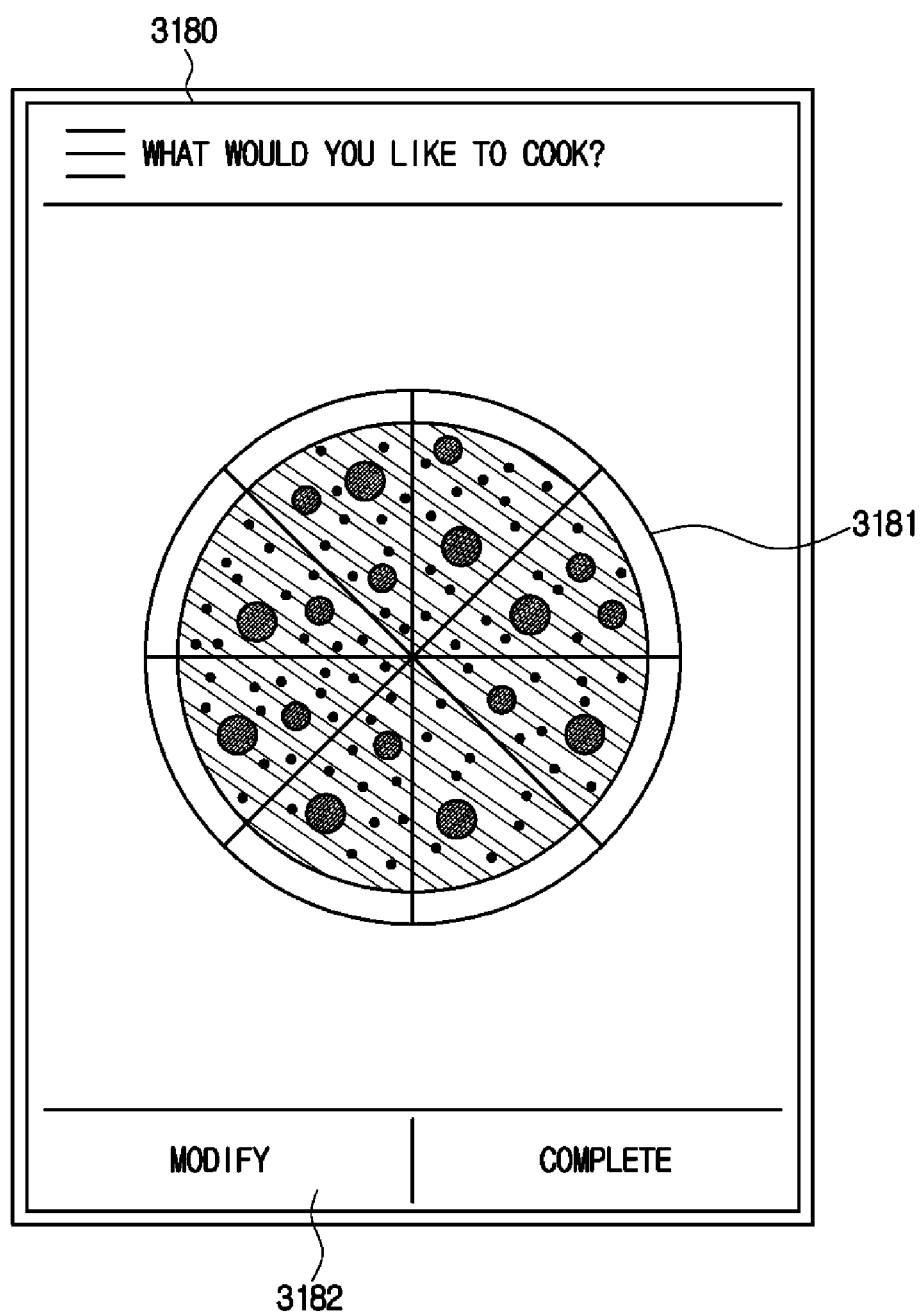
FIG. 62 illustrates an example of displaying a food image according to an embodiment of the present disclosure.

FIG. 60 illustrates a method of creating a food model according to an embodiment of the present disclosure. FIG. 61 illustrates an example of acquiring a food image according to an embodiment of the present disclosure. In addition, FIG. 62 illustrates an example of displaying a food image according to an embodiment of the present disclosure.

The user may acquire a food image by using a camera or the like and create a food model from the food image.

A method of creating a food model (2900) will be described with reference to FIGS. 60, 61, and 62.

A food image is acquired in operation 2910.

The controller 1110 of the user equipment 1100 may acquire a food image via the image acquisition unit 1140. For example, the user may photograph a food F by using the user equipment 1100 as illustrated in FIG. 61. When the user acquires a food image F, the controller 1110 may store data on the food image in the storage 1160.

The controller 1110 of the user equipment 1100 may transmit the food image to the cooking apparatus 1000 via the communicator 1170 in accordance with a user's input.

The acquired food image is displayed in operation 2920.

The controller 1110 of the user equipment 1100 may display the food image on the user interface 1120. For example, the controller 1110 may display a model creation screen 3180 including a food image 3181 on the user interface 1120 as illustrated in FIG. 62. The food image 3181 may include a shape and color of food. The model creation screen 3180 may include a shape modification button 3182 to modify the shape or color of the food included in the food image 3181.

When the user touches the shape modification button 3182, the user may edit the food image 3181 displayed on the model creation screen 3180. In other words, the user may modify the shape or color of the food of the food image 3181.

In addition, the controller 1010 of the cooking apparatus 1000 may also display a food image on the user interface 1020. The controller 1010 may receive the food image from the user equipment 1100 via the communicator 1070 and display the received food image on the user interface 1020 as illustrated in FIG. 62. The user may also modify the food image displayed on the user interface 1020 of the cooking apparatus 1000.

A thickness and ingredient of food are input in operation 2930.

The cooking apparatus 1000 or the user equipment 1100 may allow the user to select the thickness and ingredient of food. As described above, the food image includes information on the shape and color of the food. Thus, information on the thickness and ingredients of food may further be input additionally to create a food model. For example, when the user touches the inside of a food image displayed on the user interface 1020 or 1120, the user may input the thickness and ingredient of food.

The cooking apparatus 1000 or the user equipment 1100 may also estimate a thickness and ingredient of food from the food image. For example, the controller 1010 of the cooking apparatus 1000 may search for a food model having a shape and color similar to those of the food image among a plurality of food images stored in the storage 1060. If the food model having the shape and color similar to those of the food image is found, the controller 1010 may match the food image with the food model and estimate the thickness and ingredient of food in accordance with the matched results. Then, the controller 1010 may create a food model by using the input food image and the thickness and ingredient of food.

As described above, the cooking apparatus 1000 or the user equipment 1100 may acquire a food image and create a food model from the acquired food image.

Figure 63:
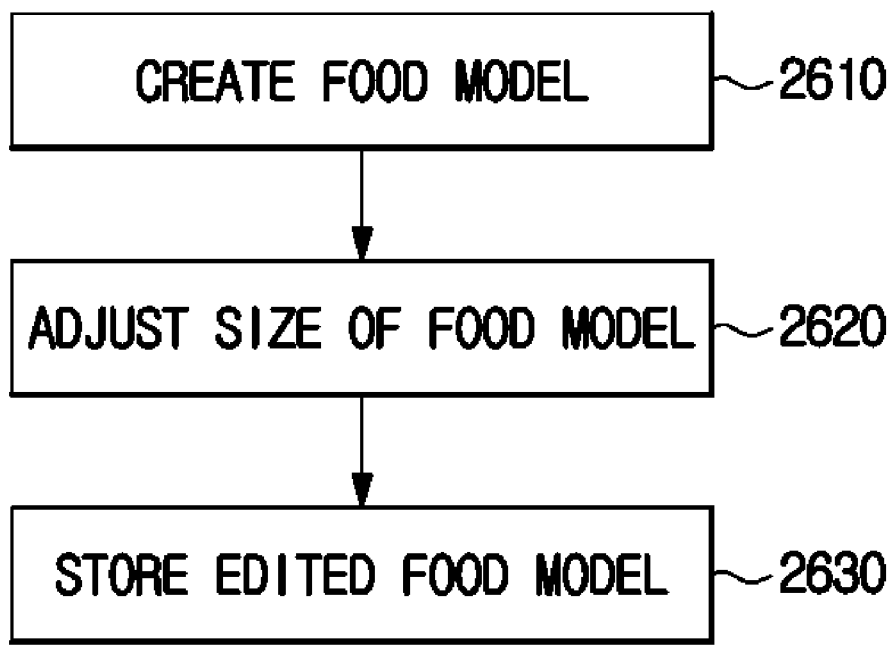
FIG. 63 illustrates an example of a method of editing a food model according to an embodiment of the present disclosure.
Figure 64:
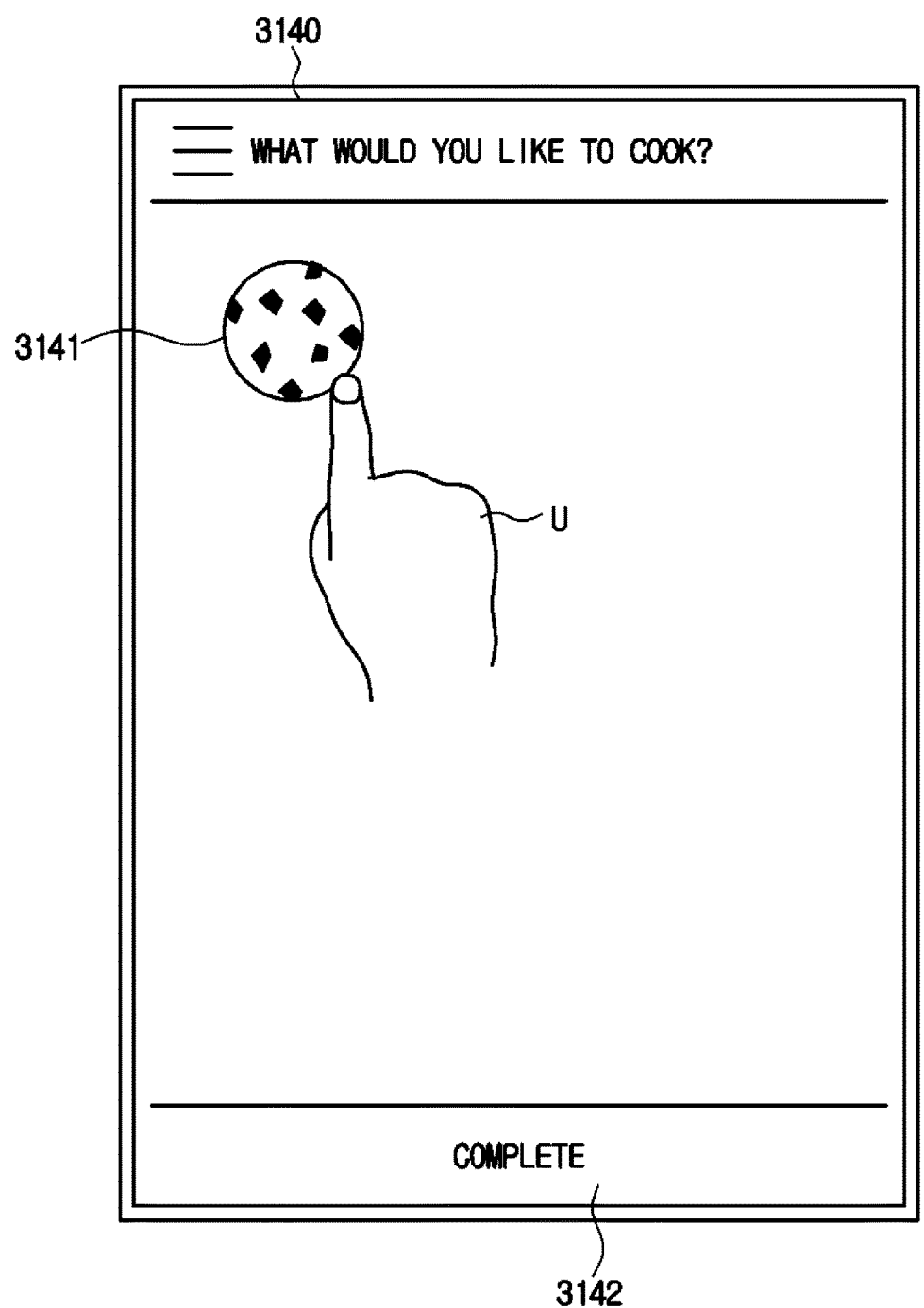
FIGS. 64 and 65 illustrate examples of editing a food model according to various embodiments of the present disclosure.
Figure 65:
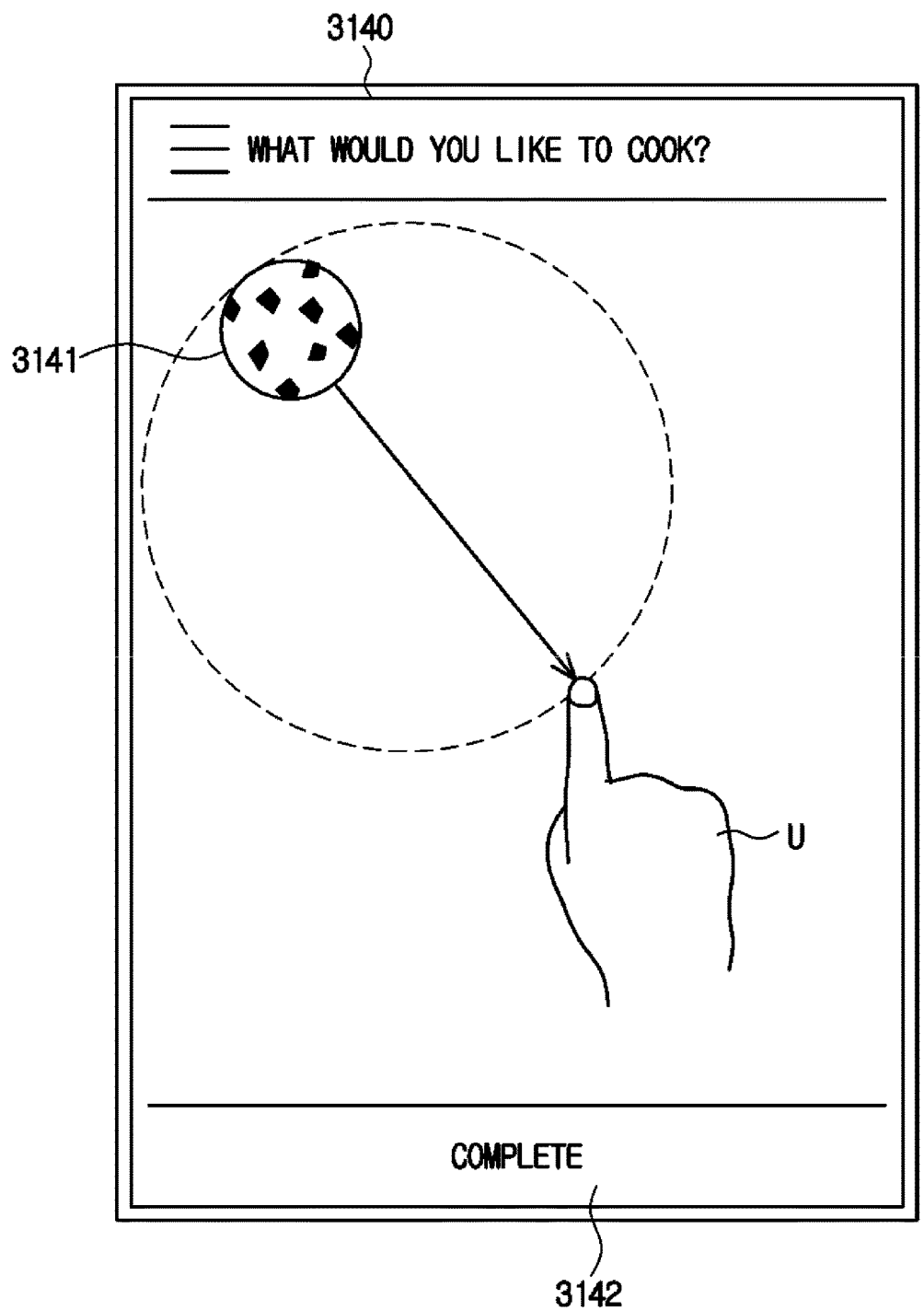

FIG. 63 illustrates an example of a method of editing a food model according to an embodiment of the present disclosure. In addition, FIGS. 64 and 65 illustrate examples of editing a food model according to an embodiment of the present disclosure.

After creation of a food model is completed, the user may adjust the size of the food model.

A method of editing a food model (2600) will be described with reference to FIGS. 63 and 64.

A food model is created in operation 2610.

The cooking apparatus 1000 or the user equipment 1100 may receive an input of a shape, thickness, ingredient, and color of food from the user and create a food model based on the shape, thickness, ingredient, and color of the food.

The cooking apparatus 1000 or the user equipment 1100 may also retrieve data on the food model stored in the storage 1060 or 1070 or receive data on the food model from an external device via the communicator 1070 or 1170.

The size of the food model is adjusted in operation 2620.

The cooking apparatus 1000 or the user equipment 1100 may display the food model and the user may adjust the size of the food model.

For example, the controller 1010 of the cooking apparatus 1000 may display a model editing screen 3140 including a food model 3141 created on the user interface 1020 as illustrated in FIG. 64.

The controller 1010 may enlarge or reduce the food model 3141 in accordance with a touch input of the user. When the user touches one point of the food model 3141 displayed on the user interface 1020 and then moves the touch point to the outside of the food model 3141, the controller 1010 may enlarge the food model 3141 in accordance with a moving distance of the touch point as illustrated in FIG. 65. In other words, as the moving distance of the touch point increases, an enlargement ratio of the food model 3141 may increase. Then, when the user stops touching, the controller 1010 may enlarge the food model 3141 in accordance with a distance from a touch start point to a touch end point and display the enlarged food model 3141.

Also, when the user touches one point of the food model 3141 displayed on the user interface 1020 and then moves the touch point to the inside of the food model 3141, the controller 1010 may reduce the food model 3141 in accordance with the moving distance of the touch point.

The controller 1110 of the user equipment 1100 may also enlarge or reduce the food model 3141 in accordance with a touch input of the user.

The edited food model is stored in operation 2630.

The cooking apparatus 1000 or the user equipment 1100 may store a food model whose size is adjusted.

For example, when the user touches a complete button 3142 included in the model editing screen 3140, the controller 1010 of the cooking apparatus 1000 may store the size-adjusted food model in the storage 1060.

The controller 1110 of the user equipment 1100 may also store the size-adjusted food model in the storage 1160.

As described above, the cooking apparatus 1000 or the user equipment 1100 may display the food model and adjust the size of the food model in accordance with the touch input of the user.

Figure 66:
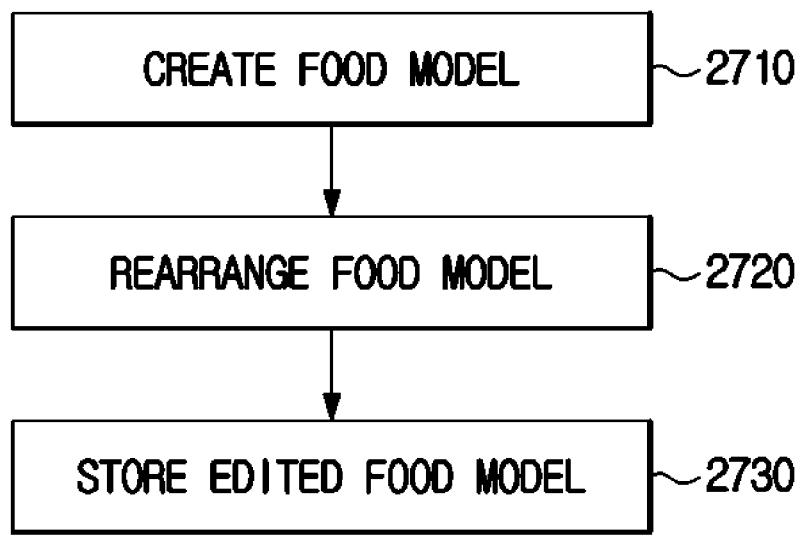
FIG. 66 illustrates another example of the method of editing a food model according to an embodiment of the present disclosure.

FIG. 66 illustrates another example of the method of editing a food model according to an embodiment of the present disclosure. In addition, FIGS. 67, 68, 69, and 70 illustrate examples of editing a food model according to an embodiment of the present disclosure.

After creation of a food model is completed, the user may rearrange the food model.

A method of emitting a food model (2700) will be described with reference to FIGS. 66, 67, 68, 69, and 70.

A food model is created in operation 2710.

The cooking apparatus 1000 or the user equipment 1100 may receive an input of a shape, thickness, ingredient, and color of food from the user and create a food model based on the shape, thickness, ingredient, and color of the food.

The cooking apparatus 1000 or the user equipment 1100 may also retrieve data on the food model stored in the storage 1060 or 1070 or receive data on the food model from an external device via the communicator 1070 or 1170.

The food model is rearranged in operation 2720.

The cooking apparatus 1000 or the user equipment 1100 may display the food model and the user may rearrange the food model.

For example, the controller 1010 of the cooking apparatus 1000 may display a model editing screen 3150 including a created food model 3151 on the user interface 1020.

Figure 67:
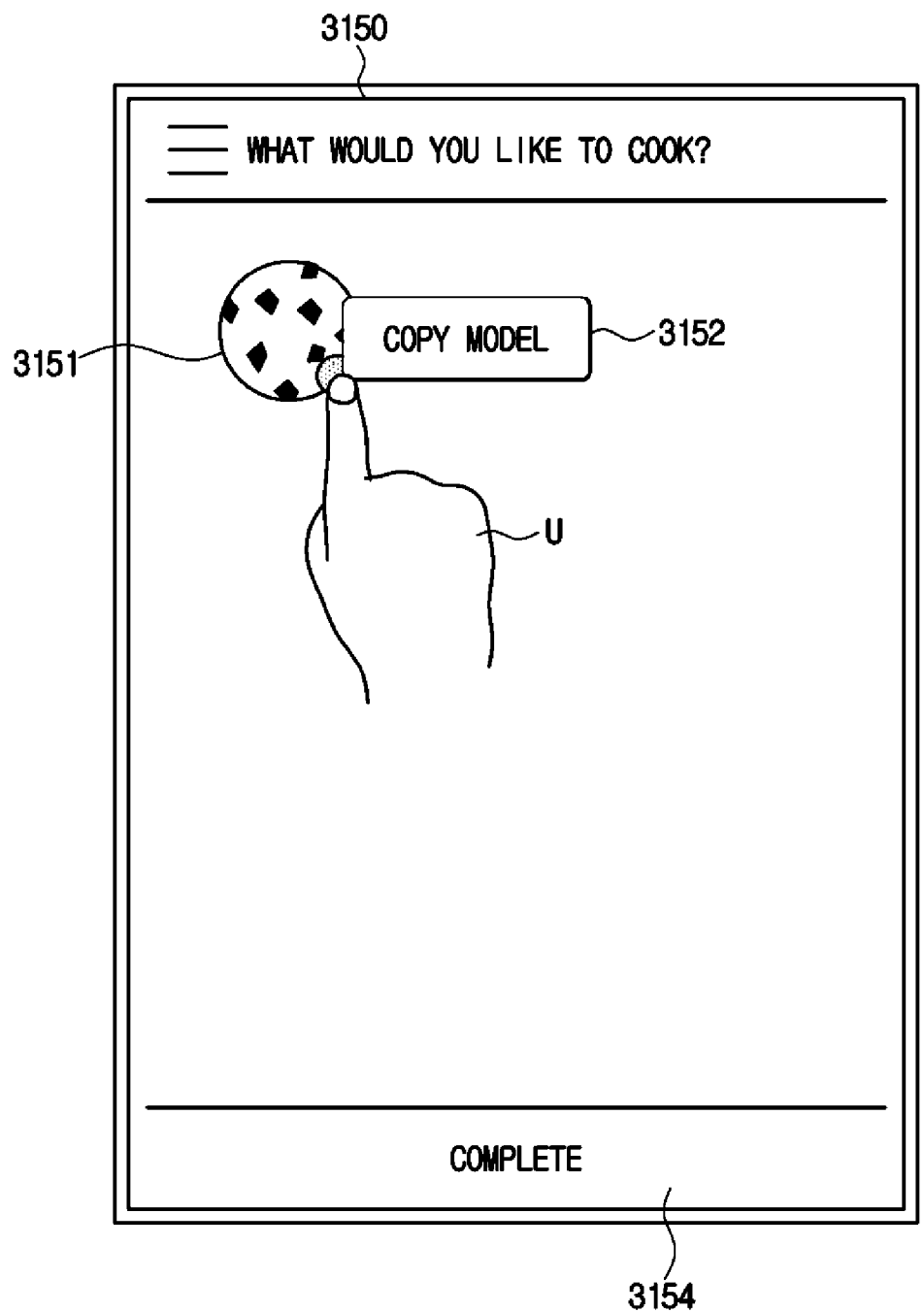
FIGS. 67, 68, 69, and 70 illustrate examples of editing a food model according to various embodiments of the present disclosure.

The controller 1010 may copy the food model 3151 in accordance with a touch input of the user. When the user maintains a touch on the food model 3151 displayed on the user interface 1020 for a predetermined time or longer or touches the food model 3151 twice or more within a given time, the controller 1010 may display a model copy button 3152 as illustrated in FIG. 67. When the user touches the model copy button 3152, the controller 1010 may temporarily store data on the food model 3151.

Figure 68:
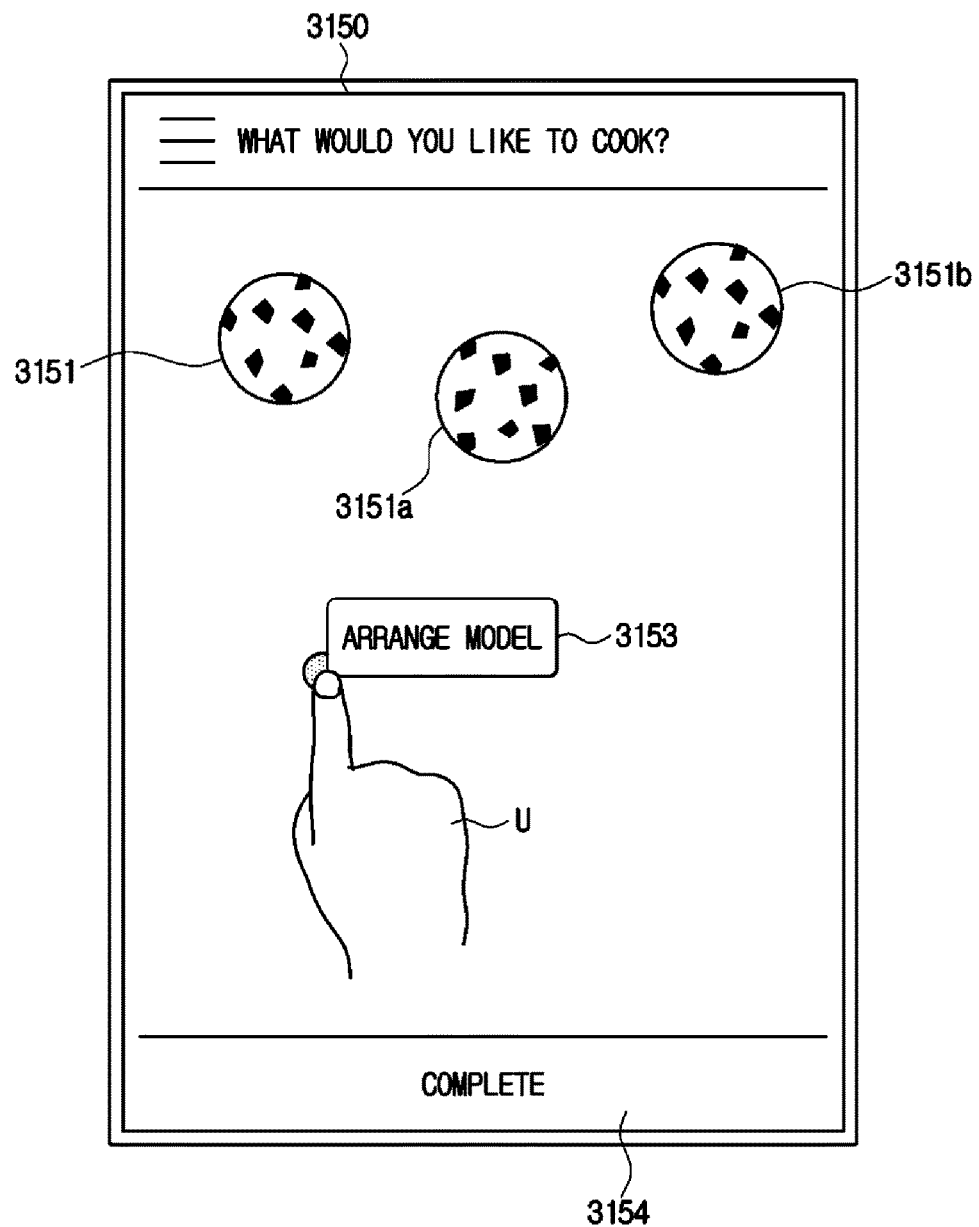

Then, the controller 1010 may arrange the food model 3151 in accordance with the touch input of the user. When the user maintains a touch on the model editing screen 3150 at a point where the food model 3151 is not located for a predetermined time or longer or touches the point twice or more within a given time, the controller 1010 may display a model arrange button 3153 at the touch point as illustrated in FIG. 68. When the user touches the model arrange button 3153, the controller 1010 may arrange the food model 3151 at the touch point. In other words, the controller 1010 may create a new food model 3151 at the touch point while maintaining the previous food model 3151.

The copy of the food model 3151 is not limited to once and the copied food model 3151 may be arranged multiple times. Thus, the controller 1010 may create, for example, a plurality of food models 3151*a* and 3151*b* from one food model 3151 and arrange the plurality of food models 3151 at respective touch points of the user.

The controller 1110 of the user equipment 1100 may also copy the food model 3151 in accordance with the touch input of the user and arrange the food model 3151 in accordance with the touch input of the user.

As another example, the controller 1010 of the cooking apparatus 1000 may display a model editing screen 3160 including a created food model 3161 on the user interface 1020.

Figure 69:
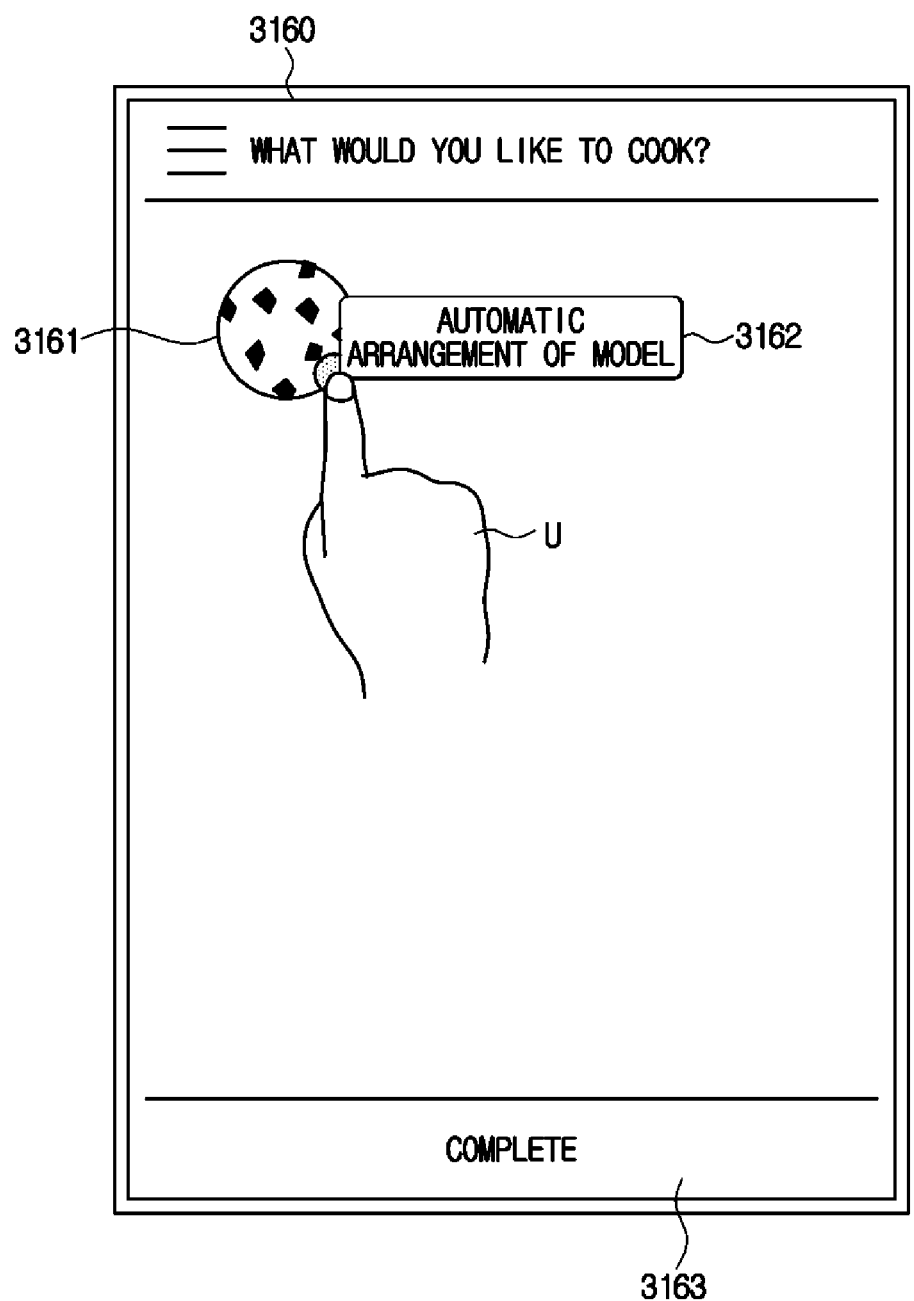

The controller 1010 may automatically copy and arrange the food model 3161 in accordance with a touch input of the user. When the user maintains a touch on food model 3161 displayed on the user interface 1020 for a predetermined time or longer or touches the food model 3161 twice or more within a given time, the controller 1010 may display an automatic model arrange button 3162 as illustrated in FIG. 69.

Figure 70:
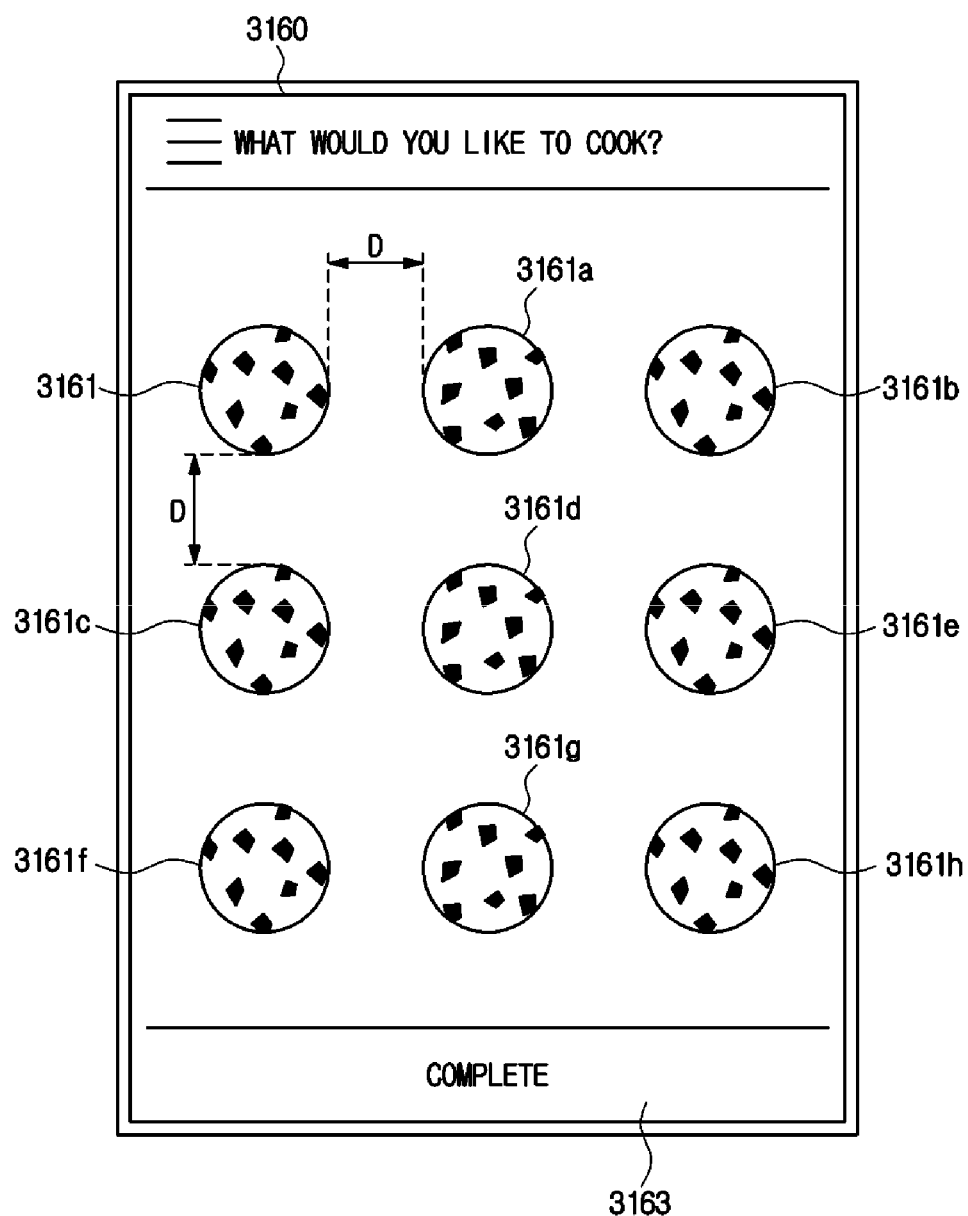

When the user touches the automatic model arrange button 3162, the controller 1010 may arrange the food models 3161 at predetermined distances D as illustrated in FIG. 70.

Particularly, the controller 1010 may calculate the available number of foods that may be placed in the cooking chamber based on width and height of the cooking chamber in which the foods may be arranged, widths of the foods, and intervals between the foods. Then, for example, the controller 1010 may copy the food model 3161 by the available number of foods arranged in the cooking chamber and arrange copied food models 3161a to 3161h in the model editing screen 3160 as illustrated in FIG. 70.

Also, the controller 1010 may calculate the available number of foods that may be arranged in the cooking chamber based on a ratio of an area where the foods may be arranged in the cooking chamber to an area of the food. Then, the controller 1010 may copy the food model 3161 and arrange the copied food models 3161a to 3161h in the model editing screen 3160 as illustrated in FIG. 70.

The controller 1110 of the user equipment 1100 may also rearrange the food model 3161 in the model editing screen 3160 in accordance with a touch input of the user.

The edited food model is stored in operation 2730.

The cooking apparatus 1000 or the user equipment 1100 may store the rearranged food model.

For example, when the user touches a complete button 3154 or 3163 included in the model editing screen 3150 or 3160, the controller 1010 of the cooking apparatus 1000 may store the rearrange food model in storage 1060.

The controller 1110 of the user equipment 1100 may also store the rearranged food model in the storage 1160.

As described above, the cooking apparatus 1000 or the user equipment 1100 may display the food model and rearrange the food model in accordance with the touch input of the user.

Figure 71:
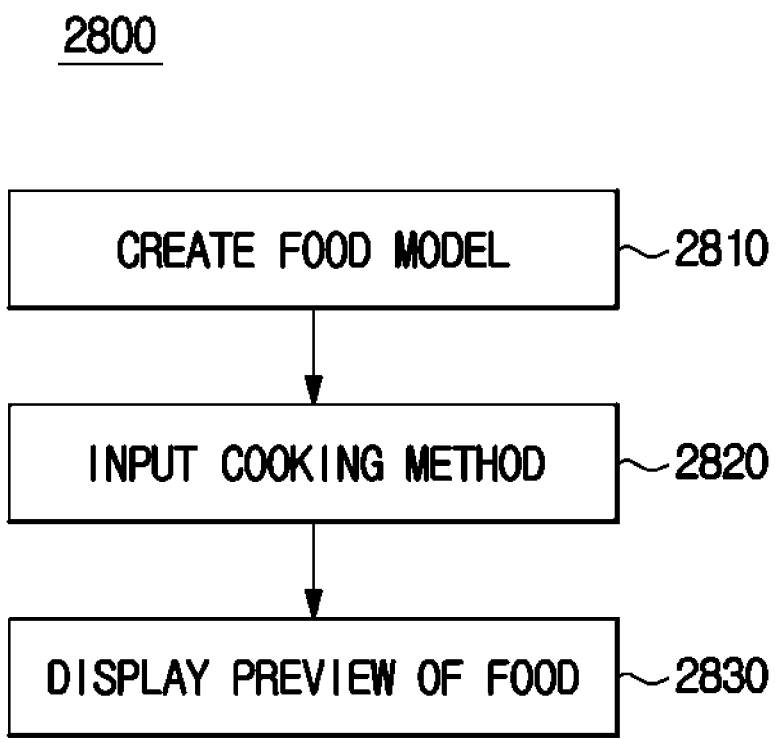
FIG. 71 illustrates a method of generating a preview of food according to an embodiment of the present disclosure.
Figure 73:
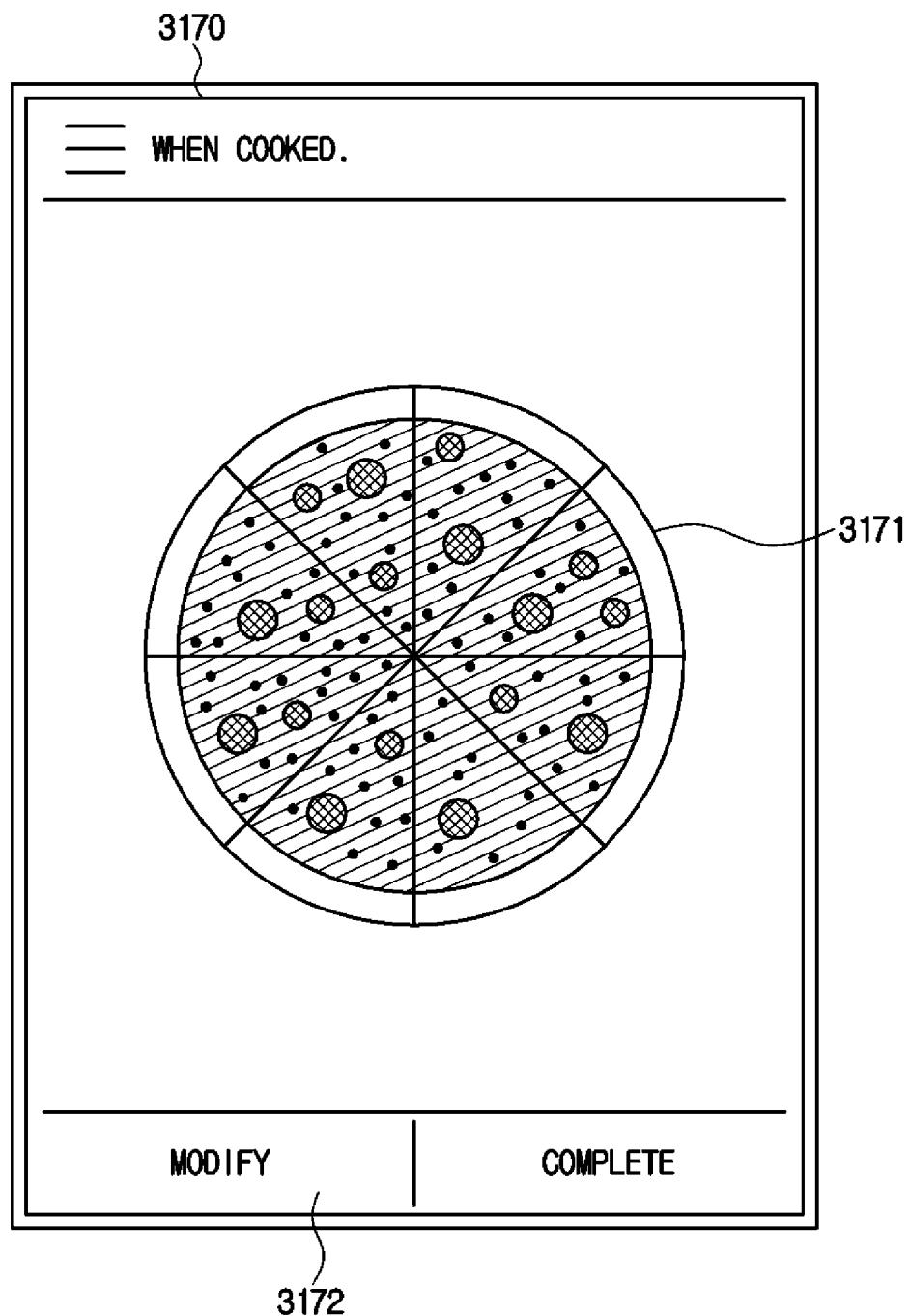
FIG. 73 illustrates an example of a preview of food according to an embodiment of the present disclosure.

FIG. 71 illustrates a method of generating a preview of food according to an embodiment of the present disclosure. FIG. 72 illustrates an example of data to generate a preview of food according to an embodiment of the present disclosure. FIG. 73 illustrates an example of a preview of food according to an embodiment of the present disclosure.

After creation of a food model is completed, the user may check a preview of cooked food.

A method of generating a preview of food (2800) will be described with reference to FIGS. 71, 72, and 73.

A food model is created in operation 2810.

The cooking apparatus 1000 or the user equipment 1100 may receive an input of a shape, thickness, ingredient, and color of food from the user and create a food model based on the shape, thickness, ingredient, and color of the food.

The cooking apparatus 1000 or the user equipment 1100 may also retrieve data on the food model stored in the storage 1060 or 1070 or receive data on the food model from an external device via the communicator 1070 or 1170.

A cooking method is input in operation 2820.

The cooking apparatus 1000 or the user equipment 1100 may receive an input of a selected heating device, a set cooking temperature, and a set cooking time from the user and set a cooking method based on the heating device, the cooking temperature, and cooking time.

The cooking apparatus 1000 or the user equipment 1100 may also retrieve data on the cooking method stored in the storage 1060 or 1070 or receive data on the cooking method from an external device via the communicator 1070 or 1170.

A preview of food is displayed in operation 2830.

The cooking apparatus 1000 or the user equipment 1100 may display a preview of food based on the food model and the cooking method. The preview of food represents an appearance of food in the case where the food is shaped by the food model and cooked according to the cooking method.

For example, the controller 1010 of the cooking apparatus 1000 may simulate heating of the food model according to the cooking method. In particular, the storage 1060 of the cooking apparatus 1000 may store a preview database to generate a preview of the food model.

The preview database may include data on changes in shapes and colors of food with respect to the ingredient and color of the food model, the heating device, the cooking temperature, and the cooking time. For example, the preview database may include changes in color of dough with respect to cooking temperature and cooking time when a convection heater is operated as illustrated in FIG. 72. Referring to FIG. 72, the color of food becomes darker as cooking temperature and cooking time increase.

The preview database may further include data on changes in shape of food with respect to cooking temperature and cooking time as well as the changes in color of food with respect to the cooking temperature and the cooking time.

The controller 1010 may estimate the shape of a cooked food based on the ingredient and color of the food model, the heating device, the cooking temperature, and the cooking time by using the preview database stored in the storage 1060 and display the estimated food shape of food on the user interface 1020.

For example, the controller 1010 may display a food preview screen 3170 as illustrated in FIG. 73. The food preview screen 3170 may include a preview of food 3171 generated based on the ingredient and color of the food model, the heating device, the cooking temperature, and the cooking time. The user may check the preview of food and modify the food model. To this end, the food preview screen 3170 may further include a modification button 3172 to modify the food model.

The controller 1110 of the user equipment 1100 may also generate a preview of food based on the ingredient and color of the food model, the heating device, the cooking temperature, and the cooking time.

As described above, the cooking apparatus 1000 or the user equipment 1100 may display the preview of food to the user.

Figure 74:
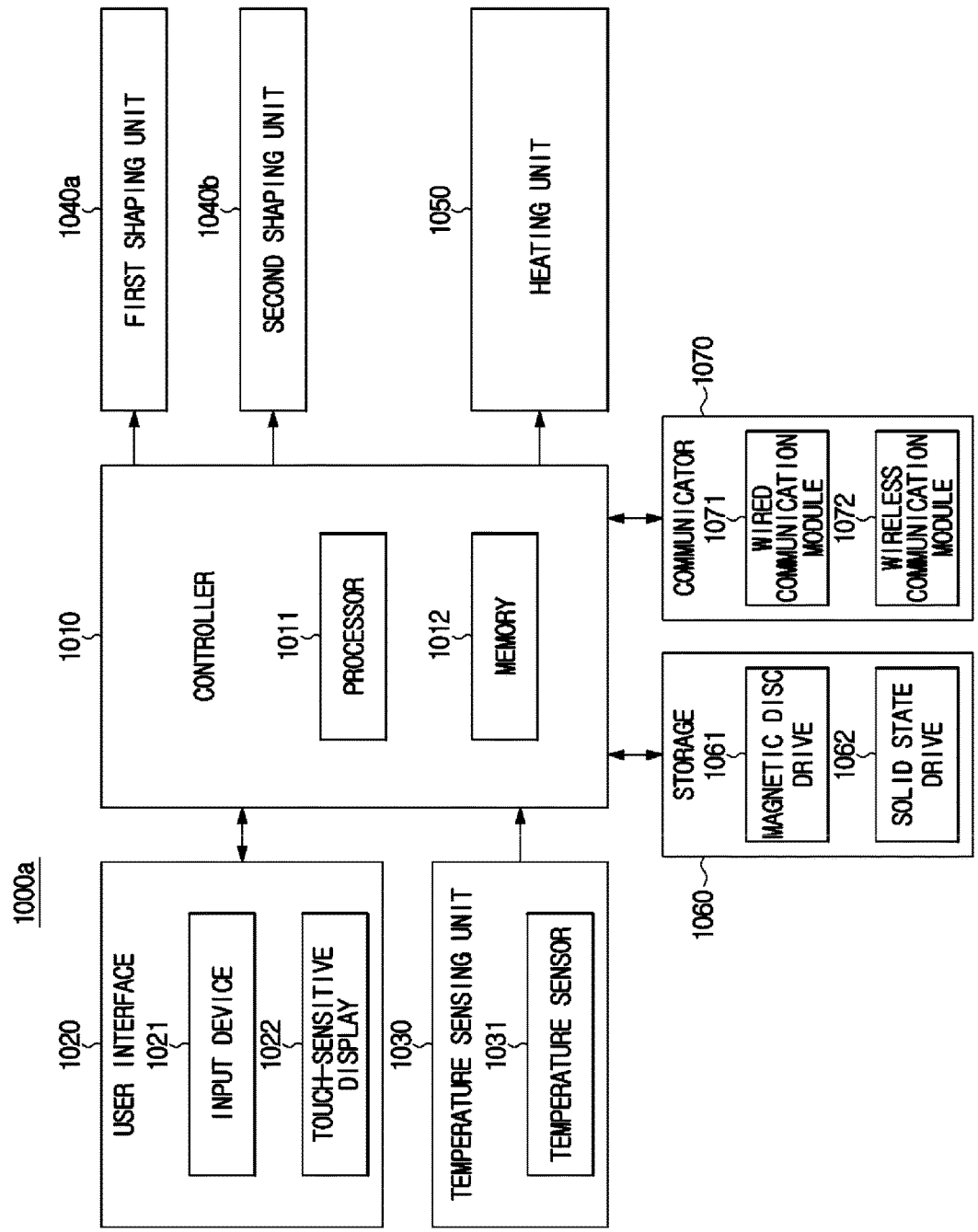
FIG. 74 is a block diagram illustrating a cooking apparatus according to an embodiment of the present disclosure.
Figure 75:
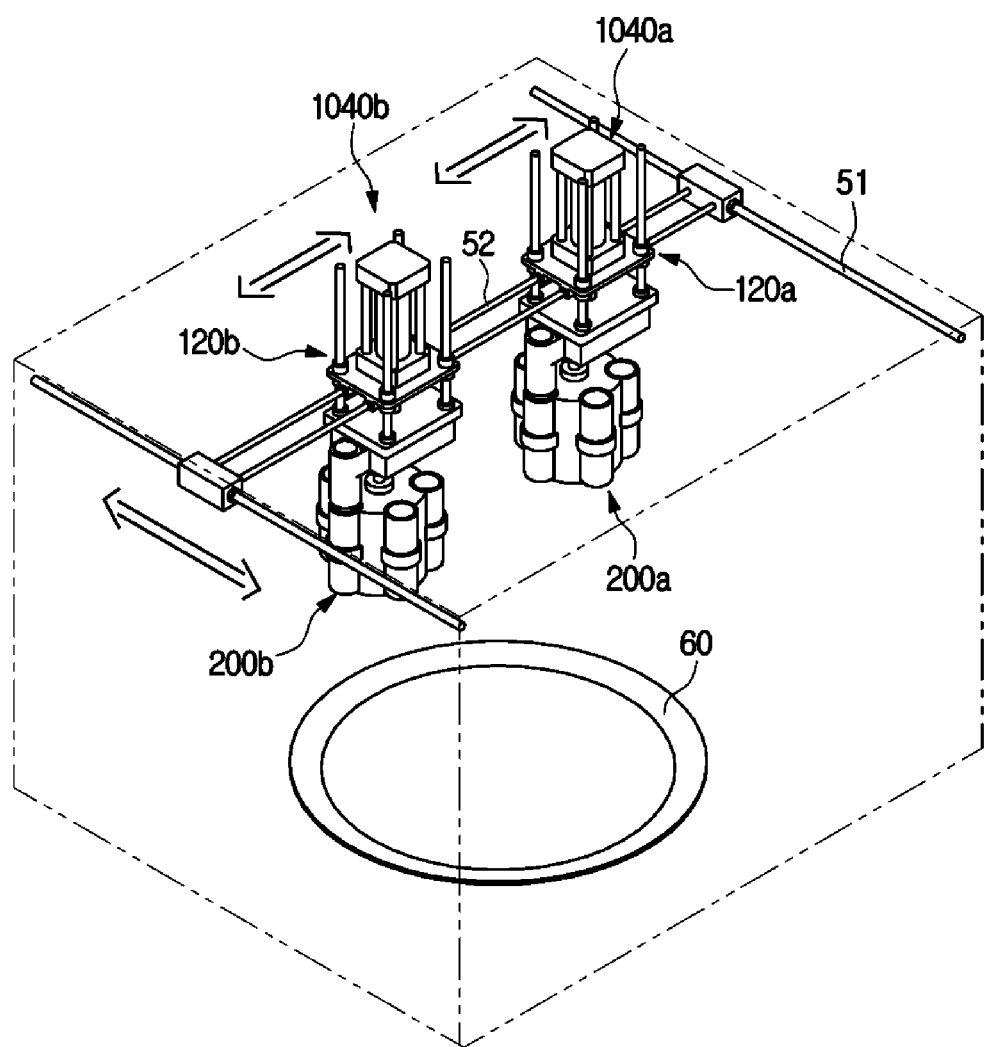
FIGS. 75, 76, and 77 illustrate examples of a shaping unit included in the cooking apparatus according to various embodiments of the present disclosure.
Figure 76:
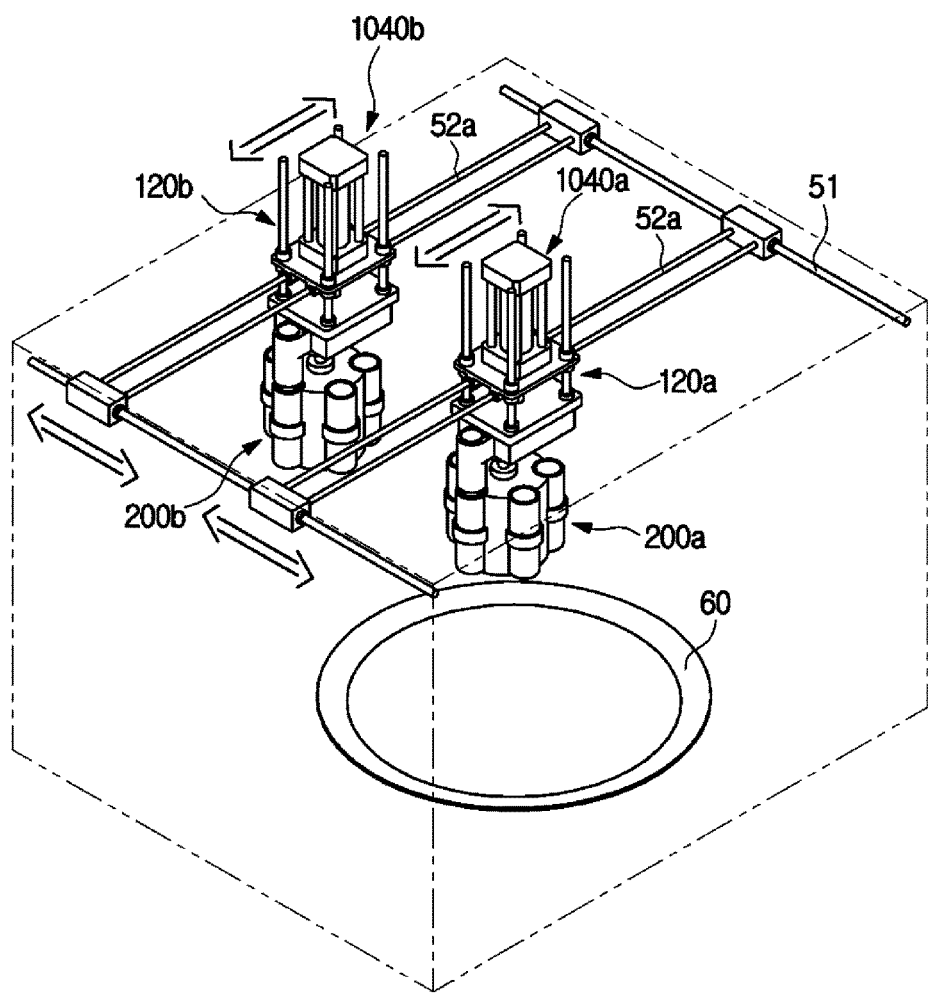
Figure 77:
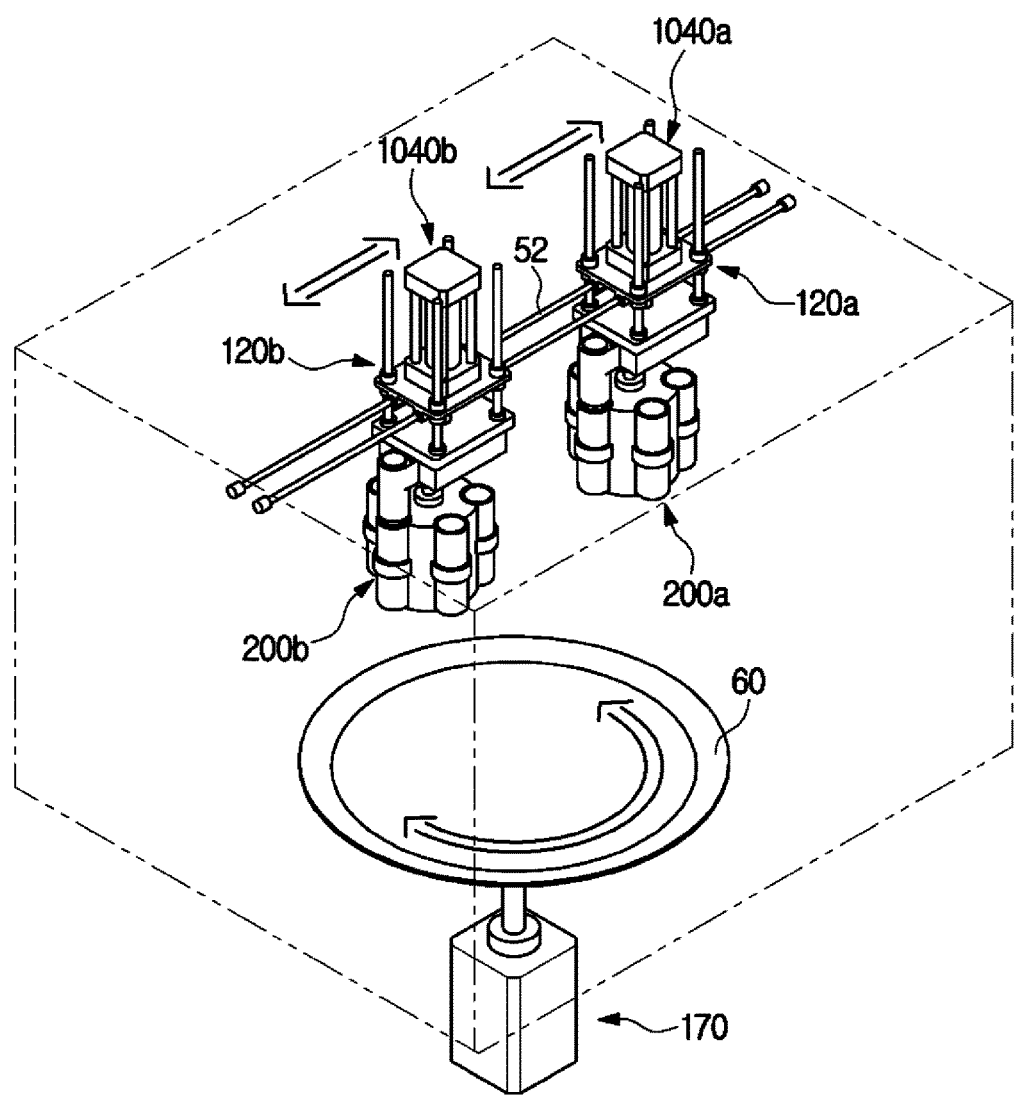

FIG. 74 is a block diagram illustrating a cooking apparatus according to an embodiment of the present disclosure. In addition, FIGS. 75, 76, and 77 illustrate examples of a shaping unit included in the cooking apparatus of the present disclosure.

In order to reduce a food shaping time, the cooking apparatus may include a plurality of shaping units.

Referring to FIGS. 74, 75, 76, and 77, a cooking apparatus 1000a may include a user interface 1020 configured to interact with a user, a temperature sensing unit 1030 configured to sense temperature of a cooking chamber, first and second shaping units (or devices) 1040a and 1040b configured to shape a food, a heating unit 1050 configured to heat the food, a storage 1060 configured to store programs and data, a communicator 1070 configured to communicate with an external device, and a controller 1010 configured to control the operation of the cooking apparatus 1000*a*.

Since the configurations and operations of the user interface 1020, the temperature sensing unit 1030, the heating unit 1050, the storage 1060, and the communicator 1070 are the same as those described above with reference to FIG. 37, detailed descriptions thereof will not be repeated.

The first and second shaping units 1040*a* and 1040*b* may each independently shape the food in accordance with a shape, ingredient, and color of food input by the user.

The first shaping unit 1040*a* may include a first cartridge assembly 200*a* and a first driving device 120*a*. The first cartridge assembly 200*a* may contain food ingredients and discharge the food ingredients according to food shaping data of the controller 1010. The first driving device 120*a* may move the first cartridge assembly 200*a* and locate the first cartridge assembly 200*a* at a predetermined position according to the food shaping data of the controller 1010.

The second shaping unit 1040*b* may include a second cartridge assembly 200*b* and a second driving device 120*b*. The second cartridge assembly 200*b* may contain food ingredients and discharge the food ingredients according to food shaping data of the controller 1010. The second driving device 120*b* may move the second cartridge assembly 200*b* and locate the second cartridge assembly 200*b* at a position preset according to the food shaping data of the controller 1010.

For example, the first shaping unit 1040*a* and the second shaping unit 1040*b* may move along the moving rods 52 disposed in the cooking apparatus 1000*a* as illustrated in FIG. 75. Also, the moving rods 52 may move along the fixed rods 51 disposed in the cooking apparatus 1000*a*.

Particularly, the first shaping unit 1040*a* may move within the right half of the moving rods 52, and the second shaping unit 1040*b* may move within the left half of the moving rods 52. As a result, the first shaping unit 1040*a* may shape the food in the right half of the cooking chamber, and the second shaping unit 1040*b* may shape the food in the left half of the cooking chamber.

As described above, the first shaping unit 1040*a* may shape the food on the basis of the right half of the food model, and the second shaping unit 1040*b* may shape the food on the basis of the left half of the food model.

As another example, the first shaping unit 1040*a* may move along first moving rods 52*a* disposed in the cooking apparatus 1000*a* and the second shaping unit 1040*b* may move along second moving rods 52*b* disposed in the cooking apparatus 1000*a* as illustrated in FIG. 76. In addition, the first moving rods 52*a* and the second moving rods 52*b* may move along the fixed rods 51.

Particularly, the first moving rods 52*a* provided with the first shaping unit 1040*a* may move within the front half of the fixed rods 51, and the second moving rods 52*b* provided with the second shaping unit 1040*b* may move within the rear half of the fixed rods 51. As a result, the first shaping unit 1040*a* may shape the food in the front half of the cooking chamber, and the second shaping unit 1040*b* may shape the food in the rear half of the cooking chamber.

As described above, the first shaping unit 1040*a* may shape the food on the basis of the front half of the food model, and the second shaping unit 1040*b* may shape the food on the basis of the rear half of the food model.

As another example, the first shaping unit 1040*a* and the second shaping unit 1040*b* may move along the fixed rods 52 disposed in the cooking apparatus 1000*a* as illustrated in FIG. 77. The fixed rods 52 are fixed in the cooking chamber. Particularly, the first shaping unit 1040*a* may move within the right half of the fixed rods 52 and the first shaping unit 1040*a* may move within the left half of the fixed rods 52.

In addition, a tray 60 on which the food is shaped may be disposed in the cooking chamber. The tray 60 may rotate by a tray rotation unit 170 (e.g., a tray rotation device).

During rotation of the tray 60, the first shaping unit 1040*a* and the second shaping unit 1040*b* may shape the food while moving to the right and to the left along the fixed rods 52.

The controller 1010 may include a processor 1011 and a memory 1012.

The processor 1011 generates food shaping data to shape the food based on the food model.

Particularly, the processor 1011 may divide the food model into a plurality of model parts and assign the plurality of model parts to the first and second shaping units 1040*a* and 1040*b*. For example, the processor 1011 may divide a food model representing one food into two model parts or divide a food model representing a plurality of foods into two model parts in accordance with the number of foods.

The processor 1011 may generate food shaping data to shape the food based on the plurality of model parts. Each of the first and second shaping units 1040*a* and 1040*b* may shape a part of the food in accordance with food shaping data of each model part.

Also, the processor 1011 may process data on the cooking method input via the user interface 1020, received via the communicator 1070, or stored in the storage 1060 and generate food heating data to heat the food by the cooking method.

The memory 1012 may store a program to receive an input of the food model and the cooking method via the user interface 1020 and a program to process data on the food model and/or data on the cooking method and generate food shaping data and/or food heating data.

As described above, the cooking apparatus 1000*a* may include the plurality of shaping units 1040*a* and 1040*b* capable of shaping the food. The plurality of shaping units 1040*a* and 1040*b* may operate independently or interwork with each other to shape the food. Accordingly, the cooking apparatus 1000*a* may shape the food more quickly.

Figure 78:
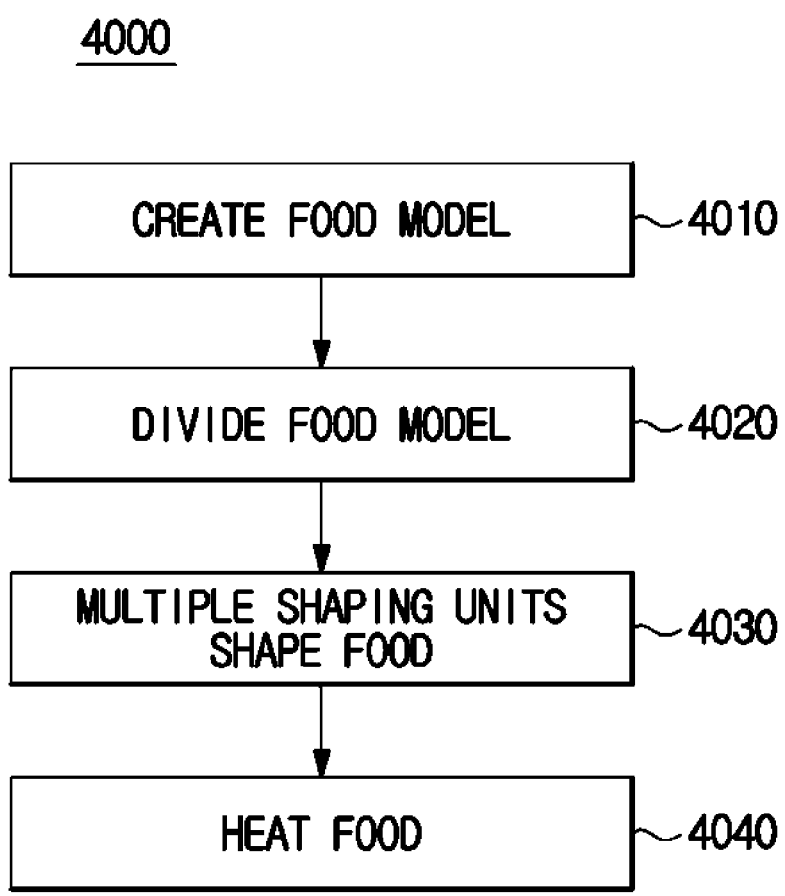
FIG. 78 illustrates a method of shaping a food according to an embodiment of the present disclosure.
Figure 79:
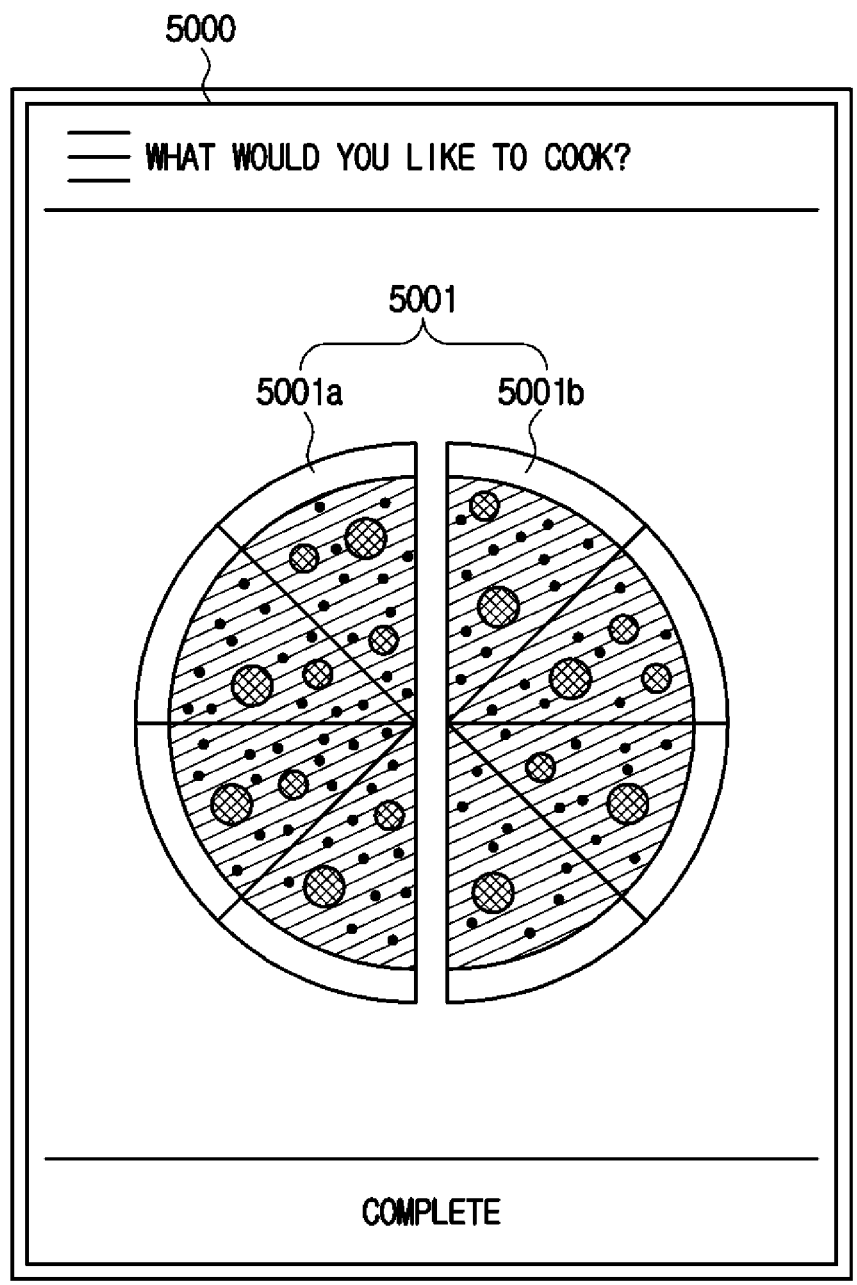
FIGS. 79 and 80 illustrate examples of dividing a food model according to various embodiments of the present disclosure.
Figure 80:
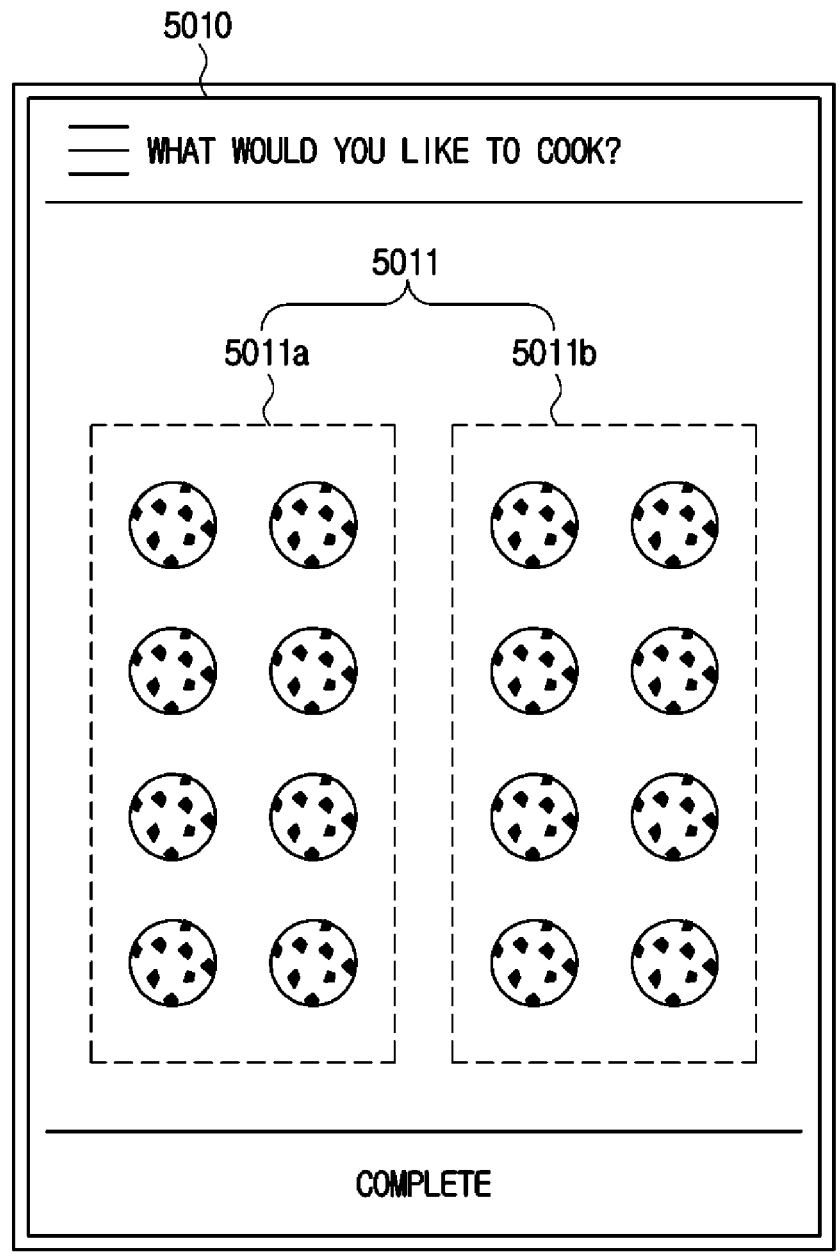

FIG. 78 illustrates a method of shaping a food according to an embodiment of the present disclosure. In addition, FIGS. 79 and 80 illustrate examples of dividing a food model according to an embodiment of the present disclosure.

A method of shaping a food (4000) will be described with reference to FIGS. 78, 79, and 80.

A food model is created in operation 4010.

The cooking apparatus 1000*a* or the user equipment 1100 may receive an input of a shape, thickness, ingredient, and color of food from the user and create a food model based on the shape, thickness, ingredient, and color of the food.

The cooking apparatus 1000*a* or the user equipment 1100 may also retrieve data on the food model stored in the storage 1060 or 1070, or receive data on the food model from an external device via the communicator 1070 or 1170.

The food model is divided in operation 4020.

The cooking apparatus 1000*a* or the user equipment 1100 may divide the food model to shape the food quickly.

The controller 1010 of the cooking apparatus 1000*a* including the first shaping unit 1040*a* and the second shaping unit 1040*b* may divide the food model into two model parts.

For example, the controller 1010 may display a model dividing screen 5000 to divide the food model on the user interface 1020 as illustrated in FIG. 79. The model dividing screen 5000 may include a food model 5001 and the food model 5001 may represent one food. Also, the food model 5001 may be divided into a first model part 5001*a* representing one part of the food and a second model part 5001*b* representing the other part of the food.

The food model 5001 may be divided into the first model part 5001*a* and the second model part 5001*b* based on size of the food. Particularly, the first model part 5001*a* and the second model part 5001*b* may have the same size.

Also, the food model 5001 may be divided into the first model part 5001*a* and the second model part 5001*b* based on ingredient. Particularly, ingredients constituting the first model part 5001*a* may be similar to each other and ingredients constituting the second model part 5001*b* may be similar to each other.

The food model 5001 may also be divided into the first model part 5001*a* and the second model part 5001*b* based on color. Particularly, colors representing the first model part 5001*a* may be similar to each other and colors representing the second model part 5001*b* may be similar to each other.

As another example, the controller 1010 may display a model dividing screen 5010 to divide the food model on the user interface 1020 as illustrated in FIG. 80. The model dividing screen 5010 may include a food model 5011 and the food model 5011 may represent a plurality of foods. The food model 5011 may be divided into a first model part 5011*a* representing some of a plurality of foods and a second model part 5011*b* representing the other of the plurality of foods.

The food model 5011 may be divided into the first model part 5011*a* and the second model part 5011*b* based on the number of foods. Particularly, the first model part 5011*a* and the second model part 5011*b* may represent the same number of foods.

Also, the food model 5011 may be divided into the first model part 5011*a* and the second model part 5011*b* based on identity of food. Particularly, a plurality of foods constituting the first model part 5011*a* may be the same and a plurality of foods constituting the second model part 5011*b* may be the same.

The controller 1110 of the user equipment 1100 may also divide the food model into a plurality of model parts and transmit the divided model parts into the cooking apparatus 1000*a* including the first shaping unit 1040*a* and the second shaping unit 1040*b*.

The food is shaped by the plurality of shaping units 1040*a* and 1040*b* in operation 4030.

The controller 1010 of the cooking apparatus 1000*a* may assign the plurality of model parts to the plurality of shaping units 1040*a* and 1040*b*. For example, the controller 1010 may assign the first model part 5001*a* to the first shaping unit 1040*a* and the second model part 5001*b* to the second shaping unit 1040*b* as illustrated in FIG. 79. Also, the controller 1010 may assign the first model part 5011*a* illustrated in FIG. 80 to the first shaping unit 1040*a* and the second model part 5011*b* to the second shaping unit 1040*b*.

Each of the shaping units 1040*a* and 1040*b* may shape a part of the food or some of the plurality of foods according to the assigned model part. For example, the first shaping unit 1040*a* may shape one part of the food (pizza) according to the first model part 5001*a* illustrated in FIG. 79 and the second shaping unit 1040*b* may shape the other part of the food (pizza) according to the second model part 5001*b*.

The food is heated in operation 4040.

The controller 1010 of the cooking apparatus 1000*a* may control the heating unit 1050 to heat the food in accordance with the cooking method. For example, one of the grill heater, the convection heater, and the microwave heater may be selected in accordance with the cooking method. Also, the selected heating device may be controlled such that the temperature of the cooking chamber is maintained at a cooking temperature during a cooking time.

As described above, the cooking apparatus 1000*a* may include a plurality of shaping units 1040*a* and 1040*b* and the plurality of shaping units 1040*a* and 1040*b* may each independently shape the food. As a result, the cooking apparatus 1000*a* may shape the food more quickly.

Figure 81:
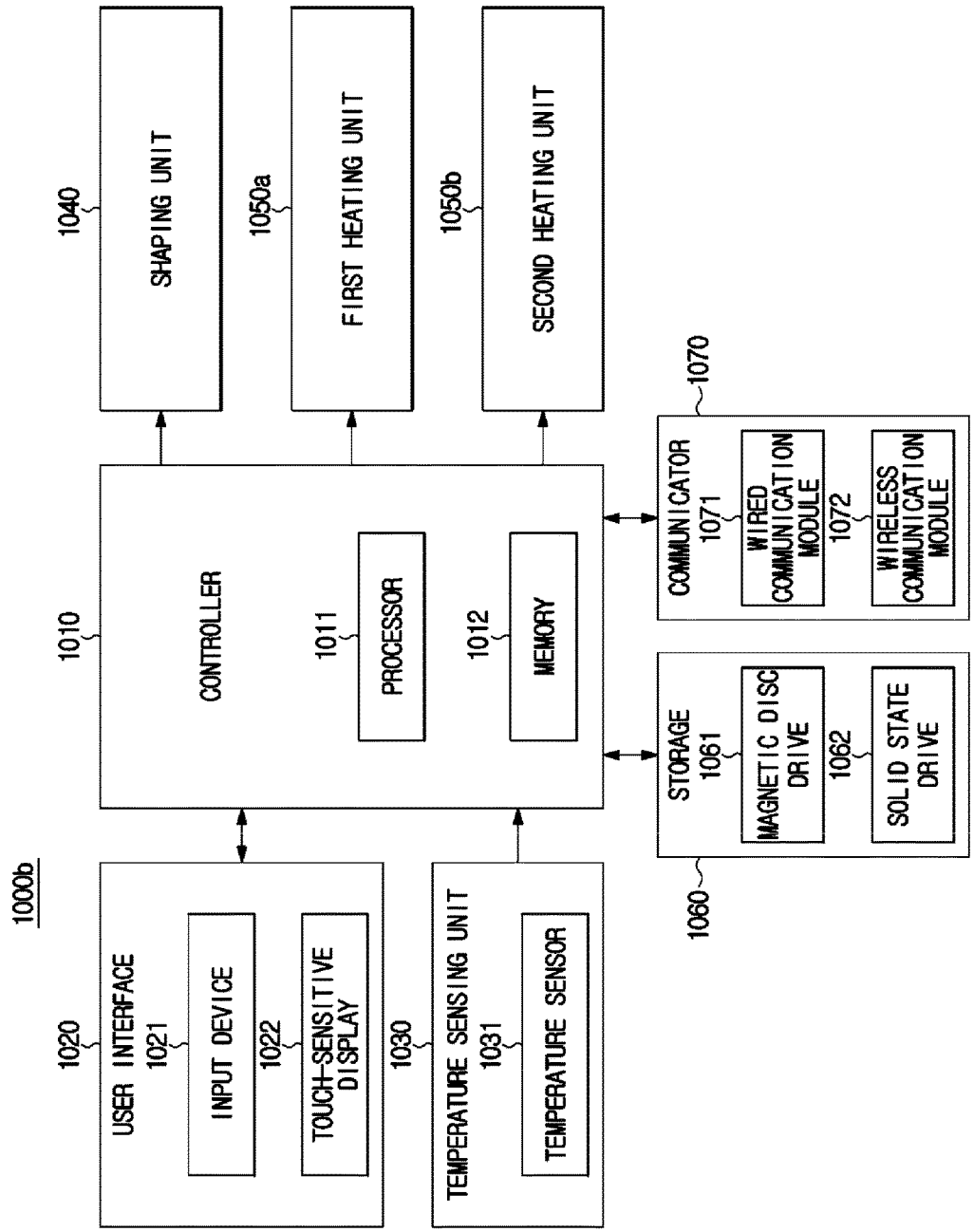
FIG. 81 is a block diagram illustrating a cooking apparatus according to an embodiment of the present disclosure.

FIG. 81 is a block diagram illustrating a cooking apparatus according to an embodiment of the present disclosure. In addition, FIG. 82 illustrates an appearance of the cooking apparatus according to an embodiment of the present disclosure.

In order to reduce a heating time of food, a cooking apparatus may include a plurality of heating units.

Figure 82:
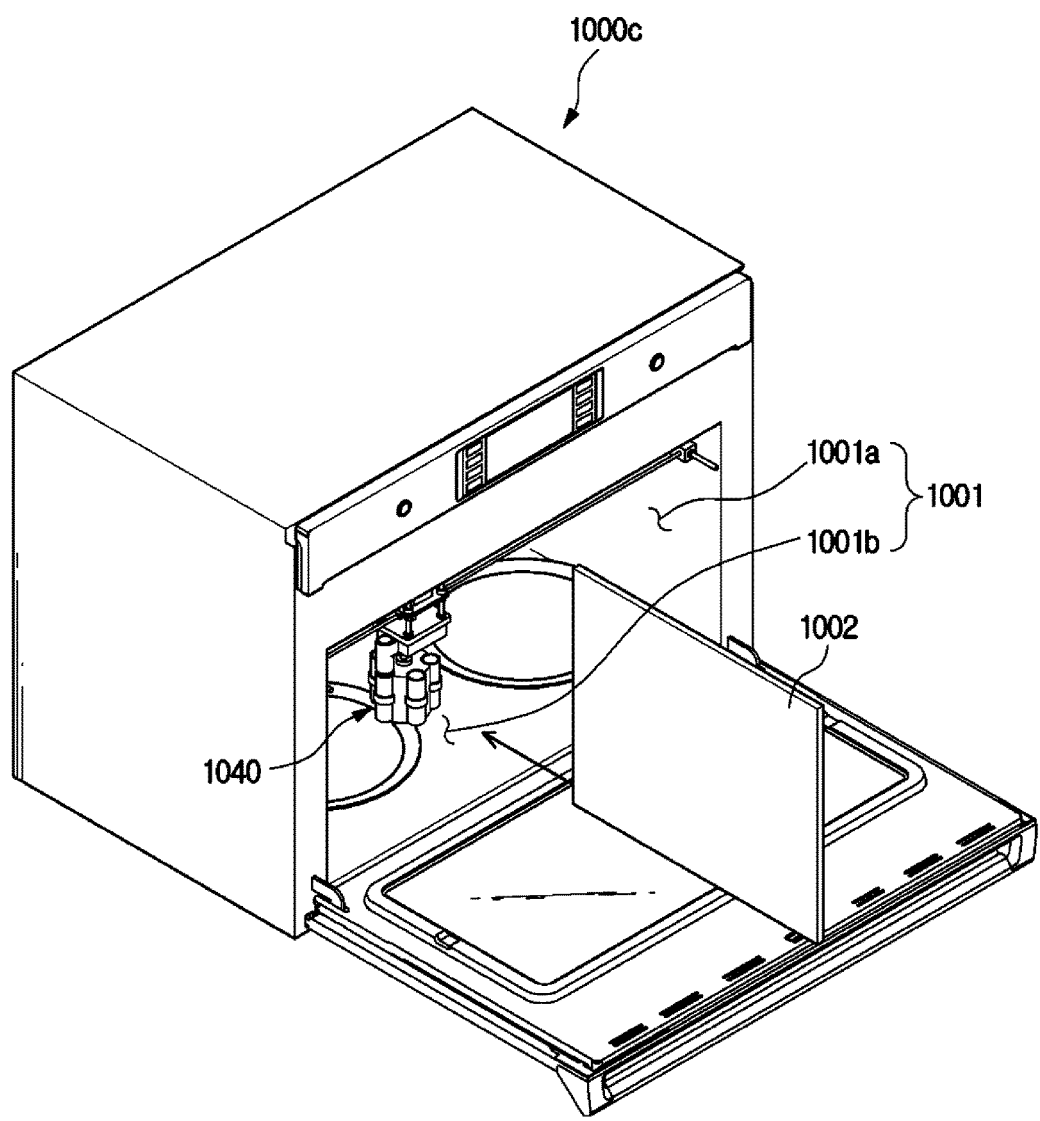
FIG. 82 illustrates an appearance of the cooking apparatus according to an embodiment of the present disclosure.

Referring to FIGS. 81 and 82, a cooking apparatus 1000*b* may include a user interface 1020 configured to interact with a user, a temperature sensing unit 1030 configured to sense temperature of a cooking chamber, a shaping unit 1040 configured to shape a food, first and second heating units or devices 1050*a* and 1050*b* configured to heat the food, a storage 1060 configured to store programs and data, a communicator 1070 configured to communicate with external devices, and a controller 1010 configured to control the operation of the cooking apparatus 1000*b*.

Since the configurations and operations of the user interface 1020, the temperature sensing unit 1030, the shaping unit 1040, the storage 1060, and the communicator 1070 are the same as those described above with reference to FIG. 37, detailed descriptions thereof will not be repeated.

Each of the first and second heating units 1050*a* and 1050 may include various heating devices. For example, each of the first and second heating units 1050*a* and 1050*b* may include a grill heater, a convection heater, a microwave heater, and the like.

In addition, the cooking chamber of the cooking apparatus 1000*b* may be partitioned by a divider. The first and second heating units 1050*a* and 1050*b* may heat foods in partitioned cooking chambers respectively. For example, the first heating unit 1050*a* may heat the food located in a first cooking chamber 1001*a* and the second heating unit 1050*b* may heat the food located in the second cooking chamber 1001*b* as illustrated in FIG. 82.

The first heating unit 1050*a* and the second heating unit 1050*b* may independently operate. The first heating unit 1050*a* and the second heating unit 1050*b* may heat the foods in different cooking methods. For example, a grill heater of the first heating unit 1050*a* may be operated to heat the food in the first cooking chamber 1001*a* and a convection heater of the second heating unit 1050*b* may be operated to heat the food in the second cooking chamber 1001*b*. A partitioning frame 1002 may be separably disposed in the internal space of the cooking apparatus 1000*c*, as illustrated in FIG. 82.

As another example, the first heating unit 1050*a* may be operated such that the temperature of the first cooking chamber 1001*a* is maintained at a first cooking temperature and the second heating unit 1050*b* may be operated such that the temperature of the second cooking chamber 1001*b* is maintained at a second cooking temperature.

As another example, the first heating unit 1050*a* may be heated for a first cooking time and the second heating unit 1050*b* may operate for a second cooking time.

The controller 1010 may include a processor 1011 and a memory 1012.

The processor 1011 may process data on the food model input via the user interface 1020, received via the communicator 1070, or stored in the storage 1060 and generate food shaping data to shape the food based on the food model.

The processor 1011 may also process data on the cooking method input via the user interface 1020, received via the communicator 1070, or stored in the storage 1060 and generate food heating data to heat the food based on the cooking method.

Particularly, the processor 1011 may divide the food model into a plurality of model parts and assign the food shaped according to the plurality of model parts to the first and second heating units 1050a and 1050b. For example, the processor 1011 may divide a food model representing one food into two model parts or divide a food model representing a plurality of foods into two model parts in accordance with the number of foods.

The processor 1011 may generate food heating data to heat the plurality of model parts respectively. Each of the first and second heating units 1050a and 1050b may heat a part of the food in accordance with the food heating data for each model part.

The memory 1012 may store a program to receive an input of the food model and the cooking method via the user interface 1020 and a program to process data on the food model and/or data on the cooking method and generate food shaping data and/or food heating data.

As described above, the cooking apparatus 1000b may include the plurality of heating units 1050a and 1050b capable of heating the food. The plurality of heating units 1050a and 1050b may operate independently or interwork with each other to heat the food. Accordingly, the cooking apparatus 1000b may heat the food more quickly.

Figure 83:
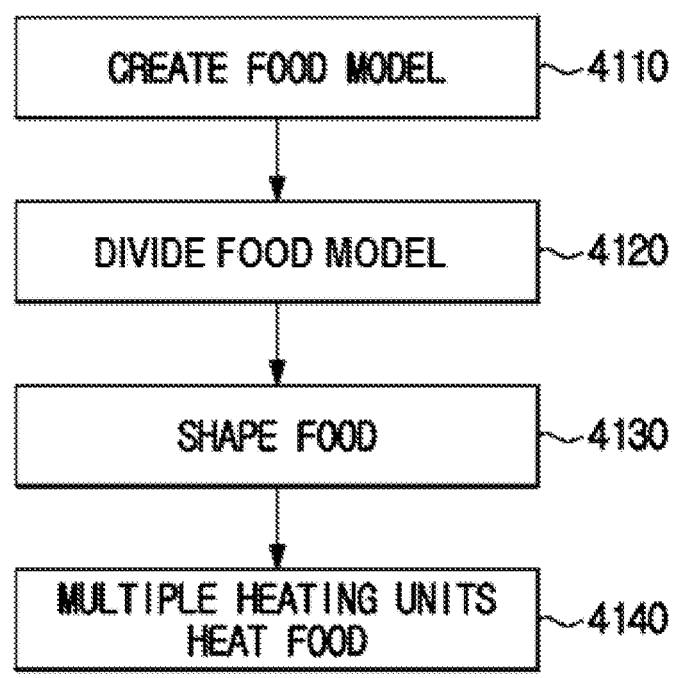
FIG. 83 illustrates a method of shaping a food according to an embodiment of the present disclosure.
Figure 84:
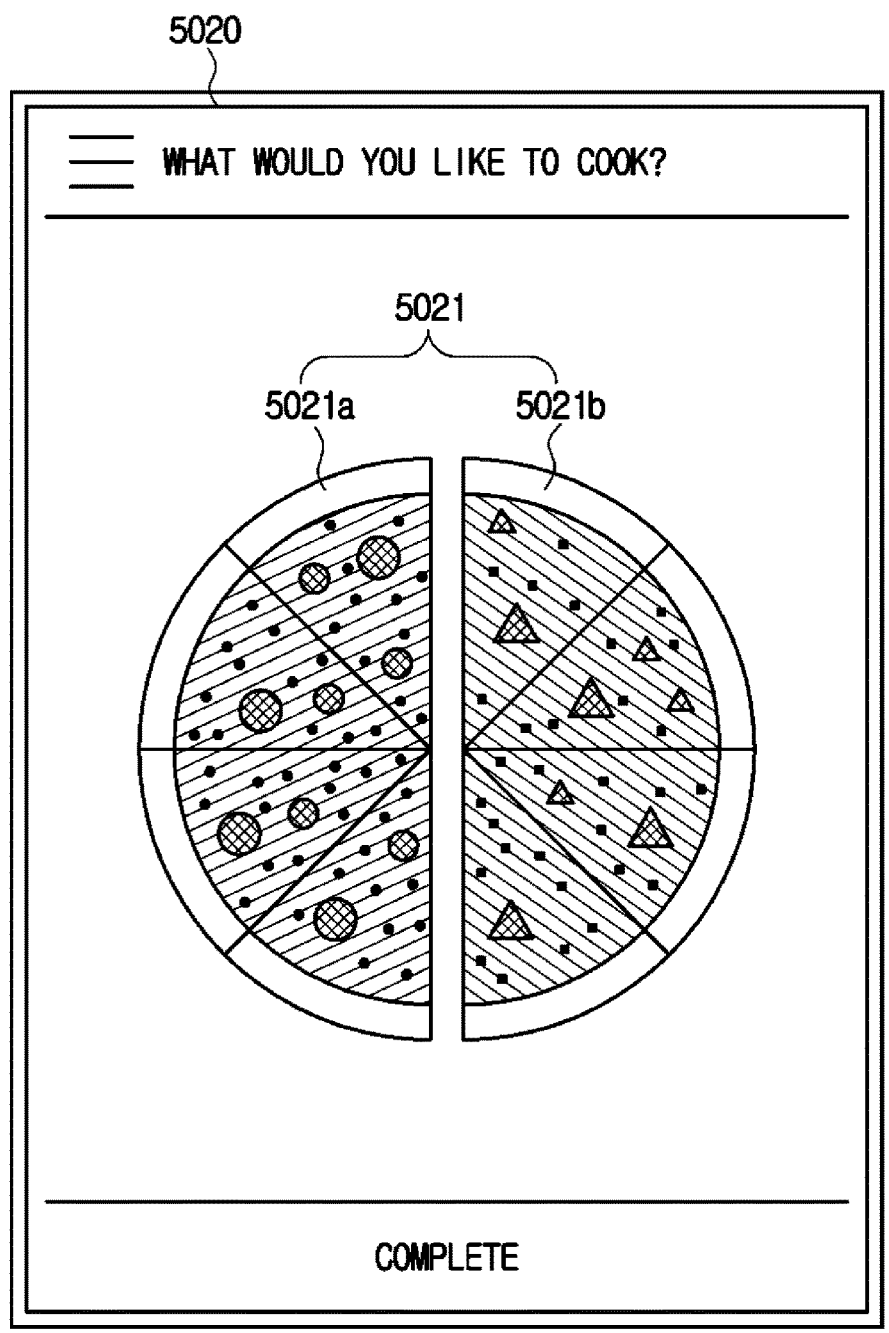
FIGS. 84 and 85 illustrate examples of dividing a food model according to various embodiments of the present disclosure.
Figure 85:
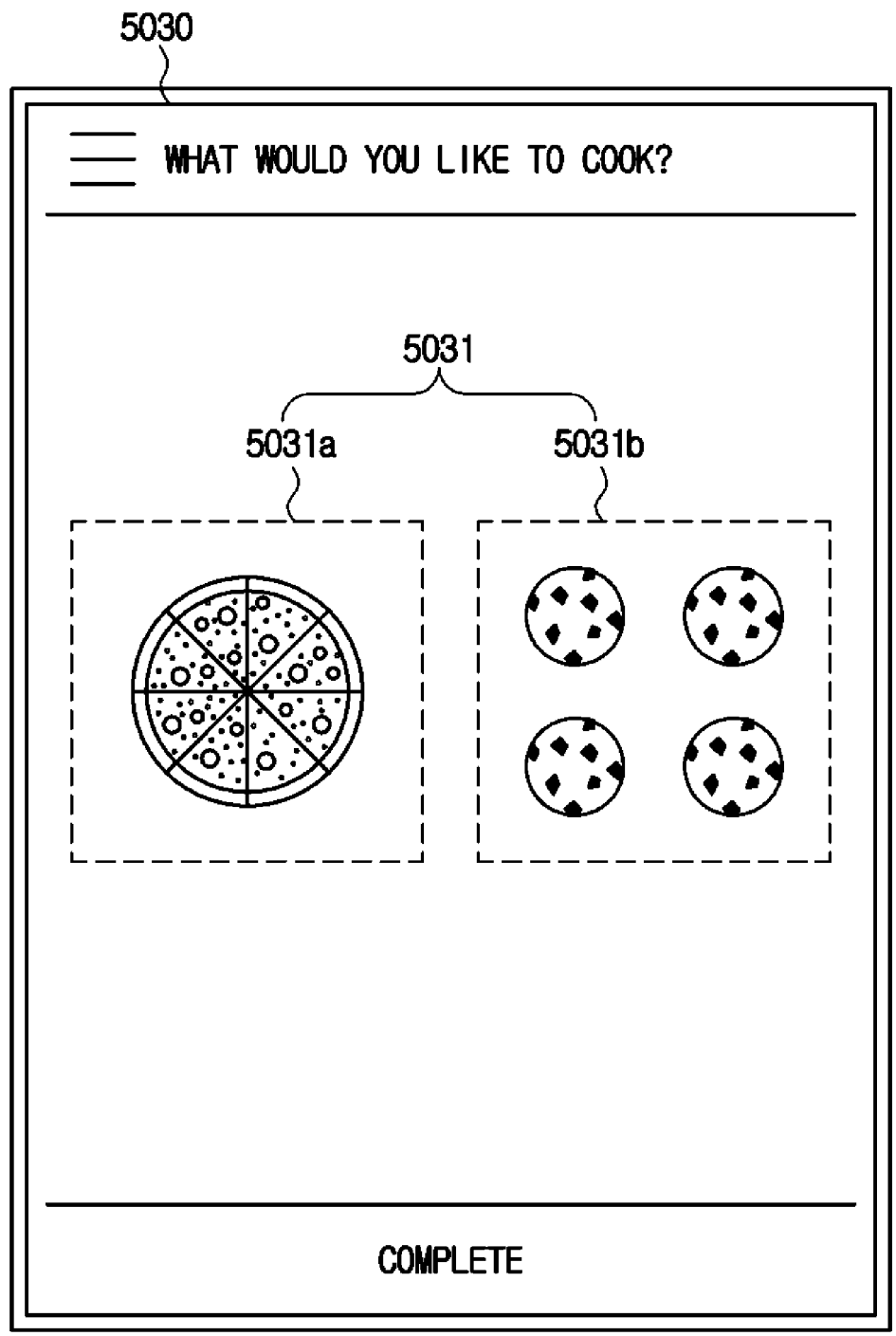

FIG. 83 illustrates a method of shaping a food according to an embodiment of the present disclosure. In addition, FIGS. 84 and 85 illustrate examples of dividing a food model according to various embodiments of the present disclosure.

A method of shaping a food (4100) will be described with reference to FIGS. 83, 84, and 85.

A food model is created in operation 4110.

The cooking apparatus 1000b or the user equipment 1100 may receive an input of a shape, thickness, ingredient, and color of food from the user and create a food model based on the shape, thickness, ingredient, and color of the food.

The cooking apparatus 1000b or the user equipment 1100 may also retrieve data on the food model stored in the storage 1060 or 1070, or receive data on the food model from an external device via the communicator 1070 or 1170.

The food model is divided in operation 4120.

The cooking apparatus 1000b or the user equipment 1100 may divide the food model to shape the food quickly.

The controller 1010 of the cooking apparatus 1000b including the first heating unit 1050a and the second heating unit 1050b may divide the food model into two model parts.

For example, the controller 1010 may display a model dividing screen 5020 to divide the food model on the user interface 1020 as illustrated in FIG. 84. The model dividing screen 5020 may include a food model 5021 and the food model 5021 may represent one food. The food model 5021 may also be divided into a first model part 5021a representing one part of the food and a second model part 5021b representing the other part of the food.

The food model 5021 may be divided into the first model part 5021a and the second model part 5021b based on the heating method. For example, one part of the food corresponding to the first model part 5021a may be heated by a grill heater of the first heating unit 1050a and the other part of the food corresponding to the second model part 5021b may be heated by a convection heater of the second heating unit 1050b.

The food model 5021 may also be divided into the first model part 5021a and the second model part 5021b based on cooking temperature. For example, one part of the food corresponding to the first model part 5021a may be heated at 100° C. and the other part of the food corresponding to the second model part 5021b may be heated at 120° C.

The food model 5021 may be divided into the first model part 5021a and the second model part 5021b according to cooking time. For example, one part of the food corresponding to the first model part 5021a may be heated for 30 minutes and the other part of the food corresponding to the second model part 5021b may be heated for 40 minutes.

As another example, the controller 1010 may display a model dividing screen 5030 to divide the food model on the user interface 1020 as illustrated in FIG. 85. The model dividing screen 5030 may include a food model 5031 and the food model 5031 may represent a plurality of foods. The food model 5031 may be divided in to a first model part 5031a representing some of the foods and a second model part 5031b representing the other of the foods.

The food model 5031 may be divided into the first model part 5021a and the second model part 5021b according to at least one of the heating method, cooking temperature, and cooking time.

The controller 1110 of the user equipment 1100 may also divide the food model into a plurality of model parts and transmit the divided model parts into the cooking apparatus 1000b including the first heating unit 1050a and the second heating unit 1050b.

The food is shaped in operation 4130.

The controller 1010 of the cooking apparatus 1000b may control the shaping unit 1040 to shape the food in accordance with the plurality of model parts.

The shaping unit 1040 may shape different model parts respectively in different cooking chambers 1001a and 1001b. For example, the shaping unit 1040 may shape the food corresponding to the first model part 5021a or 5031a in the first cooking chamber 1001a and the food corresponding to the second model part 5021b or 5031b in the second cooking chamber 1001b.

The food is heated by the plurality of heating units 1050a and 1050b in operation 4140.

The controller 1010 of the cooking apparatus 1000b may control the plurality of heating units 1050a and 1050b to heat the food.

The plurality of heating units 1050a and 1050b may heat the food according to a plurality of cooking methods respectively. The first heating unit 1050a may heat the food shaped in the first cooking chamber 1001a according to the cooking method for the first model part 5021a or 5031a. For example, the grill heater of the first heating unit 1050a may be operated at 100° C. for 30 minutes to heat the food in the first cooking chamber 1001a.

Also, the second heating unit 1050b may heat the food shaped in the second cooking chamber 1001b according to the cooking method for the second model part 5021b or 5031b. For example, the convection heater of the second heating unit 1050b may be operated at 120° C. for 40 minutes to heat the food in the second cooking chamber 1001b.

As described above, the cooking apparatus 1000b may include a plurality of heating units 1050a and 1050b. The plurality of heating units 1050a and 1050b may each independently heat the food. As a result, the cooking apparatus 1000*a* may heat the food more quickly.

Figure 86:
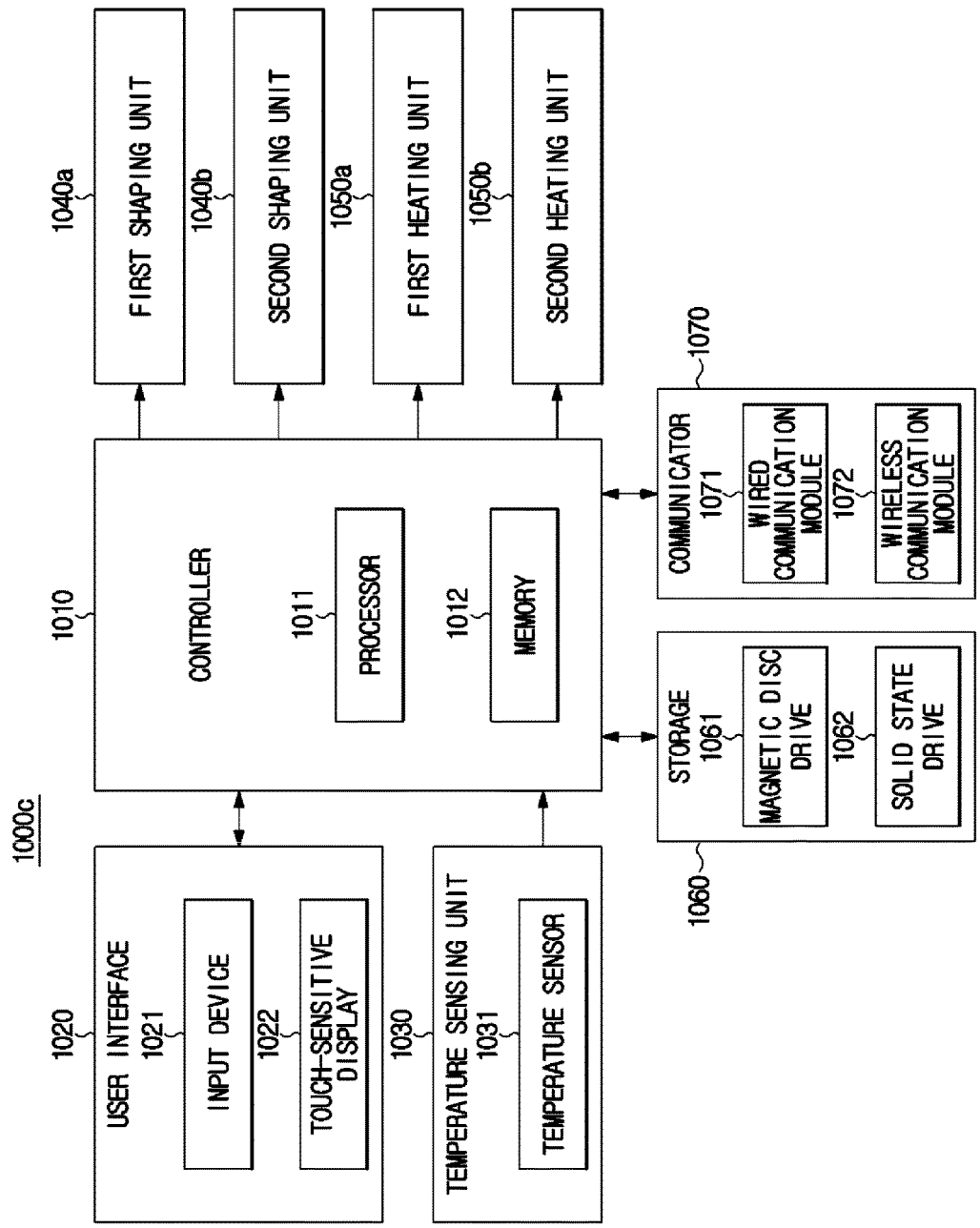
FIG. 86 is a block diagram illustrating a cooking apparatus according to an embodiment of the present disclosure.

FIG. 86 is a block diagram illustrating a cooking apparatus according to an embodiment of the present disclosure. In addition, FIG. 87 illustrates an appearance of the cooking apparatus according to an embodiment of the present disclosure.

In order to reduce a heating time of food, a cooking apparatus may include a plurality of shaping unit and a plurality of heating units.

Figure 87:
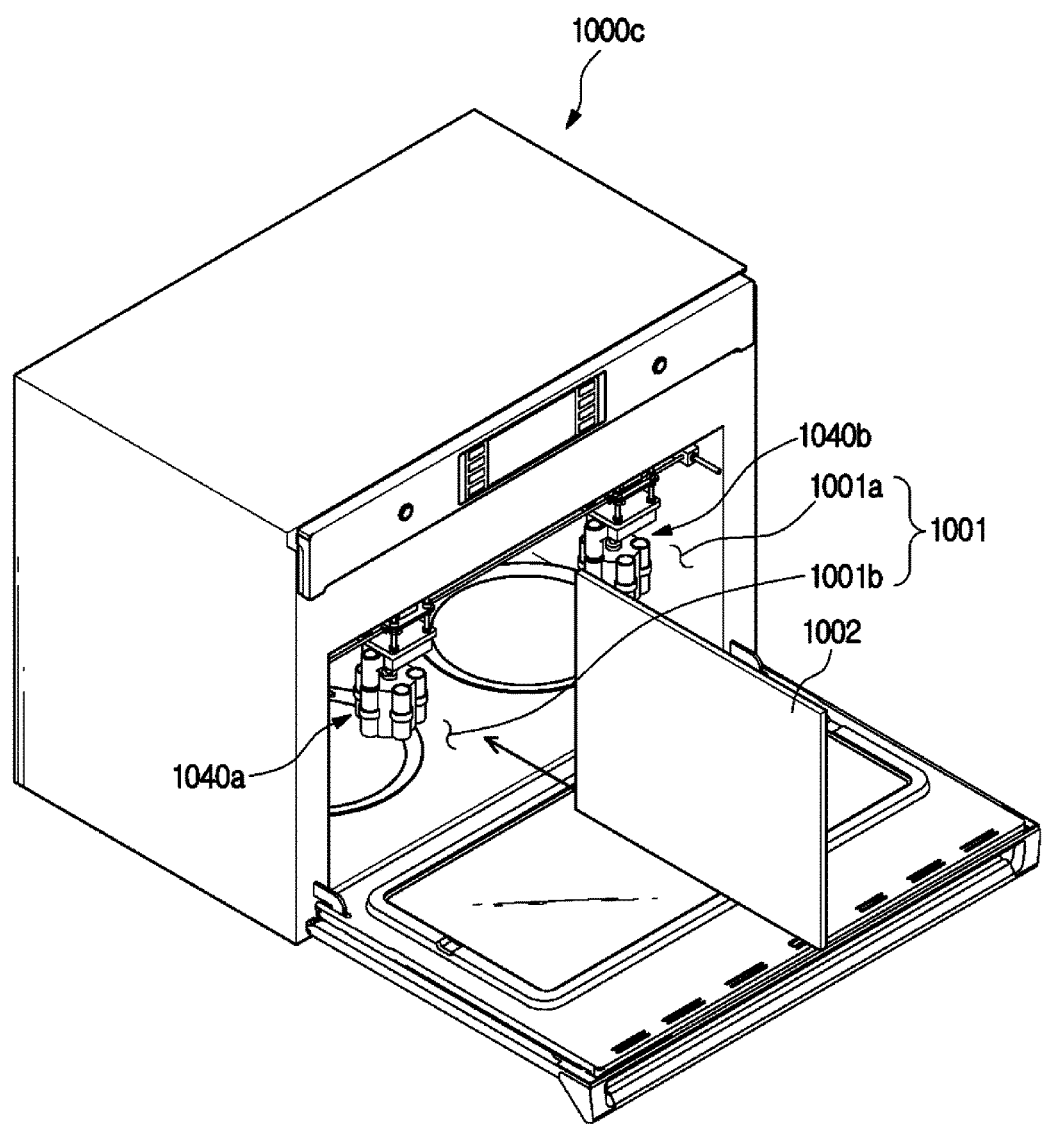
FIG. 87 illustrates an appearance of the cooking apparatus according to an embodiment of the present disclosure.

Referring to FIGS. 86 and 87, a cooking apparatus 1000*c* may include a user interface 1020 configured to interact with a user, a temperature sensing unit 1030 configured to sense temperature of a cooking chamber, first and second shaping units 1040*a* and 1040*b* configured to shape a food, first and second heating units 1050*a* and 1050*b* configured to heat the food, a storage 1060 configured to store programs and data, a communicator 1070 configured to communicate with external devices, and a controller 1010 configured to control the operation of the cooking apparatus 1000*c*. A partitioning frame 1002 may be separably disposed in the internal space of the cooking apparatus 1000*c* as illustrated in FIG. 87.

Since the configurations and operations of the user interface 1020, the temperature sensing unit 1030, the storage 1060, and the communicator 1070 are the same as those described above with reference to FIG. 37, detailed descriptions thereof will not be repeated.

The first and second shaping units 1040*a* and 1040*b* may each independently shape the food in accordance with a shape, ingredient, and color of food input by the user. The first shaping unit 1040*a* may include a first cartridge assembly 200*a* and a first driving device 120*a*. The second shaping unit 1040*b* may include a second cartridge assembly 200*b* and a second driving device 120*b*.

In addition, the cooking chamber of the cooking apparatus 1000*c* may be partitioned by a divider. The first and second shaping units 1040*a* and 1040*b* may shape foods in partitioned cooking chambers respectively. For example, the first shaping unit 1040*a* may be disposed in the first cooking chamber 1001*a* and shape the food in the first cooking chamber 1001*a* and the second shaping unit 1040*b* may be disposed in the second cooking chamber 1001*b* and shape the food in the second cooking chamber 1001*b* as illustrated in FIG. 87.

Each of the first and second heating units 1050*a* and 1050*b* may include various heating devices. For example, the first and second heating units 1050*a* and 1050*b* may respectively include a grill heater, a convection heater, a microwave heater, and the like.

In addition, the first and second heating units 1050*a* and 1050*b* may each independently heat foods respectively disposed in the divided cooking chambers. For example, the first heating unit 1050*a* may heat the food disposed in the first cooking chamber 1001*a* and the second heating unit 1050*b* may heat the food disposed in the second cooking chamber 1001*b* as illustrated in FIG. 87.

The controller 1010 may include a processor 1011 and a memory 1012.

Particularly, the processor 1011 may divide the food model into a plurality of model parts and assign the plurality of model parts to the first and second shaping units 1040*a* and 1040*b*. The processor 1011 may generate food shaping data to shape the food based on the plurality of model parts. The processor 1011 may also generate food heating data to heat each of the plurality of model parts and each of the first and second heating units 1050*a* and 1050*b* may heat a part of food in accordance with food heating data for each model part.

The memory 1012 may store a program to receive an input of the food model and the cooking method via the user interface 1020 and a program to process data on the food model and/or data on the cooking method and generate food shaping data and/or food heating data.

As described above, the cooking apparatus 1000*c* may include the plurality of shaping units 1040*a* and 1040*b* capable of shaping the food and the plurality of heating units 1050*a* and 1050*b* capable of heating the food. Thus, the cooking apparatus 1000*c* may shape and heat the food more quickly.

Figure 88:
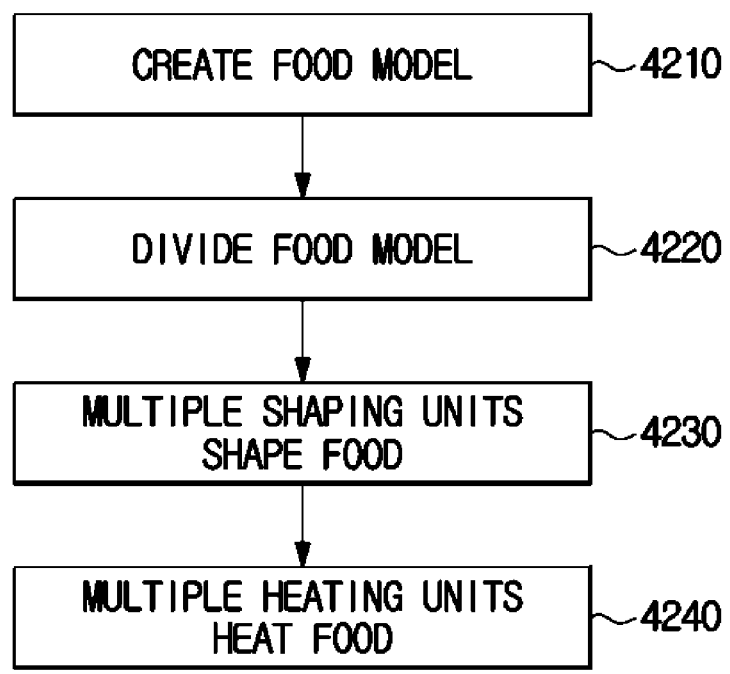
FIG. 88 illustrates a method of shaping a food according to an embodiment of the present disclosure.

FIG. 88 illustrates a method of shaping a food according to an embodiment of the present disclosure.

A method of shaping a food (4200) will be described with reference to FIG. 88.

A food model is created in operation 4210.

The cooking apparatus 1000*c* or the user equipment 1100 may receive an input of a shape, thickness, ingredient, and color of food from the user and create a food model based on the shape, thickness, ingredient, and color of the food.

The cooking apparatus 1000*c* or the user equipment 1100 may also retrieve data on the food model stored in the storage 1060 or 1070 or receive data on the food model from an external device via the communicator 1070 or 1170.

The food model is divided in operation 4220.

The cooking apparatus 1000*c* or the user equipment 1100 may divide the food model to shape the food quickly.

The controller 1010 of the cooking apparatus 1000*c* including the first and second shaping units 1040*a* and 1040*b* and the first and second heating units 1050*a* and 1050*b* may divide the food model into two model parts.

The food model may be divided into a first model part and a second model part according to various criteria. For example, the food model may be divided into the first model part and the second model part according to at least one of the shape (size), ingredient, and color of the food. As another example, the food model may be divided into the first model part and the second model part according to at least one of the heating method, cooking temperature, and cooking time.

The food is shaped by the plurality of shaping units 1040*a* and 1040*b* in operation 4230.

The controller 1010 of the cooking apparatus 1000*c* may assign the plurality of model parts to the plurality of shaping units 1040*a* and 1040*b*. Each of the shaping units 1040*a* and 1040*b* may shape a part of the food or some of the plurality of foods according to the assigned model part.

The food is heated by the plurality of heating units 1050*a* and 1050*b* in operation 4240.

The controller 1010 of the cooking apparatus 1000*c* may control the plurality of heating units 1050*a* and 1050*b* to heat the food. The plurality of heating units 1050*a* and 1050*b* may heat the food according to a plurality of cooking methods respectively.

As described above, the cooking apparatus 1000*c* may include a plurality of shaping units 1040*a* and 1040*b* and a plurality of heating units 1050*a* and 1050*b*. As a result, the cooking apparatus 1000*c* may shape the food and heat the food more quickly.

The methods of shaping/heating the food according to the food model by using a single cooking apparatus have been described above. Hereinafter, a method of shaping/heating a food according to a food model by a plurality of cooking apparatuses will be described.

Figure 89:
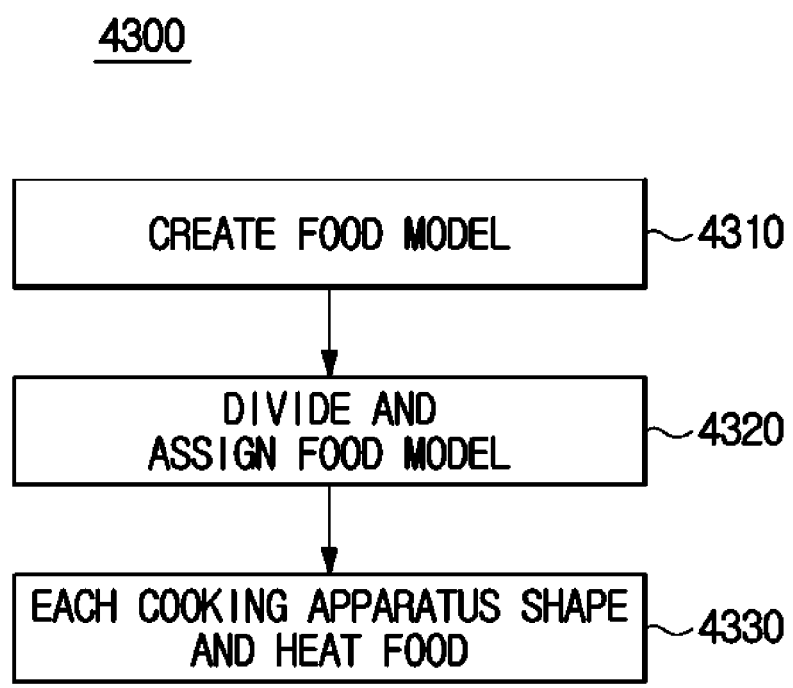
FIG. 89 illustrates an example of a method of cooking a food by a cooking system according to an embodiment of the present disclosure.
Figure 90:
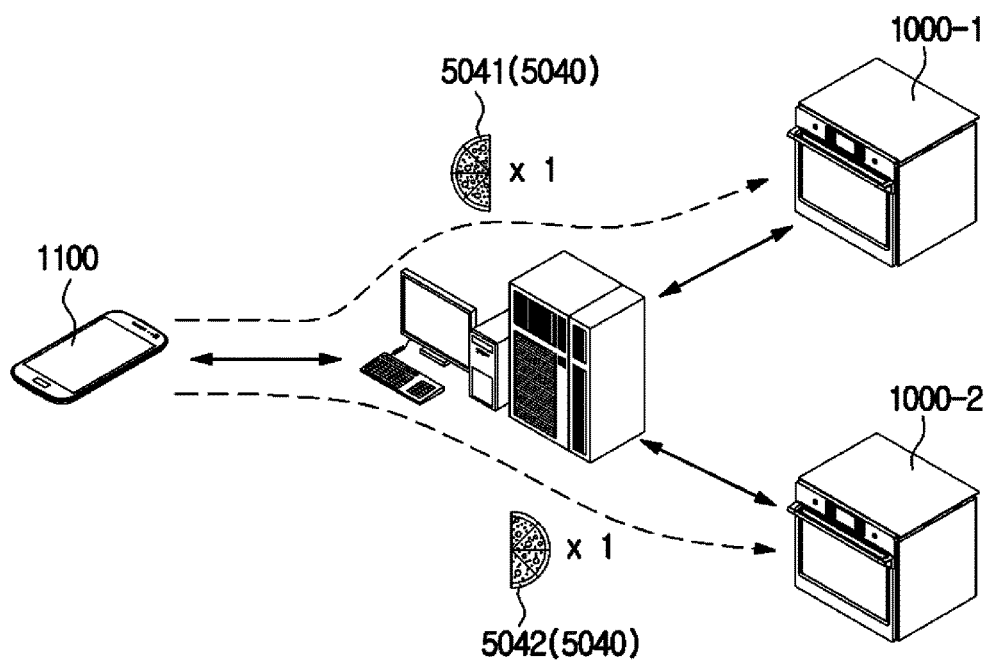
FIG. 90 illustrates an example of assigning a food model by the cooking system according to an embodiment of the present disclosure.
Figure 91:
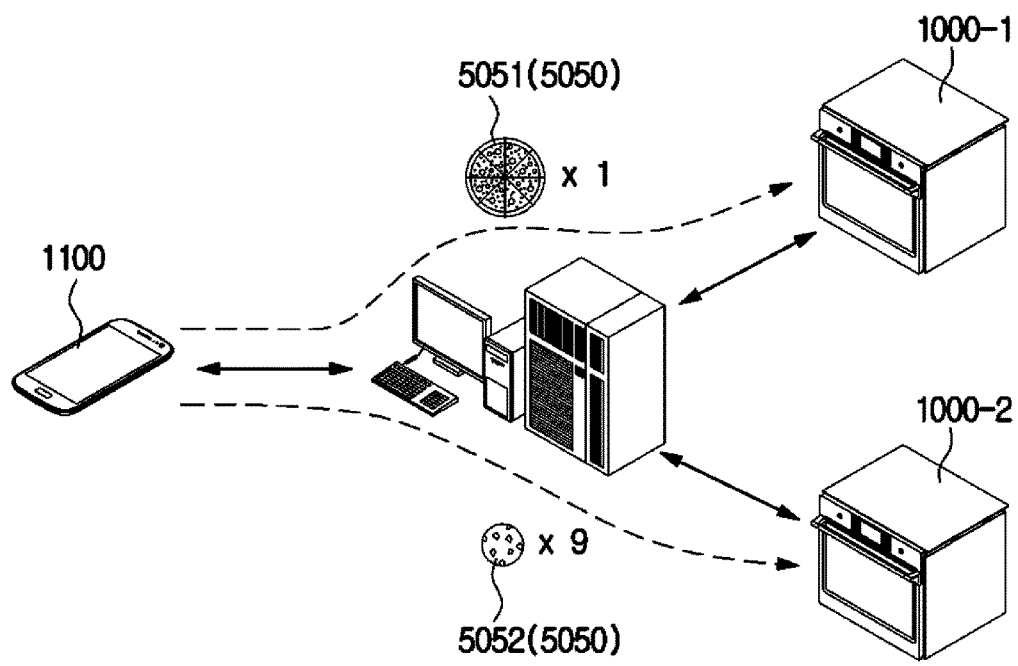
FIG. 91 illustrates another example of assigning the food model by the cooking system according to an embodiment of the present disclosure.

FIG. 89 illustrates an example of a method of cooking a food by a cooking system according to an embodiment of the present disclosure. FIG. 90 illustrates an example of assigning a food model by the cooking system according to an embodiment of the present disclosure. FIG. 91 illustrates another example of assigning the food model by the cooking system according to an embodiment of the present disclosure.

In a cooking system including a plurality of cooking apparatuses and a user equipment, a food model may be assigned to the plurality of cooking apparatuses. Also, each of the plurality of cooking apparatuses may shape/heat a food.

A method of cooking a food (4300) will be described with reference to FIGS. 89, 90, and 91.

A food model is created in operation 4310.

The user equipment 1100 may receive an input of a shape, thickness, ingredient, and color of food from the user and create a food model based on the shape, thickness, ingredient, and color of the food. The user equipment 1100 may also retrieve data on the food model stored in the storage or receive data on the food model from an external device via the communicator.

One of the plurality of cooking apparatuses 1000-1 and 1000-2 may create the food model. A detailed method of creating the food model may be the same as that of the user equipment 1100.

The food model is divided and assigned to the plurality of cooking apparatuses in operation 4320.

The user equipment 1100 may divide the food model to shape the food more quickly. The food model may be divided according to the number of the cooking apparatuses 1000-1 and 1000-2. The user equipment 1100 may assign a plurality of model parts divided from the food model to the plurality of cooking apparatuses 1000-1 and 1000-2. The user equipment 1100 may also transmit data on the assigned model parts to the plurality of cooking apparatuses 1000-1 and 1000-2 respectively.

For example, the user equipment 1100 may divide a food model 5040 representing one food into a first model part 5041 representing one part of the food and a second model part 5042 representing the other part of the food.

The food model 5040 may be divided into the first model part 5041 and the second model part 5042 according to various criteria. The food model 5040 may be divided into the first model part 5041 and the second model part 5042 according to at least one of the shape (size), ingredient, and color of the food.

The user equipment 1100 may transmit the first model part 5041 to the first cooking apparatus 1000-1 and the second model part 5042 to the second cooking apparatus 1000-2 as illustrated in FIG. 90.

Also, while transmitting the first and second model parts 5041 and 5042 respectively to the first and second cooking apparatuses 1000-1 and 1000-2, the user equipment 1100 may simultaneously transmit cooking methods for the first and second model parts 5041 and 5042 respectively to the first and second cooking apparatuses 1000-1 and 1000-2.

Since the first and second model parts 5041 and 5042 represent parts of one food, the cooking methods for the first and second model parts 5041 and 5042 may be the same. Thus, the user equipment 1100 may transmit the same cooking method to both the first cooking apparatus 1000-1 and the second cooking apparatus 1000-2.

As another example, the user equipment 1100 may divide a food model 5050 representing a plurality of foods into a first model part 5051 representing some of the foods and a second mode part 5052 representing the other of the foods.

The food model 5050 may be divided into the first model part 5051 and the second model part 5052 according to various criteria. The food model 5050 may be divided into the first model part 5051 and the second model part 5052 according to at least one of the heating method, cooking temperature, and cooking time.

In addition, the user equipment 1100 may transmit the first model part 5041 to the first cooking apparatus 1000-1 and the second model part 5052 to the second cooking apparatus 1000-2 as illustrated in FIG. 91.

Also, while transmitting the first and second model parts 5051 and 5052 respectively to the first and second cooking apparatuses 1000-1 and 1000-2, the user equipment 1100 may simultaneously transmit cooking methods for the first and second model parts 5041 and 5052 to the first and second cooking apparatuses 1000-1 and 1000-2.

Since the first and second model parts 5041 and 5042 represent different foods, the cooking methods for the first and second model parts 5041 and 5042 may be different. Thus, the user equipment 1100 may transmit different cooking methods to the first cooking apparatus 1000-1 and the second cooking apparatus 1000-2.

One of the plurality of cooking apparatuses 1000-1 and 1000-2 may divide the food model and assign the divided model parts to the plurality of cooking apparatuses 1000-1 and 1000-2. Detailed division and assignment methods are the same as those of the user equipment 1000.

The food is shaped and heated by the plurality of cooking apparatuses 1000-1 and 1000-2 in operation 4330.

Each of the plurality of cooking apparatuses 1000-1 and 1000-2 may shape and heat the food in accordance with the model part and cooking method received from the user equipment 1100.

For example, the first cooking apparatus 1000-1 may shape one part of the food according to the received first model part 5041 and heat the part of the food according to the cooking method for the first model part 5041. Also, the second cooking apparatus 1000-2 may shape one part of the food according to the received second model part 5042 and heat the part of the food according to the cooking method for the second model part 5042.

Since the first and second model parts 5041 and 5042 represent parts of one food, the food cooked by the first cooking apparatus 1000-1 may be the same as the food cooked by the second cooking apparatus 1000-2. Also, the food cooked by the first cooking apparatus 1000-1 and the food cooked by the second cooking apparatus 1000-2 may constitute one food.

As another example, the first cooking apparatus 1000-1 may shape one part of the food according to the received first model part 5051 and heat the part according to a first cooking method for the first model part 5051. Also, the second cooking apparatus 1000-2 may shape the other part of the food according to the received second model part 5052 and heat the part according to a second cooking method for the second model part 5052.

Since the first model part 5041 and the second model part 5042 represent different foods, the food cooked by the first cooking apparatus 1000-1 may be different from the food cooked by the second cooking apparatus 1000-2.

As described above, the food model may be divided into the plurality of model parts and the plurality of model parts may be assigned to the plurality of cooking apparatuses. In addition, each of the plurality of cooking apparatuses may shape and heat the food according to the assigned model part. As a result, the user may cook one food or a plurality of foods more quickly by using the plurality of cooking apparatuses.

Figure 92:
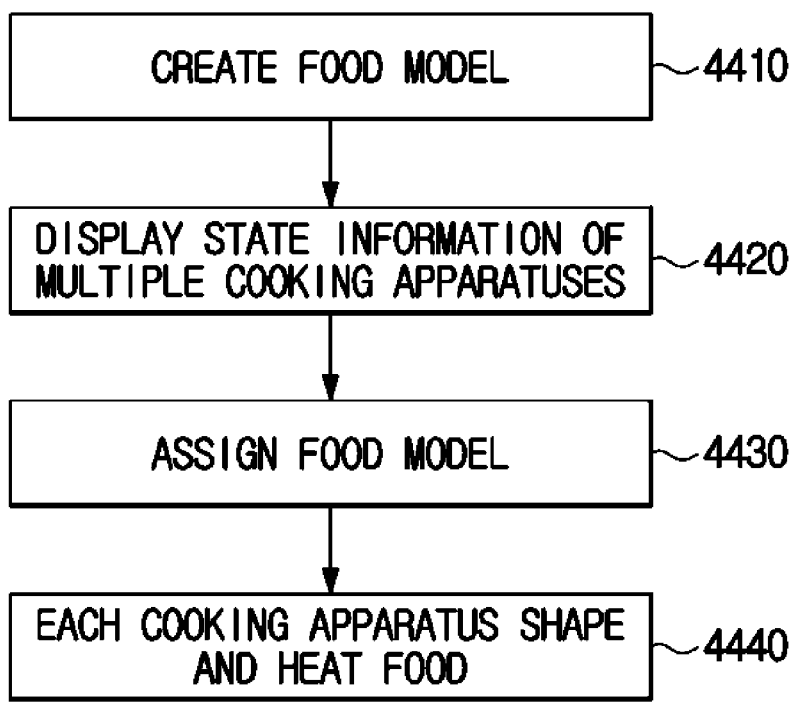
FIG. 92 illustrates another example of the method of cooking a food by the cooking system according to an embodiment of the present disclosure.
Figure 93:
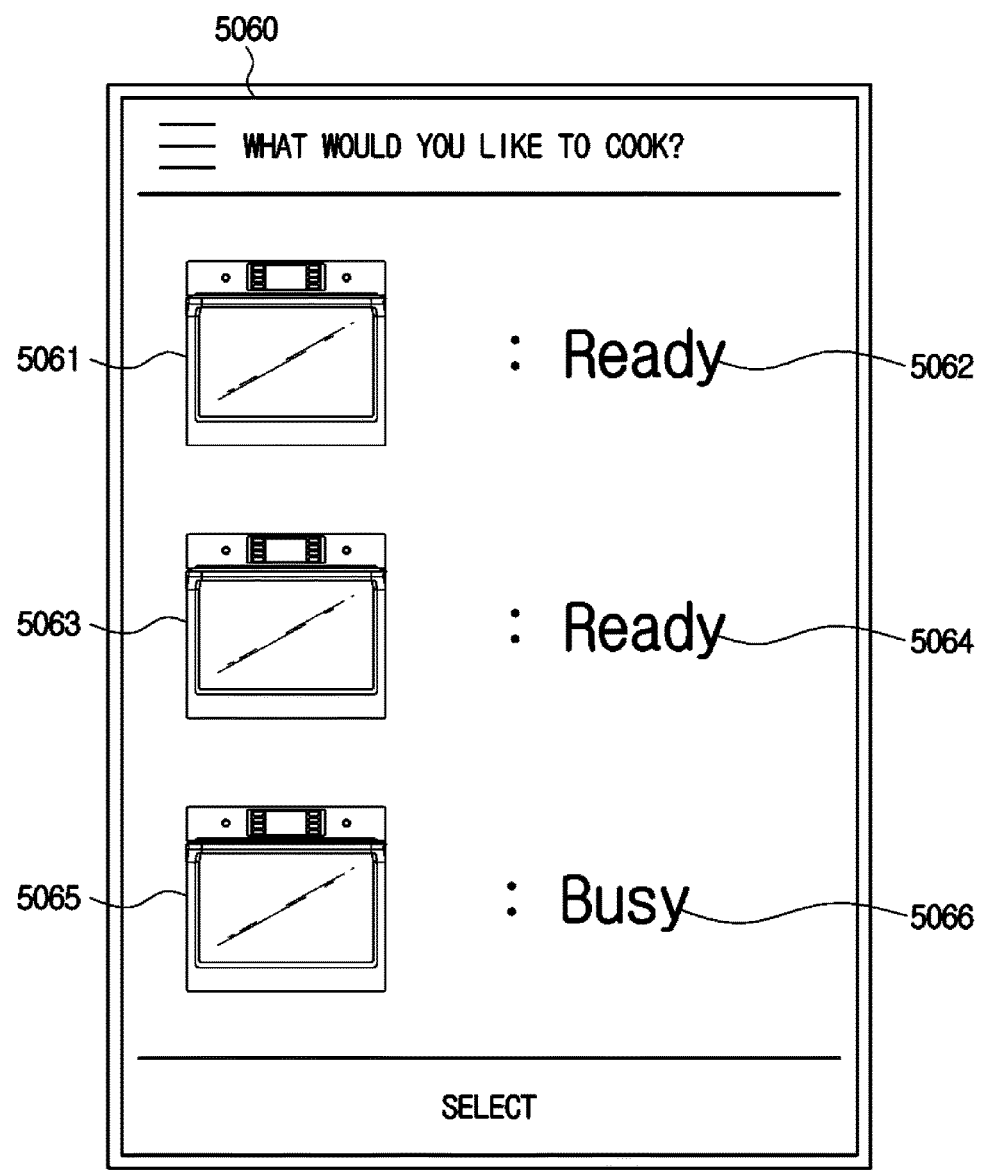
FIGS. 93 and 94 illustrate examples of a model dividing screen to divide a food model by the cooking system according to various embodiments of the present disclosure.
Figure 94:
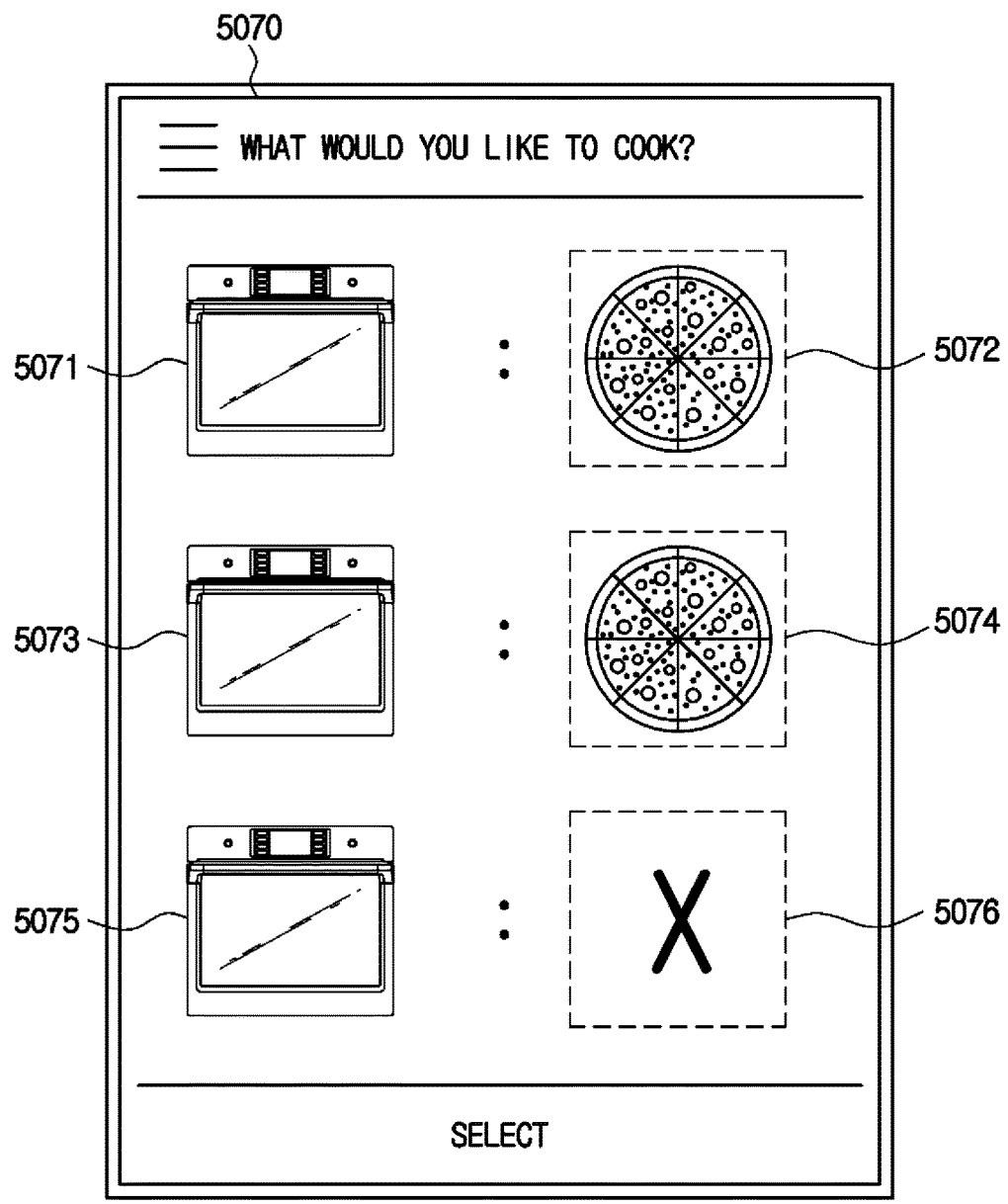
Figure 95:
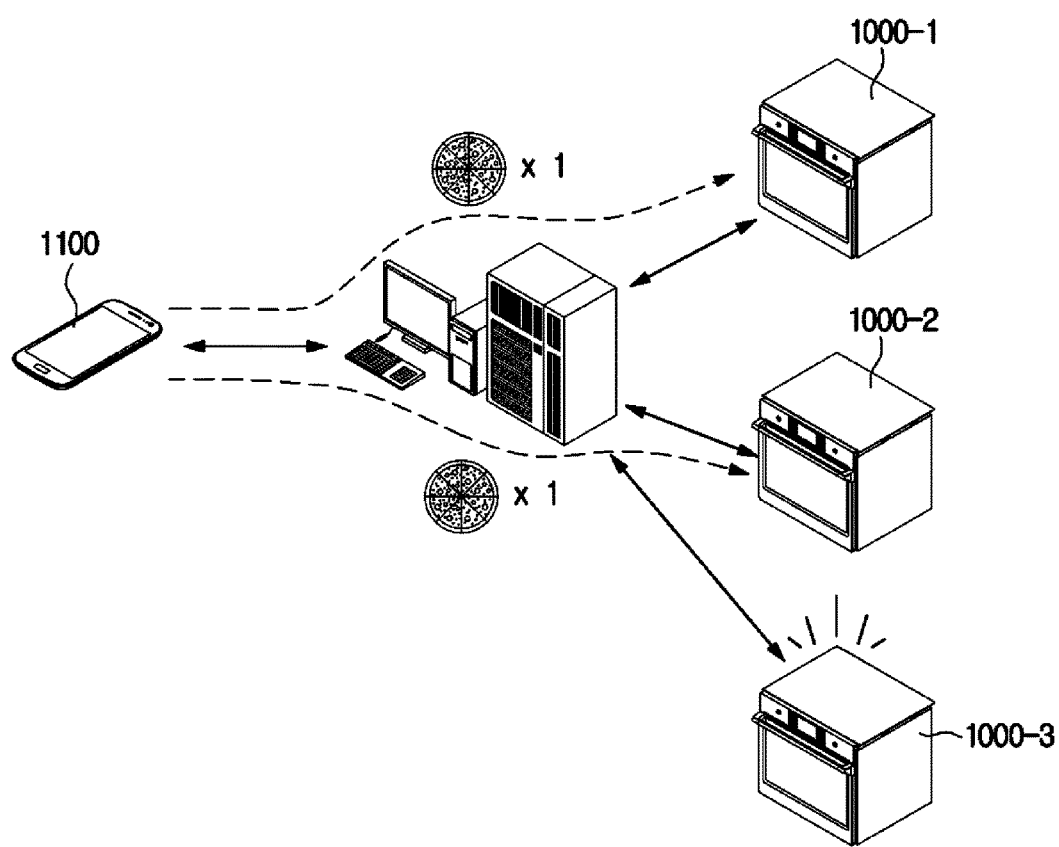
FIG. 95 illustrates an example of dividing a food model by the cooking system according to an embodiment of the present disclosure.

FIG. 92 illustrates another example of the method of cooking a food by the cooking system according to an embodiment of the present disclosure. FIGS. 93 and 94 illustrate examples of a model dividing screen to divide a food model by the cooking system according to various embodiments of the present disclosure. In addition, FIG. 95 illustrates an example of dividing a food model by the cooking system according to an embodiment of the present disclosure.

In a cooking system including a plurality of cooking apparatuses and a user equipment, a food model may be assigned to a plurality of cooking apparatuses according to operating states of the cooking apparatuses.

A method of cooking a food (4400) will be described with reference to FIGS. 92, 93, 94, and 95.

A food model is created in operation 4410.

The user equipment 1100 may receive an input of a shape, thickness, ingredient, and color of food from the user and create a food model based on the shape, thickness, ingredient, and color of the food. The user equipment 1100 may also retrieve data on the food model stored in the storage or receive data on the food model from an external device via the communicator.

One of a plurality of cooking apparatuses 1000-1, 1000-2, and 1000-3 may create a food model. A detailed method of creating the food model may be the same as that of the user equipment 1100.

State information of the plurality of cooking apparatuses 1000-1, 1000-2, and 1000-3 is displayed in operation 4420.

The user equipment 1100 may receive state information of the plurality of cooking apparatuses 1000-1, 1000-2, and 1000-3 from the plurality of cooking apparatuses 1000-1, 1000-2, and 1000-3.

For example, the controller 1110 of the user equipment 1100 may request the plurality of cooking apparatuses 1000-1, 1000-2, and 1000-3 for state information thereof via the communicator 1170. In response to the request of the user equipment 1100, the plurality of cooking apparatuses 1000-1, 1000-2, and 1000-3 may transmit the state information to the user equipment 1100. The state information transmitted by the plurality of cooking apparatuses 1000-1, 1000-2, and 1000-3 may include information on whether or not the cooking apparatus is malfunctioning, information on whether or not the cooking apparatus is operating, a remaining cooking time until the cooking operation is completed, and the like.

The user equipment 1100 may display the state information of the plurality of cooking apparatuses 1000-1, 1000-2, and 1000-3.

For example, the controller 1110 may display a state notification screen 5060 indicating state information of the plurality of cooking apparatuses 1000-1, 1000-2, and 1000-3 on the user interface 1120 as illustrated in FIG. 93. The state notification screen 5060 may include a plurality of cooking apparatus images 5061, 5063, and 5065 respectively representing the plurality of cooking apparatuses 1000-1, 1000-2, and 1000-3. Also, the state notification screen 5060 may include a plurality of state information images 5062, 5064, and 5066 respectively representing state information of the plurality of cooking apparatuses 1000-1, 1000-2, and 1000-3.

The user may confirm the states of the respective cooking apparatuses 1000-1, 1000-2, and 1000-3 via the plurality of cooking apparatus images 5061, 5063, and 5065 and the plurality of state information images 5062, 5064, and 5066 displayed on the state notification screen 5060. Particularly, the user may determine that the cooking apparatuses 1000-1 and 1000-2 are available for cooking and the cooking apparatus 1000-3 is not available for cooking.

One of the plurality of cooking apparatuses 1000-1, 1000-2, and 1000-3 may display the state information of the plurality of cooking apparatuses 1000-1, 1000-2, and 1000-3. A detailed method of displaying the state information may be the same as that of the user equipment 1100.

The food model is assigned in operation 4430.

The user equipment 1100 may assign the food model to the plurality of cooking apparatuses 1000-1, 1000-2, and 1000-3 in accordance with a use's input and transmit the food model to the plurality of cooking apparatuses 1000-1, 1000-2, and 1000-3.

For example, the controller 1110 of the user equipment 1100 may display a model assigning screen 5070 to assign the food model in accordance with a user's input on the user interface 1120 as illustrated in FIG. 94. The model assigning screen 5070 may include a plurality of cooking apparatus images 5071, 5073, and 5075 respectively representing the plurality of cooking apparatuses 1000-1, 1000-2, and 1000-3. The model assigning screen 5070 may further include model input regions 5072, 5074, and 5076 to input the food model assigned to the plurality of cooking apparatuses 1000-1, 1000-2, and 1000-3.

The user may input the assigned food model to the model input regions 5072, 5074, and 5076 in accordance with the states of the plurality of cooking apparatuses 1000-1, 1000-2, and 1000-3. For example, the user may input the food model to the cooking apparatuses 1000-1 and 1000-2 which are available for cooking.

The controller 1110 of the user equipment 1100 may assign the food model to the cooking apparatuses 1000-1 and 1000-2 according to the food model input to the model input regions 5072, 5074, and 5076 by the user. In addition, the controller 1110 may transmit data on the food model and the cooking method to the cooking apparatuses 1000-1 and 1000-2 via the communicator 1170 as illustrated in FIG. 60.

One of the plurality of cooking apparatuses 1000-1, 1000-2, and 1000-3 may assign the food model. A detailed method of assigning the food model may be the same as that of the user equipment 1100.

The food is shaped and heated by the plurality of cooking apparatuses 1000-1 and 1000-2 in operation 4440.

Each of the plurality of cooking apparatuses 1000-1 and 1000-2 that have received data on the food model may shape and heat the food and in accordance with the food model and the cooking method received from the user equipment 1100.

As described above, the user may check the states of the plurality of cooking apparatuses and assign the food model respectively to the cooking apparatuses. In addition, each of the cooking apparatuses may shape and heat the food in accordance with the food model assigned thereto. As a result, the user may cook one food or a plurality of foods more quickly by using the plurality of cooking apparatuses.

Embodiments of the present disclosure have been described above. In the embodiments described above, some components may be implemented as a "module". Here, the term 'module' means, but is not limited to, a software and/or hardware component, such as a field programmable gate array (FPGA) or application specific integrated circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more central processing units (CPUs) in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include ROM, RAM, compact disc-ROM (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user equipment configured to transmit a food model to a cooking apparatus comprising a food shaping device configured to discharge food ingredients, the user equipment comprising:
   a user interface including a touch-sensitive display, the user interface configured to:
      receive a touch input from a user for selecting the food model comprising at least one of a shape, an ingredient, or a color of a food, and
      display in response to the received touch input:
         an automatic cooking button for selecting a predetermined food shape,
         a draw button for inputting a food shape drawn on the user interface by the user,
         a cooking method button for inputting a cooking method for the food, and
         an output button for outputting instructions for making food in accordance with the selected predetermined food shape and the input cooking method;
   a transceiver configured to transmit information of the selected food model to the cooking apparatus;
   a camera configured to acquire a food image; and
   a processor configured to:
      control the transceiver to transmit the information of the food model to the cooking apparatus to instruct the cooking apparatus to shape the food according to the selected food model, and
      display a preview of the food, the preview of the food representing an appearance of the food after cooking by the cooking apparatus.

2. The user equipment according to claim 1, wherein the processor is further configured to control the user interface to display a list of food shapes on the user interface in response to a touch on the automatic cooking button.

3. The user equipment according to claim 2, wherein the processor is further configured to:
   identify food ingredients prepared in the cooking apparatus, and
   control the user interface to display a list of foods shapeable from the food ingredients.

4. The user equipment according to claim 2, wherein the processor is further configured to control the user interface to display a food shape selected by the user.

5. The user equipment according to claim 2, wherein the processor is further configured to control the transceiver to transmit the food model comprising the selected food shape to the cooking apparatus to allow the cooking apparatus to shape the food according to the food shape selected by the user.

6. The user equipment according to claim 5, wherein the processor is further configured to:
   identify food ingredients prepared in the cooking apparatus, and
   control the user interface to display an insufficient food ingredient to shape the food according to the food shape selected by the user.

7. The user equipment according to claim 1, wherein the processor is further configured to control the user interface to display a model drawing screen to draw the food shape selected by the user on the user interface in response to a touch on the draw button.

8. The user equipment according to claim 7, wherein the processor is further configured to:
   sense a touch point of the user, and
   create a food shape based on a moving path of the sensed touch point.

9. The user equipment according to claim 7, wherein the processor is further configured to control the user interface to display a reference image representing the food on the model drawing screen.

10. The user equipment according to claim 7, wherein the processor is further configured to:
    control the user interface to display at least one of a line, a circle, or a polygon in accordance with a touch input of the user in a model drawing region, and
    create the food shape from the at least one of the line, the circle, and the polygon.

11. The user equipment according to claim 7, wherein the processor is further configured to control the user interface to display an additional information input menu to input a thickness, an ingredient, and a color of the food based on the user touching an inside of the food shape.

12. The user equipment according to claim 1, wherein the processor is further configured to control the user interface to display a cooking method setting screen to input a cooking method comprising a heating temperature and a heating time in response to a touch on the cooking method button.

13. The user equipment according to claim 12, wherein the processor is further configured to control the transceiver to transmit the cooking method to the cooking apparatus to allow the cooking apparatus to cook the food according to the heating temperature and the heating time input via the cooking method setting screen.

14. The user equipment according to claim 1, wherein the preview of the food represents the appearance of the food after the food is cooked according to a heating temperature and a heating time input by the user.

15. The user equipment according to claim 1, wherein the processor is further configured to modify a size of the food shape in accordance with the touch input of the user.

16. The user equipment according to claim 1, wherein the processor is further configured to automatically arrange the food shape in accordance with the touch input of the user.

* * * * *